US008281179B2

(12) United States Patent
Akutsu et al.

(10) Patent No.: US 8,281,179 B2
(45) Date of Patent: Oct. 2, 2012

(54) INFORMATION SYSTEM, DATA TRANSFER METHOD AND DATA PROTECTION METHOD

(75) Inventors: Hiroaki Akutsu, Yokohama (JP); Takashige Iwamura, Yokohama (JP); Kenta Ninose, Yokohama (JP); Yasuo Watanabe, Machida (JP); Yasutomo Yamamoto, Sagamihara (JP); Yoshiaki Eguchi, Yokohama (JP); Hisao Homma, Odawara (JP)

(73) Assignee: Hitachi, Ltd., Tokyo (JP)

( * ) Notice: Subject to any disclaimer, the term of this patent is extended or adjusted under 35 U.S.C. 154(b) by 9 days.

(21) Appl. No.: 13/039,526

(22) Filed: Mar. 3, 2011

(65) Prior Publication Data

US 2011/0154102 A1 Jun. 23, 2011

Related U.S. Application Data

(63) Continuation of application No. 12/767,021, filed on Apr. 26, 2010, now Pat. No. 7,925,914, which is a continuation of application No. 11/850,892, filed on Sep. 6, 2007, now Pat. No. 7,739,540.

(30) Foreign Application Priority Data

Oct. 30, 2006 (JP) .................. 2006-293485
Mar. 28, 2007 (JP) .................. 2007-085675

(51) Int. Cl.
 *G06F 11/00* (2006.01)
(52) U.S. Cl. ........................................... 714/3
(58) Field of Classification Search ............ 714/6.1, 714/6.11, 6.12, 6.13, 6.2, 6.21, 6.22, 6.23, 714/6.24, 6.3, 6.31, 6.32, 42
See application file for complete search history.

(56) References Cited

U.S. PATENT DOCUMENTS

| 5,734,818 | A | 3/1998 | Kern et al. |
| 6,253,295 | B1 | 6/2001 | Beal et al. |
| 6,877,073 | B2 | 4/2005 | Sanada et al. |
| 6,973,586 | B2 | 12/2005 | Petersen et al. |
| 6,983,343 | B2 | 1/2006 | Van Cruyningen |
| 7,058,731 | B2 | 6/2006 | Kodama |
| 7,080,197 | B2 | 7/2006 | Odenwald, Jr. |
| 7,085,956 | B2 | 8/2006 | Petersen et al. |
| 7,152,120 | B2 | 12/2006 | Yamagami |
| 7,254,684 | B2 * | 8/2007 | Hiraiwa et al. ............... 711/162 |
| 7,334,101 | B2 | 2/2008 | Yagawa et al. |
| 7,437,601 | B1 * | 10/2008 | Manley et al. ............... 714/6.23 |
| 7,454,582 | B2 | 11/2008 | Watanabe et al. |

(Continued)

FOREIGN PATENT DOCUMENTS

JP 7244597 9/1995

(Continued)

*Primary Examiner* — Nadeem Iqbal
(74) *Attorney, Agent, or Firm* — Brundidge & Stanger, P.C.

(57) ABSTRACT

Availability of an information system including a storage system that performs remote copy between two or more storage apparatuses and a host computer using such storage system is improved. A third storage apparatus including a third volume is coupled to a first storage apparatus, a fourth storage apparatus including a fourth volume is coupled to a second storage apparatus, the first and third storage apparatuses perform remote copy of copying data stored in a first volume to the third volume, the first and second storage apparatuses perform remote copy of copying data stored in the first volume to a second volume, and the third and fourth storage apparatuses perform remote copy of copying data stored in the third volume to the fourth volume.

16 Claims, 61 Drawing Sheets

U.S. PATENT DOCUMENTS

| | | | |
|---|---|---|---|
| 7,467,241 B2 | 12/2008 | Masuyama | |
| 7,739,540 B2 | 6/2010 | Akutsu et al. | |
| 7,925,914 B2 * | 4/2011 | Akutsu et al. | 714/3 |
| 2001/0029570 A1 | 10/2001 | Yamamoto et al. | |
| 2004/0148443 A1 | 7/2004 | Achiwa | |
| 2004/0250034 A1 | 12/2004 | Yagawa et al. | |
| 2004/0260736 A1* | 12/2004 | Kern et al. | 707/204 |
| 2005/0027819 A1 | 2/2005 | Nakano et al. | |
| 2005/0033828 A1 | 2/2005 | Watanabe | |
| 2005/0091455 A1 | 4/2005 | Kano et al. | |
| 2005/0114599 A1 | 5/2005 | Kasako et al. | |
| 2005/0210078 A1 | 9/2005 | Maruyama et al. | |
| 2005/0251517 A1 | 11/2005 | Watanabe et al. | |
| 2005/0273565 A1 | 12/2005 | Hirakawa et al. | |
| 2006/0031594 A1 | 2/2006 | Kodam | |
| 2006/0069889 A1 | 3/2006 | Nagaya et al. | |
| 2006/0095482 A1 | 5/2006 | Suzuki et al. | |
| 2006/0168369 A1* | 7/2006 | Ohno et al. | 710/38 |
| 2006/0184728 A1 | 8/2006 | Yamagami | |
| 2006/0277378 A1 | 12/2006 | Morishita et al. | |
| 2007/0038824 A1 | 2/2007 | Suishu et al. | |
| 2007/0067593 A1 | 3/2007 | Satoyama et al. | |
| 2008/0104443 A1 | 5/2008 | Akutsu et al. | |
| 2010/0205479 A1 | 8/2010 | Akutsu et al. | |

FOREIGN PATENT DOCUMENTS

| | | |
|---|---|---|
| JP | 2001216185 | 8/2001 |
| JP | 2003015915 | 1/2003 |
| JP | 2003122509 | 4/2003 |
| JP | 2004342050 | 12/2004 |
| JP | 2005084953 | 3/2005 |
| JP | 2005115898 | 4/2005 |
| JP | 2005182222 | 7/2005 |
| JP | 2005215940 | 8/2005 |
| JP | 2005267216 | 9/2005 |
| JP | 2005316684 | 11/2005 |
| JP | 2006048676 | 2/2006 |
| JP | 2007115221 | 5/2007 |

* cited by examiner

FIG.8

| IDENTIFIER OF VIRTUAL VOLUME IN HOST | RELATED VOLUME IDENTIFIER LIST | PRIMARY VOLUME IDENTIFIER | FAILURE STATUS | PAIR STATUS |
|---|---|---|---|---|
| vsda | rsda, rsdb | rsda | NORMAL STATUS | Duplex |
| vsdb | rsdc, rsdd | rsdc | SECONDARY SYSTEM IN PREPARATION | Duplex-Pending |
| .. | .. | | .. | .. |

| POOL ID | AOU VOLUME IDENTIFIER | PAIR AOU VOLUME IDENTIFIER | ADDRESS SPACE | COW FLAG | TAKEOVER AREA | POOL VOLUME AREA IDENTIFIER |
|---|---|---|---|---|---|---|
| 1 | A-LDEV1 | APPARATUS C A-LDEV5 | 0-1999 | No | No | LDEV1(0-1999) |
| | | | 2000-3999 | No | Yes | Port=xxx. LUN=yyy (8000-9999) |
| | | | ... | ... | ... | ... |
| | | | 18000-19999 | No | No | NULL |
| 1 | A-LDEV2 | APPARATUS C A-LDEV6 | 0-1999 | No | No | LDEV2(0-1999) |
| | | | 2000-3999 | Yes | Yes | Port=xxx. LUN=yyy (10000-11999) |
| | | | ... | ... | ... | ... |
| | | | 48000-49999 | No | No | NULL |

FIG.36

| POOL ID | ATTRIBUTE | VALUE |
|---|---|---|
| 1 | SEGMENT SIZE | 2000block |
| | POOL VOLUME LIST | LDEV1, LDEV2, Port=xxx&LUN=yyy, Port=zzz&LUN=aaa,.... |
| | UNUSED (UNALLOCATED) AREA LIST | LDEV1(2000-40000), LDEV2(2000-10000), Port=xxx&LUN=yyy,... |
| | UNUSED CAPACITY | 3000000block |
| | CAPACITY WARNING | 10000block |
| | POOL PAIR IDENTIFIER | APPARATUS L POOL ID=3 |
| 2 | SEGMENT SIZE | 1000block |
| | POOL VOLUME LIST | LDEV8, Port=aaa&LUN=bbb,.... |
| | UNUSED (UNALLOCATED) AREA LIST | LDEV8(0000-40000), Port=aaa&LUN=bbb,... |
| | UNUSED CAPACITY | 100000block |
| | CAPACITY WARNING | 10000block |
| | POOL PAIR IDENTIFIER | APPARATUS L POOL ID=3 |

| UPDATE TIME | UPDATE NUMBER | WRITE ADDRESS | WRITE DATA LENGTH | JOURNAL VOLUME ADDRESS |
|---|---|---|---|---|
| 2004/03/23 23:12:56 | 2 | Volume1 700 | 300 | Volume3 1500 |
| 2004/03/23 23:12:59 | 3 | Volume2 1000 | 8 | Volume4 1800 |

| JOURNAL GROUP IDENTIFIER | 1 |
|---|---|
| PAIR IDENTIFIER LIST | 2, 8, 9... |
| JOURNAL VOLUME NUMBER LIST | 2, 8, 11.. |
| UPDATE NUMBER | 4 |
| OPPONENT STORAGE APPARATUS NUMBER | ... |
| OPPONENT JOURNAL GROUP NUMBER | ... |
| OLDEST ADDRESS OF UPDATE INFORMATION | ... |
| LATEST ADDRESS OF UPDATE INFORMATION | ... |
| START ADDRESS OF UPDATE INFORMATION TRANSFER | ... |
| OLDEST ADDRESS OF WRITE DATA | ... |
| LATEST ADDRESS OF WRITE DATA | ... |
| RESTORED LATEST UPDATE NUMBER | ... |

41330

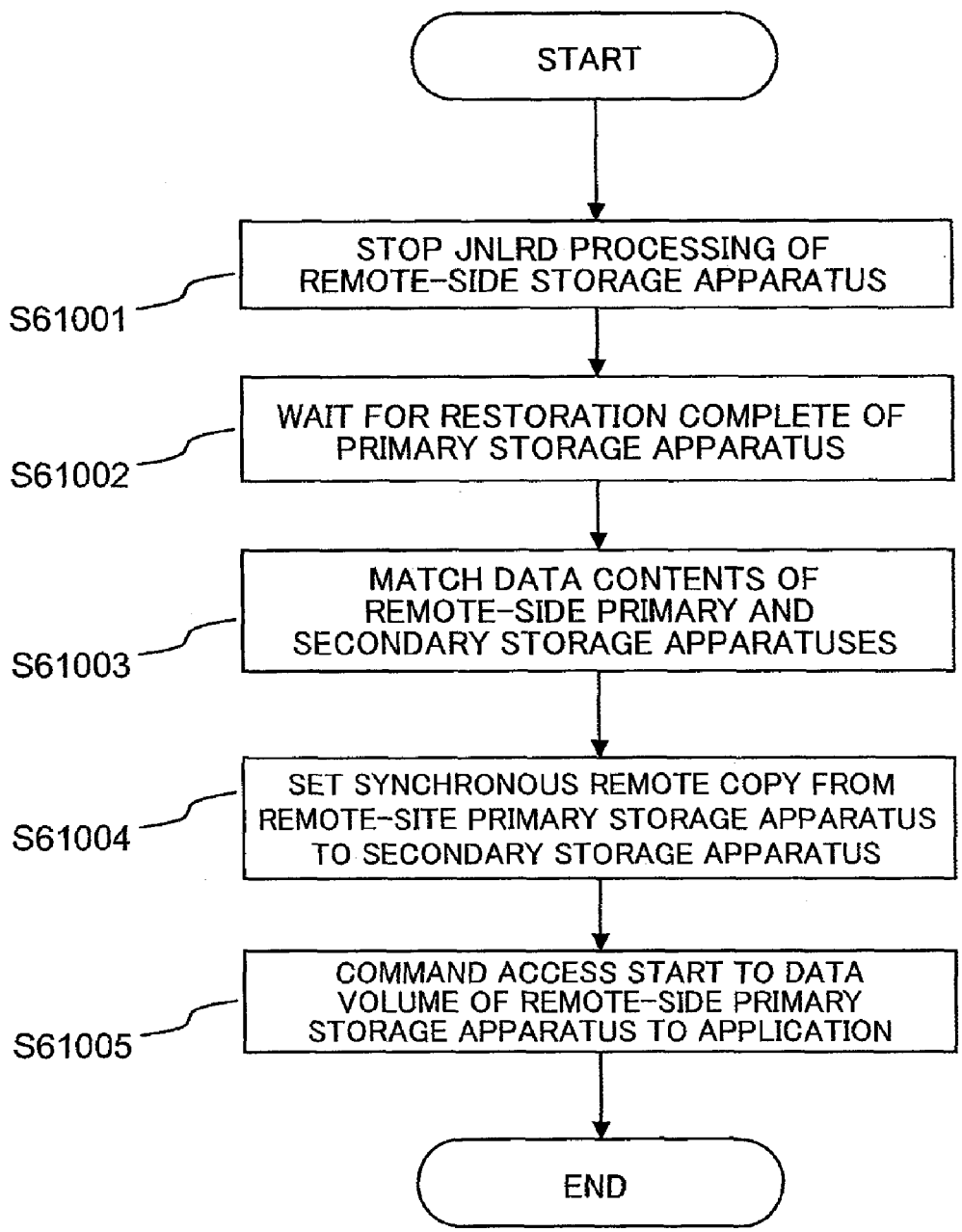

INFORMATION SYSTEM, DATA TRANSFER METHOD AND DATA PROTECTION METHOD

CROSS REFERENCE TO RELATED APPLICATIONS

The present application is a continuation of application Ser. No. 12/767,021, filed Apr. 26, 2010 now U.S. Pat. No. 7,925,914; which is a continuation of application Ser. No. 11/850,892, filed Sep. 6, 2007, now U.S. Pat. No. 7,739,540; which relates to and claims priority from Japanese Patent Applications No. 2007-85675, filed on Mar. 28, 2007 and No. 2006-293485, filed on Oct. 30, 2006, the entire disclosure of which is incorporated herein by reference.

BACKGROUND OF THE INVENTION

The present invention relates to a storage system comprising a plurality of storage areas, and a host computer coupled to the storage system.

Generally, an information system is equipped with a storage apparatus that uses an HDD (hard disk drive) as a storage device, and a storage system including this storage apparatus is accessed from a plurality of host systems (hosts, for example) via a storage area network (SAN: Storage Area Network). Generally, with a storage apparatus, a high-reliability method according to RAID (Redundant Array of Independent (or Inexpensive) Disks) technology is adopted to provide reliability to the storage apparatus beyond the reliability of a stand-alone HDD. Nevertheless, pursuant to the advancement of information society in recent years, the availability (service continuity) of information systems depending on reliability based on RAID is becoming inadequate.

Japanese Patent Laid-Open Publication No. H7-244597 (Patent Document 1) describes high-availability technology to deal with the foregoing situation. This technology prepares a production site and a backup site respectively including a host computer (hereinafter abbreviated as a"host") and a storage apparatus, and mirrors data stored in the storage apparatus of the production site to the storage apparatus of the backup site. If the storage apparatus of the production site fails and shuts down, application processing that was suspended as a result of such storage apparatus failure is resumed using the storage apparatus and the host of the backup site. This technology is generally referred to as remote copy or remote mirroring.

SUMMARY OF THE INVENTION

With the technology of Patent Document 1, since the application is resumed with a different host when a storage apparatus fails and shuts down, re-boot processing of the application is required. Needless to say, there will be a problem concerning availability since the application will not be able to perform its normal operation from the time such application is suspended until the re-boot is complete.

Thus, an object of the present invention is to improve the availability of an information system including a storage system that performs remote copy between two or more storage apparatuses, and a host that uses this storage system.

In order to achieve the foregoing object, the present invention provides an information system having a first host computer as a host system, a first storage apparatus coupled to the first host computer and including a first volume, and a second storage apparatus coupled to the first storage apparatus and the first host computer and including a second volume. This information system comprises a third storage apparatus coupled to the first storage apparatus and including a third volume, and a fourth storage apparatus coupled to the second storage apparatus and including a fourth volume. The first and second storage apparatuses execute remote copy of copying data stored in the first volume to the second volume. The first and third storage apparatuses execute remote copy of copying data stored in the first volume to the third volume. The second and fourth storage apparatuses execute remote copy of coping data stored in the second volume to the fourth volume.

The present invention also provides a data protection method in an information system having a first host computer as a host system, a first storage apparatus coupled to the first host computer and including a first volume, and a second storage apparatus coupled to the first storage apparatus and the first host computer and including a second volume. This data protection method comprises a first step of connecting a third storage apparatus including a third volume to the first storage apparatus and connecting a fourth storage apparatus including a fourth volume to the second storage apparatus, and the first and second storage apparatuses executing remote copy of copying data stored in the first volume to the second volume, and a second step of the first and third storage apparatuses executing remote copy of copying data stored in the first volume to the third volume, and the second and fourth storage apparatuses executing remote copy of copying data stored in the second volume to the fourth volume.

The present invention further provides an information system having a first host computer as a host system, a first storage apparatus coupled to the first host computer and including a first volume, and a second storage apparatus coupled to the first storage apparatus and the first host computer and including a second volume. This information system comprises a third storage apparatus coupled to the first and second storage apparatuses and including a third volume, and a fourth storage apparatus coupled to the third storage apparatus and including a fourth volume. The first and second storage apparatuses execute remote copy of copying data stored in the first volume to the second volume. The first and third storage apparatuses execute remote copy of copying data stored in the first volume to the third volume. The third and fourth storage apparatuses execute remote copy of coping data stored in the third volume to the fourth volume.

The present invention additionally provides a data protection method in an information system having a first host computer as a host system, a first storage apparatus coupled to the first host computer and including a first volume, and a second storage apparatus coupled to the first storage apparatus and the first host computer and including a second volume. This data protection method comprises a first step of connecting a third storage apparatus including a third volume to the first and second storage apparatuses and connecting a fourth storage apparatus including a fourth volume to the third storage apparatus, the first and second storage apparatuses executing remote copy of copying data stored in the first volume to the second volume, and the first and third storage apparatuses executing remote copy of copying data stored in the first volume to the third volume, and a second step of the third and fourth storage apparatuses executing remote copy of copying data stored in the third volume to the fourth volume.

According to the present invention, it is possible to improve the availability of an information system including a storage system that performs remote copy between two or more storage apparatuses, and a host that uses this storage system.

BRIEF DESCRIPTION OF DRAWINGS

FIG. 8 is a conceptual diagram showing a device relation table to be managed by an I/O path manager;

FIG. 35 is a conceptual diagram explaining the specific contents of the AOU address mapping information;

FIG. 36 is a conceptual diagram explaining the specific contents of the AOU pool management information;

FIG. 46 is a conceptual diagram explaining update information;

FIG. 47 is a conceptual diagram explaining journal group information 41330P;

FIG. 61 is a flowchart showing the flow of failover processing according to the eighteenth embodiment.

DETAILED DESCRIPTION OF THE DRAWINGS

Embodiments of the present invention are now explained with reference to the attached drawings.

(1) First Embodiment

1. Constitution of Information System

Figure 1:
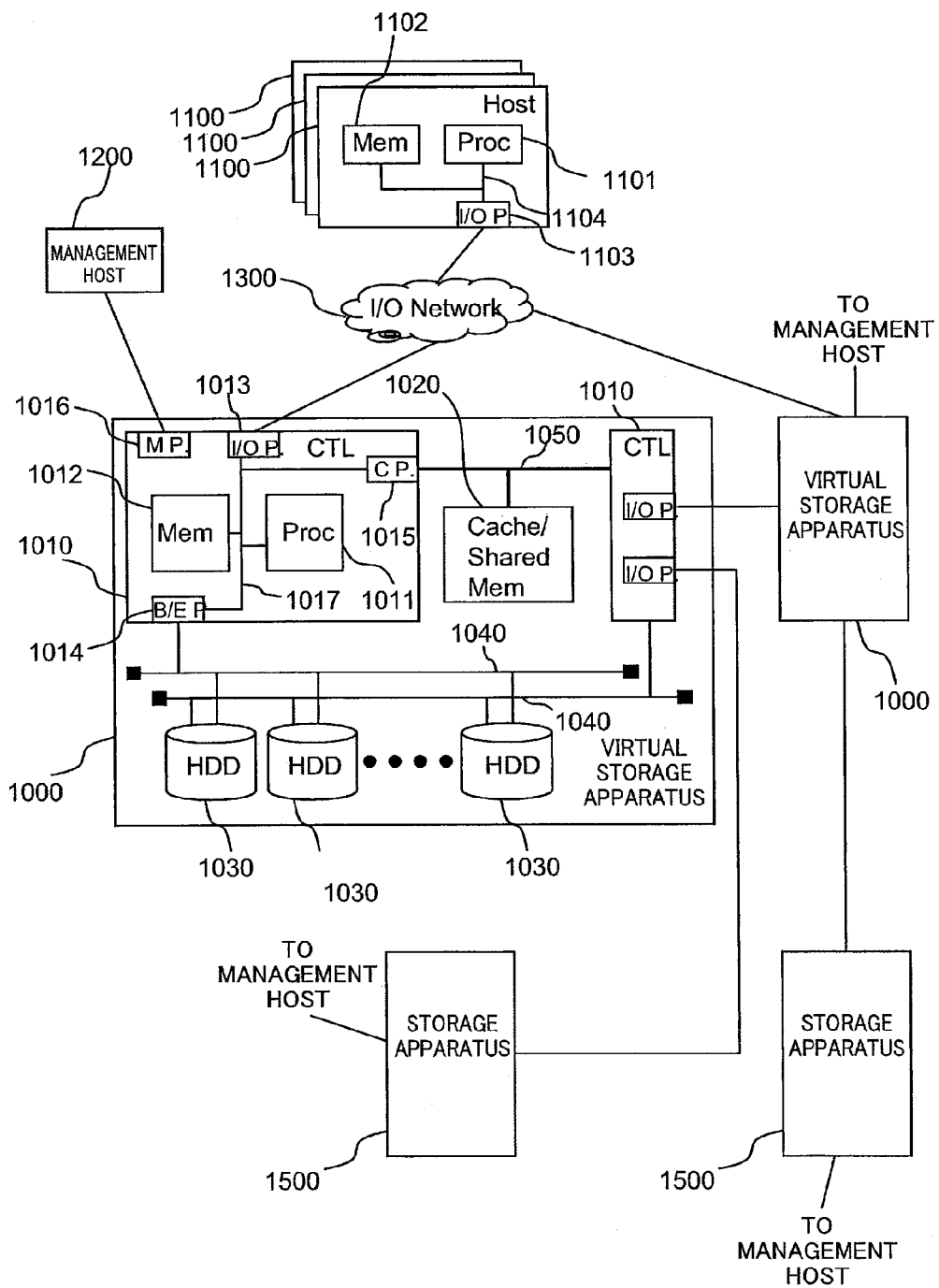
FIG. 1 is a block diagram showing an example of the hardware constitution of an information system according to a first embodiment of the present invention.

FIG. 1 is a diagram showing an example of the hardware constitution (configuration) of an information system according to an embodiment of the present invention.

The information system, for example, comprises a storage apparatus 1500, a host computer (hereafter abbreviated as a "host") 1100, a management host 1200, and two or more virtual storage apparatuses 1000. A plurality of storage apparatuses 1500, host computers (hereafter abbreviated as the "hosts") 1100, and management hosts 1200 may be provided, respectively. The virtual storage apparatus 1000 and the host 1100 are mutually connected via an I/O network 1300. The virtual storage apparatus 1000 and the storage apparatus 1500 and the management host 1200 are mutually connected via a management network (not shown) or the I/O network 1300.

The host 1100 has a host internal network 1104, and coupled to this network 1104 are a processor (abbreviated as Proc in the diagrams) 1101, a memory (abbreviated as Mem in the diagrams) 1102, and an I/O port (abbreviated as I/O P in the diagrams) 1103. The management host 1200 may also have the same hardware constitution as the host 1100. Incidentally, an expansion card for adding an I/O port to the host 1100 is sometimes referred to as an HBA (Host Bus Adapter).

The management host 1200 has a display device, and this display device is able to display a screen for managing the virtual storage apparatus 1000 and the storage apparatus 1500. Further, the management host 1200 is able to receive a management operation request from a user (for instance, an operator of the management host 1200), and send the received management operation request to the virtual storage apparatus 1000 and the storage apparatus 1500. The management operation request is a request for operating the virtual storage apparatus 1000 and the storage apparatus 1500, and, for example, there are a parity group creation request, an internal LU (Logical Unit) creation request, a path definition request, and operations related to a virtualization function.

Connection via a fibre channel is foremost considered as the I/O network 1300, but in addition thereto, a combination of FICON (Fibre CONnection: registered trademark), or Ethernet (registered trademark) and TCP/IP (Transmission Control Protocol/Internet Protocol) and iSCSI (internet SCSI (Small Computer System Interface)), and a combination of network file systems such as Ethernet (registered trademark) and NFS (Network File System) of CIFS (Common Internet File System) may also be considered. Further, the I/O network 1300 may also be other than the above so as long as it is a communication device capable of transferring I/O requests. Further, the network that connects the virtual storage apparatus 1000 and the storage apparatus 1500 is also the same as the I/O network 1300.

The virtual storage apparatus 1000 comprises a controller (indicated as CTL in the diagrams) 1010, a cache memory (indicated as CM in the diagrams) 1020, and a plurality of HDDs 1030. As a preferred embodiment, the controller 1010 and the cache memory 1020 are respectively constituted of a plurality of components. The reason for this is because even if a failure occurs in a single component and such component is blocked, the remaining components can be used to continue receiving I/O requests as represented by read and write requests.

The controller 1010 is an apparatus (a circuit board, for example) for controlling the operation of the virtual storage apparatus 1000. The controller 1010 has an internal network 1017, and coupled to this internal network 1017 are an I/O port 1013, a cache port (abbreviated as CP in the diagrams) 1015, a management port (abbreviated as MP in the diagrams) 1016, a back-end port (abbreviated as B/E P in the diagrams) 1014, a processor (a CPU (Central Processing Unit), for instance) 1011, and a memory 1012. The controllers 1010 and the cache memories 1020 are mutually connected each other via a storage internal network 1050. Further, the controller 1010 and the respective HDDs 1030 are mutually connected via a plurality of back-end networks 1040.

The hardware constitution of the storage apparatus 1500 is constituted of similar components as those of the virtual storage apparatus 1000. Incidentally, when the virtual storage apparatus 1000 is a dedicated device or switch for virtualization without an HDD, the storage apparatus 1500 does not need to be constituted of similar components as those of the virtual storage apparatus 1000. Further, the internal network of the host 1100 and the virtual storage apparatus 1000 is preferably of a broader bandwidth than the transfer bandwidth of the I/O port 1013, and all or a part thereof may be substituted with a bus or switch-type network. Further, in FIG. 1, although only one I/O port 1013 is provided to the controller 1010, in reality, a plurality of I/O ports 1013 may exist in the controller 1010.

According to the foregoing hardware constitution, the host 1100 will be able to read or write all or a part of the data stored in the HDD of the virtual storage apparatus 1000 and the storage apparatus 1500. Incidentally, in the ensuing explanation, the system handling the storage of data is referred to as a storage cluster. Further, a subsystem that realizes high availability by including two subsystems inside the storage cluster and which includes the virtual storage apparatus 1000 and/or the storage apparatus 1500 is referred to as a storage subsystem.

2. Overview of Present Embodiment

Figure 2:
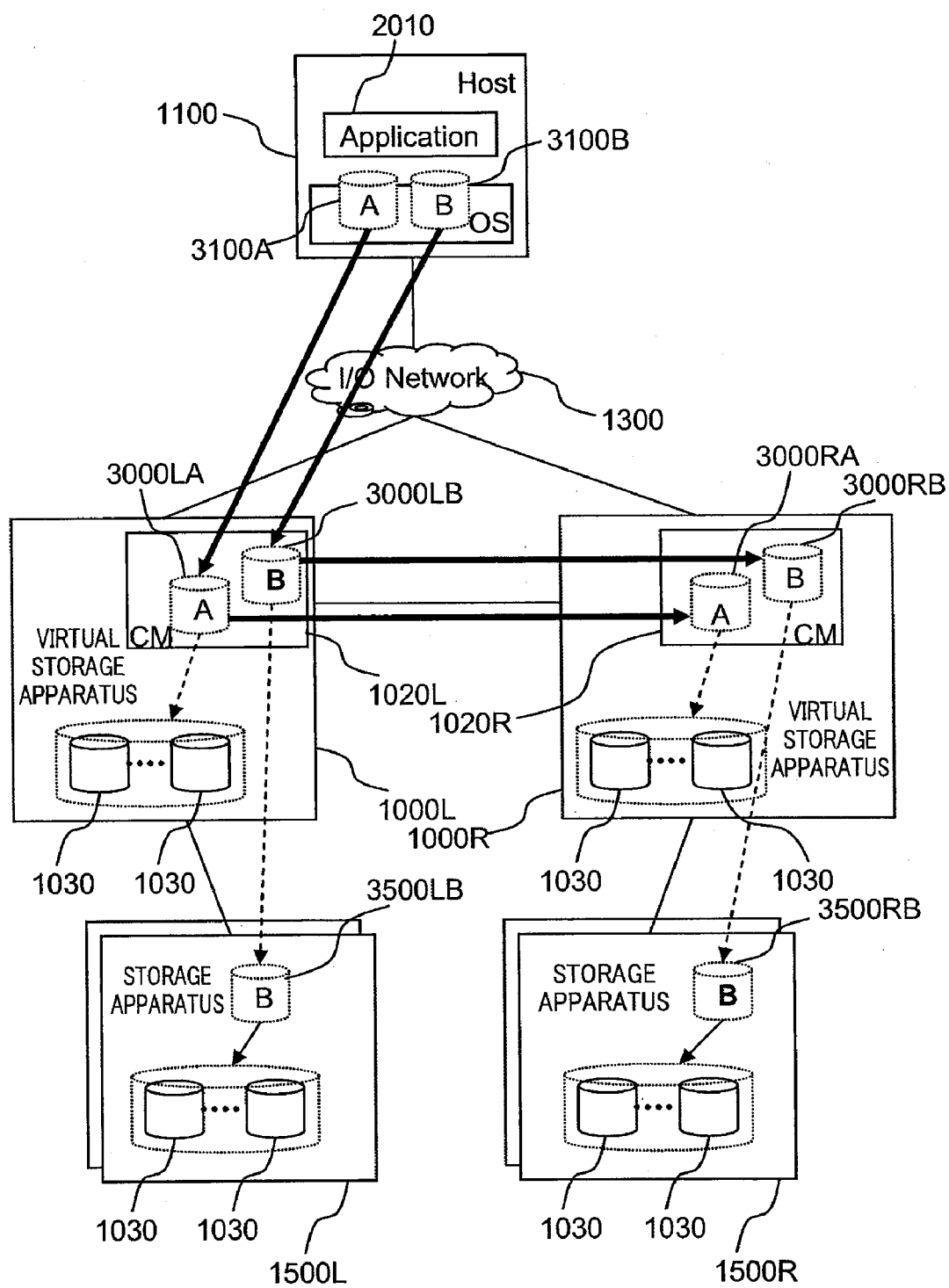
FIG. 2 is a first conceptual diagram showing the overview of a first embodiment of the present invention.

In this embodiment, in order to improve the availability of a storage system including the virtual storage apparatus 1000 having a virtualization function for virtualizing a storage area such as a volume in another storage apparatus, a redundant constitution using another virtual storage apparatus 1000 is adopted. FIG. 2 is a diagram showing an overview of such a duplex constitution.

In this overview, the storage system includes a virtual storage apparatus 1000L, a virtual storage apparatus 1000R, a storage apparatus 1500L, and a storage apparatus 1500R. Incidentally, in order to simplify the following explanation, let it be assumed that the virtual storage apparatus 1000L and the storage apparatus 1500L serve as a primary system (production system), and the virtual storage apparatus 1000R and the storage apparatus 1500R serve as a secondary system (backup system). Nevertheless, when the number of volumes to be respectively provided by the virtual storage apparatuses 1000L, 1000R to the host 1100 is two or more volumes, in substitute for handling the primary system/secondary system in virtual storage apparatus units, only the virtual storage apparatuses 1000L, 1000R to serve as the primary system in volume units need to be defined.

The respective virtual storage apparatuses 1000L, 1000R provide partial or all areas of a parity group (configured based on RAID technology) with its own HDD 1030 as the constituent element as a volume 3000LA and a volume 3000RA to the host 1100 (corresponds to the portion in which 'A' is indicated in a cylinder in FIG. 2). Further, the virtual storage apparatus 1000 is also able to optionally provide, based on the virtualization function, virtual volumes 3000LB, 3000RB (volumes in which the nonvolatile storage areas of the corresponding HDD or the like exist outside the virtual storage apparatuses 1000L, 1000R). In this overview, a part or all of the volumes 3500LB, 3500RB provided by the storage apparatuses 1500L, 1500R are used as the corresponding nonvolatile storage areas. Incidentally, reference to "data of a volume" in the following explanation includes, in addition to the data stored in the HDD 1030, data that is temporarily stored in the cache memory 1020. Further, "data of a virtual volume" described later includes, in addition to the data stored in the volumes 3500LB, 3500RB of the storage apparatuses 1500L, 1500R, data that is temporarily stored in the cache memory 1020 of the virtual storage apparatuses 1000L, 1000R.

Meanwhile, an application program (hereinafter sometimes abbreviated as an "application") 2010, an OS, and system programs as represented by daemon and management programs for assisting in the setting and processing of the OS are executed in the host 1100. The OS provides to the application 2010 an interface for I/O requests to data existing in the volumes 3000LA, 3000LB, 3000RA, 3000RB provided by the virtual storage apparatuses 1000L, 1000R, and sends I/O requests to the appropriate virtual storage apparatuses 1000L, 1000R and volumes 3000LA, 3000LB, 3000RA, 3000RB according to the request from the application 2010. In a normal status, the host 1100 issues an I/O request as represented by a read or write request to the volumes 3000LA, 3000LB of the virtual storage apparatus 1000L, and thereby sends and receives data. In other words, upon receiving a read request, the virtual storage apparatus 1000L reads data from the HDD 1030 and returns such data to the host 110 when the requested volumes 3000LA, 3000LB, 3500LB correspond to the HDD 1030 inside the virtual storage apparatus 1000L, or acquires the necessary data and returns such data (all or a part) to the host 1100 by issuing a read request to the storage apparatus 1500L.

In the case of a write request, in order to make the data redundant, the virtual storage apparatus 1000L that received the write data sends the write data to the virtual storage apparatus 1000R as the secondary system, and returns the write complete message to the host 1100 after the virtual storage apparatus 1000L receives a write data reception complete message from the virtual storage apparatus 1000R. Incidentally, write data to the virtual storage apparatus 1000L and write data received by the virtual storage apparatus 1000R via the virtual storage apparatus 1000L may also be temporarily retained in the cache memories 1020L, 1020R of the respective virtual storage apparatuses 1000L, 1000R. Incidentally, as one example of this embodiment, the transfer of this write data is conducted via storage remote copy.

Figure 3:
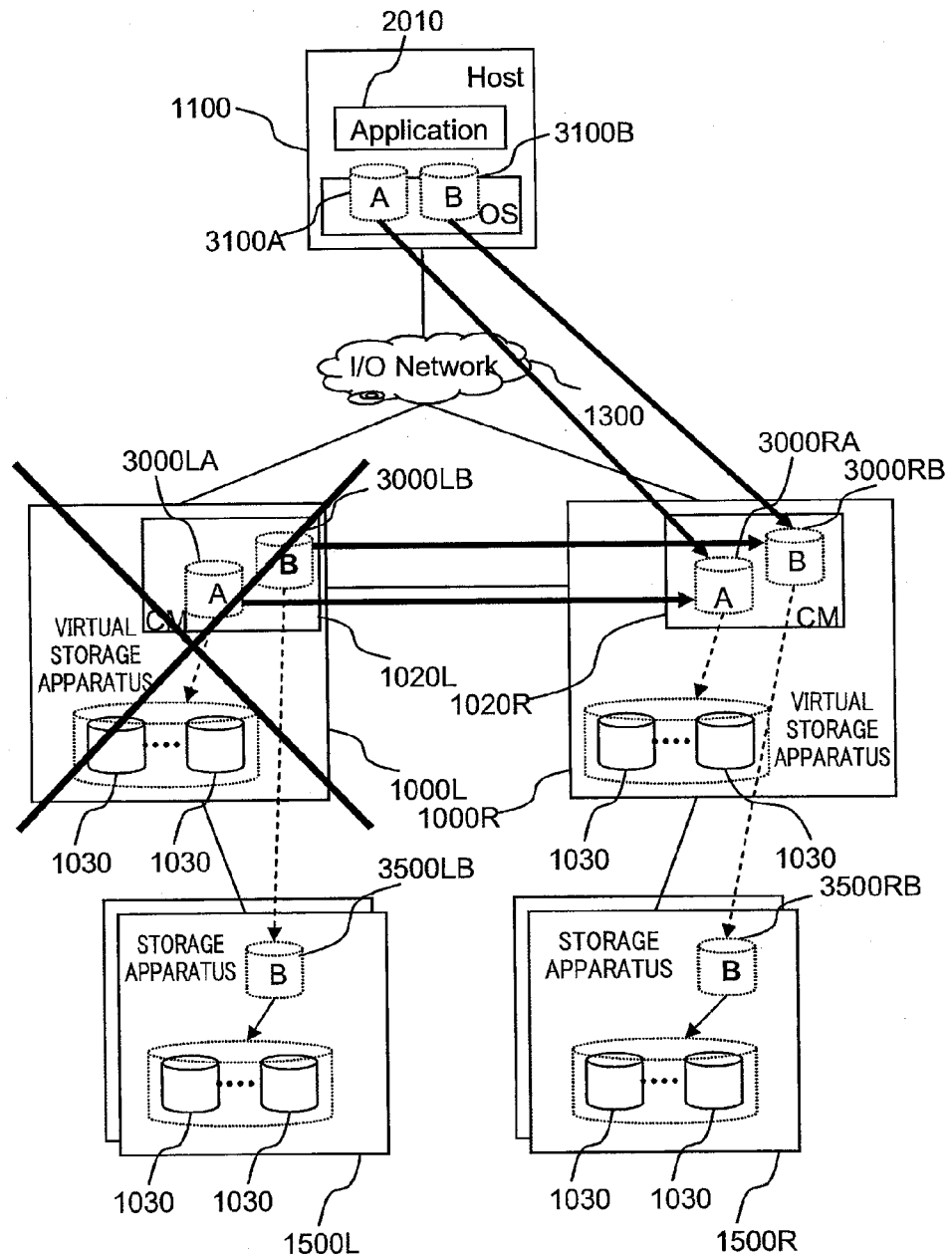
FIG. 3 is a second conceptual diagram showing the overview of the first embodiment.

FIG. 3 shows the processing overview of the information system after a failure occurred in the virtual storage apparatus 1000L under a normal status.

When the primary virtual storage apparatus 1000L fails and shuts down, the system program in the host 1100 detects this failure, and switches the destination of the I/O request from the primary virtual storage apparatus 1000L to the secondary virtual storage apparatus 1000R. Nevertheless, in this case also, the application 2010 is able to continue I/O without being aware that the destination of the I/O request has been switched. Thus, normally, as a volume identifier designated at the time of an I/O request from the application 2010 or the file system, the system program provides a virtual volume identifier (or a device file) at an OS layer (more specifically, a layer that is lower than the file system), and the lower layer of OS manages the correspondence of that identifier and the identifier (or device file) actually allocated to the volume. When switching the destination of the I/O request, the correspondence thereof is switched from the volume 3000LA and the volume 3000LB of the virtual storage apparatus 1000L to the volume 3000RA and the volume 3000RB of the virtual storage apparatus 1000R, so as to realize switching that will be transparent to the application 2010.

Further, the virtual storage apparatus 1000R is also able to process the write request, according to the arrival of such write request to the volumes 3000RA, 3000RB from the host 1100, or other express fail over requests. As an example of this change processing, in line with the data copy from the virtual storage apparatus 1000L to the virtual storage apparatus 1000R, when the setting is configured to deny the write request from the host 1100 to the volumes 3000RA, 3000RB of the virtual storage apparatus 1000R, such setting is cancelled. Further, when write data is being transferred using remote copy, the copy status of remote copy may also be changed.

Figure 4:
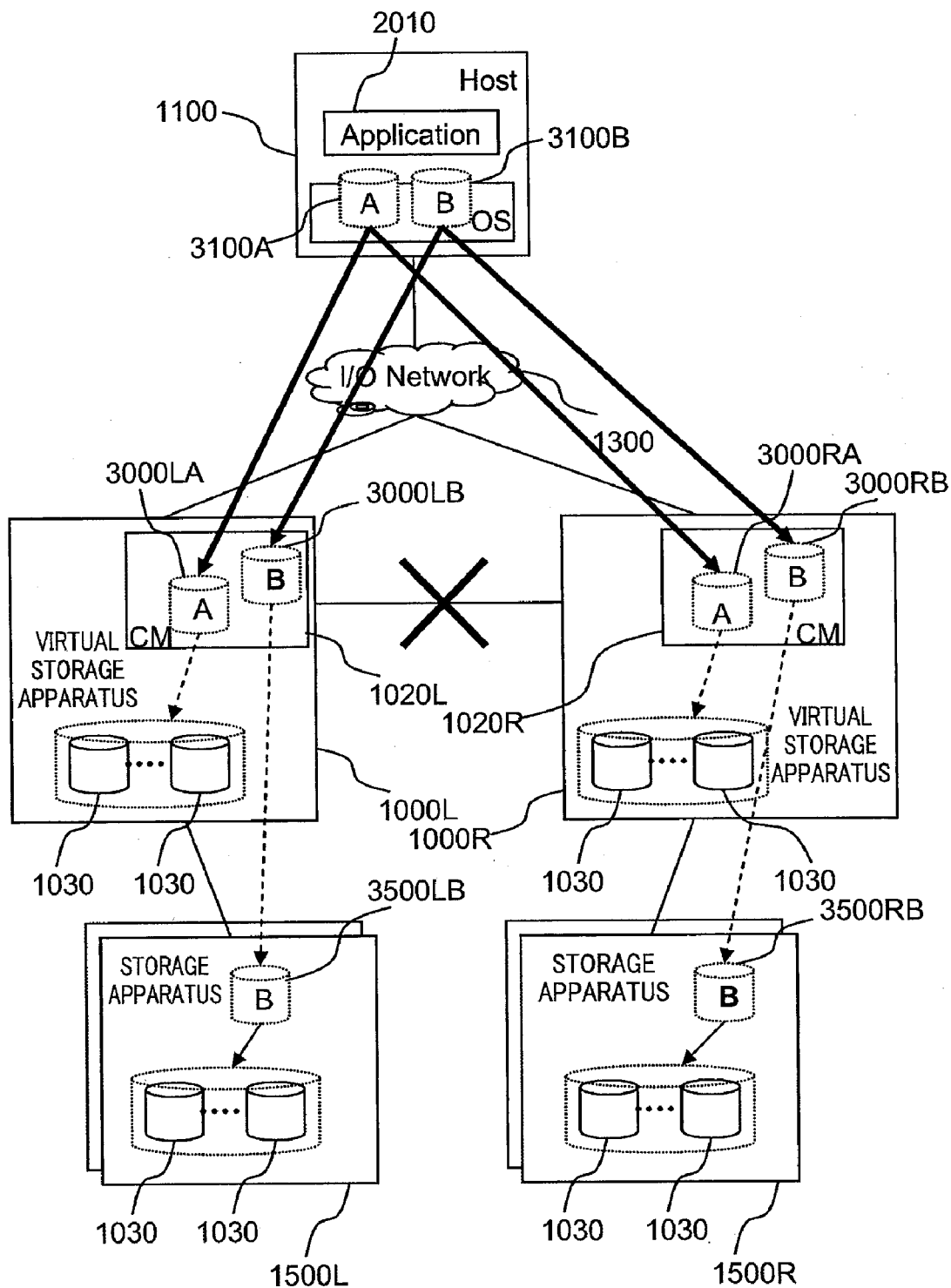
FIG. 4 is a third conceptual diagram showing the overview of the first embodiment.

FIG. 4 shows the processing overview of the information system after the occurrence of a failure in the network between the virtual storage apparatuses 1000L, 1000R.

The virtual storage apparatus 1000L that detected the network failure notifies this failure to the host 1100. The host 1100 that received the failure notice requests the secondary virtual storage apparatus 1000R to process the write request and issues subsequent write requests to both the primary virtual storage apparatus 1000L and the secondary virtual storage apparatus 1000R so as to make the data of the primary system and the data of the secondary system uniform.

3. Programs and Information to be Executed by Host 1100

Figure 5:
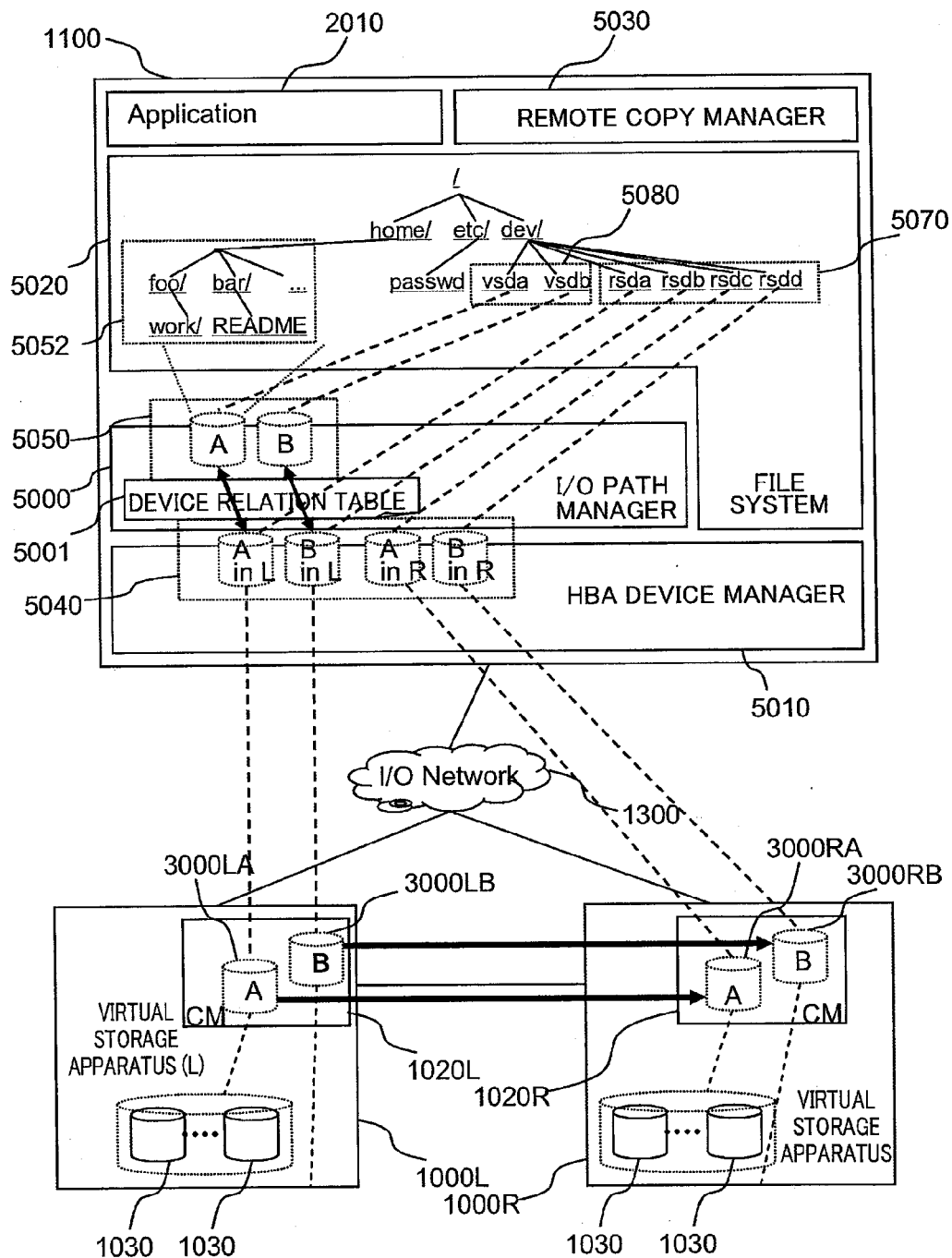
FIG. 5 is a conceptual diagram representing the software constitution in a host.

FIG. 5 is a diagram illustrating the concept to be provided by the respective software programs in addition to the software programs to be executed in the host 1100 and information to be used by such software programs. Incidentally, although the software programs are retained in the memory 1102 (FIG. 1) and executed by the processor 1101 (FIG. 1), such software programs may be partially realized as hardware and executed.

In the host 1100, in addition to the application 2010 and the remote copy manager 5030, a file system 5020, an I/O path manager 5000 and an HBA device driver 5010 are executed as program modules inside the OS or Kernel (it is not necessary to execute all processing, for the file system 5020, the I/O path manager 5000 or the HBA device driver 5010, inside the Kernel.).

The HBA device driver 5010 is a program for sending and receiving I/O requests and incidental data through the I/O port 1103 (FIG. 1) mounted on the HBA, and controlling communication with the other virtual storage apparatuses 1000L, 1000R and the storage apparatuses 1500L, 1500R. The HBA device driver 5010 is also able to provide an identifier corresponding to the volumes 3000LA, 3000LB, 3000RA, 3000RB provided by the virtual storage apparatuses 1000L, 1000R to the upper layer, and receive an I/O request accompanied with such identifier. The volume 5040 illustrates this concept, and corresponds to the respective volumes 3000LA, 3000LB, 3000RA, 3000RB provided by the virtual storage apparatuses 1000L, 1000R.

The I/O path manager 5000 is a module for switching the I/O request destination of the application 2010. This module provides to the file system 5020 an I/O request interface and the identifier, which is the same type of identifier corresponding to the volume 5040 provided by the HBA device driver 5010 and corresponds to a virtual volume in the host 1100. The identifier corresponding to the virtual volume in the host 1100 corresponds to the identifier corresponding to the volume 5040 provided by the HBA device driver 5010 in the module, and the device relation table 5001 retains the correspondence thereof. The volume 5050 illustrates the concept of this virtual volume in the host 1100, and, in FIG. 5, an example of the correspondence thereof corresponds to the identifier corresponding to the volumes 3000LA, 3000LB of the virtual storage apparatus 1000L (to put it differently, it could be said that the entities of the virtual volume 5050 in the host 1100 are the volumes 3000LA, 3000LB of the virtual storage apparatus 1000L).

An I/O request up to this layer is usually designated in a fixed-length block access format. Nevertheless, the I/O request is not limited thereto when the host 1100 is a mainframe, and it may also be designated in a CKD (Count Key Data) format.

The file system 5020 is a module for sending an I/O request and sending and receiving data from/to the virtual storage apparatuses 1000L, 1000R, which is done through the identifier and the I/O interface corresponding to the volume 5040 provided by the HBA device driver 5010, and the identifier and the interface corresponding to the virtual volume 5050 in the host 1100 provided by the I/O path manager 5000. FIG. 5 illustrates as an example of the structure of a directory tree inside the file system 5020 in a state where a part of such tree structure 5052 is stored in the volume 5050 provided through virtualization in the host 1100 by the I/O path manager 5000 (as explained above, more precisely, provision of the virtual volume 5050 in the host 1100 of the I/O path manager 5000 is made through the identifier, and the data indicated as being stored in the volume 5050 is actually stored in the volumes 3000LA, 3000LB, 3000RA, 3000PB provided by the virtual storage apparatuses 1000L, 1000R shown in the device relation table 5001). The file system 5020 provides an interface of a file I/O to the application 2010. The file system 5020 called from the application 2010 through the file I/O interface converts the read or write request accompanied with a file name and data offset in the file into a read or write request of a block format while referring to structural information in the file system 5020 such as a directory file or an inode, and delivers the read or write request to the I/O path manager 5000 or the HBA device driver 5010.

Incidentally, with a Unix system or Windows (registered trademark) system OS, the file I/O interface is used to provide a function referred to as a device file system as the interface for directly operating the data of volumes. Normally, the device file system is deployed under the control of the '/dev' directory of the file space, and the file name of the file of the foregoing directory and below (rsda and so on in the illustrated example) corresponds to the volumes 5040, 5050 provided by the lower layer (HBA device driver 5010 and I/O path manager 5000) of the file system 5020. Then, data stored in the volumes 5040, 5050 can be read and written with the file I/O interface as though such data is stored in the device files 5070, 5080. Incidentally, in the example shown in FIG. 5, the device file 5070 (rsda, rsdb, rsdc, rsdd) corresponds to the volume 5040 recognized and provided by the HBA device driver 5010, and the device file 5080 (vsda, vsdb) corresponds to the volume 5050 provided by the I/O path manager 5000. These device files 5070, 5080 may be used for the purpose of realizing independent data organization or buffer management when the application 2010 is a database.

The remote copy manager 5030 is a program for acquiring the status of remote copy for realizing the data transfer between the virtual storage apparatuses 1000L, 1000R, and for the host 1100 and the I/O path manager 5000 to perform the operation of remote copy, and communicates with the virtual storage apparatuses 1000L, 1000R according to the request of a program, a user or the I/O path manager 5000 using this program.

Incidentally, as explained above, it would be desirable if the functions of the HBA device driver 5010 and the I/O path manager 5000 could be partially or wholly installed and uninstalled as modules inside the Kernel. This is because, since the HBA device driver 5020 is a program for controlling the HBA, it is often provided by the manufacturer of the HBA. Similarly, since the processing of the I/O path manager 5000 is decided subject to the processing of the virtual storage apparatuses 1000L, 1000R, it is possible that some or all of the modules will be provided by the manufacturer of the virtual storage apparatuses 1000L, 1000R. Therefore, as a result of being able to install/uninstall this program, it will be possible to constitute an information system based on a broad range of combinations of HBA and virtual storage apparatuses 1000L, 1000R. Further, with the present invention, since the primary system and the secondary system are switched in a manner that is transparent to the application 2010, transparent switching that does not require the recompilation or the like of the application 2010 can be realized by executing processing inside the Kernel. Moreover, since the I/O path manager 5000 exists in the intermediate layer of the file system 5020 and the HBA device driver 5010, recompilation of the file system 5020 is no longer required, and transparency of the file system is also secured. In addition, the I/O path manager 5000 is able to use the functions of the HBA device driver 5010.

Further, the following two methods can be considered when the I/O path manager 5000 inside the Kernel calls the remote copy manager 5030 or performing the opposite communication method thereof.

(A) The I/O path manager 5000 creates a virtual volume for communication, and the file system 5020 creates this communication volume as a device file in the file space. The remote copy manager 5030 stands by in a state of periodically executing a read system call to the device file. The I/O path manager 5000 receives an I/O request from the remote copy manager 5030, but pends it internally. Then, when it becomes necessary for this module to send a message to the remote copy manager 5030, the I/O path manager 5000 returns the data containing the message defined as a return value of the I/O request to the remote copy manager 5030 through the file system 5020. Incidentally, the read system call issued by the remote copy manager thereupon will be forced to wait inside the Kernel for a long period of time. If this is not preferable, the I/O path manager 5000 should return data indicating that there is no message to the remote copy manager 5030 through the file system 5020 after the lapse of a prescribed period of time, and the remote copy manager 5030 that received this message should execute the read system call once again.

(B) Unix (registered trademark) domain socket is used and this is treated as a virtual network communication. Specifically, the remote copy manager 5030 operates one end of the socket, and the I/O path manager 5000 operates the remaining end.

Incidentally, in the following explanation, when the I/O path manager 5000 is to operate remote copy or refer to the status, let it be assumed that such operation is conducted by calling the remote copy manager 5030 through the foregoing communication.

4. Programs and Information to be Executed by Virtual Storage Apparatus 1000

Figure 6:
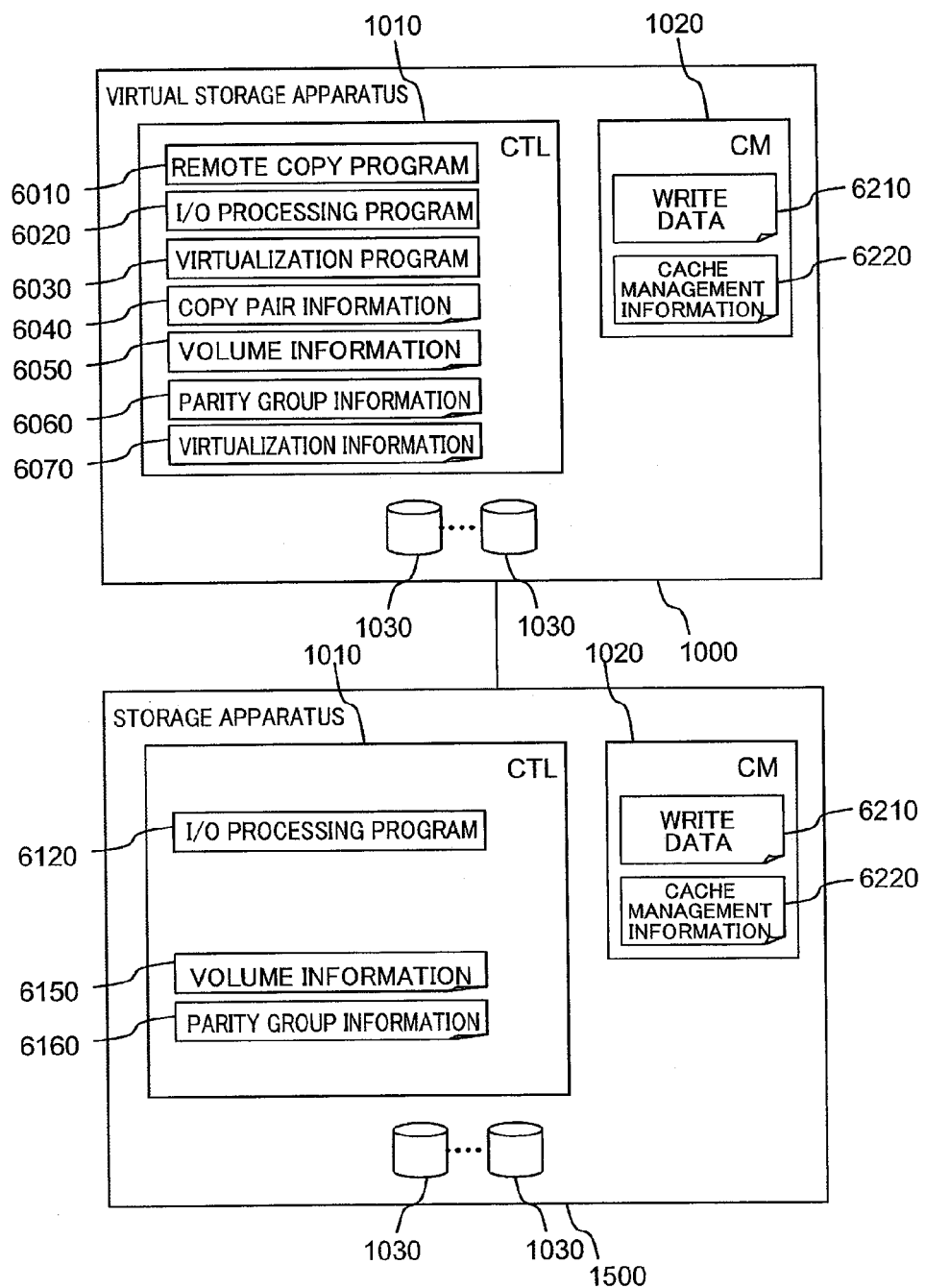
FIG. 6 is a block diagram representing the software constitution in a virtual storage apparatus and a storage apparatus.

FIG. 6 is a diagram showing the programs to be executed by the virtual storage apparatuses 1000 (1000L, 1000R) and the storage apparatuses 1500 (1500L, 1500R), and information to be managed by these programs. Incidentally, although the programs are retained in the memory 1102 (FIG. 1) and the cache memory 1020 and executed by the processor 1101 (FIG. 1), such programs may be partially constituted as hardware and executed.

<4.1. I/O Processing Program 6020, Parity Group Information 6060 and Volume Information 6050>

The parity group information 6060 contains information relating to the following constitution of each parity group.

(1) Identifier of HDD 1030 configuring the parity group. Since a plurality of HDDs 1030 are participating in the parity group, this information exists in a plurality for each parity group.

(2) RAID level

Further, the volume information 6050 contains information relating to the following configuration of each volume.

(1) Volume capacity (2) Identifier of the parity group and areas (start address and/or end address) in the parity group storing data corresponding to the volume.

The I/O processing program 6020 executes the following processing relating to the I/O request received from the host 1100 by referring to the volume information 6050 and the parity group information 6060.

(A) Staging: Copying data stored in the HDD 1030 to the cache memory 1020.

(B) Destaging: Copying data stored in the cache memory 1020 to the HDD 1030. Incidentally, as the pre-processing thereof, redundant data based on RAID technology may also be created.

(C) Read processing: Determining whether data corresponding to the request exists in the cache memory 1020 in response to the read request received from the host 1100. In case of the data corresponding to the request not existing in the cache memory 1020, staging processing is executed to copy the data to the cache memory 1020, and such data is sent to the host 1100. Incidentally, in case of such data existing in the cache memory 1020, this data is sent to the host 1100.

(D) Write processing: Storing the write data received from the host 1100 in the cache memory 1020. Incidentally, in case of the free area in the cache memory 1020 not being enough during the processing, destaging processing is executed to copy appropriate data to the HDD 1030, and the area in the cache memory 1020 is thereafter reused. Further, in case of the address, of which data is previously stored in the cache memory 1020, is included in the target area of the write request, the data of the area may sometimes be directly overwritten in the cache memory 1020.

(E) Cache algorithm: Deciding the data in the HDD 1030 to be staged and the data in the cache memory 1020 to be destaged according to an LRU algorithm or the like based on the reference frequency or reference period of data in the cache memory 1020.

<4.2. Virtualization Program 6030 and Virtualization Information 6070>

The virtualization information 6070 contains information relating to the following configuration of each virtualization volume.

(1) Following information concerning areas in the volume of the storage apparatus 1500, and address space in the virtual volume as which the foregoing areas is provided to the host 1100. In case of the virtual volume constituting a plurality of volumes, the following information will also exist in a plurality.

(1-1) Identifier of the storage apparatus 1500 (or identifier of the port), identifier of the volume, and areas (start address and end address) in the volume, constituted of the virtual volume (1-2) Areas (start address and end address) in the virtual volume (2) Capacity of the virtual volume The virtualization program 6030 is a program for the virtual storage apparatus 1000 to provide a volume to the host 1100 by using the volume provided by the storage apparatus 1500. Incidentally, there are the following patterns as the correspondence of the virtual volume provided by the virtualization program 6030 and the relating volume in the storage apparatus 1500.

(A) A case of using the overall volume in the storage apparatus 1500 as the storage area of the virtual volume. In this case, capacity of the virtual volume will be roughly the same capacity as the selected volume ('roughly same' is a case of storing the control information and redundant information in a volume of the storage apparatus 1500. When there is no such information, this will be the same capacity).

(B) A case of using a part of the volume in the storage apparatus 1500 as the storage area corresponding to the virtualization volume. Here, capacity of the virtual volume will be roughly the same as the area capacity to be used.

(C) A case of combining and using a plurality of volumes in a plurality of storage apparatuses 1500 as the storage area of the virtual volume. Here, capacity of the virtual volume will be roughly the same capacity as the total value of the capacity of the respective volumes. Incidentally, as this kind of combination method, there are striping, concatenate (method of linking a plurality of volumes and treating them as a single volume) and so on.

(D) In addition to pattern (C), further storing parity information or mirror data. Here, capacity of the virtual volume will be half of (C) when storing mirror data, or depend on the parity calculation method when storing parity. Reliability of data stored in the virtual volume can be improved through combination with high-reliability based on RAID inside the storage apparatus 1500.

Incidentally, regarding every pattern, the storage apparatus identifier (or port identifier) and the volume identifier (information for identifying volumes in the virtual storage apparatus or controlled by ports used in the I/O request, such as LUN (Logical Unit Number), CKD-format CU number, LDEV (Logical DEVice) number, and the like), designated in the I/O request, differ from the original volume.

The virtualization program 6030 is called by the I/O processing program 6020 when the data to be subject to staging or destaging corresponds to the virtual volume, and uses the virtualization information 6070 to execute the following processing.

(A) Staging: Deciding which data stored in the volume of which storage apparatus 1500 should be copied to the cache memory 1020 based on the correspondence of the virtualization volume and the volume of the storage apparatus 1500, and thereafter copying such data to the cache memory 1020.

(B) Destaging: Deciding which volume of the storage apparatus 1500 should be target to copy data in the cache memory 1020 to, based on the correspondence of the virtual volume and the volume of the storage apparatus 1500, and thereafter copying such data to the storage apparatus 1500. Incidentally, as the pre-processing thereof, redundant data based on RAID technology may also be created.

<4.3. Remote Copy Program 6010 and Copy Pair Information 6040>

The copy pair information 6040 possesses the following information for each copy pair (hereinafter sometimes abbreviated as a "pair") of the copy source volume and the copy destination volume of remote copy. Incidentally, in this embodiment, volumes that are the target of high availability are designated as the copy source volume and the copy destination volume.

(1) Identifier of the virtual storage apparatus 1000 having the copy source volume, and identifier of the volume (2) Identifier of the virtual storage apparatus 1000 having the copy destination volume, and identifier of the volume (3) Status of the copy pair (details will be described later)

The remote copy program 6010 is a program for mirroring the data stored in the copy source volume to the copy destination volume, and refers to the copy pair information 6040 to perform the processing. The processing overview and pair status of remote copy (in particular synchronous remote copy) are explained below.

<4.3.1. Copy Processing Operation of Synchronous Remote Copy>

As the method of the synchronous remote copy described above, when the virtual storage apparatus 1000 of the copy source receives a write request for writing into the copy source volume from the host 1100, the virtual storage apparatus 1000 of the copy source sends write data to the virtual storage apparatus 1000 of the copy destination and thereafter returning a write request completion notice to the host 1100.

Figure 7:
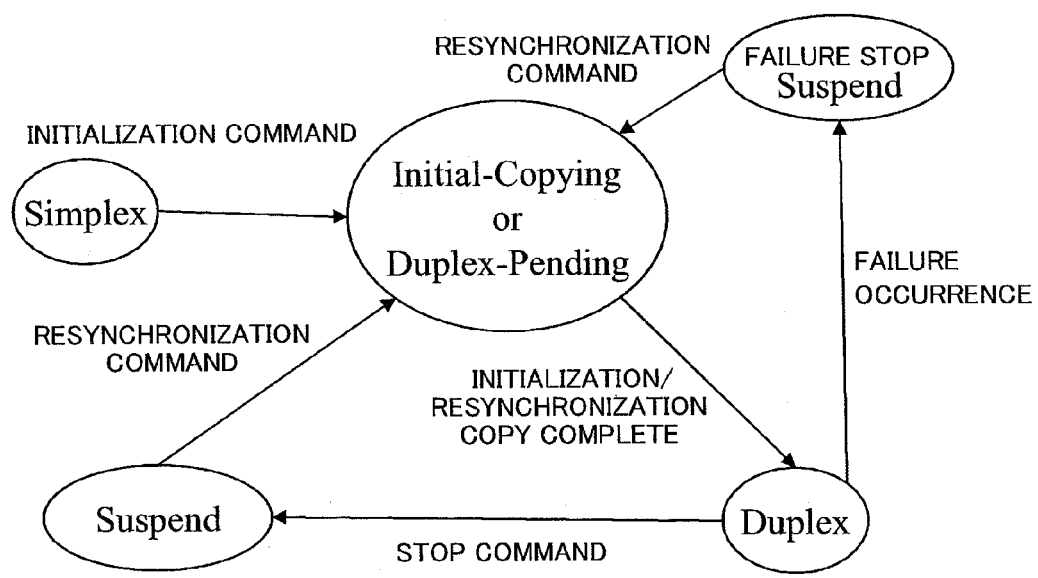
FIG. 7 is a conceptual diagram representing the pair status of remote copy and the transition of pair status.

When synchronous remote copy is to be executed, the controller 1010 of the virtual storage apparatus 1000 manages information referred to as a copy pair status (Simplex, Initial-Copying, Duplex, Suspend and Duplex-Pending), in order to display the status of remote copy between the pair of copy source volume and copy destination volume on a management screen 1200 or operate the status of remote copy. FIG. 7 shows a status transition diagram relating to the pair status of synchronous remote copy. The respective pair statuses are explained below.

<4.3.1.1. Simplex Status>

The Simplex status is a status where copy between the copy source volume and the copy destination volume configuring a pair has not been started.

<4.3.1.2. Duplex Status>

The Duplex status is a status where synchronous remote copy has been started, the initialization copy described later is complete and the data contents of the copy source volume and the copy destination volume configuring a pair are the same. In this status, excluding the areas that are currently being written, data contents of the copy source volume and data contents of the copy destination volume will be the same. Incidentally, during the Duplex status and in the Duplex-Pending and Initial-Copying statuses, write requests from the host 1100 to the copy destination volume are denied.

<4.3.1.3. Initial-Copying Status>

The Initial-Copying status is an intermediate status during the transition from the Simplex status to the Duplex status, and initialization copy from the copy source volume to the copy destination volume (copy of data already stored in the copy source volume to the copy destination volume) is performed as required during this period. When initialization copy is complete and processing necessary for making the transition to the Duplex status is complete, the pair status becomes a Duplex status.

<4.3.1.4. Suspend Status>

The Suspend status is a status where the contents written into the copy source volume are not reflected in the copy destination volume. In this status, data contents of the copy source volume and the copy destination volume configuring a pair are not the same. Triggered by a command from the user or the host 1100, the pair status makes a transition from another status to the Suspend status. In addition, a case may be considered where, when it is no longer possible to perform synchronous remote copy due to a network failure or the like between the virtual storage apparatuses 1000, the pair status makes an automatic transition to the Suspend status.

In the following explanation, the latter case; that is, the Suspend status caused by a failure will be referred to as a Failure Suspend status. Representative examples that cause such Failure Suspend status are, in addition to a network failure, failures in the copy source volume and the copy destination volume, and failure of the controller 1010.

When entering the Suspend status, although the copy source storage 1000 receives write data according to a write request and stores it in the copy source volume when such write request is issued to the copy source volume subsequent to entering the Suspend status, the copy source storage 1000 does not send the write data to the virtual storage apparatus 1000 of the copy destination. Further, the virtual storage apparatus 1000 of the copy source stores the writing location of the written write data in the copy source volume as a differential bitmap or the like.

Incidentally, when a write request is issued to the copy source volume subsequent to entering the Suspend status, the virtual storage apparatus 1000 of the copy destination also performs the foregoing operation. Further, when a setting referred to as "fence" is configured in a pair before such pair enters the Failure Suspend status, writing of the copy source volume is denied after the pair status makes a transition to the Failure Suspend status. Incidentally, the virtual storage apparatus 1000 of the copy destination may also deny the write request to the copy destination volume during the Failure Suspend status.

<4.3.1.5. Duplex-Pending Status>

The Duplex-Pending status is the intermediate status during the transition from the Suspend status to the Duplex status. In this status, data copy from the copy source volume to the copy destination volume is executed in order to make the data contents of the copy source volume and the copy destination volume coincide. After the data contents of the copy source volume and the copy destination volume become identical, the pair status becomes a Duplex status.

Incidentally, data copy during the Duplex-Pending status is executed, via differential copy of copying only the portions that need to be updated (in other words, the inconsistent data between the copy source volume and the copy destination volume) by using the writing location (for instance, the foregoing differential bitmap or the like) recorded in the virtual storage apparatus 1000 of the copy source or the virtual storage apparatus 1000 of the copy destination during the Suspend status.

Further, although the Initial-Copying status and the Duplex-Pending status were explained above as being separate statuses, these may also be combined and displayed as one status on the screen of the management host 1200, or subject to transition as one status.

<4.3.1.6. Pair Operation Command>

The pair status makes a transition to another status based on the following commands from the host 1100 or the management host 1200.

(A) Initialization command: When this command is received during the Simplex status, transition is made to the Initial-Copying status.

(B) Resynchronization command: When this command is received during the Suspend status or the Failure Suspend status, transition is made to the Duplex-Pending status.

(C) Partition command: When this command is received during the Duplex status, transition is made to the Suspend status.

(D) Copy direction inversion command: When this command is received during the Duplex status, Suspend status or Failure Suspend status, relationship of the copy source and the copy destination is inverted. In the case of a Duplex status, the copy direction is also inverted when this command is received.

Incidentally, the initialization command is expected to designate the virtual storage apparatus 1000 of the copy source and the copy source volume, and the virtual storage apparatus 1000 of the copy destination and the copy destination volume, and the remaining commands merely need to designate identifiers showing the pair relationship since such pair relationship has already been formed (combination of the virtual storage apparatus 1000 of the copy source and the copy source volume, and the virtual storage apparatus 1000 of the copy destination and the copy destination volume is also one of such identifiers).

5. Programs and Information to be Executed by Storage Apparatus 1500

FIG. 6 illustrates the programs and information to be executed by the storage apparatus 1500, and the respective programs and information perform the same operation as the virtual storage apparatus 1000.

6. Device Relation Table 5001

FIG. 8 is a diagram showing the information contained in the device relation table 5001. The device relation table 5001 manages the following information for each virtual volume (more specifically, for each identifier corresponding to such volume) in the host 1100 provided by the I/O path manager 5000.

(A) Identifiers of the virtual volumes in the host 1100

(B) Related volume identifier list: Identifiers of volumes of the storage apparatus 1500 that may become the entity of virtual volumes in the host 1100 are included. Incidentally, as said individual identifiers, the identifiers allocated by the HBA device drivers 5010 as the lower layer of the I/O path manager 5000 are used. In this embodiment, identifiers of volumes in the primary virtual storage apparatus 1000 (1000L) and volumes in the secondary virtual storage apparatus 1000 (1000R) are listed (if a normal status).

(C) Primary volume: Shows which volume listed at (B) is a primary.

(D) Failure status (E) Pair status

Incidentally, since the identifiers of (A) and the identifiers of (B) are handled the same from the perspective of the file system 5020, overlap of the identifiers of (A) and (B) is not allowed. Further, since overlap is also not allowed in the case of combining (A) and (B), the I/O path manager 5000 needs to create the identifiers of (A) while giving consideration to this point.

7. Initialization Processing

Figure 9:
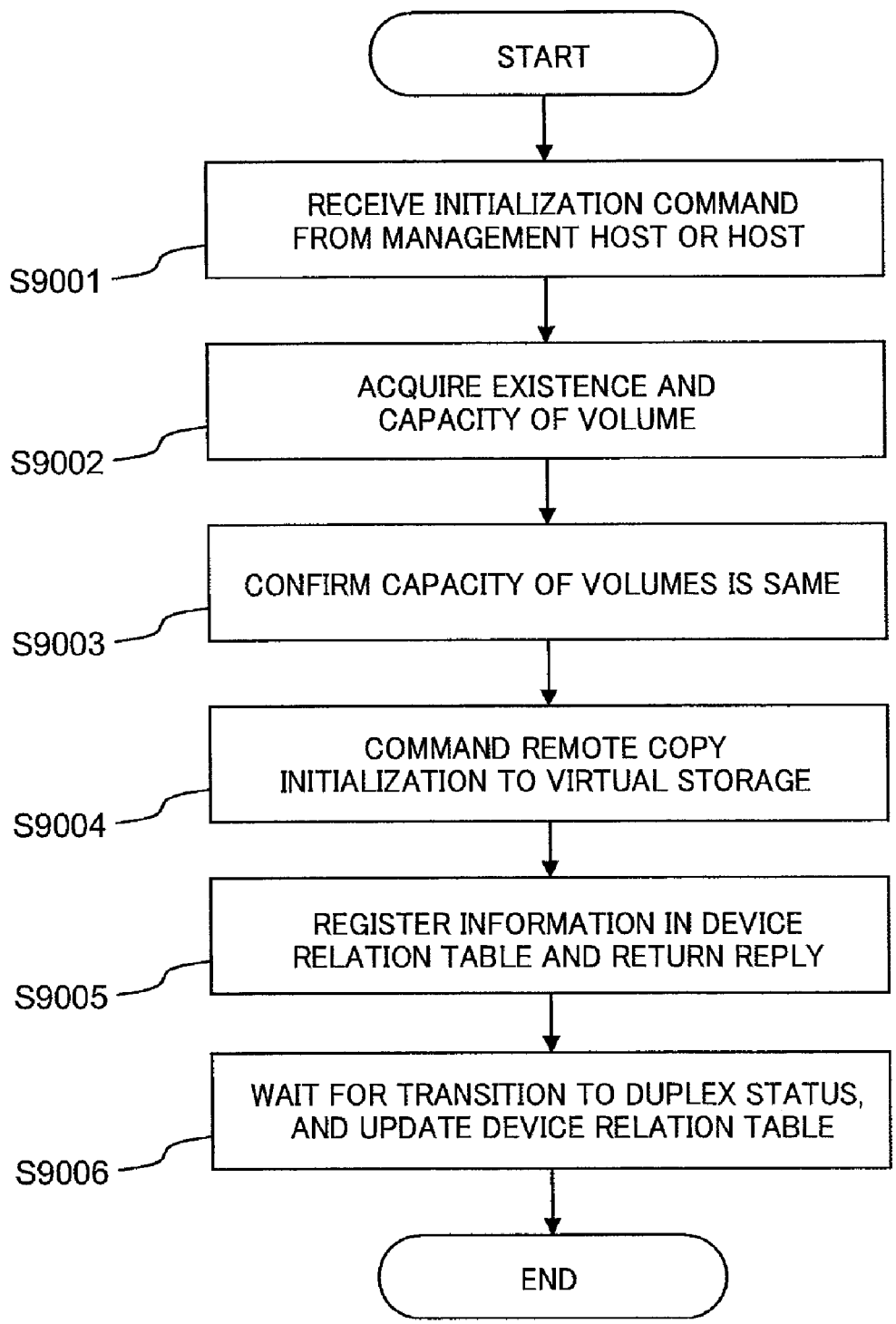
FIG. 9 is a flowchart showing the flow when the I/O path manager performs initialization processing.

FIG. 9 is a flowchart illustrating the initialization processing of the I/O path manager 5000. This initialization processing is now explained with reference to the flowchart. Incidentally, although there are cases below where the processing subject of various processes is explained as the "I/O path manager 5000," in reality, it goes without saying that the processor 1101 (FIG. 1) of the host 1100 executes the corresponding processing based on a program called the "I/O path manager 5000."

(S9001) The I/O path manager 5000 receives an initialization command containing the following information from the user of the management host 1200 or the host 1100. Incidentally, as the initialization processing of a duplex system, this is also referred to as an HA (High Availability) initialization command.

(A) Primary virtual storage apparatus 1000 and its volumes (B) Secondary virtual storage apparatus 1000 and its volumes (S9002) The I/O path manager 5000 communicates with both virtual storage apparatuses 1000 commanded at S9001 and acquires the existence of volumes and the capacity thereof.

(S9003) The I/O path manager 5000 confirms that volumes commanded at S9001 exist and are of the same capacity. When this cannot be confirmed, the I/O path manager 5000 returns an error to the command source.

(S9004) The I/O path manager 5000 sends a remote copy initialization command to one or both virtual storage apparatuses 1000. This initialization command is commanded with the primary volume as the copy source volume and the secondary volume as the copy destination volume. Based on this command, the virtual storage apparatus 1000 starts remote copy.

(S9005) The I/O path manager 5000 registers the following information in the device relation table 5001, and thereafter returns an initialization start reply to the source of the initialization command.

(A) Identifiers of the virtual volumes in the host 1100 (=values created by the I/O path manager 5000)

(B) Related volume identifier list (=two identifiers corresponding to the virtual storage apparatus 1000 and the volume designated at S9001 (both the primary system and secondary system)).

(C) Identifier of the primary volume (=primary volume designated at S9001)

(D) Failure status (=secondary system in preparation)

(E) Pair status (=Initial-Copying)

(S9006) The I/O path manager 5000 monitors the pair status of remote copy, and updates the device relation table 50001 to the following information upon transition to the Duplex status.

(D) Failure status (=normal status)

(E) Pair status (=Duplex)

As a result of the foregoing processing, the I/O path manager 5000 is able to start the preparation for high availability including the setting of remote copy according to the user's command. Incidentally, in reality, since the I/O path manager 5000 is able to provide the virtual volume in the host 1100 immediately after S9005, users who wish to make access in a file format is able to start file I/O by issuing a mount command to the volume. Further, as a different method, the I/O path manager 5000 may define the virtual volume in the host 1100 corresponding to the volume to realize high availability before the setting of remote copy, and the file system 5020 may also start the foregoing processing from a state of mounting the volume by the user designating a volume to become a secondary system.

8. Write Request Processing Flow

Figure 10:
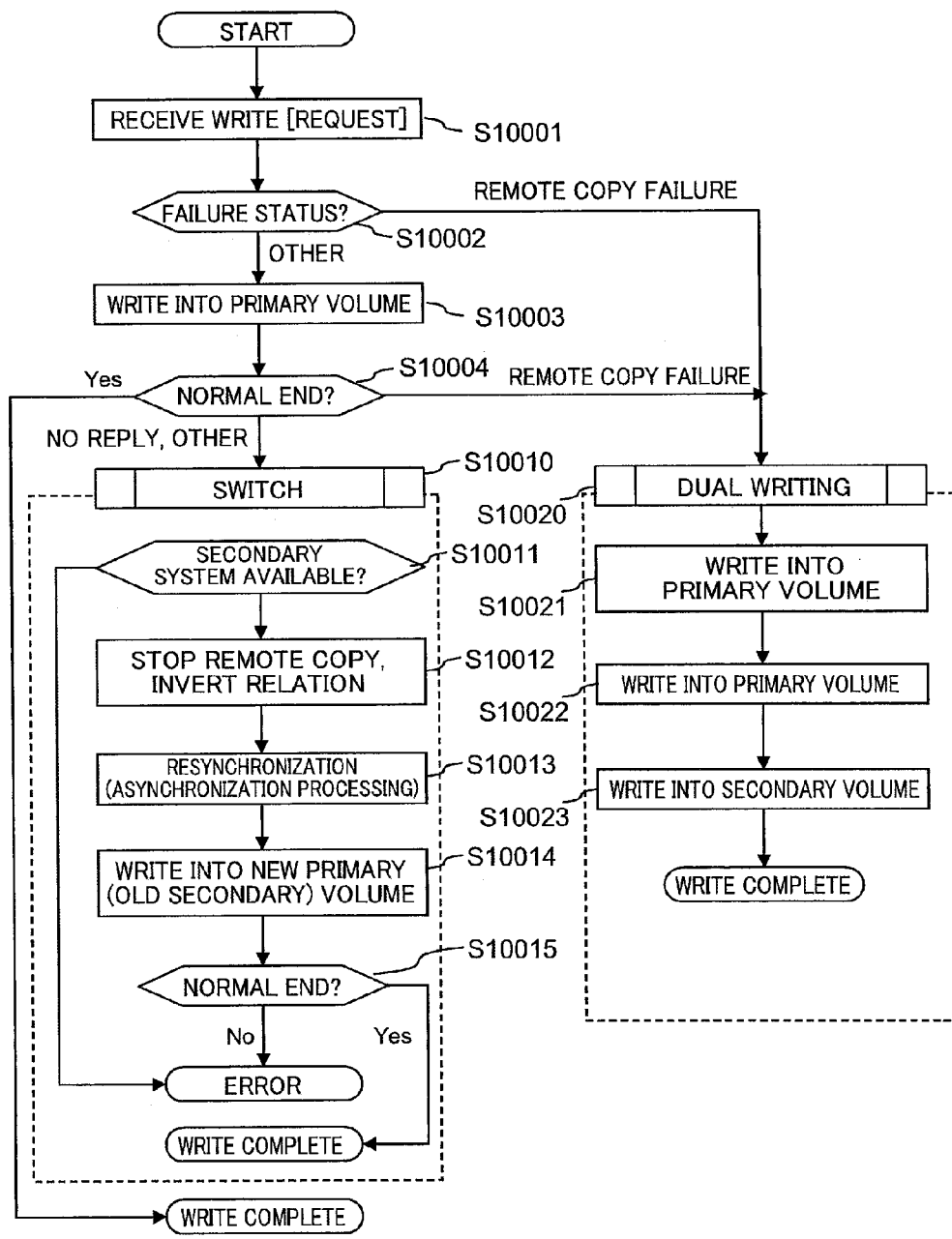
FIG. 10 is a flowchart showing the flow when the I/O path manager performs write processing.

FIG. 10 is a diagram showing the processing flow when the I/O path manager 5000 receives a write request from the file system 5020.

(S10001) From the file system 5020, the I/O path manager 5000 is called (or receives a message of) a write request function including the identifier of the virtual volume in the host 1100 to become the write destination, write location of the volume, and the write length.

(S10002) The I/O path manager 5000 confirms the failure status of the virtual volume and, if it is a remote copy failed status, transfers the control to the dual write processing at S10020, and otherwise executes S10003.

(S10003) The I/O path manager 5000 issues a write request to the primary volume. Incidentally, issuance of the write request is actually realized by calling the HBA device drive 5010 of the lower layer.

(S10004) The I/O path manager 5000 confirms the reply of the write request, returns a completion reply to the file system 5020 if it is a normal end or transfers the control to the dual write processing at S10020 if it is a remote copy failure or transfers the control to the switch processing at S10010 if it is a no reply or in other cases.

Incidentally, the dual write processing at S10020 is executed at the following steps.

(S10021) If the writing into the primary or secondary volume is denied due to the setting of remote copy, the I/O path manager 5000 cancels this setting.

(S10022) The I/O path manager 5000 issues a write request to the primary volume.

(S10023) The I/O path manager 5000 issues a write request to the secondary volume. The I/O path manager 5000 waits for the arrival of a write request reply from both the primary system and secondary system, and returns a completion reply to the file system 5020.

<8.1. Flow of Switch Processing>

The processing realized by the switch processing is further explained.

(S10011) The I/O path manager 5000 foremost confirms whether the secondary volume is available by referring to the failure status of the device relation table 5001, and returns an error reply to the file system 5020 if it determines that the secondary volume is unavailable, or executes S10012 if the secondary volume is available. Incidentally, a status where there is no secondary system (when the secondary virtual storage apparatus 1000 is not functioning due to a failure, or in a case of a volume in which the secondary virtual storage apparatus 1000 is not set to begin with), and the status of initialization in preparation described above may consider the status of unavailable.

(S10012) The I/O path manager 5000 issues a remote copy stop command to the secondary virtual storage apparatus 1000 and, after confirming that the copy status entered the Suspend status, issues a copy direction inversion command.

(S10013) The I/O path manager 5000 issues a remote copy resynchronization command to the secondary virtual storage apparatus 1000. Incidentally, there is no need to wait until the resynchronization is actually complete and the pair status enters the Duplex status.

(S10014) The I/O path manager 5000 updates the primary volume identifier of the device relation table 5001 to a volume identifier that was a secondary system theretofore, and switches the primary system and the secondary system. Then, the I/O path manager 5000 sends a write request to the new primary volume through the HBA device driver 5010.

(S10015) The I/O path manager 5000 confirms the reply of the write request, returns a completion reply to the file system 5020 if it is a normal end or returns an error reply if it is an error, and ends the processing.

<8.1.1. Countermeasures Against Write Request Failure During Dual Write Processing>

When the write request to the primary volume at S10022 ends in a failure during the dual write processing at S10020, control may be transferred to the switch processing at S10010. Further, when the write request to the secondary volume at S10023 ends in a failure, the failure status of the device relation table 5001 is changed to 'no secondary system,' and writing is thereby completed.

Further, since the pair status is a Failure Suspend status during the dual write processing, a write location is indicated in the volume of the virtual storage apparatus 1000 based on a differential bitmap of remote copy. Nevertheless, since the write data written in both volumes based on the dual write processing are the same, it is desirable to avoid recording in the differential bitmap while the dual write processing is being conducted normally, and to copy only the differential data during the resynchronization processing after recovery of the communication failure. As a solution for the above, while the dual write processing is being conducted normally, a case may be considered of periodically and repeatedly clearing the differential bitmap of the volume of both the primary and secondary virtual storage apparatuses 1000. With this method, there is no need to issue a clear command for each write request, and it is possible to avoid the copy of all areas of the target volume during the resynchronization of remote copy. This is because, although the write request of the dual write after the time of the nearest clearing process and the write request of the dual write during the failure of the dual write will be recorded as a write location in the differential bitmap, there will be no data inconsistency or copy omission area. Because, even when the data area recorded during the dual write is copied with resynchronization, the data contents of the copy destination will not change.

Incidentally, in the foregoing solution, processing of the write request may be temporarily stopped in order to clear the differential bitmap of both the primary and secondary system. As a method of stopping the processing, considered may be a method of the I/O path manager 5000 not transferring the write request received from the file system 5020 to the virtual storage apparatus 1000 until both differential bitmaps are cleared, or a method of pending the write request processing in the primary virtual storage apparatus 1000 until both differential bitmaps are cleared.

As a second solution, there is a method of allocating two differential bitmaps respectively to the primary and secondary volumes. The processing contents thereof are shown below.

(Initial status) The primary and secondary virtual storage apparatuses 1000 respectively record the location of the write request on one side of the two differential bitmaps. Thus, both virtual storage apparatuses 1000 will retain and manage information concerning an active side (this side refers to the side recording the write location when the write request arrives, and the other side of the differential bitmap is referred to as an inactive side). Further, it is desirable that there is nothing recorded on the inactive side of the differential bitmap.

(Step 1) The primary virtual storage apparatus 1000 switches the differential bitmap to become the recording destination of the location of the write request and the subsequent write requests are recorded in the switched differential bitmap by updating the management information of the active side to an alternative differential bitmap that was an inactive side. The secondary virtual storage apparatus 1000 is similarly switched. Incidentally, the trigger for starting the switch processing is given from the I/O path manager 5000 to both virtual storage apparatuses 1000. Incidentally, the switch processing of the primary system and secondary system may be executed in any order, or may be executed in parallel.

(Step 2) The I/O path manager 5000 issues a differential bitmap clear command to both virtual storage apparatuses 1000 upon waiting for a switch completion reply from both virtual storage apparatuses 1000. The virtual storage apparatus 1000 that received the clear command clears the write location of the differential bitmap that is an inactive side, and returns a reply to the I/O path manager 5000. Similar to the switch processing, the clear processing of the primary system and secondary system may be executed in any order, or may be executed in parallel.

(Step 3) The I/O path manager 5000 waits for a clear completion reply from the both virtual storage apparatuses 1000, and re-executes the process from Step 1 after the lapse of a certain period of time.

In the case of this solution, with the resynchronization processing after recovery of the communication failure, the area to perform differential copy can be decided during the Duplex-Pending status by calculating the logical sum of four bitmaps of the primary system and secondary system. Further, although there are many bitmaps in this method, there is no need to pend the write request.

The following third solution is a modified example of the foregoing second solution.

(Initial status) The primary and secondary virtual storage apparatuses 1000 respectively record the location of the write request on both side of the differential bitmaps. Thus, both virtual storage apparatuses 1000 will retain and manage information concerning the differential bitmap side that was previously cleared.

(Step 1) The I/O path manager 5000 issues a differential bitmap clear command to both virtual storage apparatuses 1000. The virtual storage apparatus 1000 that received the clear command clears the write location of the alternative differential bitmap that is not the different bitmap that was cleared previously, and returns a reply to the I/O path manager 5000.

(Step 3) The I/O path manager 5000 waits for a clear completion reply from the both virtual storage apparatuses 1000, and re-executes the process from Step 1 after the lapse of a certain period of time.

9. Read Request Processing Flow

Figure 11:
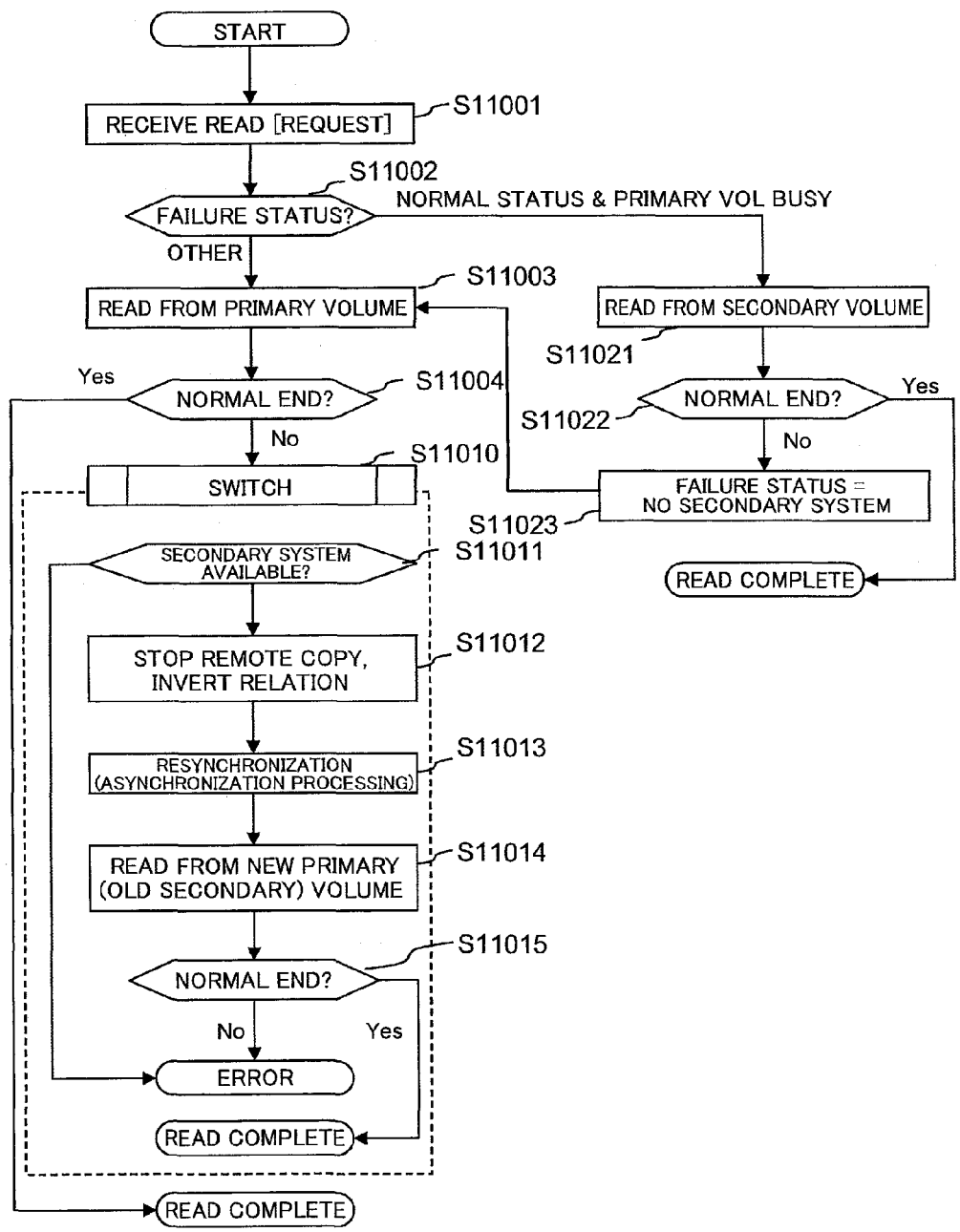
FIG. 11 is a flowchart showing the flow when the I/O path manager performs read processing.

FIG. 11 is a flowchart showing the processing contents when the I/O path manager 5000 receives a read request from the file system 5020.

(S11001) From the file system 5020, the I/O path manager 5000 is called (or receives a message of) a read request function including the identifier of the virtual volume in the host 1100 to become the read destination, read location of the volume, and the read length.

(S11002) The I/O path manager 5000 confirms the failure status of the virtual volume, executes S11021 if it is a normal status and the I/O load against the primary volume is high (for instance, when a given IOPS is exceeded or a given bandwidth is exceeded) or otherwise executes S11003 (no secondary system, secondary system in preparation, normal status, etc.).

(S11003) The I/O path manager 5000 issues a read request to the primary volume.

(S11004) The I/O path manager 5000 confirms the reply of the read request, returns a completion reply to the file system 5020 if it is a normal end or transfers the control to the switch processing at S11010 in other cases.

(S11021) The I/O path manager 5000 issues a read request to the secondary volume.

(S11022) The I/O path manager 5000 confirms the reply of the read request, returns a completion reply to the file system 5020 if it is a normal end or executes S11023 in other cases.

(S11023) The I/O path manager 5000 updates a failure status of the device relation table 5001 to 'no secondary system,' and executes S11003.

<9.1. Flow of Switch Processing>

The processing realized by the switch processing is further explained.

(S11011) The I/O path manager 5000 foremost confirms whether the secondary volume is available by referring to the failure status of the device relation table 5001, and returns an error reply to the file system 5020 if it determines that the secondary volume is unavailable or executes S11012 if the secondary volume is available. Incidentally, as a status of being determined as being unavailable, considered may be a status where there is no secondary system (when the secondary virtual storage apparatus 1000 is not functioning due to a failure, or in a case of a volume in which the secondary virtual storage apparatus 1000 is not set to begin with), and the status of initialization in preparation described above.

(S10012) The I/O path manager 5000 issues a remote copy stop command to the secondary virtual storage apparatus 1000 and, after confirming that the copy status entered the Suspend status, issues a copy direction inversion command.

(S10013) The I/O path manager 5000 issues a remote copy resynchronization command to the secondary virtual storage apparatus 1000. Incidentally, there is no need to wait until the resynchronization is actually complete and the pair status enters the Duplex status.

(S10014) The I/O path manager 5000 updates the primary volume identifier of the device relation table 5001 to a volume identifier that was a secondary system theretofore, and switches the primary system and the secondary system. Then, the I/O path manager 5000 sends a read request to the new primary volume through the HBA device driver 5010.

(S10015) The I/O path manager 5000 confirms the reply of the read request, returns a completion reply to the file system 5020 if it is a normal end or returns an error reply if it is an error and ends the processing.

10. Failure Countermeasure Processing Flow

In this section, the flow of processing from the time the I/O path manager 5000 detects a failure until the recovery is complete is explained. Incidentally, this processing is periodically executed in the background.

<10.1. Network Failure Between Virtual Storage Apparatuses 1000>

(Step 1) The I/O path manager 5000 monitors the pair status of remote copy and detects the occurrence of some kind of failure by discovering a Failure Suspend status.

(Step 2) The I/O path manager 5000 issues a remote copy stop command to the secondary virtual storage apparatus 1000, inverts the copy direction after confirming that the copy status entered a Suspend status, and inquires the status to the respective virtual storage apparatuses 1000. Then the I/O path manager 5000 updates the failure status of the device relation table 5001 to 'remote copy failure' after confirming that no failure has occurred to the self virtual storage apparatus 1000 and that the cause is a network failure. Incidentally, this processing may also utilize the work result of the work performed by the storage administrator.

(Step 3) Wait until the network recovers.

(Step 4) The I/O path manager 5000 issues a pair resynchronization command to the primary virtual storage apparatus 1000.

(Step 5) The I/O path manager 5000 updates the failure status of the device relation table 5001 to 'secondary system in preparation.'

(Step 6) The I/O path manager 5000 waits for the pair status to become a Duplex status, and thereafter updates the failure status of the device relation table 5001 to 'normal status.'

<10.2. Failure and Shutdown of Primary Virtual Storage Apparatus 1000>

(Step 1) The I/O path manager 5000 detects the occurrence of a failure by monitoring the status of the primary virtual storage apparatus 1000.

(Step 2) The I/O path manager 5000 switches the subsequent I/O request destination to the secondary virtual storage apparatus 1000 by changing the identifier of the primary volume of the device relation table 5001 to the identifier of the secondary volume, and further updates the failure status to 'no secondary system.'

(Step 3) The I/O path manager 5000 waits until the old primary (currently secondary switched at Step 2) virtual storage apparatus 1000 recovers.

(Step 4) The I/O path manager 5000 issues a pair resynchronization command or initialization command to the primary virtual storage apparatus 1000.

(Step 5) The I/O path manager 5000 updates the failure status of the device relation table 5001 to 'secondary system in preparation.'

(Step 6) The I/O path manager 5000 waits for the pair status to become a Duplex status, and then updates the failure status of the device relation table 5001 to 'normal status.'

<10.3. Failure and Shutdown of Secondary Virtual Storage Apparatus 1000>

(Step 1) The I/O path manager 5000 detects the occurrence of a failure by monitoring the status of the secondary virtual storage apparatus 1000.

(Step 2) The I/O path manager 5000 updates the failure status of the device relation table 5001 to 'no secondary system.'

(Step 3) The I/O path manager 5000 waits until the secondary virtual storage apparatus 1000 recovers.

(Step 4) The I/O path manager 5000 issues a pair resynchronization command or initialization command to the primary virtual storage apparatus 1000.

(Step 5) The I/O path manager 5000 updates the failure status of the device relation table 5001 to 'secondary system in preparation.'

(Step 6) The I/O path manager 5000 waits for the pair status to become a Duplex status, and then updates the failure status of the device relation table 5001 to 'normal status.'

11. Alternative Initialization Method

In the foregoing explanation, although remote copy was configured to the virtual storage apparatus 1000 according to an initialization request issued from the I/O path manager 5000, the opposite method described below can also be considered.

(Step 1) The management host 1200 starts remote copy by issuing a remote copy pair initialization command to the virtual storage apparatus 1000.

(Step 2) The I/O path manager 5000 receives a scanning request.

(Step 3) The I/O path manager 5000 acquires the configuration of remote copy in the respective volumes through the HBA device driver 5010 (status of remote copy configuration, whether it is a copy source or a copy destination, the virtual storage apparatus 1000 to become the other pair and its volume). Incidentally, as the foregoing acquisition method, a SCSI command can be used in the I/O network, or information can be acquired using other communication networks.

(Step 4) The I/O path manager 5000 creates a device relation table 5001 based on the information acquired at the previous step, and starts the processing described above. Incidentally, creation examples of the device relation table 5001 are shown below.

(A) Identifier of the virtual volume in the host 1100=value created by the I/O path manager 5000

(B) Related volume identifier list=identifiers of the copy source volume and the copy destination volume of remote copy (C) Primary volume=copy source volume remote copy (D) Failure status='normal status' when the pair status acquired from the virtual storage apparatus 1000 is a Duplex status, 'secondary system in preparation' when it is an Initial-Copying status or a Duplex-Pending status, 'remote copy failure' when it is a Suspend status or a Failure Suspend status (E) Pair status=pair status acquired from the virtual storage apparatus 1000

High availability is realized in this embodiment based on the operation of the hardware and programs described above. Incidentally, as countermeasures to be taken when much time is required for the switch processing illustrated in FIG. 10 and FIG. 11, a part of the foregoing switch processing can be executed as preliminary processing when it becomes necessary for the I/O path manager 5000 to re-send the I/O request. Here, the preliminarily performed switch processing can be restored if the re-sent I/O request is returned with a normal reply, and the remaining portions of the foregoing switch processing can be executed if the re-sent I/O request is returned with error reply, or there is no reply. Further, in this embodiment, all volumes may be virtualized with the virtual storage apparatus 1000, the entity may be a virtual volume in the storage apparatus 1500, and the virtual storage apparatus 1000 may be an apparatus dedicated to virtualization, or contrarily a constitution where the entity of all volumes is inside the virtual storage apparatus 1000 may be adopted. Moreover, in addition to the capacity, various other attributes may be configured to the volumes provided by the virtual storage apparatus 1000 (for instance, an emulation type or a volume identification number acquirable with an Inquiry command defined based on a SCSI standard).

Such attribute information and attribute change are also transferred from the primary virtual storage apparatus to the secondary virtual storage apparatus based on remote copy, and these may also be managed in both virtual storage apparatuses.

12. Alternative Read/Write Processing

Figure 25:
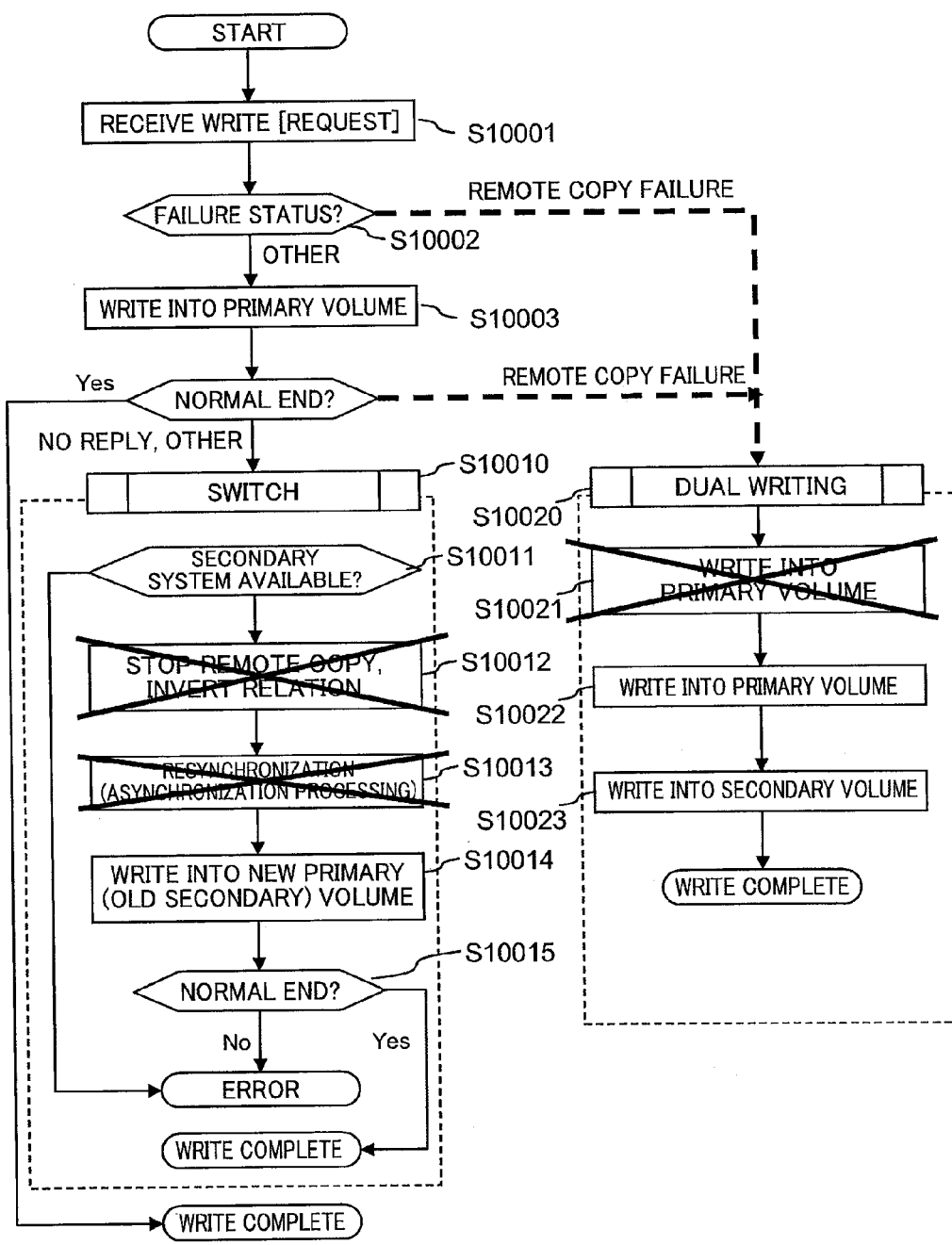
FIG. 25 is a flowchart showing a different flow when the I/O path manager performs write processing.
Figure 26:
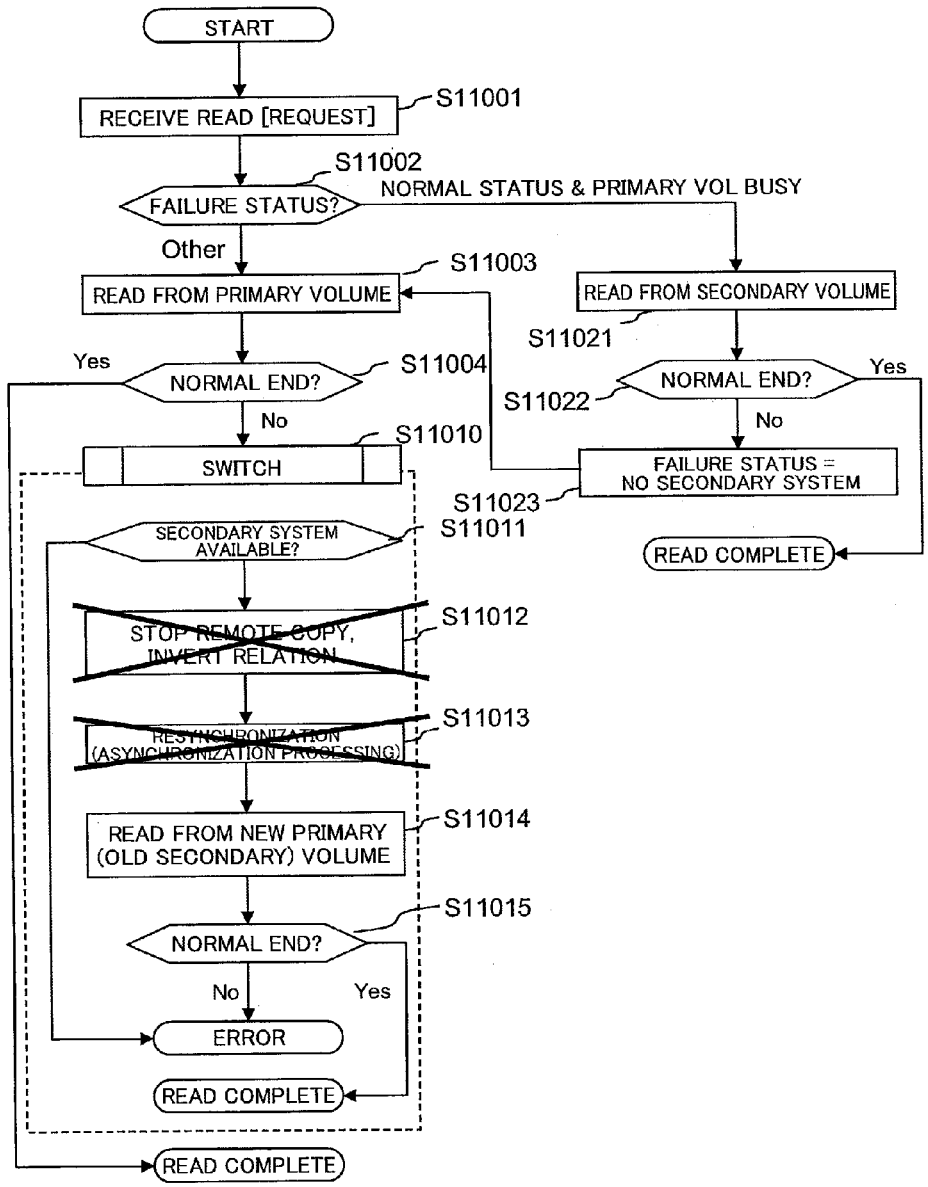
FIG. 26 is a flowchart showing a different flow when the I/O path manager performs read processing.
Figure 27:
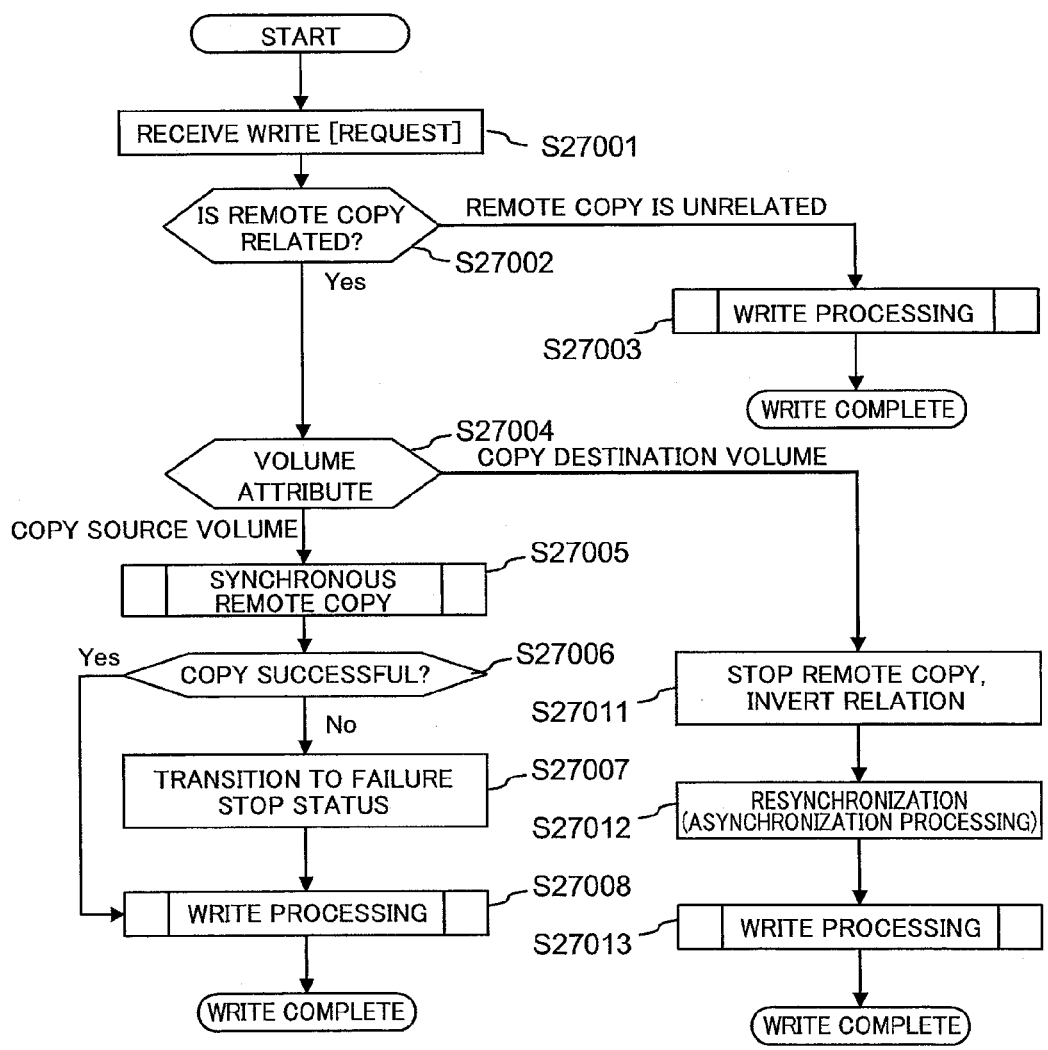
FIG. 27 is a flowchart showing a pair operation according to a write request to be performed by the storage apparatus when the I/O path manager is to perform the write processing of FIG. 25.

In the write/read processing illustrated in FIG. 10 and FIG. 11, the I/O path manager 5000 specifically transfers the operation of remote copy to the virtual storage apparatus 1000. Nevertheless, since the operation of remote copy may differ for each vendor of the virtual storage apparatus 1000, there are cases when it would be more preferable not to include such operation in the write processing and read processing of the I/O path manager 5000. FIG. 25 to FIG. 27 show the processing contents of such a form. Incidentally, although there are cases below where the processing subject of various processes is explained as the "virtual storage apparatus 1000," in reality, it goes without saying that the processor 1101 (FIG. 1) of the virtual storage apparatus 1000 executes the corresponding processing based on programs stored in the memory 1012 (FIG. 1).

<12.1. Write Processing of I/O Path Manager>

FIG. 25 is a flowchart showing the general processing contents of FIG. 10 to be executed by the I/O path manager 5000. FIG. 25 differs from the FIG. 10 in the following points.

(Difference 1) The operation of remote copy at steps S10012, S10013 and S10021 is skipped.

(Difference 2) The routine does not reach step S10020 of the flow during remote copy failure. Nevertheless, these differences only occur when it is not possible to identify an error message signifying remote copy failure in normal read/write processing.

FIG. 27 is a diagram showing the operation of remote copy to be performed when the virtual storage apparatus 1000 receives a write request.

(S27001) The virtual storage apparatus 1000 receives a write request.

(S27002) The virtual storage apparatus 1000 determines whether the target volume of the write request is related to remote copy, and executes S27003 when it is unrelated, and executes S27004 when it is related.

(S27003) The virtual storage apparatus 1000 performs normal write processing, returns a reply to the host 1100 and ends this processing.

(S27004) The virtual storage apparatus 1000 determines the remote copy attribute of the target volume of the write request, and executes S27005 when it is a copy source attribute, and executes S27011 when it is a copy destination attribute.

(S27005) The virtual storage apparatus 1000 executes synchronous remote copy processing, transfers write data to the secondary storage, and waits for a reply.

(S27006) The virtual storage apparatus 1000 determines whether the copy was successful, and executes S27008 if the copy was successful, and executes S27007 is the copy was unsuccessful.

(S27007) The virtual storage apparatus 1000 changes the status of the remote copy pair in which the target volume will become the copy source to a Failure Suspend status. However, writing to this volume is not prohibited.

(S27008) The virtual storage apparatus 1000 performs normal write processing, returns a reply to the host 1100, and ends this processing.

(S27011) The virtual storage apparatus 1000 stops remote copy, and inverts the relationship of the copy source and the copy destination.

(S27012) The virtual storage apparatus 1000 starts the resynchronization processing.

(S27013) The virtual storage apparatus 1000 performs normal write processing, returns a reply to the host 1100, and then ends this processing.

Incidentally, it is not necessary to wait until the resynchronization processing at S27012 is complete. This is because the virtual storage apparatus 1000 executing S27012 is a secondary system, the primary virtual storage apparatus 1000 is not necessarily operating normally, and much time may be required until the resynchronization processing is complete. Incidentally, the foregoing case is the same in that it can be recovered with the processing described in <10. Failure Measure Processing Flow>.

<12.3. Read Processing of I/O Path Manager>

FIG. 26 is a flowchart showing the general processing contents of FIG. 11 to be executed by the I/O path manager 5000. FIG. 26 differs from the FIG. 11 in the following point.

(Difference 1) The operation of remote copy at steps S11012 and S11013 is skipped.

Incidentally, although in FIG. 11 the direction of remote copy was inverted according to the read processing, the remote copy direction is not inverted in this processing. This is because, in addition to cases where the primary virtual storage apparatus 1000 will not return a reply to the read request to the secondary virtual storage apparatus 1000 (including cases caused by a communication failure between hosts=virtual storage apparatuses), there are cases where this is caused by the excess load of the primary virtual storage apparatus 1000. Thus, if the secondary virtual storage apparatus 1000 performs the pair inversion of remote copy triggered by the read request to the copy destination volume, the pair will be inverted with the read request that just happened to be issued to the secondary virtual storage apparatus 1000, and the pair will be inverted once again with the subsequent read request, and the read performance will deteriorate as a result.

Nevertheless, when the execution of S11021 is inhibited, the virtual storage apparatus 1000 may perform pair inversion of remote copy by performing the following processing upon read processing.

(Step 1) The virtual storage apparatus 1000 receives a read request.

(Step 2) The virtual storage apparatus 1000 performs normal read processing.

(Step 3) The virtual storage apparatus 1000 determines whether the read-target volume is the copy destination volume of remote copy, and executes subsequent Step 4 if so, and ends this processing if not.

(Step 4) The virtual storage apparatus 1000 stops remote copy, and inverts the relationship of the copy source and the copy destination.

(2) Second Embodiment

Figure 12:
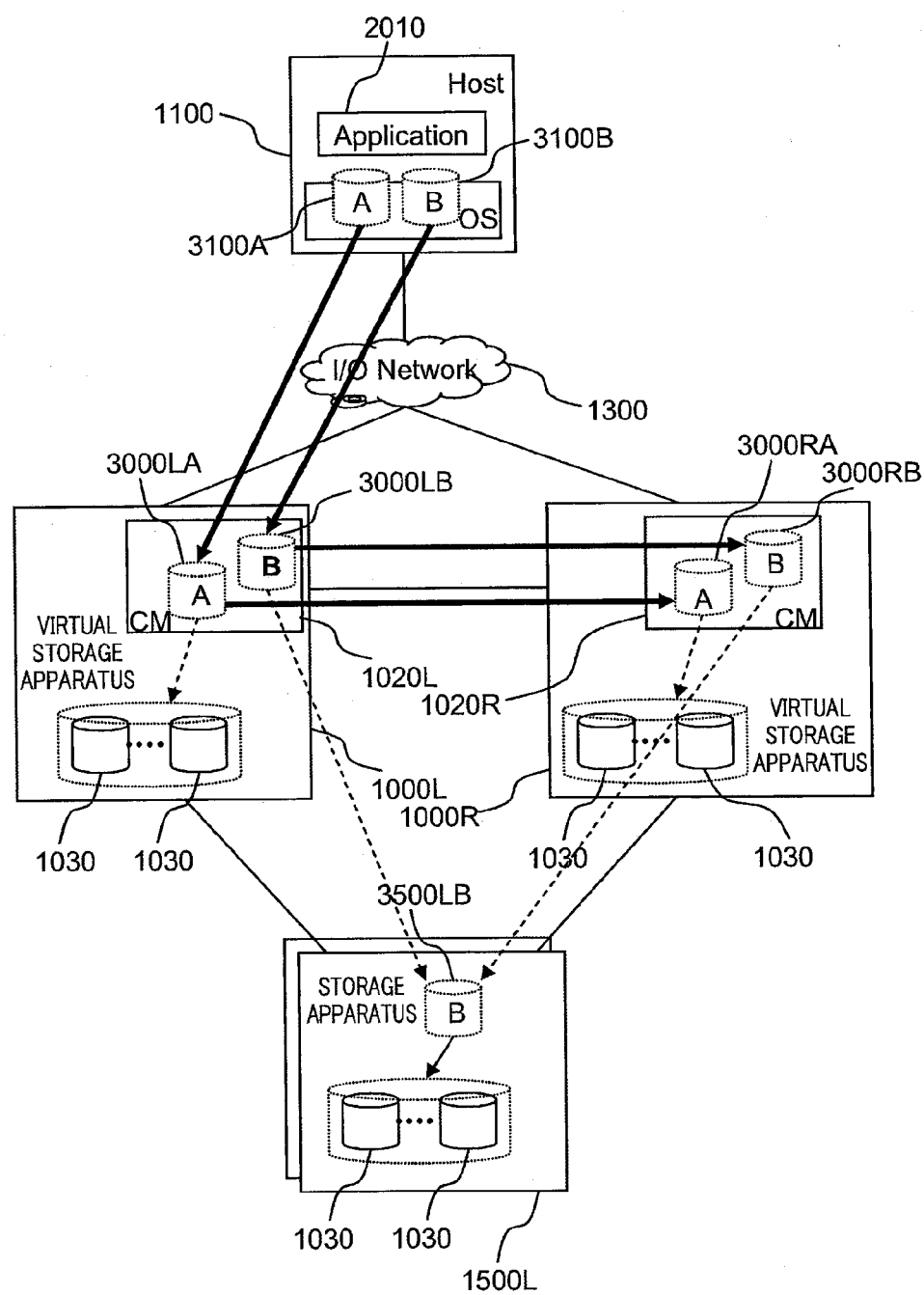
FIG. 12 is a conceptual diagram showing the overview of a second embodiment of the present invention.

The second embodiment is now explained with reference to FIG. 12. The second embodiment differs from the first embodiment in that the storage apparatus 1500L is coupled to a plurality of virtual storage apparatuses 1000L, 1000R, and these virtual storage apparatuses 1000L, 1000R share the volumes in the storage apparatus 1500L to enable the continuation of service at a lower cost than the first embodiment even when one of the virtual storage apparatuses 1000L, 1000R shuts down.

Nevertheless, since the virtual storage apparatuses 1000L, 1000R include cache memories 1020L, 1020R, in preparation for a case when the primary virtual storage apparatus 1000L shuts down due to a disaster immediately after write data is written into the virtualization volume, it is necessary to also store the write data into the cache memory 1020R of the secondary virtual storage apparatus 1000R, and the destaging and staging of both virtual storage apparatuses 1000L, 1000R must be devised accordingly.

A write request in a normal status is processed according to the following steps.

(Step 1) The primary virtual storage apparatus 1000L that received a write request from the host 1100 determines whether the write request is addressed to the volume 3000LA corresponding to the HDD 1030 inside the virtual storage apparatus 1000L, addressed to the virtualization volume (hereinafter referred to as the "shared virtualization volume") 3000LB provided by both virtual storage apparatuses 1000L, 1000R by sharing the volume 3500L of the storage apparatus 1500L, or addressed to the normal virtualization volume. Incidentally, processing other than the shared virtualization volume 3000LB is the same as the processing of the first embodiment.

(Step 2) The primary virtual storage apparatus 1000L stores the write data in its internal cache memory 1020L, stores the write data in the cache memory 1020R of the secondary virtual storage apparatus 1000R based on a remote copy program, and thereafter returns a normal reply to the host 1100.

(Step 3) The caching algorithm of the primary virtual storage apparatus 1000L decides the data in the cache memory 1020L to be destaged, and destages the data to the volume of the storage apparatus 1500L.

(Step 4) After destaging is complete, the primary virtual storage apparatus 1000L commands the secondary virtual storage apparatus 1000R to discard the address of data in the destaged cache memory 1020L. Incidentally, the secondary virtual storage apparatus 1000R that received the command discards the target data from the cache memory 1020R.

Incidentally, in this constitution, when switching of the I/O request is conducted to the secondary virtual storage apparatus 1000R in a state where the network between the virtual storage apparatuses 1000L, 1000R is disconnected, there are cases where the virtual storage apparatuses 1000L, 1000R will both autonomously perform destaging as primary systems. In order to avoid this kind of situation, when both virtual storage apparatuses 1000L, 1000R are to perform processing as primary systems, they may foremost perform exclusion control using a function such as SCSI Reserve or the like to the volume 3500L shared in the storage apparatus 1500L. Further, as another method, caching of virtual storage apparatus 1000L may be invalidated regarding the shared virtualization volume 3000LB, and, in such a case, when the access authority of the shared virtual volume 3000LB is changed to a read-only access authority, caching may be validated according to such change.

(3) Third Embodiment

Figure 13:
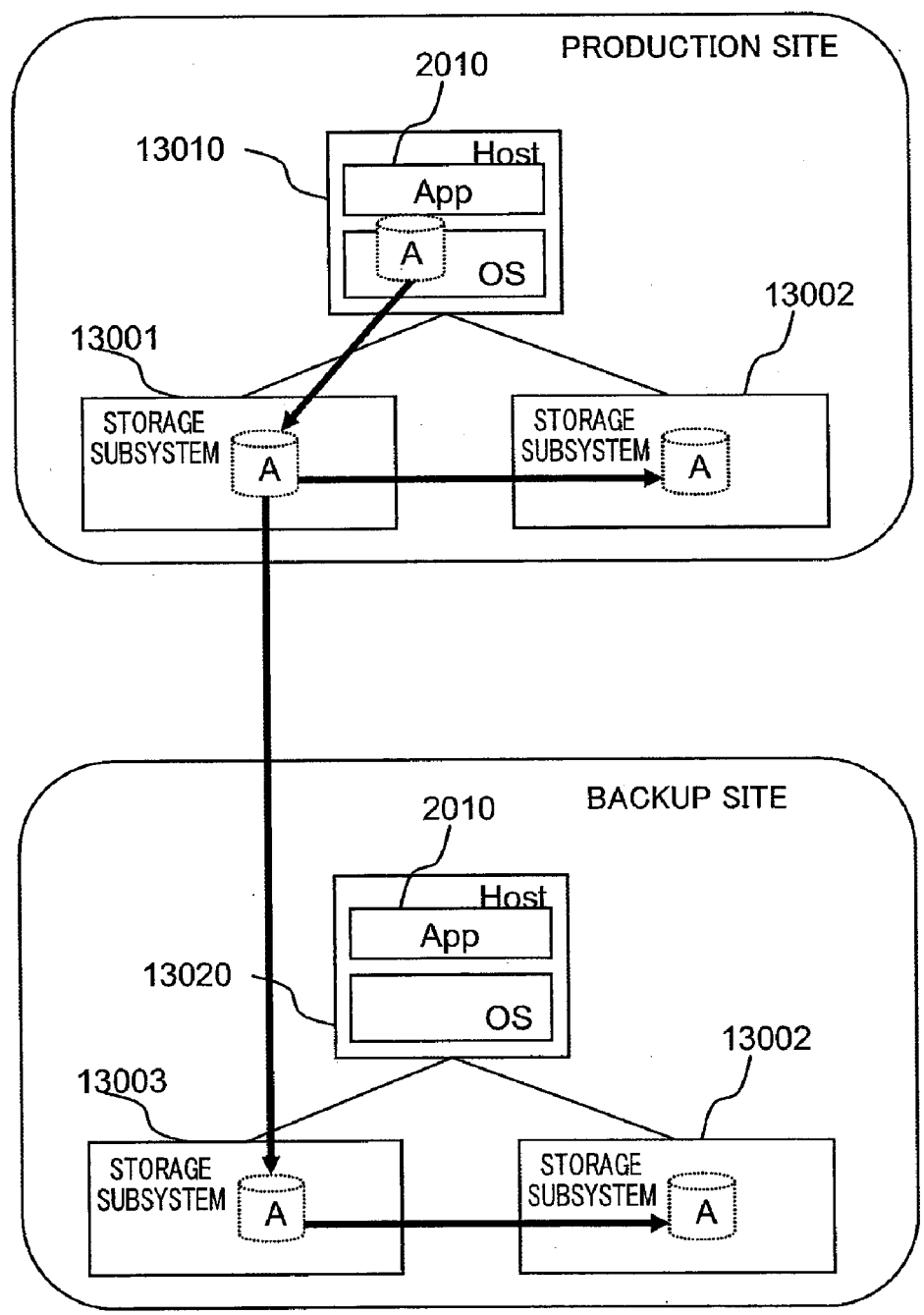
FIG. 13 is a conceptual diagram showing the overview of a third embodiment of the present invention.

The third embodiment is now explained with reference to FIG. 13. In this embodiment, the information system described in the foregoing embodiments is separately prepared at a remote site (backup site) that is different from the production site to perform remote copy, and the service can be resumed at the backup site when the production site is subject to a disaster.

Incidentally, in the following explanation, there are cases where the foregoing "virtual storage apparatus" is referred to as a storage apparatus, the "copy source volume" as a primary volume, the "copy destination volume" as a secondary volume, the "primary system" as an active side, and the "secondary system" as a standby side. Further, the information systems of the production site and the backup site may be collectively referred to as a remote copy system.

<1. Constitution of Remote Copy System>

In this embodiment, each site is constituted of hosts 13010, 13020 and a plurality of storage subsystems 13001, 13002, 13003, 13004. At the production site, the storage subsystems 13001, 13002 jointly adopt the high availability constitution described above. Moreover, at the backup site also, the storage subsystems 13003, 13004 jointly adopt the high availability constitution.

Further, in this embodiment, synchronous or asynchronous remote copy is performed from the active-side storage subsystem (with a copy source volume) 13001 of the production site to the active-side storage subsystem (with a copy destination volume) 13003 of the backup site. When the production site is subject to a disaster, the host 1310 of the backup site issues an I/O request to active side of the storage subsystems 13003, 13004 of a high availability constitution, and the re-booted application 2010 thereby resumes the processing.

Incidentally, as described above, a storage subsystem refers to both concepts including a constitution that does not use the virtualization function of the virtual storage apparatus 1000 (FIG. 1), as well as to a constitution where the virtual storage apparatus 1000 provides a virtualization volume using the virtualization function based on a combination of the virtual storage apparatus 1000 and the storage apparatus 1500 (FIG. 1). Further, in this embodiment, each storage subsystem 13001, 13002, 13003, 13004 may adopt separate internal constitutions (for instance, configuring only the storage subsystem 13001 with the virtual storage apparatus 1000 without using the virtualization function, or sharing the storage apparatus 1500 (FIG. 1) with the storage subsystems 13003 and 13004 of the backup site, but not sharing the same on the production site side).

Incidentally, although there are cases below where the processing subject of various processes is explained as the "storage subsystem," in reality, it goes without saying that the processor of the storage subsystem executes the corresponding processing based on programs stored in the memory of the storage subsystem.

<2. Processing>

When the application 2010 of the host 1301 of the production site issues a write request, the OS determines the active-side storage subsystem in the production site, and transfers the write request thereto. Incidentally, the storage subsystem 13001 corresponds to this in FIG. 13.

The active-side storage subsystem 13001 of the production site transfers write data to the standby-side storage subsystem (13002 corresponds to this in FIG. 13) in the production site based on synchronous remote copy. Further, the active-side storage subsystem 13001 transfers write data to the active-side storage subsystem (13003 corresponds to this in FIG. 13) of the backup site as synchronous or asynchronous remote copy (since only the active side processes the write request in the high availability constitution in this embodiment, remote copy is also similarly processed on the active side). The active-side storage subsystem 13003 in the backup site that received the write data transfers the received write data to the standby-side storage subsystem 13004 in the site based on synchronous remote copy.

Thus, the storage subsystems 13001, 13002 of the production site are keeping track of the active-side storage subsystem of the backup site, and the storage subsystems 13003, 13004 of the backup site are also keeping track of the active storage subsystem (storage subsystem 1301) of the production site so that they will not accept remote copy from an unexpected storage subsystem.

As a result of the foregoing processing, high availability is realized in both the production site and the backup site. However, the backup site may be of a constitution that does not adopt the high availability constitution for reduction of costs.

<3. Asynchronous Remote Copy>

Unlike with synchronous remote copy described above, asynchronous remote copy does not transfer write data at the time a write request arrives from the host 13010, but rather transfers such write data after the request completion reply (to put it differently, asynchronous remote copy transfers write data in a timing independent from the request reply to the host 13010). Thus, with asynchronous remote copy, it is possible to perform remote copy without deteriorating the response time of the write request even when the communication delay is significant because the distance between the sites is long. Nevertheless, with asynchronous remote copy, it is necessary to buffer write data in the storage subsystem 13001 on the side of the production site. The following methods for buffering write data may be considered.

(1) The storage subsystem 13001 of the production site creates a journal containing write data to the copy source volume and sequence information of such write data, stores this in its own cache memory or a dedicated volume, transfers this journal to the storage subsystem 13003 of the backup site, and the storage subsystem 13003 of the backup site stores write data in the copy destination volume by referring to the sequence information of the journal. Thereby, when the production site is subject to a disaster, it is possible to provide data with a protected write sequence (more specifically, write data with dependence on the side of the backup site.

(2) The storage subsystem 13001 of the production site groups the data written into the copy source volume every given period and stores such group in its own cache memory or a dedicated volume, transfers this asynchronously to the storage subsystem 13003 of the backup site, and stores data in group units in the copy destination volume of the storage subsystem 13003 of the backup site.

Thus, unless the write data to be buffered for asynchronous remote copy is also retained in the standby-side storage subsystem 13002, it will not be possible to succeed the asynchronous remote copy when the active-side storage subsystem 13001 shuts down. Thus, the active-side storage subsystem 13001 of the production site conveys, in addition to write data, information of the copy destination volume, foregoing sequence information or timing of performing the grouping process to the standby-side storage subsystem 13002, and the standby-side storage subsystem 13002 creates buffering data for asynchronous remote copy as the same as the active side according to such information.

Incidentally, since the storage subsystem 13003 of the backup site buffers the write data received from the production site without immediately storing it in the copy destination volume, the standby side needs to similarly create buffering data according to commands from the active side as with the production site, and store the write data in the copy destination volume at the same timing.

(4) Fourth Embodiment

The fourth embodiment is now explained with reference to FIG. 14. This embodiment explains the constitution of an interface (function I/F) for controlling the function provided by a storage apparatus in an information system constituted redundantly by two storage apparatuses using synchronous remote copy described above.

Incidentally, from this embodiment to the fourteenth embodiment, the components referred to as virtual storage apparatuses 1000L, 1000R and storage apparatuses 1500L, 1500R heretofore are respectively referred to as storage apparatuses 15000A, 15000B and external storage apparatuses 16000A, 16000B. Further, although there are cases below where the processing subject of various processes is explained as the "storage apparatuses 15000A, 15000B" or the "external storage apparatuses 16000A, 16000B," in reality, it goes without saying that the processors (not shown) of the storage apparatuses 15000A, 15000B or the processors (not shown) of the external storage apparatuses 16000A, 16000B execute the corresponding processing based on programs stored in the memory of the storage apparatuses 15000A, 15000B or the external storage apparatuses 16000A, 16000B.

This embodiment illustrates an example where, after a function control request from the host 14000 is sent to the storage apparatus 15000A, the storage apparatus 15000A transfers the function control request to the storage apparatus 15000B, and both storage apparatuses 15000A, 15000B interpreting and executing such function control request.

The command device 15002A and the command device 15002B are respectively the logical volumes provided by the storage apparatus 15000A and the storage apparatus 15000B, and act as an interface with the host 1400 that controls the function. Incidentally, in this embodiment, it is hypothesized that the command device 15002A is the active side.

Further, based on synchronous remote copy, contents of the command device 15002A and contents of the command device 15002B will constantly coincide. The command device 15002A and the command device 15002B are provided to the function management program 14003 as one volume 14004 based on the path management function (corresponds to the function provided by the I/O path manager 5000 (FIG. 1)) provided by the operating system 14001.

The logical volume 15001A and the logical volume 15001B are respectively logical volumes provided by the storage apparatus 15000A and the storage apparatus 15000B, and logical volumes that are subject to the function control. Incidentally, in this embodiment, the logical volume 15001A is hypothesized as the active side.

Further, based on synchronous remote copy, contents of the logical volume 15001A and contents of the logical volume 15001B will constantly coincide. The logical volume 15001A and the logical volume 15001B are provided to the application program 14002 as one volume 14006 based on the path management function provided by the operating system 14001.

Incidentally, there may be a plurality of logical volumes to be subject to the function control described above.

The function control request processing unit 14005 of the function management program 14003 receives a function control request from the user or another program in the host 14000 or a program in a separate host (management host or the like) from the host 14000. The function control request processing unit 14005 that received the function control request reads/writes contents of the control request to the volume 14004 from and into the volume 14004. In this embodiment, since the command device 15002A is an active side, the write/read command is issued to the command device 15002A.

Writing into the command device 15002A is used to boot the function control, and reading from the command device 15002A is used to obtain the output value of the result of the function control.

The control request received by the function control request processing unit 14005 contains information (also referred to as "apparatus information") for uniquely identifying the control-target storage apparatuses 15000A, 15000B, information (also referred to as "volume information") for uniquely identifying the control-target logical volumes 15001A, 150001B, and information incidental to the function control.

The control I/F processing unit 15003A of the storage apparatus 15000A detects that a control request has been written into the command device 15002A. The control I/F processing unit 15003A determines whether the apparatus information of the control request coincides with the self-storage apparatus (storage apparatus 15000A) (determination 100). In this embodiment, since the command device 15002A is the active side, the determination result will be "Match." In the case of a match, the control I/F processing unit 15003A calls the function processing unit 15004A to execute prescribed function control to the logical volume 15001A corresponding to the volume information. As a specific example, there is a referral operation of a pair status of a certain logical copy function (described later) as one function provided by the storage apparatus 15000A. When this operation is called to the logical volume 15001A, the function processing unit 15004A refers to the management information of the local copy function, and, after acquiring the pair status, sends the pair status to the function control request processing unit 14005 via the control I/F processing unit 15003A, the command device 15002A and the volume 14004.

Meanwhile, although the control I/F processing unit 15003B of the storage apparatus 15000B performs similar processing, in this embodiment, since the command device 15002B is the standby side, the result of determination 100 will be "No Match." In this case, the control I/F processing unit 15003B refers to the pair management information of synchronous remote copy, and specifies the logical volume (corresponds to the logical volume 15001B) in the self-storage apparatus (storage apparatus 15000B) corresponding to the volume information (corresponds to the logical volume 15001A). Then, the control I/F processing unit 15003B calls the function processing unit 15004B to execute prescribed function control to the logical volume 15001B.

It is thereby possible to execute prescribed function control to the logical volume 15001A of the storage apparatus 15000A and the logical volume 15001B of the storage apparatus 15000B.

In this embodiment, although a case was explained relating to the referral operation of the pair status of the local copy function provided by the storage apparatuses 15000A, 15000B, this embodiment can be applied to the operation of various functions provided by the storage apparatuses 15000A, 15000B such as (1) other pair operations (pair creation, pair split, etc.) of the local copy function, (2) various pair operations of the local copy function provided by the storage apparatuses 15000A, 15000B, (3) operation of the security function (LDEV guard function described later) to the logical volumes 15001A, 15001B provided by the storage apparatuses 15000A, 15000B, (4) operation of the logical snapshot function (explained later) provided by the storage apparatuses 15000A, 15000B, and so on.

Incidentally, as a different mode of execution, upon receiving a command to be issued to both storage apparatuses 15000A, 15000B on the active side and standby side, a case may be considered where the active-side storage apparatus 15000A processes the received command and transfers it to the standby-side storage apparatus 15000B to perform the command processing, and start both storage processing with a single command from the host 14000. Further, in the case of a command concerning the acquisition of the program status, a case may also be considered where the active-side storage apparatus 15000A that received the command transfers the same command to the standby-side storage apparatus 15000B to acquire the status, and the active-side storage apparatus 15000A returning the status to the command source after comparing both statuses.

(5) Fifth Embodiment

Figure 15:
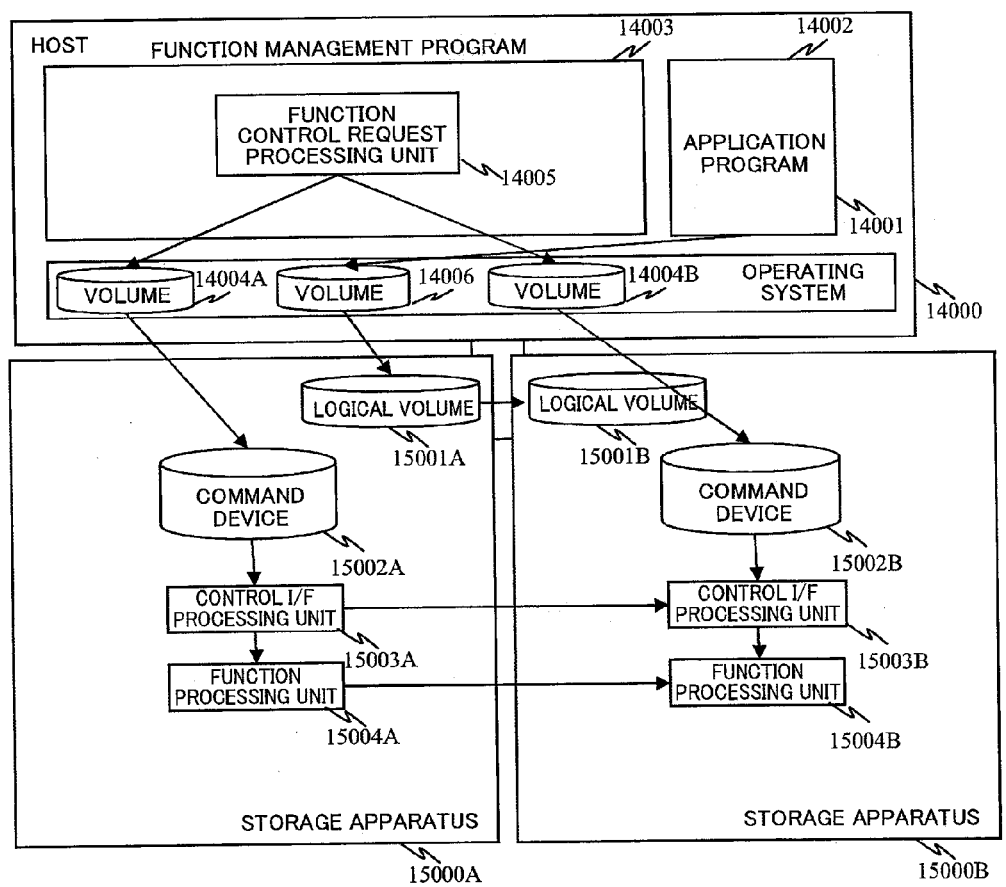
FIG. 15 is a conceptual diagram showing the overview of a fifth embodiment of the present invention.

This embodiment describes a separate constitution of the function I/F. The constitution of this embodiment is explained with reference to FIG. 15.

Figure 14:
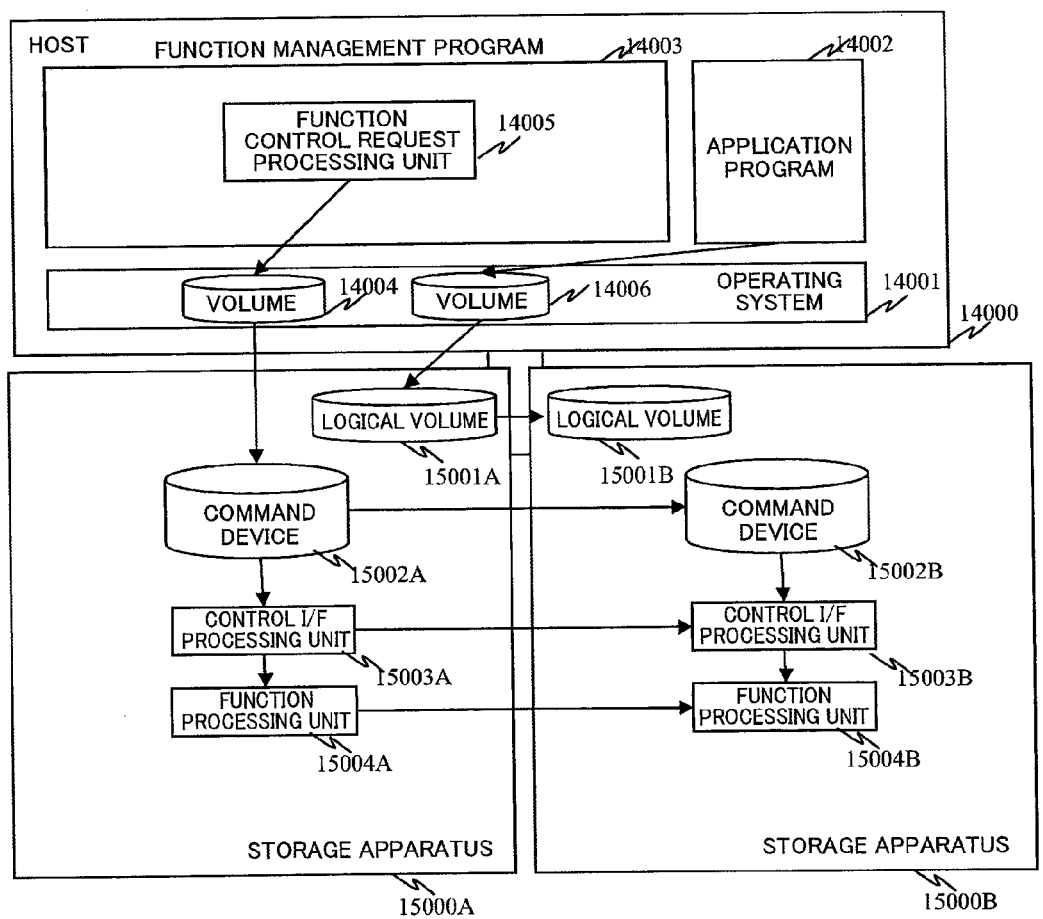
FIG. 14 is a conceptual diagram showing the overview of a fourth embodiment of the present invention.

The constitution of this embodiment is roughly the same as the constitution illustrated in FIG. 14. The differences with FIG. 14 are as following three points:

(1) The command device 15002A and the command device 15002B are not a pair of synchronous remote copy;

(2) The function management program 14003 recognizes the command device 15002A and the command device 15002B as separate volumes 14004A, 14004B; and (3) The function control request processing unit 14005 sends the function control request to the command device 15002A and the command device 15002B.

In this embodiment, as with the fourth embodiment, the control request received by the function control request processing unit 14005 contains information (also referred to as "apparatus information") for uniquely identifying the control-target storage apparatuses 15000A, 15000B, information (also referred to as "volume information") for uniquely identifying the control-target logical volumes 15001A, 150001B, and information incidental to the function control.

In this embodiment, unlike the fourth embodiment, as described above, the function control request processing unit 14005 that received the function control request from the user or another program in the host 14000 or a program in a separate host from the host 14000 sends a control request to both command devices 15002A, 15002B.

Incidentally, the control request may also be rewritten such that the function control request processing unit 14005 determines the apparatus information, designates the logical volume 15001A as the volume information to the command device 15002A, and designates the logical volume 15001B as the volume information to the command device 15002B.

Further, the user or another program in the host 14000 or a program in a separate host from the host 14000 may identify the storage apparatuses 15000A, 15000B, and issue different control requests in duplicate to the storage apparatuses 15000A, 15000B. In other words, a control request of the logical volume 15001A is issued to the command device 15002A, and a control request of the logical volume 15001B is issued to the command device 15002B.

(6) Sixth Embodiment

Figure 16:
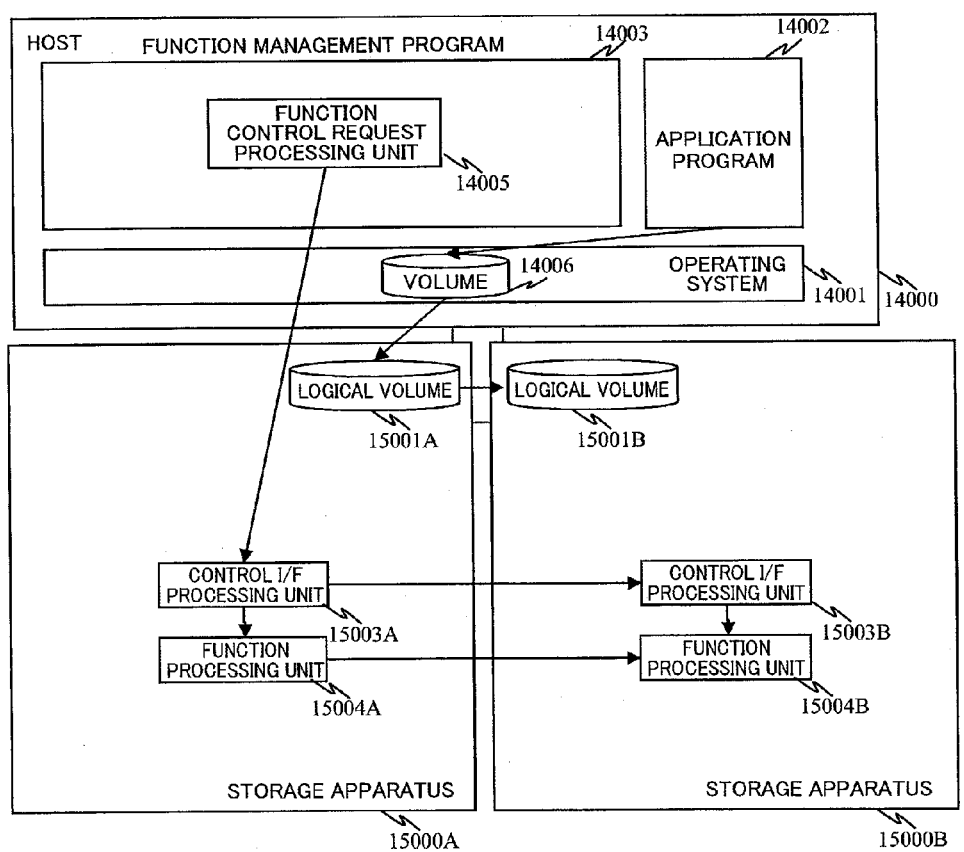
FIG. 16 is a conceptual diagram showing the overview of a sixth embodiment of the present invention.

This embodiment describes a separate constitution of the function I/F. The constitution of this embodiment is explained with reference to FIG. 16.

The sixth embodiment is roughly the same as the fourth embodiment. The differences with the fourth embodiment are as follows.

(1) The host 14000, the storage apparatus 15000A, and the storage apparatus 15000B are mutually connected with an interconnection network such as a LAN (Local Area Network). Incidentally, these components may be directly connected via a LAN, or connected via a switch.

(2) The constitution does not include a command device, and the communication among the three components (host 14000, storage apparatus 15000A and storage apparatus 15000B is conducted via the LAN.

(3) The function control request processing unit 14005 sends a control request to the control I/F processing unit 15003A via the LAN.

(4) The control I/F processing unit 15003A that received the control request sends a control request to the control I/F processing unit 15003B via the LAN.

The point of processing the control request received by the control I/F processing units 15003A, 15003B is the same as the fourth embodiment, and the sixth embodiment is able to provide an equivalent function I/F as the fourth embodiment.

(7) Seventh Embodiment

Figure 17:
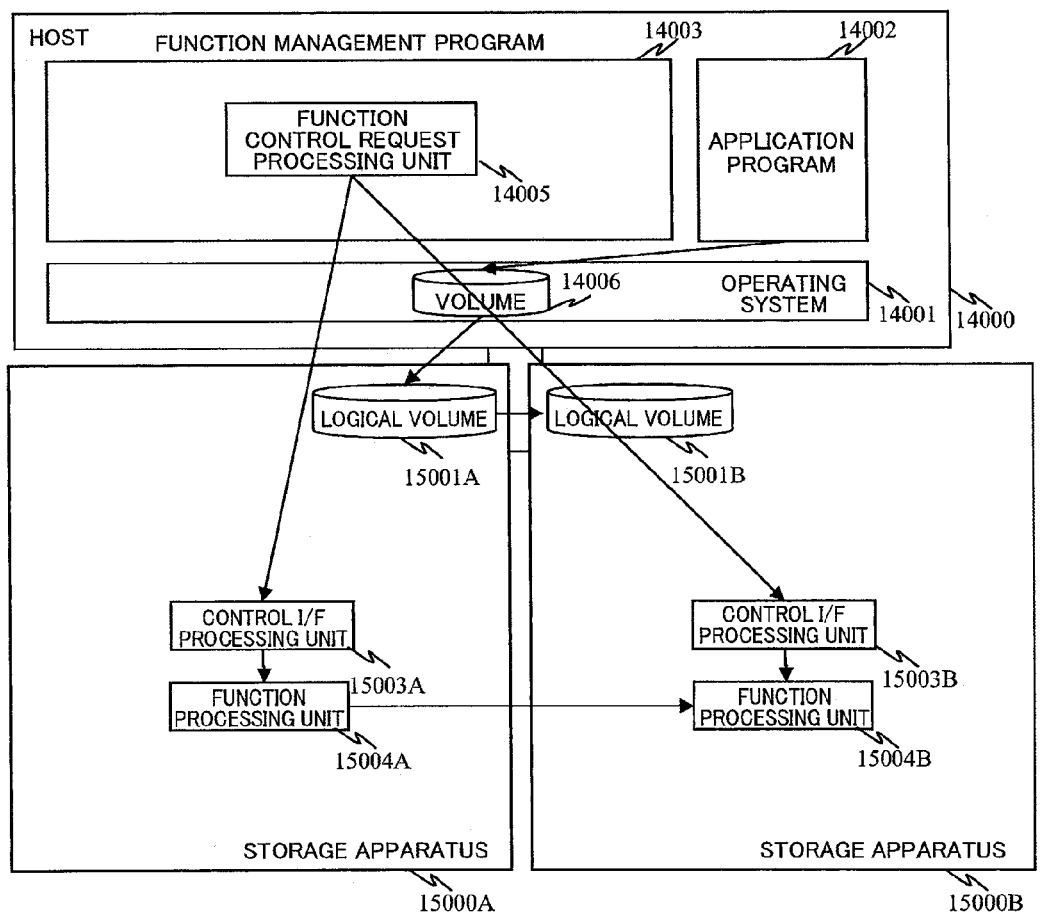
FIG. 17 is a conceptual diagram showing the overview of a seventh embodiment of the present invention.

This embodiment describes a separate constitution of the function I/F. The constitution of this embodiment is explained with reference to FIG. 17.

The seventh embodiment is roughly the same as the sixth embodiment. The differences with the sixth embodiment are as follows.

(1) The function control request processing unit 14005 sends a control request to both control I/F processing units 15003A, 15003B via the LAN.

(2) The control I/F processing unit 15003A does not sends a control request to the control I/F processing unit 15003B.

The point of processing the control request received by the control I/F processing units 15003A, 15003B is the same as the sixth embodiment, and the seventh embodiment is able to provide an equivalent function I/F as the sixth embodiment.

(8) Eighth Embodiment

In this embodiment, a case is explained of applying a security function (LDEV security function) to the logical volumes in the storage apparatus.

Figure 18:
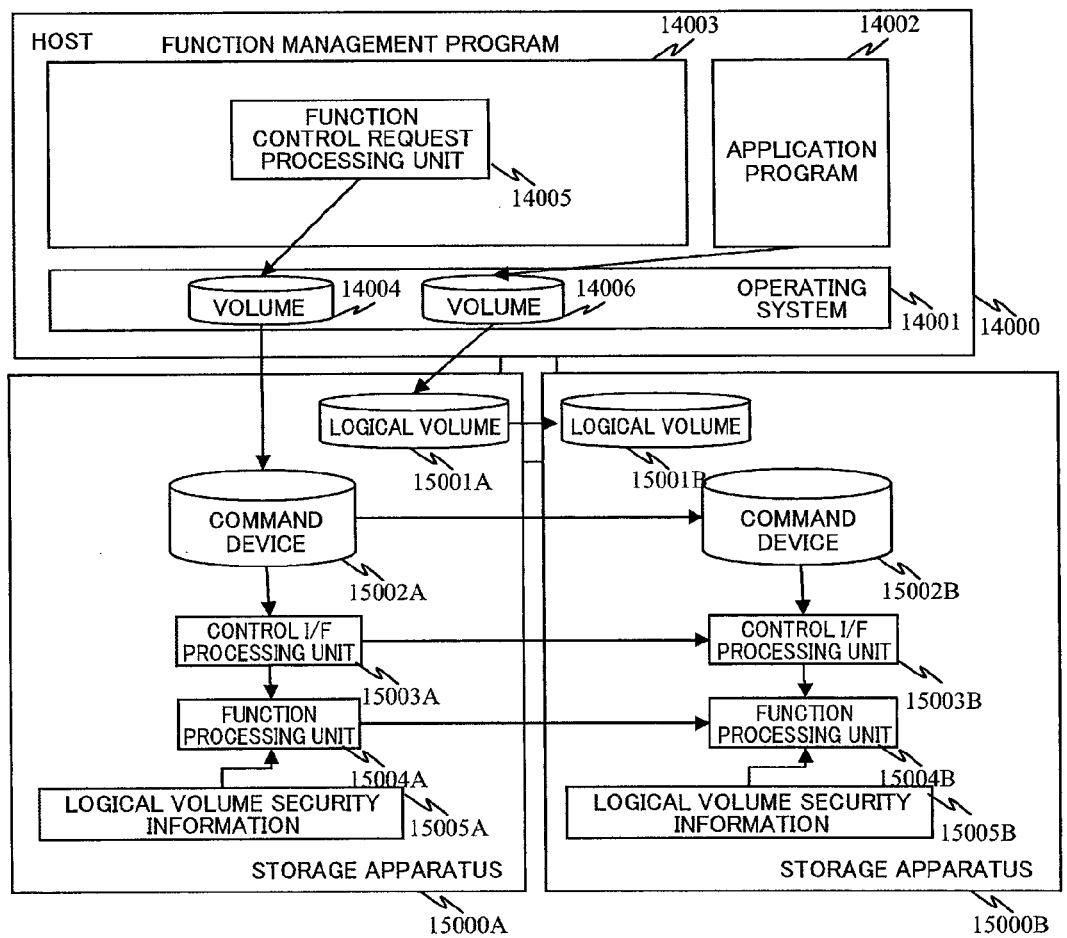
FIG. 18 is a conceptual diagram showing the overview of a eighth embodiment of the present invention.

FIG. 18 shows an embodiment of the LDEV security function. The constitution of this embodiment is roughly the same as FIG. 14. The difference with FIG. 14 is the addition of logical volume security information 15005A, 15005B. The logical volume security information 15005A, 15005B is used for access control from the host 14000 to the logical volumes 15001A, 15001B in the storage apparatuses 15000A, 15000B. As an example of access control, in order to inhibit the falsification of data in the logical volumes 15001A, 15001B, there is control for completely prohibiting the write access to the logical volumes 15001A, 15001B. Further, as a separate example, there is a function of prohibiting writing for a prescribed period to data obligated to be stored for a given period of time under laws and ordinances. Moreover, as another example, there is a function of prohibiting the read/write access from a specific host from the perspective of protecting confidential information.

Even in a constitution that seeks redundancy based on synchronous remote copy using the two storage apparatuses 15000A, 15000B as shown in FIG. 18, there are cases where it would be desirable to apply the LDEV security function. In this case also, it is possible to control the LDEV security function using the function I/F explained in the fourth embodiment. Specifically, it will suffice to set parameters concerning the LDEV security in the logical volume security information 15005A, 15005B storing security information of the target volume and referring to the same in the function processing unit 15004.

(9) Ninth Embodiment

In this embodiment, explained is a case of applying a logical copy function to the logical volumes in the storage apparatus.

A local copy function is the function of creating a replication of a volume designated by the user in the storage apparatus that is the same as the copy source volume. The replication of the volume created using this function is accessed by the host for data mining or tape backup, or stored for a long time as backup data. When using the local copy function, a volume in which a replication is to be created and the volume of the replication destination are designated as a pair (copy pair), and a replication can be created by the user operating the pair. In the following explanation, the replication-target volume is sometimes referred to as a primary volume, and the replication destination volume is sometimes referred to as a secondary volume. In this embodiment, the availability is improved by coordinating the local copy function with the active-side storage apparatus and the standby-side storage apparatus.

Figure 19:
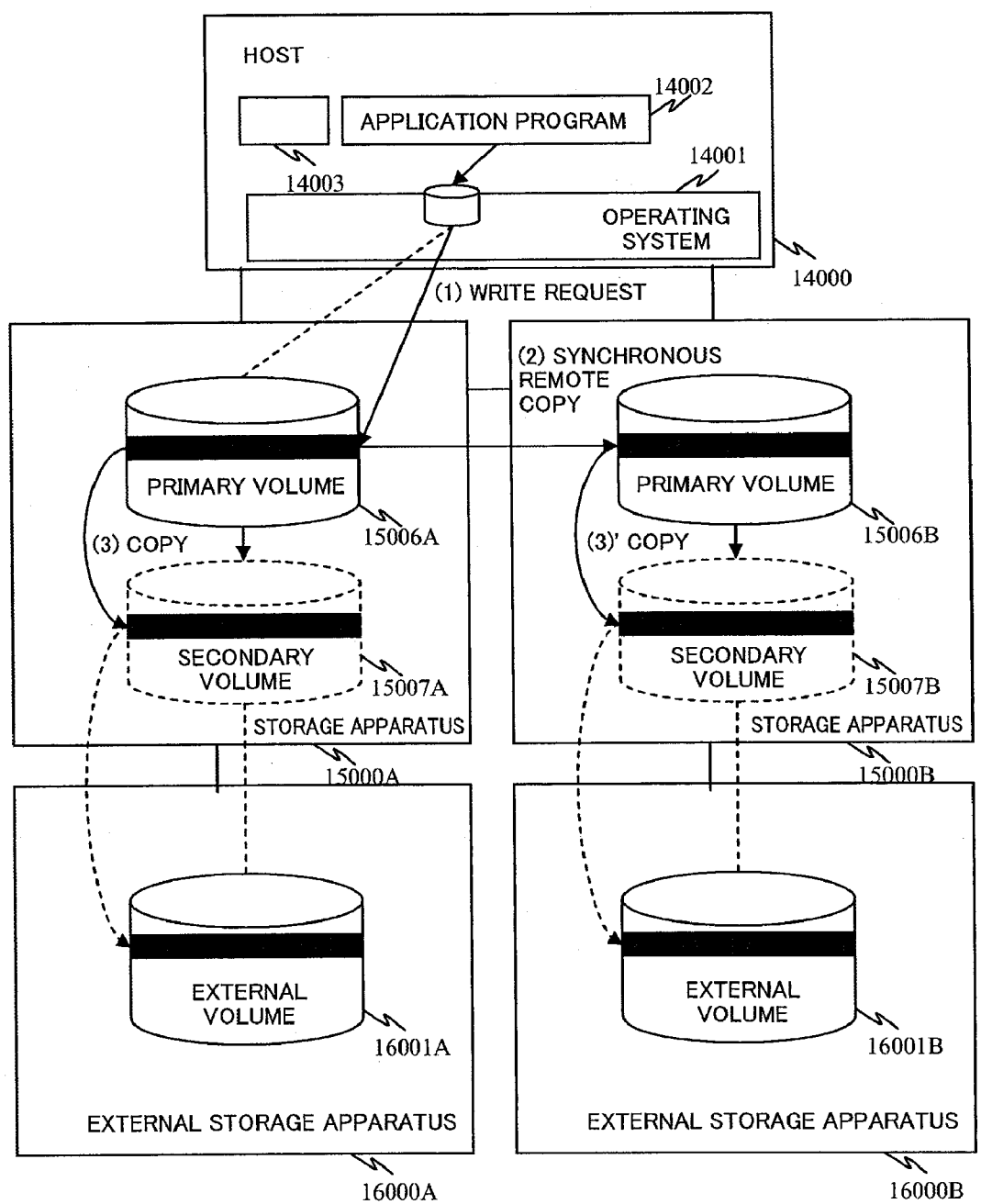
FIG. 19 is a conceptual diagram showing the overview of a ninth embodiment of the present invention.

FIG. 19 shows an embodiment of the local copy function. In FIG. 19, the host 14000 is coupled to the storage apparatus 15000A and the storage apparatus 15000B. Further, the storage apparatus 15000A is coupled to the external storage apparatus 16000A, and the storage apparatus 15000B is coupled to the external storage apparatus 16000B. Moreover, the local copy function and the differential bitmap (information showing the differential status between the primary volumes 15006A, 15006B and the secondary volumes 15007A, 15007B) are executed and managed by the storage apparatus 15000A and the storage apparatus 15000B.

This embodiment shows a constitution example where the primary volumes 15006A, 15006B are in the storage apparatuses 15000A, 15000B, and the secondary volumes 15007A, 15007B are in the external storage apparatuses 16000A, 16000B. The primary volume 15006A and the secondary volume 15007A are a pair, and the entity of the secondary volume 15007A is in the external volume 16001A. Similarly, the primary volume 15006B and the secondary volume 15007B are a pair, and the entity of the secondary volume 15007B is in the external volume 16001B.

<Operation in Duplex Status>

The Duplex status is one of the pair statuses, and is a status where background copy described later is being performed from the primary volumes 15006A, 15006B to the secondary volumes 15007A, 15007B.

The read/write processing in the Duplex status is explained below. Incidentally, the following explanation of the read/write processing is subject to the active side of the target volumes (primary volumes 15006A, 15006B) of the read/write processing being the storage apparatus 15000A.

The read processing is foremost explained. The operating system 14001 that received the read request from the application program 14002 determines whether the active-side storage is the storage apparatus 15000A or the storage apparatus 15000B based on the path management function (in relation to the read-target primary volume), and issues a read request to the active-side storage apparatus 15000A. The active-side storage apparatus 15000A that received the read request sends read data to the host 14000. The application program 14002 receives the read-target data via the operating system 14001. This read processing is thereby complete.

Overview of the write processing is now explained. The operating system 14001 that received the write request from the application program 14002 determines whether the active-side storage apparatus is the storage apparatus 15000A or the storage apparatus 15000B based on the path management function (in relation to the write-target primary volume), and issues a write request to the active-side storage apparatus 15000A. The storage apparatus 15000A that received the write request receives the write data, stores the write data in the cache memory not shown, and sets the bit of the differential bit corresponding to the write data to 1 (ON).

Further, the write data is thereafter copied (synchronous remote copy) from the cache memory in the storage apparatus 15000A to the primary volume 15006B in the storage apparatus 15000B based on the remote copy function. Incidentally, the method of synchronous remote copy is as explained above. The storage apparatus 15000B that received the write data from the storage apparatus 15000A based on synchronous remote copy stores the write data in the cache memory not shown, and sets the bit of the differential bitmap corresponding to the write data to 1 (ON). Thereafter, the storage apparatus 15000B sends a write completion report to the storage apparatus 15000A, and the storage apparatus 15000A that received the write completion report sends a write completion report to the host 14000.

Incidentally, the write data written respectively in the primary volume 15006A of the storage apparatus 15000A and the primary volume 15006B of the storage apparatus 15000B is copied to the secondary volumes 15007A, 15007B in asynchronously with the writing in the primary volumes 15006A, 15006B (this processing is hereinafter referred to as "background copy processing").

Background copy is performed by periodically monitoring the differential bitmap, copying data of the area recorded as having a differential (in other words, the bit is ON) from the primary volumes 15006A, 15006B to the secondary volumes 15007A, 15007B, and clearing the bit (OFF or 0) after the copy is complete.

Meanwhile, the standby-side storage apparatus 15000B also performs similar processing triggered at the time the write data arrived based on synchronous remote copy.

Incidentally, the present invention may adopt a constitution other those described above, and the primary volumes 15006A, 15006B may be in the external storage apparatus 16000A, or may be in the storage apparatuses 15000A, 15000B. The same applies to the secondary volumes 15007A, 15007B may also be in the external storage apparatus 16000A, or in the storage apparatuses 15000A, 15000B.

When some kind of failure occurs and the read/write request to the primary volume 15006A in the active-side storage apparatus 15000A can no longer be processed, as described above, the operating system 14001 continues access by switching the target of the read/write request to the primary volume 15006B. In this case also, since a local copy pair exists in the storage apparatus 15000B, backup processing and the like described above can be performed using the secondary volume 15007B.

<Operation of Pair Split and Suspend Status>

The Suspend status is one of the pair statuses, and indicates a status where the image of the secondary volumes is decided. In this status, contents of the primary volumes and contents of the secondary volumes do not coincide, and the differential between the primary volumes and the secondary volumes is managed with the differential bitmap. Further, in this status, since the secondary volumes are in a stationary status, the user is able to perform backup processing and the like described above.

The host 14000 stops the operation of background copy explained above when making the pair of the Duplex status of local copy to a Suspend status (this is referred to as a "Pair Split"). The Pair Split is implemented via the function I/F explained in the fourth to seventh embodiments.

(1) The host 14000 issues a stop command of local copy to the virtual storage apparatuses 15000A, 15000B via the function I/F. Normally, on the side of the host 14000, issuance of the I/O request is stopped immediately before the foregoing stop command.

(2) The active-side and standby-side virtual storage apparatuses 15000A, 15000B complete the background copy of areas that are turned ON in the differential bitmap. The host 14000 receives a message indicating that the background copy in both virtual storage apparatuses 15000A, 15000B is complete from the active-side storage apparatus 15000A or from both storage apparatuses 15000A, 15000B.

(3) The host 14000 receives the message, and thereafter resumes the I/O issuance.

As a result of the processing up (2) above, the volume pair existing respectively in the active-side and standby-side virtual storage apparatuses 15000A, 15000B becoming a Suspend status is confirmed. At this point, the pair status in both storage apparatuses 15000A, 15000B will be a Split status. Incidentally, the write location of the write request issued to the primary volume or the secondary volume during the Split is recorded in the differential bitmap for the pair resynchronization described later.

The subsequent read/write request processing is roughly the same as the Duplex status. The difference from the Duplex status is that the background copy processing is not operated.

<Pair Creation>

The status where the primary volume and the secondary volume are not of a pair relationship is referred to as a Simplex status. The processing for changing the Simplex status to the Duplex status is referred to as a pair creation. The transient state of changing the pair status from the Simplex status to the Duplex status is referred to as an Initial-Copying status.

The pair creation command is implemented via the function I/F explained with reference to fourth to seventh embodiment.

(1) The host 14000 issues a pair creation command to the virtual storage apparatus 15000A via the function I/F. As a result, the pair creation processing is started in both the active-side and standby-side storage apparatuses 15000A, 15000B.

(2) Both storage apparatuses 15000A, 15000B set the pair status to an Initial-Copying status, turns ON all differential bitmaps, and starts background copy.

(3) When the background copy is completed until the end of the differential bitmap, the virtual storage apparatuses 15000A, 15000B set the pair status to the Duplex status.

Incidentally, the read/write processing in the Initial-Copying status is the same as the read/write processing in the Duplex status.

<Pair Resynchronization>

The operation of changing the pair status from a Suspend status to a Duplex status is referred to as pair resynchronization. The transient status of changing the pair status from the Suspend status to the Duplex status is referred to as a Duplex-Pending status.

The pair resynchronization command is implemented via the function I/F explained in the fourth to seventh embodiments.

(1) The host 14000 issues a pair resynchronization command to the storage apparatus 15000A via the function I/F. As a result, the pair resynchronization processing is started at both the active-side and standby-side storage apparatuses 15000A, 15000B.

(2) The both storage apparatuses 15000A, 15000B set the pair status to Duplex-Pending, and starts background copy.

(3) When the background copy is completed until the end of the differential bitmap, the storage apparatuses 15000A, 15000B set the pair status to the Duplex status.

The read/write processing in the Duplex-Pending status is the same as the read/write processing in the Duplex status.

(10) Tenth Embodiment

Figure 20:
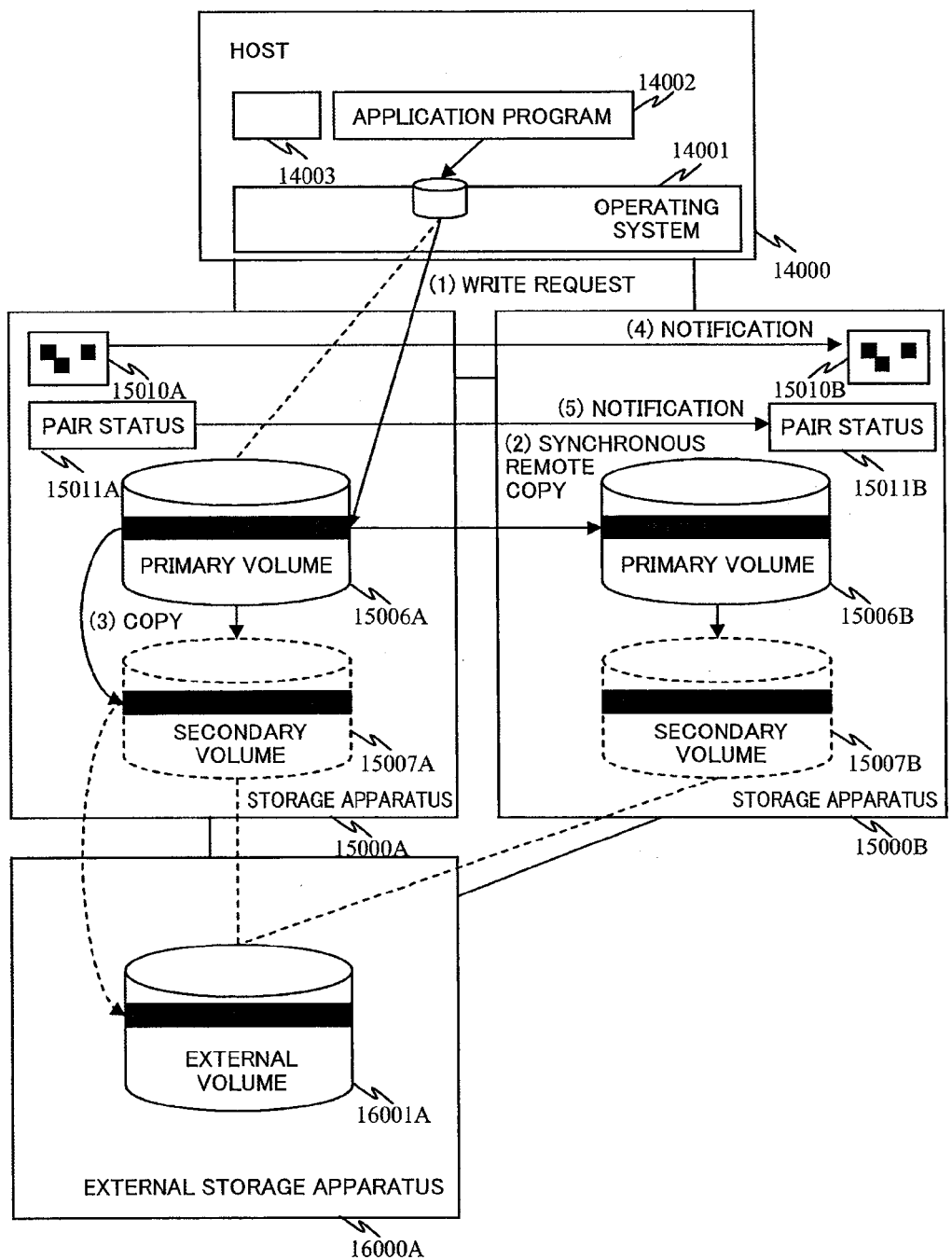
FIG. 20 is a conceptual diagram showing the overview of a tenth embodiment of the present invention.

This embodiment explains a local copy function that is different from the ninth embodiment. FIG. 20 shows a constitution example of the information system according to this embodiment.

Foremost, the difference in constitution between this embodiment and the ninth embodiment is that there is no external storage apparatus 16000B, the storage apparatus 15000B and the external storage apparatus 16000A are connected via an I/O network, and the entities of the secondary volumes 15007A, 15007B are all mapped to become the external volume 16001A in the external storage apparatus 16000A. The remaining constitution is the same as the ninth embodiment.

As a result of adopting the foregoing constitution, it is possible to eliminate the physical storage apparatus required by the secondary volumes 3000LB, 3000RB.

The major difference in the processing operation between this embodiment and the ninth embodiment is that the standby-side storage apparatus 15000B does not perform background copy to the external volume 16001A, and only operates the pair status and differential bitmap 15010B as control information concerning the pair through communication with the storage apparatus 15000A.

The details of this processing operation are explained below.

<Operation in Duplex Status>

The read/write processing in the Duplex status is explained below.

The read processing is the same as the read processing of the ninth embodiment.

The write processing is as follows. The operating system 14001 that received the write request from the application program 14002 determines whether the active side is the storage apparatus 15000A or the storage apparatus 15000B based on the path management function (in relation to the write-target primary volume), and issues a write request to the active-side storage apparatus 15000A. The storage apparatus 15000A that received the write request receives write data, stores the write data in the cache memory, and sets the bit of the corresponding differential bitmap 15010A to 1 (ON).

Thereafter, the write data is copied from the primary volume 15006A in the storage apparatus 15000A to the primary volume 15006B in the storage apparatus 15000B based on the synchronous remote copy function. Incidentally, the method of synchronous remote copy is as described above. The storage apparatus 15000B that received the write data from the storage apparatus 15000B based on the synchronous remote copy function stores the write data in the cache memory, and sets the bit of the differential bitmap 15010B corresponding to the write data to 1 (ON). The storage apparatus 15000B thereafter sends a write completion report to the storage apparatus 15000A, and the storage apparatus 15000A that received the write completion report sends a write completion report to the host 14000.

Incidentally, the data written into the primary volume 15006A of the storage apparatus 15000A is background-copied to the secondary volume 15007A asynchronously with the writing into the primary volume 15006A. Unlike the write processing in the ninth embodiment, the data written into the primary volume 15006B of the storage apparatus 15000B is not subject to background copy.

The background copy processing in the storage apparatus 15000A periodically monitors the differential bitmap 15010A, copies the data of areas recorded as having a differential (in other words, bit is ON) from the primary volume 15006A to the secondary volume 15007A, and clears the bit after the copy is complete (OFF or 0). Incidentally, this embodiment, unlike the write processing in the ninth embodiment, background copy is not performed on the side of the storage apparatus 15000B.

Subsequently, unlike the write processing in the ninth embodiment, the storage apparatus 15000A notifies the location information of the cleared bit to the storage apparatus 15000B. The storage apparatus 15000B that received the notice clears the bit (differential bit) in the storage apparatus 15000B corresponding to the foregoing bit. Incidentally, notification of the location information of the differential bit is conducted via a command device in the storage apparatus 15000B. Nevertheless, in a constitution where the storage apparatuses 1500A, 15000B are connected via a LAN, the notification may also be made through communication via the LAN. In the following explanation, let it be assumed that the communication concerning the control information of functions such as the differential bit and pair status between the storage apparatus 15000A and the storage apparatus 15000B is conducted via the command device or the LAN.

When some kind of failure occurs and the I/O request to the active-side primary volume 15006A can no longer be processed, the operating system 14001, as with the ninth embodiment, continues access by switching the target of the I/O request to the primary volume 15006B.

<Operation of Pair Split and Suspend Status>

When the host 14000 is to change the pair of the Duplex status of local copy to a Split status, it performs pair split as in the ninth embodiment. Incidentally, although stop processing of background copy is performed in pair split, in this embodiment, stop processing is not actually performed since background copy is not performed in the storage apparatus 15000B.

The subsequent I/O request processing is roughly the same as in the Duplex status. The difference with the Duplex status is that the background copy processing does not operate in the storage apparatus 15000B.

<Pair Creation>

The pair creation command is the same as the ninth embodiment in that it is implemented via the function I/F explained in the fourth to seventh embodiments.

(1) The host 14000 issues a pair creation command to the storage apparatus 15000A via the function I/F. As a result, the pair creation processing is started at both the active-side and standby-side storage apparatuses 15000A, 15000B.

(2) Both storage apparatuses 15000A, 15000B set the pair status to an Initial-Copying status. The storage apparatus 15000A turns ON all differential bitmaps 15010A and starts background copy. Unlike the ninth embodiment, the storage apparatus 15000B turns ON all differential bitmaps 15010B, but does not perform background copy.

(3) Operation for clearing the differential bit corresponding to areas to which background copy in the storage apparatus 15000A is complete, and the incidental operations (notification of the location information of the differential bit and clearing of the differential bit) are the same as the operations in the Duplex status.

(4) Unlike the ninth embodiment, when the background copy is completed until the end of the differential bitmap 15010A, the storage apparatus 15000A sets the pair status to a Duplex status, and notifies the storage apparatus 15000B that the pair status has changed to a Duplex status. The storage apparatus 15000B that received the notification sets the pair status to a Duplex status.

The read/write processing in the Initial-Copying status is the same as the read/write processing in the Duplex status.

<Pair Resynchronization>

The pair resynchronization command is the same as the ninth embodiment in that it is implemented via the function I/F described in the fourth to seventh embodiments.

(1) The host 14000 issues a pair resynchronization command to the storage apparatus 15000A via the function I/F. As a result, the pair resynchronization processing is started at both the active-side and standby-side storage apparatuses 15000A, 15000B.

(2) The storage apparatus 15000A sets the pair status to a Duplex-Pending status, and starts background copy. Unlike the ninth embodiment, the storage apparatus 15000B does not perform background copy.

(3) When the background copy is completed until the end of the differential bitmap 15010A, the storage apparatus 15000A sets the pair status to a Duplex status. Nevertheless, unlike the ninth embodiment, only the storage apparatus 15000A performs this processing. The storage apparatus 15000A thereafter notifies the storage apparatus 15000B that the pair status has changed to a Duplex status. The storage apparatus 15000B that received the notification sets the pair status to a Duplex status.

The read/write processing in the Duplex-Pending status is the same as the read/write processing in the Duplex status.

(11) Eleventh Embodiment

Constitution of an AOU (Allocation On Use) function is now explained. The AOU function is a function of allocating a real storage area only regarding the area used by (written from) the host.

The AOU function is constituted of a pool as an aggregate of real volumes that actually store data, and a virtual volume as a volume to be presented to the host. The virtual volume in this embodiment is virtual from the perspective that real data in which writing was performed is only allocated. Real data is not allocated to the entire address space of the volume presented to the host. Incidentally, the real volume may be in the external storage apparatus, or may be in the same storage apparatus as the virtual volume.

Figure 21:
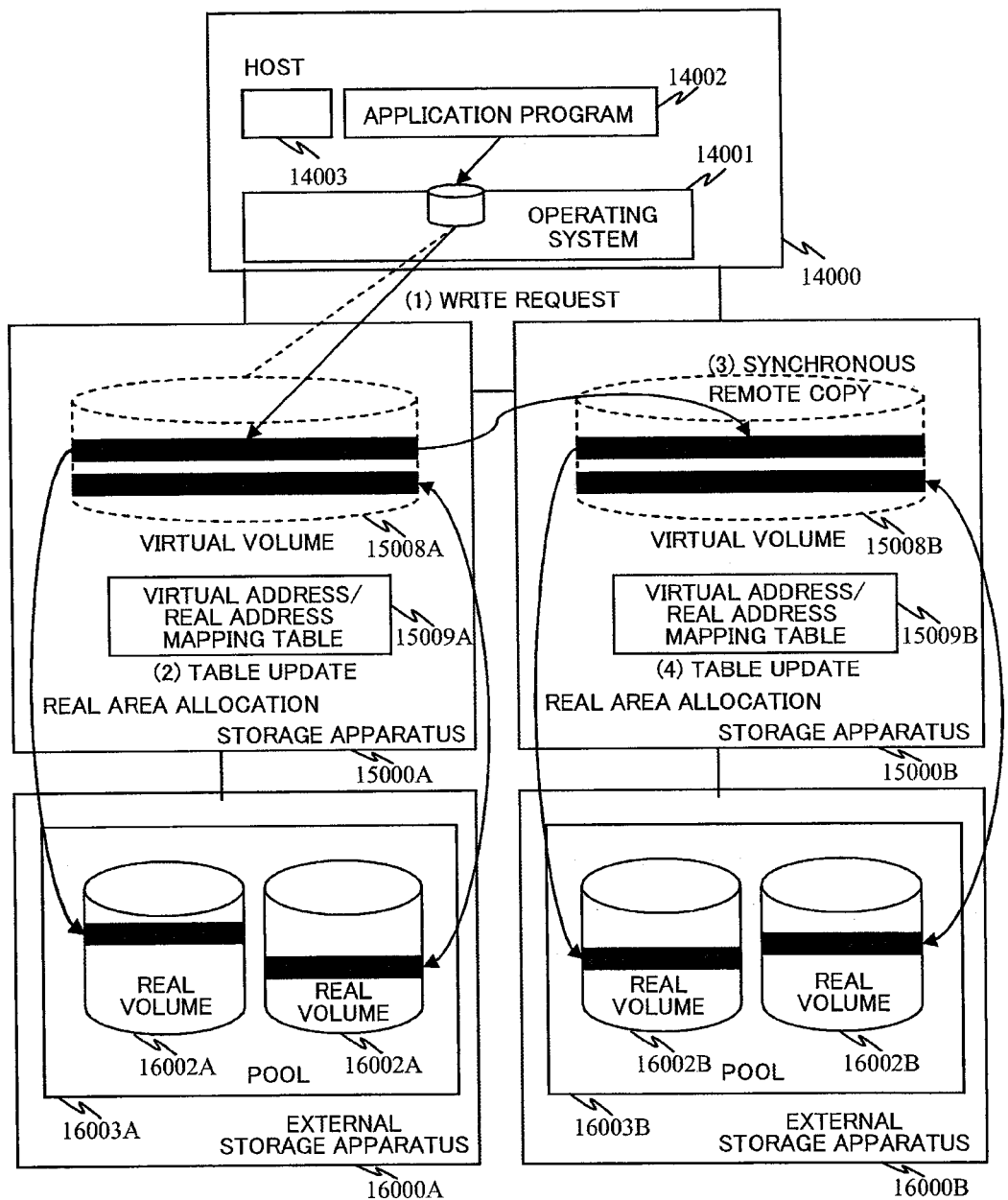
FIG. 21 is a conceptual diagram showing the overview of a eleventh embodiment of the present invention.

FIG. 21 shows an embodiment of the AOU function. In FIG. 21, the host 14000 is coupled to the storage apparatus 15000A and the storage apparatus 15000B. Further, the storage apparatus 15000A is coupled to the external storage apparatus 16000A, and the storage apparatus 15000B is coupled to the external storage apparatus 16000B.

This embodiment shows a constitution example where the real volume 16002A is in the external storage apparatuses 16000A, 16000B. Data in the virtual volume 15008A is associated with data in the real volume 16002A of the pool 16003A. Similarly, data in the virtual volume 15008B is associated with data in the real volume 16002B of the pool 16003B. Further, the virtual volume 15008A and the virtual volume 15008B are constituted so that their contents coincide based on the synchronous remote copy function. The method of synchronous remote copy is as described above.

The read/write processing of this constitution is now described. Incidentally, the following explanation on the read/write processing is based on the premise that the active side of the target volume of the read/write processing is the storage apparatus 15000A.

Read processing is foremost explained. The operating system 14001 that received the read request from the application program 14002 determines whether the active-side storage is the storage apparatus 15000A or the storage apparatus 15000B based on the path management function, and issues a read request to the active-side storage apparatus 15000A. The storage apparatus 15000A that received the read request refers to the virtual address/real address mapping table 15009A, and determines whether a real area in the pool 16003A is allocated to the read data.

When real data is allocated in the foregoing determination, the storage apparatus 15000A reads the read data from the real area and sends it to the host 14000. The application 14002 receives the read data via the operating system 14001. The read processing is thereby complete.

Write processing is now explained. The operating system 14001 that received a write request from the application program 14002 decides whether the active-side storage apparatus is the storage apparatus 15000A or the storage apparatus 15000B based on the path management function, and issues a write request to the active-side storage apparatus 15000A. The storage apparatus 15000A that received the write request refers to the virtual address/real address mapping table 15009A, and determines whether a real area in the pool 16003A is allocated to the write-target data (determination 200).

If a real area is allocated in the foregoing determination, the storage apparatus 15000A receives write data from the host 14000, and stores the write data in the area in the cache memory not shown corresponding to the real area. The storage apparatus 15000A thereafter sends a write request for write data to the storage apparatus 15000B based on the synchronous remote copy function. The storage apparatus 15000B that received the write request from the storage apparatus 15000A determines whether a real area in the pool 16003A is allocated to the write data. Here, since contents of the virtual volume 15008A and contents of the virtual volume 15008B coincide based on the synchronous remote copy function, it is determined that the real area is allocated. Subsequently, the storage apparatus 15000B receives write data from the storage apparatus 15000A, and stores the write data in the area in the cache memory not shown corresponding to the real area, and issues a write completion report to the storage apparatus 15000A.

If a real area is not allocated in the foregoing determination (determination 200), the storage apparatus 15000A registers the address of write data in the virtual address/real address mapping table 15009A, and thereby allocates a real area. Subsequently, the storage apparatus 15000A receives write data from the host 14000, and stores the write data in the area in the cache memory not shown corresponding to the real area. The storage apparatus 15000A thereafter sends a write request for write data to the storage apparatus 15000B based on the synchronous remote copy function. The storage apparatus 15000B that received the write request from the storage apparatus 15000A determines whether a real area in the pool 16003B is allocated to the write data. Here, since contents of the virtual volume 15008A and contents of the virtual volume 15008B coincide based on the synchronous remote copy function, it is determined that the real area is allocated.

Subsequently, the storage apparatus 15000B receives write data from the storage apparatus 15000A, and stores the write data in the area in the cache memory not shown corresponding to the real area, and issues a write completion report to the storage apparatus 15000A. Subsequently, the storage apparatus 15000B registers the address of write data in the virtual address/real address mapping table 15009B, and thereby allocates a real area. The storage apparatus 15000B receives write data from the storage apparatus 15000A, stores the write data in the area in the cache memory not shown corresponding to the real area, and thereafter issues a write completion report to the storage apparatus 15000A. The storage apparatus 15000A that received the write completion report issues a write completion report to the host 14000. The host 14000 receives the write completion report, and the write processing is thereby complete.

Incidentally, data stored in the cache memory is written into the real volumes 16002A, 16002B asynchronously with the storage of such data in the cache memory.

When some kind of failure occurs and the application 14002 is no longer able to perform the read/write processing via virtual volume 15008A in the storage apparatus 15000A, the path management function provided by the operating system 14001 detects a failure, and switches the access path of the read/write processing to go through the virtual volume 15008B in the storage apparatus 15000B. Since contents of the virtual volume 15008A and contents of the virtual volume 15008B coincide based on the synchronous remote function, even when the access path is switched, read/write processing can be ongoingly performed in a normal manner.

(12) Twelfth Embodiment

Figure 22:
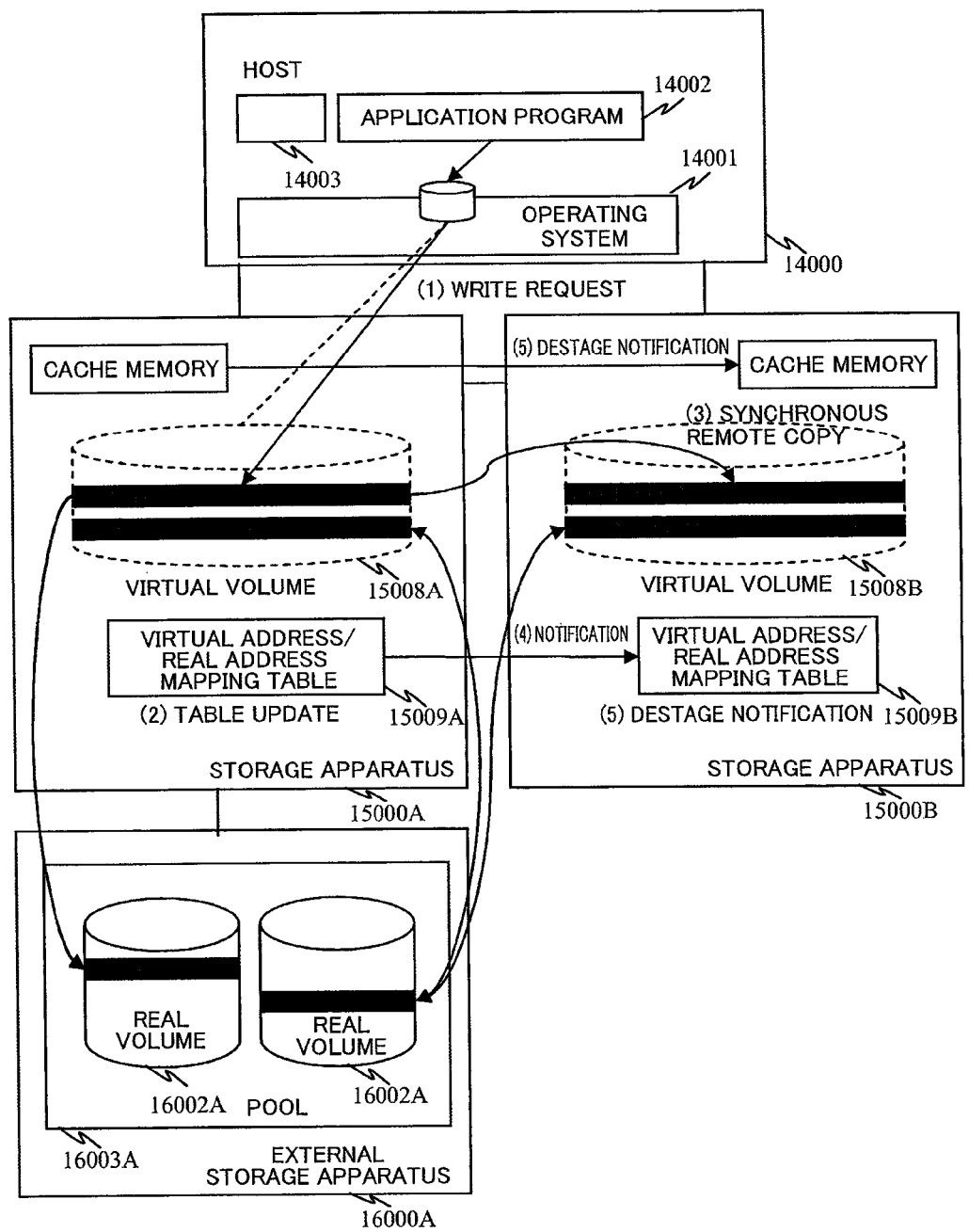
FIG. 22 is a conceptual diagram showing the overview of a twelfth embodiment of the present invention.

This embodiment describes an embodiment that is different from the AOL function of the eleventh embodiment. FIG. 22 shows a constitution example of this embodiment.

The difference in the constitution of this embodiment and the eleventh embodiment is that there is no external storage apparatus 16000B, and the real areas of the virtual volumes 15008A, 15008B are all allocated to areas in the pool 16003A in the external storage apparatus 16000A. The remaining constitution is the same as the eleventh embodiment.

Incidentally, in this embodiment, since the storage apparatus 15000A and the storage apparatus 15000B use the real volume 16002A in the common external storage apparatus 16000A as the common pool, unlike the eleventh embodiment, this embodiment is limited to a constitution where the real volume 16002A is in the external storage apparatus 16000A.

As a result of adopting the foregoing constitution, it is possible to eliminate the physical storage apparatus (HDD or the like) required by the pool.

The major difference in the processing operation between this embodiment and the eleventh embodiment is in that the standby-side storage apparatus 15000B does not perform writing from the cache memory into the real volume 16002A of the external storage apparatus 16000A, and that the storage apparatus 15000A notifies the storage apparatus 15000B of the update to the virtual address/real address mapping table 15009A, and the storage apparatus 15000B that received the notification updates the virtual address/real address mapping table 15009B.

Details of the processing operation are explained below.

Foremost, the read processing is the same as the read processing in the eleventh embodiment.

Write processing is now explained. The operating system 14001 that received a write request from the application program 14002 decides whether the active-side storage apparatus is the storage apparatus 15000A or the storage apparatus 15000B based on the path management function, and issues a write request to the active-side storage apparatus 15000A. The storage apparatus 15000A that received the write request refers to the virtual address/real address mapping table 15009A, and determines whether a real area in the pool 16003A is allocated to the write-target data (determination 300).

If a real area is allocated in the foregoing determination, the storage apparatus 15000A receives write data from the host 14000, and stores the write data in the area in the cache memory corresponding to the real area. The storage apparatus 15000A thereafter sends a write request for write data to the storage apparatus 15000B based on the synchronous remote copy function. In this embodiment, unlike the eleventh embodiment, the storage apparatus 15000B that received the write request from the storage apparatus 15000A instantaneously receives write data from the storage apparatus 15000A, stores such data in the cache memory, and thereafter issues a write completion report to the storage apparatus 15000A. The storage apparatus 15000A that received the write completion report from the storage apparatus 15000B sends a write completion report to the host 14000.

If a real area is not allocated in the foregoing determination (determination 300), the storage apparatus 15000A registers the address of write data in the virtual address/real address mapping table 15009A, and thereby allocates a real area. Subsequently, the storage apparatus 15000A receives write data from the host 14000, and stores the write data in the area in the cache memory not shown corresponding to the real area. The storage apparatus 15000A thereafter sends a write request for write data to the storage apparatus 15000B based on the synchronous remote copy function.

In this embodiment, unlike the eleventh embodiment, the storage apparatus 15000B that received the write request from the storage apparatus 15000A instantaneously receives write-target data from the storage apparatus 15000A, stores such data in the cache memory, and thereafter issues a write completion report to the storage apparatus 15000A. The storage apparatus 15000A receives the write completion report from the storage apparatus 15000B, and thereafter sends the contents of change in the virtual address/real address mapping table 15009A to the storage apparatus 15000B.

The storage apparatus 15000B that received the contents of change in the virtual address/real address mapping table 15009A makes similar changes to the virtual address/real address mapping table 15009B. Thereby, the real area of the write area in the virtual volume 15008B of the storage apparatus 15000B will be mapped to the real area (allocated by the storage apparatus 15000A) in the real volume 16002A of the common external storage apparatus 16000A. The storage apparatus 15000B notifies the storage apparatus 15000A of the update of the virtual address/real address mapping table 15009B. Subsequently, the storage apparatus 15000A that received the notification issues a write completion report to the host 14000. Incidentally, the storage apparatus 15000A simultaneously may perform (1) the data transmission of synchronous remote copy, and (2) the transmission of change of contents in the virtual address/real address mapping table 15009A, receive the completion report on the processing of (1) and (2), and thereafter issue a write completion report to the host 14000. Subsequently, the host 14000 receives the write completion report, and the write processing thereby complete.

Incidentally, data stored in the cache memory of the storage apparatus 15000A is written (destaged) into the real volume 16002A with the storage apparatus 15000A asynchronously with the storage in the cache memory. After destaging is complete, the storage apparatus 15000A notifies such completion to the storage apparatus 15000B. The storage apparatus 15000B that received the notification discards the area of the cache memory corresponding to the writing. Incidentally, instead of discarding the area, the area of the cache memory corresponding to the writing may be cleaned (a status where contents of the cache memory coincide with data in the storage apparatus (such as an HDD)).

When some kind of failure occurs and the application 14002 is no longer able to perform the read/write processing via virtual volume 15008A in the storage apparatus 15000A, the path management function provided by the operating system 14001 detects a failure, and switches the access path of the read/write processing to go through the virtual volume 15008B in the storage apparatus 15000B. Since contents of the virtual volume 15008A and contents of the virtual volume 15008B coincide based on the synchronous remote function, even when the access path is switched, read/write processing can be ongoingly performed in a normal manner.

(13) Thirteenth Embodiment

In this embodiment, an example is explained where the logical snapshot function is applied to the volumes in the storage apparatuses.

A logical snapshot function is a function that is similar to the local replication function, and a function for providing the user with replicated data at the point-in-time designated by the user. Nevertheless, the secondary volume having replicated data is a virtual volume provided using the write data subsequent to the replication creation command stored in the area of the real volume belonging to the pool, and data of the primary volume. The entity of the virtual secondary volume is retained in a pool that is an aggregate of real volumes. The relationship of the primary volume and the secondary volume may be referred to as a snapshot pair or simply as a pair. In the logical snapshot function, from the perspective that a logical volume having the same contents as the primary volume at the stationary point is not actually created, the secondary volume is virtual. The logical snapshot function, unlike the local copy function described above, does not need a secondary volume that is the same size as the size of the primary volume. Thereby, it is possible to eliminate storage apparatuses (HDDs and the like) required for retaining the contents of the secondary volume.

In this embodiment, the availability can also be improved by coordinating the active-side storage apparatus and the standby-side storage apparatus regarding this logical snapshot function.

Figure 23:
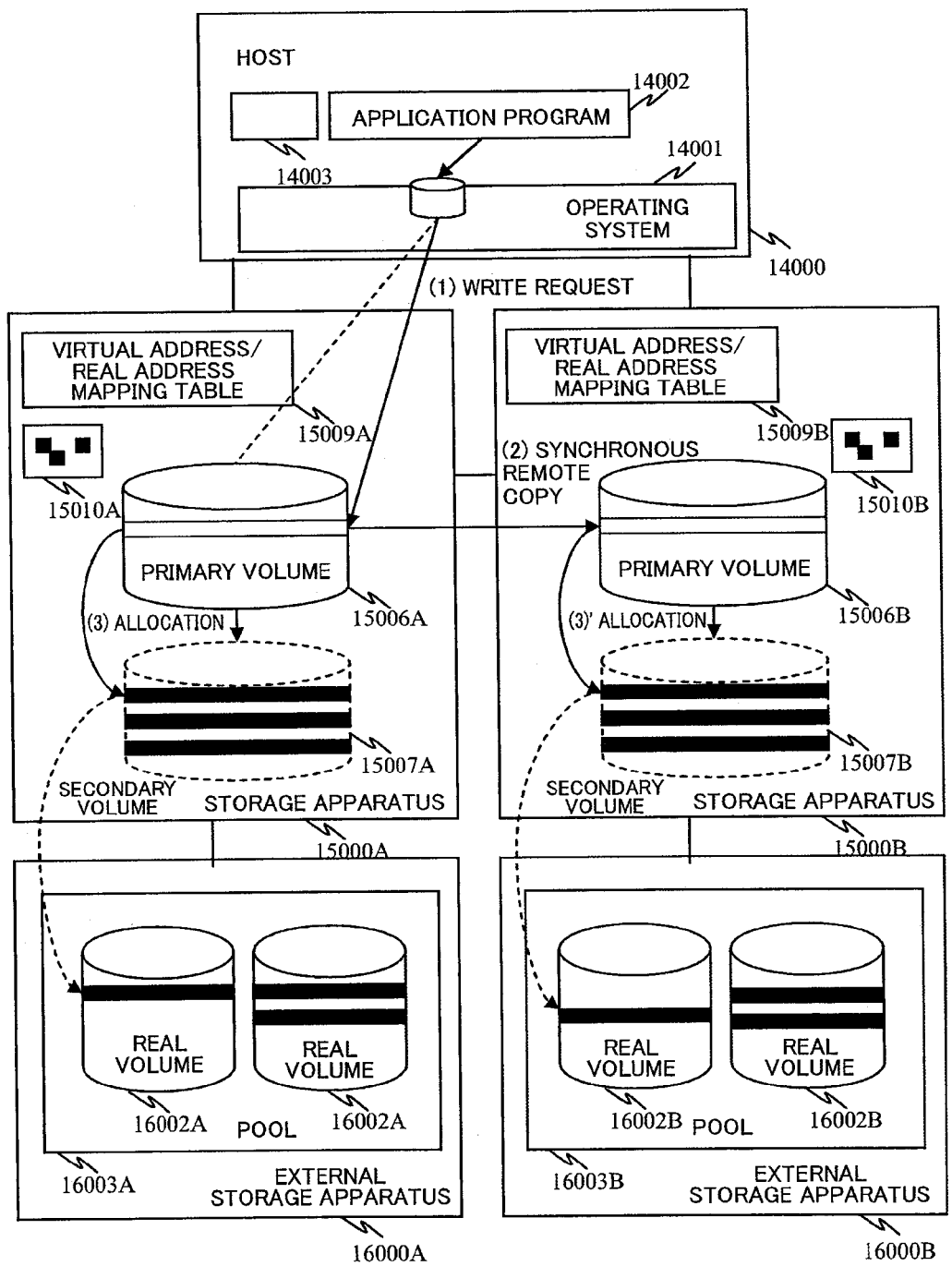
FIG. 23 is a conceptual diagram showing the overview of a thirteenth embodiment of the present invention.

FIG. 23 shows an embodiment of the snapshot function. In FIG. 23, the host 14000 is coupled to the storage apparatus 15000A and the storage apparatus 15000B. Further, the storage apparatus 15000A is coupled to the external storage apparatus 16000A, and the storage apparatus 15000B is coupled to the external storage apparatus 16000B. Further, the snapshot function and the differential bitmaps 15010A, 15010B (information showing the status of differential between the primary volumes 15006A, 15006B at the stationary point and the primary volumes 15006A, 15006B at the current time) and the virtual address/real address mapping tables 15009A, 15009B (tables for managing the location of the entity of the virtual secondary volumes 15007A, 15007B) are executed and managed by the storage apparatus 15000A and the storage apparatus 15000B. Further, the primary volume 15006A in the storage apparatus 15000A and the primary volume 15006B in the storage apparatus 15000B are configured to form a remote copy pair.

This embodiment shows a constitution example where the primary volumes 15006A, 15006B are in the storage apparatuses 15000A, 15000B and the pool 16003A, 16003B are in the external storage apparatus 16000A, 16000B. Incidentally, the pools 16003A, 16003B may also be in the storage apparatuses 15000A, 15000B.

<Logical Snapshot Creation Command>

When the user using the host 14000 issues a logical snapshot creation command, a creation command is issued to the active-side storage apparatus 15000A and the standby-side storage apparatus 15000B according to the methods described in the previous embodiments. The storage apparatuses 15000A, 15000B that received the creation command prepare virtual secondary volumes 15007A, 15007B, and allocate the differential bitmaps 15010A, 15010B that are all 0 (meaning no differential) and the virtual address/real address mapping tables 15009A, 15009B to the secondary volumes 15007A, 15007B.

<Read Processing to Primary Volume>

This is the same as the previous embodiments.

<Write Processing to Primary Volume>

The operating system 14001 that received the write request from the application program 14002 determines whether the active-side storage is the storage apparatus 15000A or the storage apparatus 15000B based on the path management function (in relation to the write-target primary volume), and issues a write request to the active-side storage apparatus 15000A. The storage apparatus 15000A that received the write request checks the differential bitmap 15010A of the write-target address. If the result is 1, data sent from the host 14000, together with the write request, is stored as write data of the primary volume in the cache memory. Meanwhile, if the result is 0, the following Copy-On-Write processing is performed for using the before-updated data of the primary volume 15006A as data for the secondary volume 15007A.

(Step 1) The storage area of the real volume 16002A belonging to the pool 16003A is allocated.

(Step 2) The before-updated data is copied from the primary volume 15006A to said storage area while using the cache memory.

(Step 3) The pool management information for managing the storage destination of the before-updated data to be saved is updated to indicate which area of the real volume 16002A in the pool 16003A that data has been stored.

(Step 4) The received write data is stored as data to the address of the primary volume 15006A in the cache memory, and a write completion reply is returned.

In parallel with this, the write data is copied from the primary volume 15006A in the storage apparatus 15000A to the primary volume 15006B in the storage apparatus 15000A based on the remote copy function, and similar processing is performed. Thus, the storage apparatuses 15000A, 15000B respectively manage the virtual address/real address mapping tables 15009A, 15009B and the differential bitmap s15010A, 15010B.

<Read Processing to Secondary Volume>

The operating system 14001 that received the write request from the application program 14002 determines whether the active side is the storage apparatus 15000A or the storage apparatus 15000B based on the path management function (in relation to the read-target secondary volume), and issues a read request to the active-side storage apparatus 15000A. The storage apparatus 15000A that received the read request checks the differential bitmap 15010A recorded in the primary volume 15006A. As a result, if the bit of the read-target address is 0, data stored in the same address of the primary volume 15006A is returned to the host 14000, and the operating system 14001 returns the data to the application 14002. Meanwhile, if the bit of the read-target address is 1, the operating system 14001 refers to the virtual address/real address mapping table 15009A, decides the location of the pre-updated data concerning the read-target address of the primary volume 15006A, and returns the data from the real volume belonging to the pool 16003A to the host 14000 (application program 14002).

<Write Processing to Secondary Volume>

In the host 14000, the operating system 14001 that received the write request from the application program 14002 determines whether the active side is the storage apparatus 15000A or the storage apparatus 15000B based on the path management function (in relation to the write-target secondary volume), and issues a write request to the active-side storage apparatus 15000A. The storage apparatus 15000A that received the write request checks the differential bitmap 15010A of the write-target address allocated to the primary volume 15006A. If the result is 1, by referring to the virtual address/real address mapping table 15009A, the operating system 14001 searches the storage area of a real volume 16002A in the pool 16003A storing the before-updated data of the address of the primary volume 15006A, and stores the write data in the area. Meanwhile, when the result is 0, the following processing is performed.

(A) An area of the real volume 16002A belonging to the pool 16003A is allocated.

(B) Write data is stored in the allocated area and the virtual address/real address mapping table 15009A is updated in order to indicate which area of the real volume 16002A in the pool 16003A that data has been stored.

(C) The bit corresponding to the address of the differential bitmap 15010A is updated to 1.

In parallel with this, the write data is copied from the primary volume 15006A in the storage apparatus 15000A to the primary volume 15006B in the storage apparatus 1000R based on the remote copy function, and similar processing is performed. Thus, the storage apparatuses 15000A, 15000B respectively manage the virtual address/real address mapping tables 15009A, 15009B and the differential bitmaps 15010A, 15010B.

<Copy-after-Write Processing>

The storage apparatuses 15000A, 15000B may execute the following Copy-After-Write processing in substitute for the Copy-On-Write processing to be executed upon writing into the primary volumes 15006A, 15006B.

(Step 1) The received write data is stored as data to the address of the primary volumes 15006A, 15006B in the cache memory, and a write completion reply is returned. However, destaging of the write data is inhibited.

(Step 2) Storage areas of the real volumes 16002A, 16002B belonging to the pools 16003A, 16003B are allocated.

(Step 3) The before-updated data is coped from the primary volumes 15006A, 15006B to said storage area while using the cache memory.

(Step 4) The pool management information for managing the storage destination of the saved before-updated data is updated to indicate which area of the real volumes 16002A, 16002B in the pools 16003A, 16003B that data has been stored.

(Step 5) Destaging of write data that was inhibited is permitted.

<Failure>

When some kind of failure occurs and the read/write request to the active-side primary volume 15006A and the secondary volume 15007A can no longer be processed, as described above, the operating system 14001 is able to continue access by switching the read/write request target to the standby-side primary volume 15006B or the secondary volume 15007B. Incidentally, as described above, in order to issue a write request to the same storage apparatuses 15000A, 15000B, preferably, the primary volumes 15006A, 15006B and the secondary volumes 15007A, 15007B of the snapshot function simultaneously switch the secondary volumes 15007A, 15007B when switching of the primary volumes 15006A, 15006B is required, and contrarily switch the primary volumes 15006A, 15006B as well when switching of the secondary volumes 15007A, 15007B is required.

(14) Fourteenth Embodiment

Figure 24:
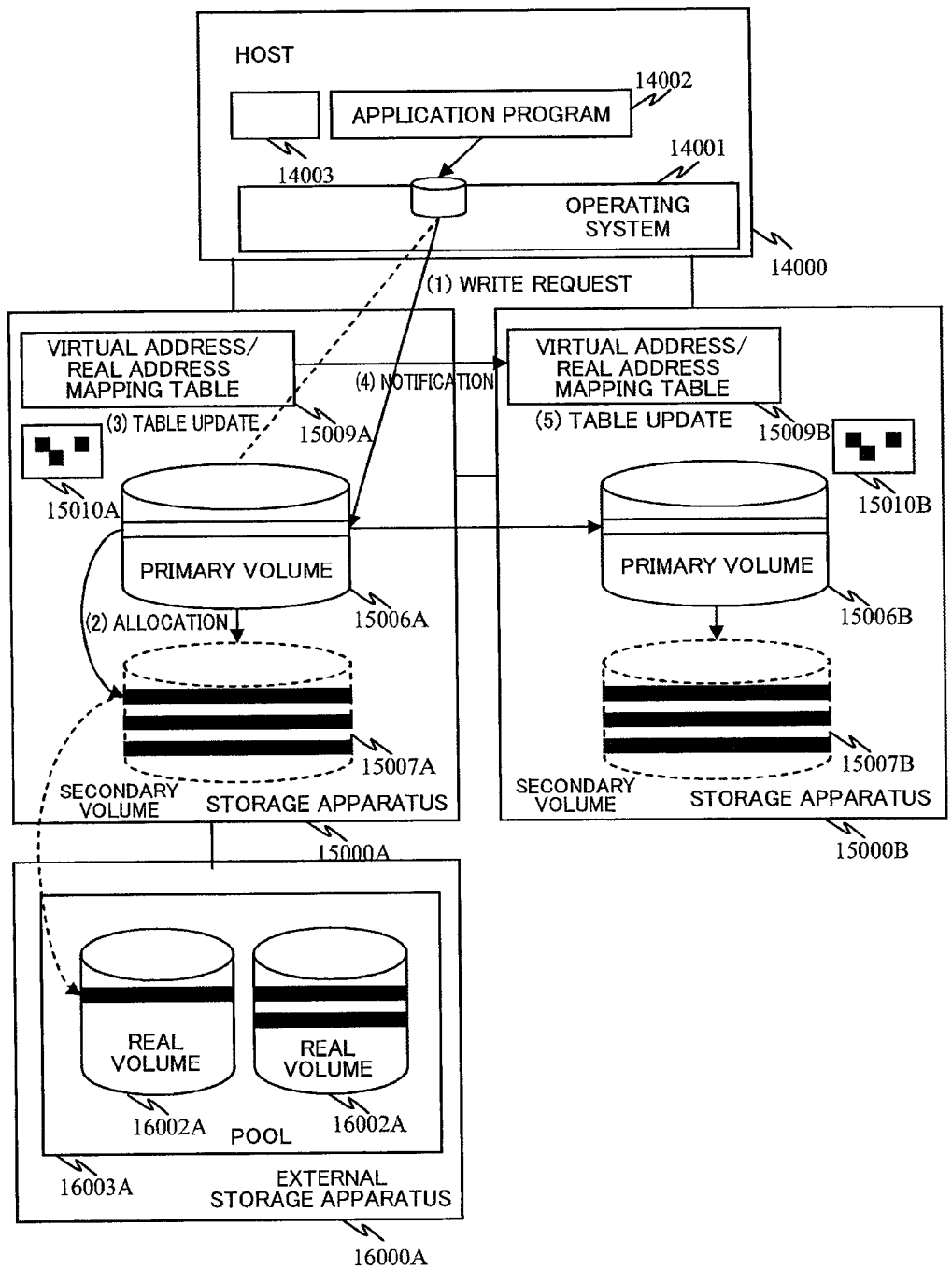
FIG. 24 is a conceptual diagram showing the overview of a fourteenth embodiment of the present invention.

An embodiment of a logical snapshot function that is different from the thirteenth embodiment is now explained. FIG. 24 shows one constitution example of this embodiment.

Foremost, the difference in the constitution between this embodiment and the thirteenth embodiment is that the external storage apparatus 16000B does not exist, and the real area of the virtual secondary volumes 15007A, 15007B is allocated to the area in the pool 16003A of any external storage apparatus 16000A. The remaining constitution is the same as the thirteenth embodiment.

Incidentally, in this embodiment, since the storage apparatus 15000A and the storage apparatus 15000B use the real volume 16002A in the common external storage apparatus 16000A as the common pool 16003A, and, unlike the thirteenth embodiment, the real volume 16002A is limited to the constitution within the external storage apparatus 16000A.

As a result of adopting the foregoing constitution, it is possible to eliminate the physical storage apparatus (such as an HDD) required by the pool 16003A.

The major difference of the processing operation in this embodiment and the thirteenth embodiment is as follows.

(A) In normal situations, in substitute for the standby-side storage apparatus 15000B not performing writing from the cache memory into the real volume 16002A of the external storage apparatus 16000A, the timing that the active-side storage apparatus 15000A destages the data corresponding to the real volume 16002A in the primary volume 15006A, the secondary volume 15007A, and the pool 16003A is conveyed to the standby-side storage apparatus 15000B, and the standby-side storage apparatus 15000B thereby discards the data in the cache memory.

(B) The storage apparatus 15000A notifies the storage apparatus 15000B of the update to the virtual address/real address mapping table 15009A, and the storage apparatus 15000B that received the notification updates the virtual address/real address mapping table 15009B.

Further, in substitute of the processing of (A), caching of data corresponding to the real volume 16002A in the secondary volumes 15007A, 15007B or the pool 16003A can be invalidated. Here, since the saving of the before-updated data by the foregoing Copy-On-Write processing includes the storing of data in the real volume 16002A in the pool 16003A until the writing in the primary volumes 15006A, 15006B is complete, the performance will deteriorate. But since this does not occur in the Copy-After-Write mode, this is preferable.

Several embodiments of the present invention were described above, but these embodiments are merely illustrations for explain the present invention and are not intended to limit the scope of invention in any way. The present invention may be worked in various other modes without deviating from the gist of this invention. For example, a nonvolatile memory can be used in substitute for the HDD 1030 and the cache memory 1020. As the nonvolatile memory, for example, various types of nonvolatile memories such as a flash memory (specifically, for instance, a NAND-type flash memory), MRAM (Magnetoresistive Random Access Memory), and PRAM (Parameter Random Access Memory) can be used.

(15) Fifteenth Embodiment

Figure 28:
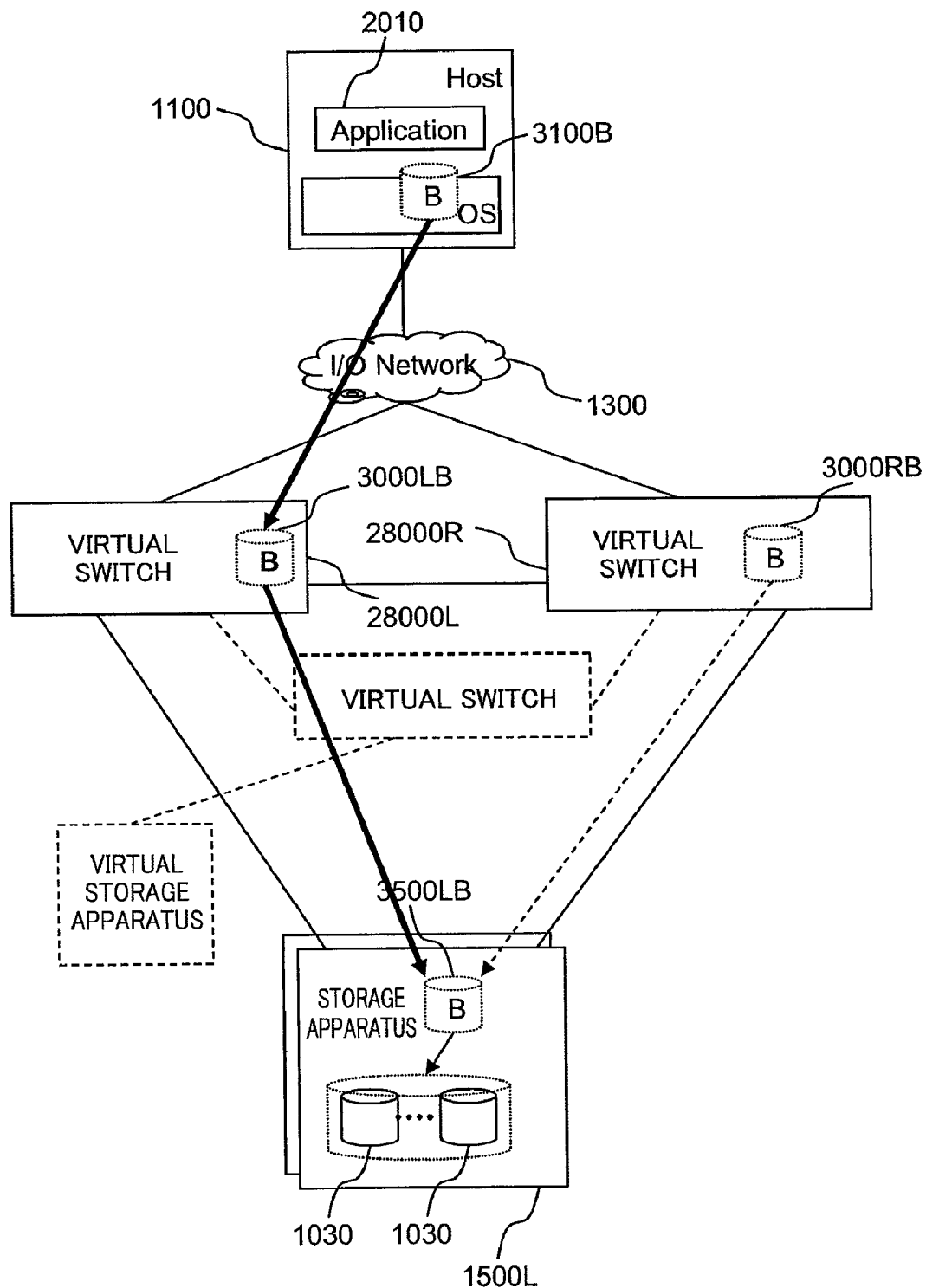
FIG. 28 is a conceptual diagram showing the overview of a fifteenth embodiment of the present invention.

FIG. 28, in which the same reference numeral is given to the components corresponding to those illustrated in FIG. 1, is a schematic diagram showing an embodiment of applying network switches (virtualization switches) 28000L, 28000R having a virtualization function.

<1. Hardware Constitution of Present Embodiment>

The virtualization switches 28000L, 28000R have a plurality of network ports, and processors for controlling the network ports control the transfer of the respective ports, detect failures, and perform virtualization described later. Incidentally, although not shown in this schematic diagram, as with the first embodiment explained with reference to FIG. 1, a management host is coupled to the virtualization switches 28000L, 28000R, and a user is able to configure settings in the virtualization switches 28000L, 28000R or perform setting copy between the virtualization switches 28000L, 28000R via this management host. Incidentally, the other components are the same as the first to fourteenth embodiments, and the explanation thereof is omitted.

<2. Characteristics of Present Embodiment Employing Virtualization Switch>

Virtualization provided by the virtualization switches 28000L, 28000R differ from the first to fourteenth embodiments by comprising the following characteristics.

(Characteristic 1) A virtual WWN (or port name) can be provided. The port of the fibre channel switch is referred to as an F port or an E port, and has an attribute that is different from the N port (meaning the start point or end point of communication) of the normal host or the storage. Thus, when performing virtualization in the virtualization switches 28000L, 28000R, if a virtual WWN, which is not actually connected internally, is created and provided to both virtualization switches 28000L, 28000R, software in the host 1100 will no longer have to explicitly switch the I/O path. Incidentally, more specifically, although communication of the fibre channel is conducted with the foregoing port name, this is an identifier allocated by the fibre channel switch, and the identifier internally contains information for identifying the switch to be used in the routine. Thus, both virtualization switches 28000L, 28000R perform the routine by allocating a port name so to simulate to the host 1100 as the N port having a virtual WWN is coupled to the both virtualization switches 28000L, 28000R via the virtual switch.

(Characteristic 2) Caching is not performed in the switches. The fibre channel switch normally decides the transfer destination by referring to only the control header and performs transfer control in a so-called cut-through method where data buffering is not performed, caching is often not performed even when providing a virtualization function. Incidentally, when performing caching, processing related to this characteristic is realized with the processing as with the embodiments described above. Further, the read/write processing of the virtualization switches 28000L, 28000R in a case of not performing caching can be considered to be similar to write-through-type control of transferring a request to the storage apparatus 1500L upon receiving an I/O request and returning a processing completion report to the host 1100 upon waiting for the processing to be complete.

(Characteristic 3) High availability in this embodiment is realized merely by setting the same virtualization in both virtualization switches 28000L, 28000R. This is possible because caching is not performed in the virtualization switches 28000L, 28000R. Incidentally, when the virtualization switches 28000L, 28000R are to perform remote copy or local copy, and there is information such as differential bitmaps in the switches, as with the previous embodiments, it is necessary to retain internal information in both the primary and secondary systems.

Incidentally, although the virtualization switches 28000L, 28000R were explained above as being fibre channel switches, the virtualization switches 28000L, 28000R may also be switches employing Ethernet (registered trademark), or iSCSI or TCP/IP. Here, the WWN may correspond to the MAC address and the port name may correspond to the IP address, but in cases of Ethernet (registered trademark) or TCP/IP, the routine may be performed to the IP address by directly providing the virtual port and the IP address allocated thereto externally without providing virtual switches.

(16) Sixteenth Embodiment

The sixteenth embodiment is now explained. This embodiment relates to an invention of providing a virtual storage apparatus of configuring the AOU function explained in the eleventh embodiment and twelfth embodiment in a high availability constitution. Incidentally, functions and the like that are not explained below are the same as the configuration/constitution of the information system explained in the first to fifteenth embodiments.

As described above, regarding the volume (hereinafter referred to as the "AOU volume") to be provided by the virtual storage apparatus to the host 1100 based on the foregoing function, the AOU function is a function of allocating a storage area of a HDD (more specifically, a part or the whole of a storage area of a volume (hereinafter referred to as a "pool volume") constituted to a HDD) to an address written into by the host 1100, instead of allocating the storage area of the HDD to all address of the AOU volume from the start of use. The AOU function is able to effectively use the HDD. This is because, it is not able to dynamically expand the data capacity during ongoing access with a certain type of file system operating in the host 1100, the administrator of the host 1100 sets the volume capacity by including the data capacity that may be used in the future. Thus, conventional technology had to be equipped with a HDD that will not be used at the time the volume capacity is set, even though it may not be used in the future.

Incidentally, from the perspective of effectively using the HDD capacity, it is preferable that the area of the pool volume is unallocated to the area of the AOU volume unwritten, but this embodiment is not limited thereto if there is another objective (realizing high performance, etc.).

1. Overview of Present Embodiment

Figure 29:
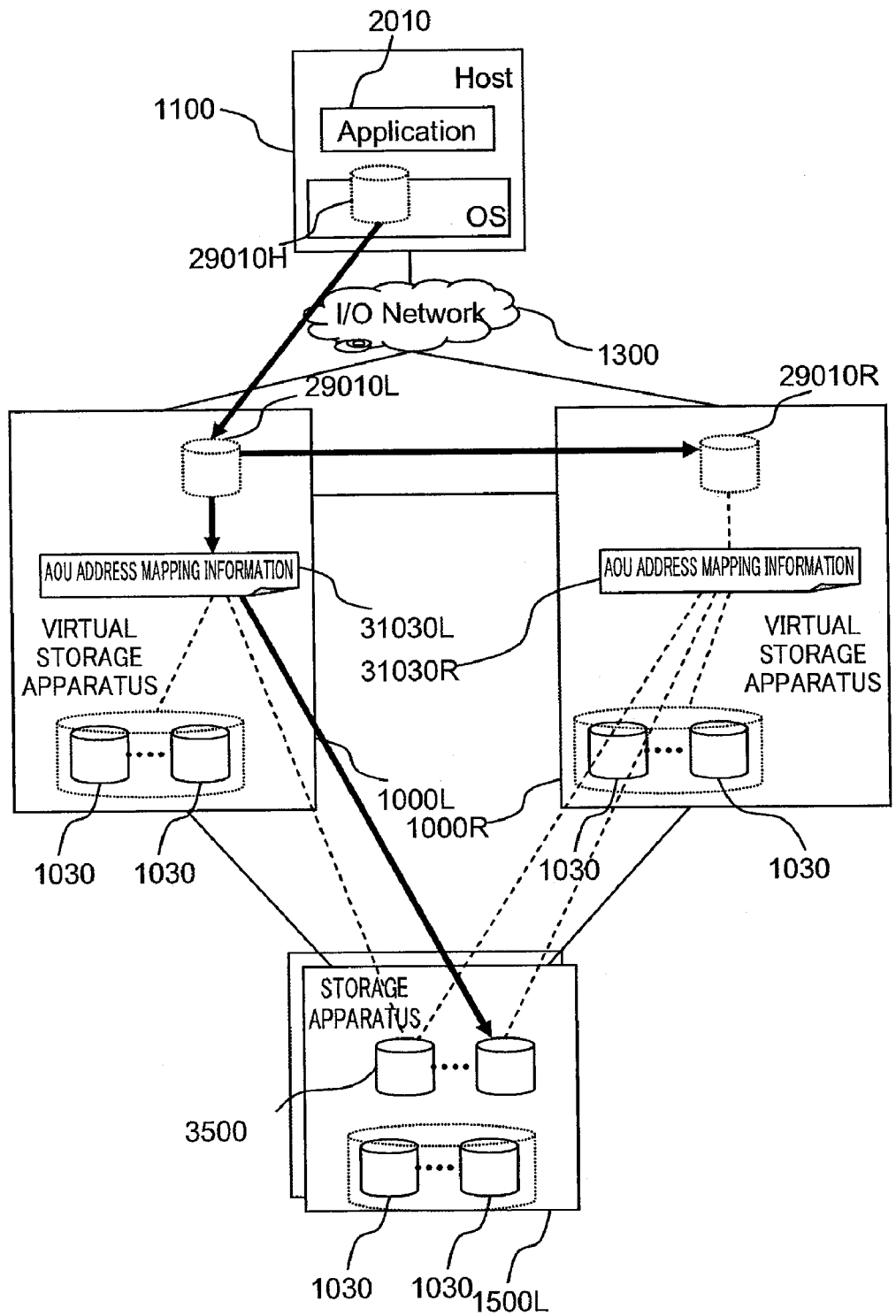
FIG. 29 is a conceptual diagram showing the overview of a sixteenth embodiment of the present invention.

FIG. 29, in which the same reference numeral is given to the components corresponding to those illustrated in FIG. 1, shows an overview of this embodiment. With the information system according to this embodiment, two virtual storage apparatuses 1000L, 1000R are coupled to the common storage apparatus 1500L. As a result of the two virtual storage apparatuses 1000L, 1000R of high availability having the AOU function, the service down time of the information system is shortened. Incidentally, unless specified herein, the storage apparatus 1500L is in an accessible state from both virtual storage apparatuses 1000L, 1000R; in other words, it is in a shared state, and with the existence of a storage apparatus that is not shared, the volume in the storage apparatus can be used as the storage area of AOU. Further, although not shown in FIG. 29, in the case of this embodiment, as with the first embodiment, a management host 1200 (FIG. 1) is coupled to the virtual storage apparatuses 1000L, 1000R.

Sections that are different from the foregoing embodiments are mainly explained below. The two virtual storage apparatuses 1000L, 1000R use the AOU address mapping information 31030L, 31030R to create the AOU volumes 29010L, 29010R, and provide these to the host 1100. The AOU address mapping information 31030L, 31030R contains the correspondence of the address space of the AOU volumes 29010L, 29010R and the area of the pool volume in the virtual storage apparatuses 1000L, 1000R or the area of the pool volume in the storage apparatus 1500L.

When a write request is issued from the host 1100 to the AOU volume 29010L, the primary virtual storage apparatus 1000L determines whether an area of the pool volume is allocated to the address range of the request target, and, if not allocated, it allocates the area of the pool volume of the virtual storage apparatus 1000L or the storage apparatus 1500L. Then, as a result of the write request being processed, write data is stored in the cache area of the primary virtual storage apparatus 1000L. Further, write data to the AOU volume 29010L is transferred to the secondary virtual storage apparatus 1000R based on the synchronous remote copy, and write data is stored in the cache area as with the primary system.

Subsequently, both virtual storage apparatuses 1000L, 1000R perform destaging processing, but only one of the virtual storage apparatuses 1000L, 1000R performs destaging to the write data corresponding to the storage apparatus 1500L. This is because if both virtual storage apparatuses 1000L, 1000R independently destage the write data, data stored in the storage apparatus 1500L will become inconsistent (for instance, data loss or inconsistency of write sequence such as the last written data being deleted and returning to the previous write data). Thus, it is necessary to decide in advance which one of the virtual storage apparatuses 1000L, 1000R will perform destaging before destaging becomes required. This embodiment explains an example of this where the primary virtual storage apparatus 1000L performs destaging, but destaging may also be performed by the secondary virtual storage apparatus 1000R, or the virtual storage apparatus 1000L, 1000R to perform such destaging may be decided based on the address space of the destaging target.

In the case of a read request also, the primary virtual storage apparatus 1000L foremost determines whether an area of the pool volume is allocated to the address range of the request target. When an area is allocated as a result of this determination, the virtual storage apparatus 1000L reads data from the area (including data in the cache memory not shown) of the corresponding pool volume and transfers this to the host 1100. When an area is not allocated, the virtual storage apparatus 1000L returns a predetermined value (zero, for instance).

Figure 30:
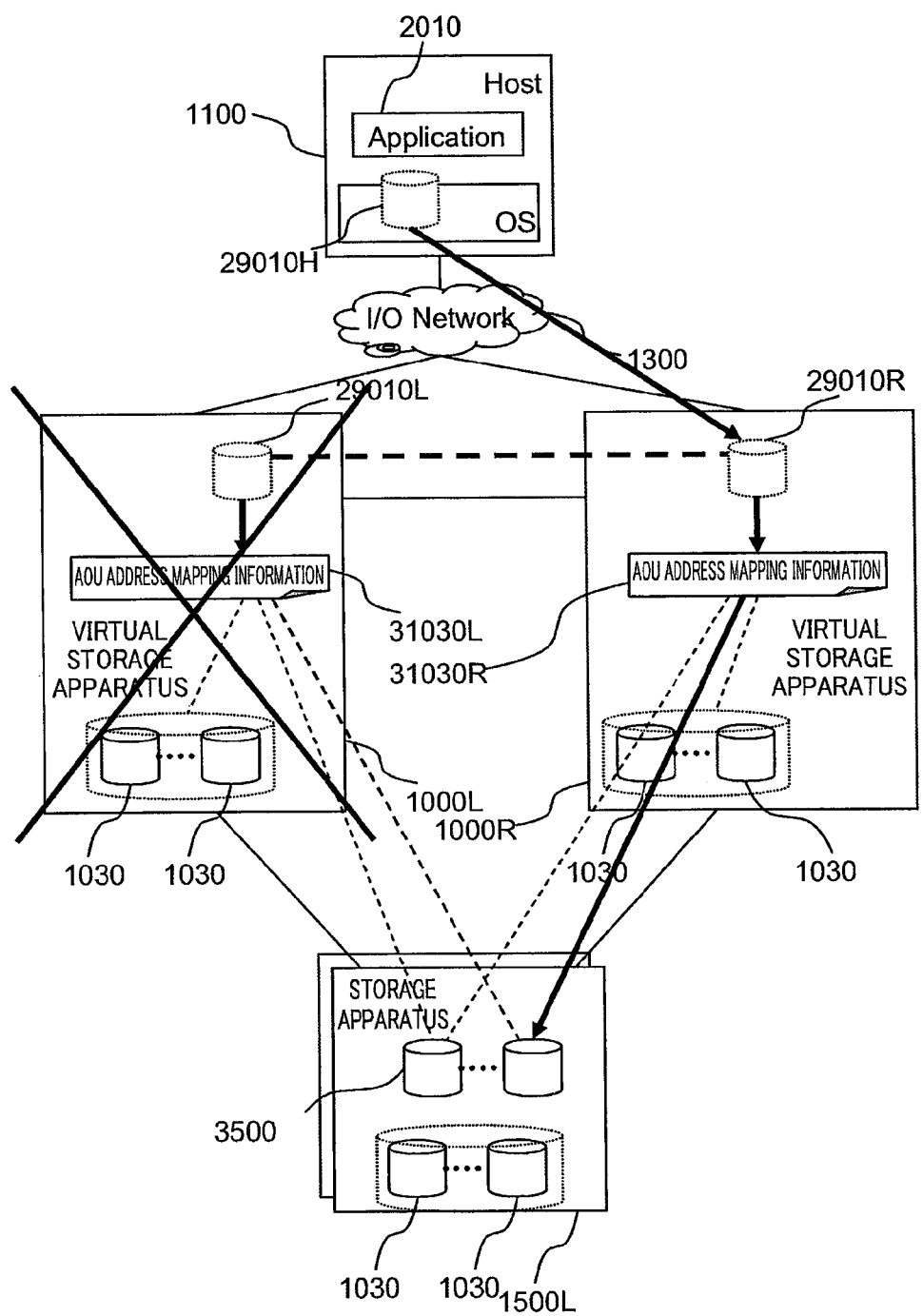
FIG. 30 is a conceptual diagram showing the overview of the sixteenth embodiment.

FIG. 30 is a schematic diagram after switching the I/O request processing to the secondary virtual storage apparatus 1000R subsequent to the function of causing the primary virtual storage apparatus 1000L to stop. As illustrated in FIG. 30, the secondary virtual storage apparatus 1000R processes the I/O request based on the AOU address mapping information 31030R in the storage apparatus 1500L and the virtual storage apparatus 1000L. Thus, as a result of the primary and secondary virtual storage apparatuses 1000L, 1000R communicating on a regular basis, they maintain the contents of the AOU address mapping information 31030L, 31030R that are the same as the portions relating to the storage apparatus 1500L. Thereby, the secondary virtual storage apparatus 1000R is able to take over the allocation status of the storage apparatus 1500L. Further, the secondary virtual storage apparatus 1000R does not delete data stored in the cache memory from such cache memory unless it is data that has been destaged from the cache memory in the primary virtual storage apparatus 1000L. Thereby, it is possible to prevent data loss even if the data from the cache memory in the primary virtual storage apparatus 1000L is volatilized when the function is stopped.

2. Programs and Information to be Executed by Virtual Storage Apparatus

Figure 31:
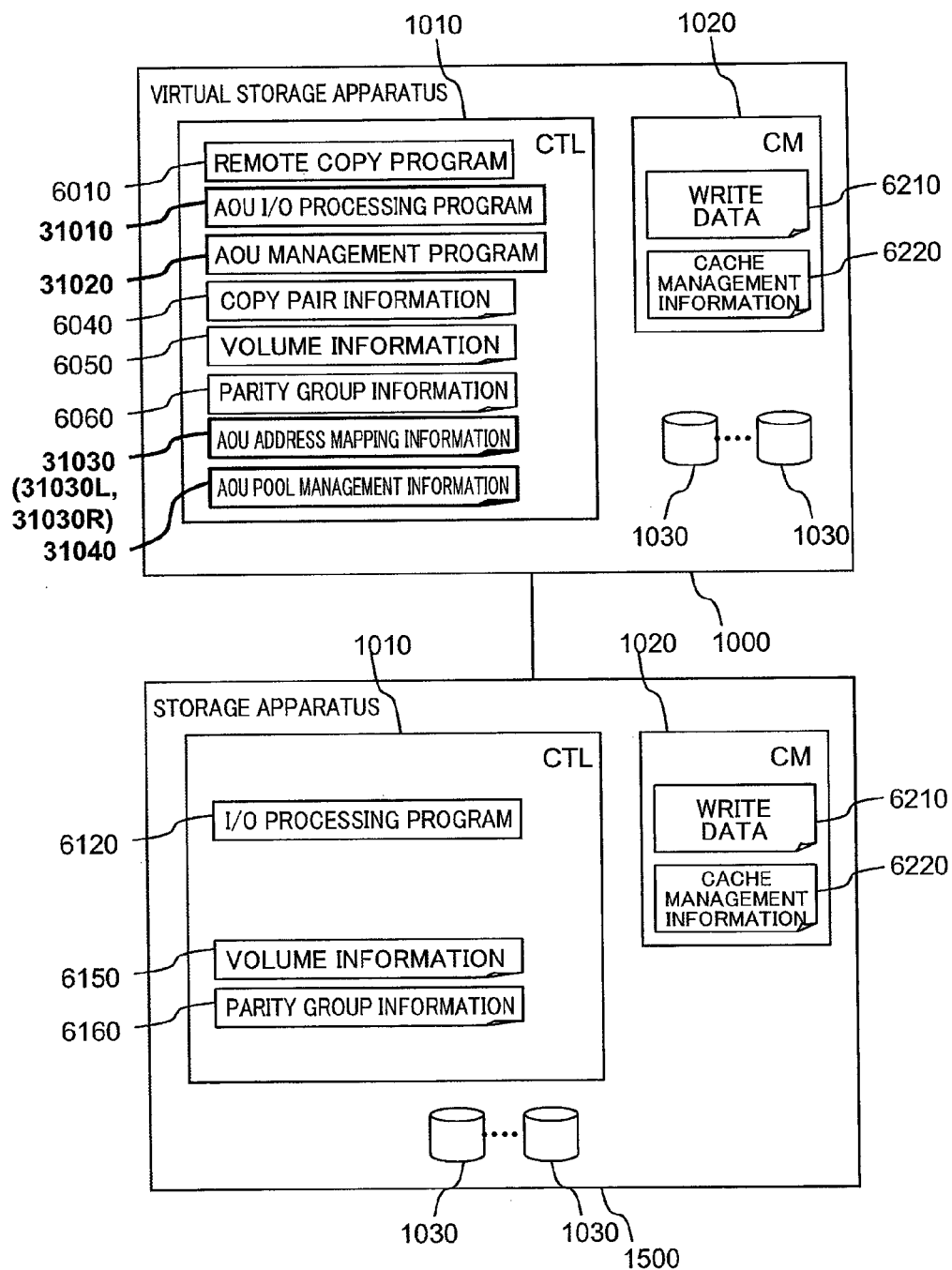
FIG. 31 is a block diagram representing the software constitution of the virtual storage apparatus and the storage apparatus according to an embodiment of the present invention.

FIG. 31, in which the same reference numeral is given to the components corresponding to those illustrated in FIG. 6, show the software programs to be executed by the virtual storage apparatuses 1000L, 1000R, and information to be used by these programs.

In FIG. 31, the AOU I/O processing program 31010 is a program for processing I/O request received by the virtual storage apparatuses 1000L, 1000R, and contains a part of the functions of the I/O processing program 6020 (FIG. 6) in the first to fourteenth embodiments.

The AOU management program 31020 is a program for configuration concerning the AOU function and executing Deduplication processing described later. Further, the AOU address mapping information 31030 is information concerning the correspondence of the AOU volumes 29010L, 29010R and the pool volume areas. Further, the AOU pool management information 31040 is information for managing the aggregate of pool volumes (pool) to be used by the AOU function.

<2.1. AOU Address Mapping Information>

FIG. 35 shows the specific contents of the AOU address mapping information 31010. The virtual storage apparatuses 1000L, 1000R manage the storage area of data and the like, based on the identifier of the volume provided to the host 1100, and the address of the an area (segment) into which the address space of the AOU volume is divided from the top by a predetermined size (segment size). Incidentally, this segment size is a value to be configured at the time of defining the pool.

In FIG. 35, the "AOU volume identifier" and the "address space" respectively show the identifier of the AOU volumes 29010L, 29010R containing the corresponding segment, and the address of such segment in the AOU volumes 29010L, 29010R. Further, the pool ID shows the identifier of the pool to allocate an area to the AOU volume 29010L, 29010R.

The "COW (Copy On Write) flag" is a flag showing it is necessary to store the corresponding write data in a separately allocated pool volume area if a write request to such segment arrives. This flag is sometimes turned "ON" showing that the write data needs to be stored in another pool volume with different segments being associated to the area of the same pool volume.

The "pool volume area identifier" is identifying information showing the identifier of the pool volume area actually storing the data to be stored in the segment. This identifying information, for instance, is constituted of the following information.

(1) The identifier and address range of the internal volume when using an area of an internal volume of the virtual storage apparatuses 1000L, 1000R.

(2) Information for identifying the apparatus such as the port name or communication destination, information for identifying the volume inside an apparatus such as a LUN, and address range when including an area of a volume in the storage apparatus 1500L.

(3) NULL in the case of an unallocated area.

The "takeover area" is information showing whether the pool volumes, in which an identifier is indicated in the corresponding "pool volume area identifier" column, are being managed by both the primary and secondary virtual storage apparatuses 1000L, 1000R ("Yes" when managed by both and "No" when not managed by both).

The "pair AOU volume identifier" retains an identifier of the AOU volumes 29010L, 29010R forming a pair with the volume specified with the corresponding AOU volume identifier. As this identifier, a combination of an identifier of the corresponding virtual storage apparatuses 1000L, 1000R and an identifier of the corresponding AOU volumes 29010L, 29010R is used.

Incidentally, as described above, one reason that the AOU areas are managed in segment units is because the I/O performance will deteriorate since the management information of the AOU address mapping information 31030 will become too large when managed in block units.

<2.2. AOU Pool Management Information>

FIG. 36 shows the specific configuration of the AOU pool management information 31040. The AOU pool management information 31040 retains the following information for each pool.

(1) Segment size
(2) List of volumes (pool volumes) allocated to the pool
(3) List of unallocated areas among the pool volume areas
(4) Unused capacity
(5) Threshold value for issuing an alert that the capacity is insufficient
(6) Identifier of the virtual storage apparatus set as the opponent of the pool pair and pool ID in the apparatus. Incidentally, "pool pair" will be described later.

3. Initialization

Initialization of this embodiment is performed according to the following routine.
1. Initialization of pool
2. Creation of AOU volume
3. Association of AOU volumes
4. Configuration of synchronous remote copy The details are now explained. Incidentally, although there are cases below where the processing subject of certain processes is explained as the "management host" or "program," in reality, it goes without saying that the processor in the management host executes the corresponding processing based on a program stored in the corresponding memory of the management host, and the processor 1011 in the corresponding virtual storage apparatuses 1000L, 1000R executes the corresponding processing based on that program.

<3.1. Initialization of Pool>

Initialization is performed according to the following routine.

(Step 1) Based on a command from the management host 1200, the AOU management program 31020 to be executed by one of the virtual storage apparatuses 1000L and 1000R creates a pool. Here, this command contains a segment size. Further, during the process of creating the pool, the AOU management program 31020 creates an entry of the AOU pool management information 31040 containing the pool ID.

(Step 2) Based on processing similar to Step 1, the other virtual storage apparatus 1000R or 1000L also creates a pool.

(Step 3) The management host 1200 issues to both virtual storage apparatuses 1000L and 1000R commands for configuring the pairs created at Step 1 and Step 2 as a pool pair. This command contains a set of the ID of the pools to become a pool pair and the Identifier of the virtual storage apparatuses 1000L and 1000R to provide the pools. The AOU management program 31020 that received the command communicates with the AOU management program 31020 of the virtual storage apparatuses 1000L, 1000R of the opponent to become the pool pair, and configures these pools as a pool pair if it is confirmed that the segment size set to both pools is equal and that both pools have not yet been set as a pool pair. Incidentally, the AOU management program 31020 registers the identifier of opponent's pool ID in the AOU pool management information 31040 upon setting the foregoing pairs as a pool pair.

(Step 4) The management host 1200 issues a pool volume creation command to one of the virtual storages 1000L and 1000R. Incidentally, this command contains the identifier of the volume defined in the virtual storage apparatuses 1000L and 1000R. The AOU management program 31020 of the virtual storage apparatus 1000L, 1000R that received the command changes the attribute of the designated volume to a pool volume, and adds the identifier of the designated volume to the pool volume list of the AOU pool management information 31040.

(Step 5) The management host 1200 issues the same command as at Step 3 to the other virtual storage apparatus 1000R, 1000L. The other virtual storage apparatus 1000R, 1000L that received the command performs the same processing as at Step 3.

Incidentally, when the administrator determines that the internal volume of the virtual storage apparatus 1000 will not be used in the AOU, Step 4 and Step 5 may be omitted.

(Step 6) The management host 1200 issues to one of the virtual storage apparatuses 1000L, 1000R a command for configuring the volume of the storage apparatus 1500L as a pool volume. Incidentally, to facilitate understanding, in the ensuing explanation, let it be assumed that the command destination is the virtual storage apparatus 1000L, and the virtual storage apparatus 1000 forming a pair with the command destination is the virtual storage apparatus 1000R. Nevertheless, this may also be of the opposite relationship. Here, the command includes information for identifying the storage apparatus 1500L and the volume, and information showing that the volume the opponent's virtual storage apparatus 1000R in which the volumes are forming a pool pair will take over. The AOU management program 31020 of the virtual storage apparatus 1000L that received the command will perform the following coordination with the pair virtual storage apparatus 1000R.

(A) By issuing a read request (or a write request) to the volume of the storage apparatus 1500L contained in the command, the virtual storage apparatus 1000L that received the command confirms that both the storage apparatus 1500L and the volume exist, and whether such volume is accessible. If the storage apparatus 1500L or the volume does not exist, or if it is not possible to access the volume, the virtual storage apparatus 1000L returns an error to the management host 1200, and proceeds to the subsequent step if the volume is accessible. Incidentally, the error includes information showing that the storage apparatus 1500L was inaccessible, and this information may be displayed on the management host 1200.

(B) The virtual storage apparatus 1000L that received the command transfers the pool volume creation command to the paired virtual storage apparatus 1000R. Incidentally, this command contains information for identifying the target volume contained in the command from the management host 1200, and information showing that the volume is being managed by both pools belonging to the pool pair. Incidentally, the transfer destination of the pool volume creation command can be specified by referring to the "identifying information of pool pair" in the AOU pool management information 31040.

(C) When the virtual storage apparatus 1000R receives the command of (B), it confirms that the volume in the storage apparatus 1500L is accessible by performing the same processing as (A). If the volume is accessible, the virtual storage apparatus 1000R adds the volume to the pool volume list of the AOU pool management information 31040 together with the information showing that the volume is being commonly managed, and returns the result to the virtual storage apparatus 1000L that received the foregoing command. Meanwhile, if the volume was inaccessible as a result of the foregoing confirmation, the virtual storage apparatus 1000R adds information showing that the virtual storage apparatus 1000R could not access the storage apparatus 1500L and returns a result signifying the unsuccessful access.

(D) If the result of access to the volume was unsuccessful, the virtual storage apparatus 1000L that received the command that received the foregoing result transfers the reason as well as the result to the management host 1200, and ends the sequential processing. Meanwhile, if the result of access to the volume was successful, the virtual storage apparatus 1000L adds this result to the pool volume list of the AOU pool management information 31040 together with the information showing that the volume is a volume to be commonly managed, transfers a result signifying the successful access to the management host 1200, and thereby ends this processing.

Incidentally, when adding the volume to the pool volume list at (C) and (D), the AOU management program 21020 updates the unused capacity stored in the corresponding "unused capacity" column to a value obtained by adding the capacity of the added volume, and adds the area of this volume to the empty area list. Further, the processing at Step 5 may also issue commands separately from the management host 1200 to the virtual storage apparatuses 1000L and 1000R.

(Step 7) The management host 1200 transfers a command for configuring the value of a capacity warning to both virtual storage apparatuses 1000L, 1000R, and the virtual storage apparatuses 1000L, 1000R that received the command respectively set the value contained in the command in the AOU pool management information 31040.

<3.2. Creation of AOU Volume>

Creation of the AOU volumes 29010L, 29010R is conducted by issuing commands to the respective virtual storage apparatuses 1000L, 1000R. The routine is described below.

(Step 1) The management host 1200 transfers the AOU volume creation command accompanying the volume capacity and the pool ID to the respective virtual storage apparatuses 1000L, 1000R.

(Step 2) The virtual storage apparatus 1000L that received the command creates AOU address mapping information 31030L concerning a new AOU volume 29010L. Here, for all segments, "NO" is set in the corresponding "COW flag" and the "takeover area", and "NULL" is set to the "pool volume area identifier." The virtual storage apparatus 1000L thereafter returns a creation complete reply.

(Step 3) Similarly, the virtual storage apparatus 1000R that received the command creates AOU address mapping information 31030R concerning a new AOU volume 29010R. Details concerning the creation are the same as Step 2.

Incidentally, the AOU volumes 29010L, 29010R may be created by issuing a command to one of the virtual storage apparatuses 1000L, 1000R from the management host 1200, and the virtual storage apparatus 1000L, 1000R that received the command re-issuing the command to the paired virtual storage apparatus 1000R, 1000L. Incidentally, the port name and the LUN under the control of the port name, designated by the administrator, may be allocated to the AOU volumes 29010L, 29010R by including the port name and LUN in the volume creation command. Further, the port name and the LUN may be allocated after the creation command of the AOU volumes 29010L, 29010R.

<3.3. Association of AOU Volumes>

The AOU volumes 29010L and 29010R, each created in the respective virtual storage apparatuses 1000L, 1000R, are associated to each other. Thus, the management host 1200 transfers an association command containing the identifier of the two AOU volumes 29010L and 29010R to the virtual storage apparatus 1000L or 1000R. The virtual storage apparatus 1000L or 1000R that received the command register the AOU volumes 29010L and 29010R forming a pair in the corresponding "AOU volume identifier" column of the AOU address mapping information 31030. This command is given to the respective virtual storage apparatuses 1000L and 1000R in order to associate the AOU volumes 29010L and 29010R, as described in the other embodiments, this may also be realized by one of the virtual storage apparatus 1000L or 1000R transferring the command to the other virtual storage apparatus 1000R or 1000L.

Incidentally, upon sending the foregoing association command, by confirming the existence of the AOU volume 29010L and 29010R contained in the command, and that one of the AOU volumes 29010L and 29010R is created from one of the pools of the pool pair and the other AOU volume 29010R or 29010L is created from the other pool of the pool pair, implementation of the pool management can be simplified. Further, this association can be conducted pursuant to the creation of the AOU volumes 29010L, 29010R and setting of the synchronous remote copy.

<3.4. Setting of Synchronous Remote Copy>

In the synchronous remote copy expressed above, although it was necessary to copy all areas of the volume in the Initial-Copying status, in this embodiment, formation copy is performed according to the following routine. Further, in order to facilitate the understanding, in the ensuing explanation, let it be assumed that the primary virtual storage apparatus 1000 is the virtual storage apparatus 1000L, and the secondary virtual storage apparatus 1000 is the virtual storage apparatus 1000R.

(Step 1) The virtual storage apparatus 1000L to become the copy source (in other words, primary system for the volume) assigns the top segment of the AOU volume 29010L to the variable i.

(Step 2) The virtual storage apparatus 1000L of the copy source confirms the "takeover area" and "pool volume area identifier" of the segment i in the AOU address mapping information 31030, and performs the following processing.

(A) If the "takeover area" is "NO," data of the segment i is copied according to the normal creation copy. This is because of the area of the pool volume in the virtual storage apparatus 1000L, copy must be performed to secure the redundancy.

(B) When the "takeover area" is "YES," dirty data in the cache memory not shown in the virtual storage apparatus 1000L related to the segment i is destaged, or copied to the cache area of the virtual storage apparatus 1000R of the copy destination (in other words, the secondary system for the volume) in the creation copy. This is because, excluding the data in the cache memory, data is outside the primary virtual storage apparatus 1000L, or, by moving the data in the cache memory outside the virtual storage 1000L, no data will be lost even if the function of the primary virtual storage apparatus 1000L is stopped.

(C) When the "pool volume area identifier" is "NULL," copy is not performed to the segment i since areas are not allocated to either the primary or secondary system.

(Step 3) When the segment i is the last segment, the virtual storage apparatus 1000L of the copy source ends the creation copy and changes the pair status to a Duplex status, and, when it is not the last segment, it sets the subsequent segment to the variable i and returns to Step 1.

Incidentally, the foregoing processing may be used in the resynchronization processing between the virtual storage apparatuses 1000L, 1000R, or may be used in the processing after the function of one of the virtual storage apparatuses 1000L, 1000R is stopped and recovered.

4. I/O Request Processing

The I/O request processing of this embodiment is explained below.

<4.1. Write Request Processing>

Figure 32:
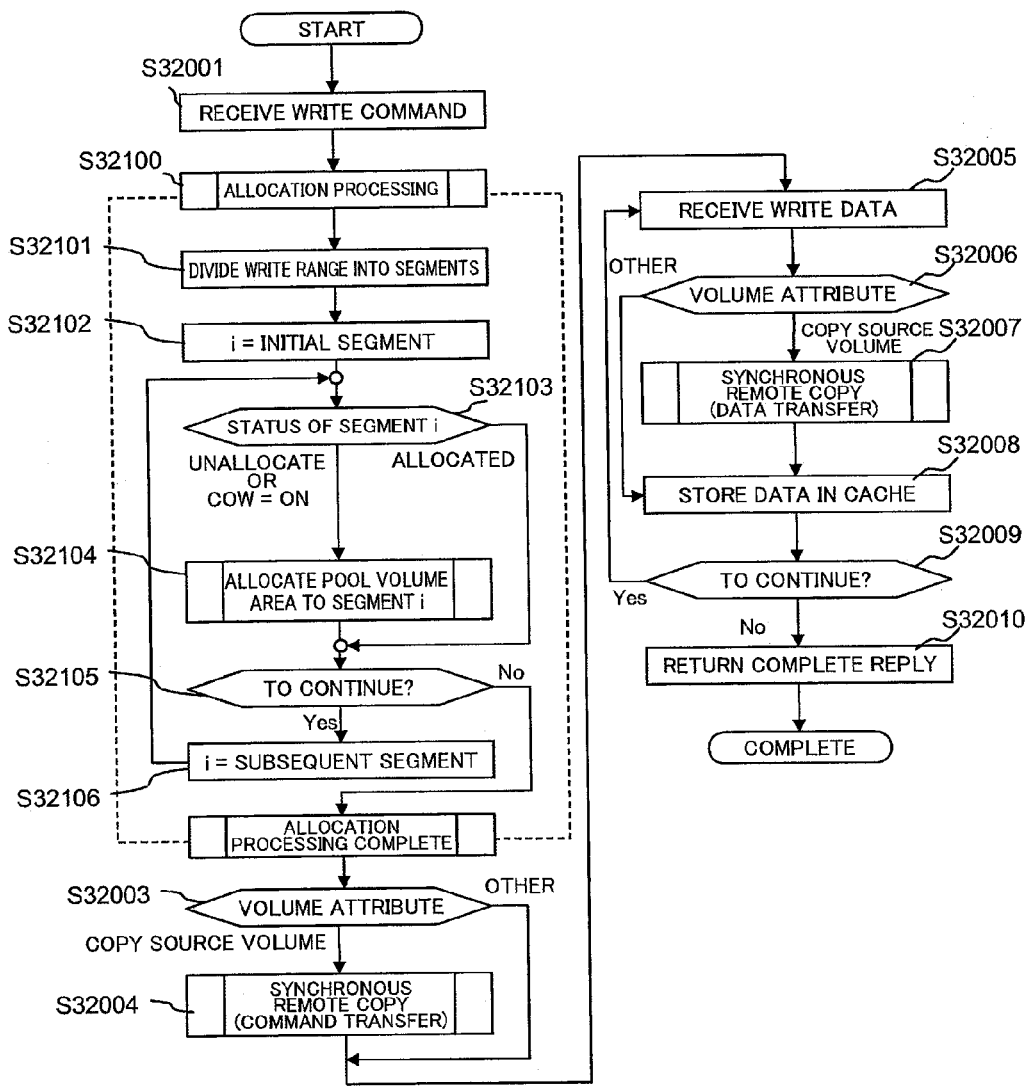
FIG. 32 is a flowchart showing a different flow when the virtual storage apparatus performs write processing.

FIG. 32 is a flowchart showing the processing contents to be executed by the AOU I/O processing program 31010 upon receiving a write request. Incidentally, in the foregoing explanation, although an explanation was not provided using separate flowcharts regarding the command and write data configuring the write request, since there are cases in this processing were certain areas of the write request target are allocated while the other areas are unallocated, the processing is explained in detail with reference to the flowchart.

(S32001) The AOU I/O processing program 31010 receives a write command constituting the write request. This write command contains the address (location) and the data length.

(S32100) The AOU I/O processing program 31010 executes allocation processing based on the received write command. By executing this processing, the AOU I/O processing program 31010 checks whether an area of the pool volume is allocated for each segment, and allocates an area of the pool volume to segments to which an area of the pool volume is unallocated, or segments allocated with an area shared with other segments in which the "COW flag" is "ON" (segments that need to be written during writing other than the shared area). Further, the AOU I/O processing program 31010 reflects the allocation results of the pool volume area in the AOU address mapping information 31030.

(S32003) The AOU I/O processing program 31010 confirms the attribute of the AOU volume 29010R, 29010L, and executes S32004 if the AOU volume 29010R, 29010L is a copy source volume, or otherwise executes S32005.

(S32004) The AOU I/O processing program 31010 calls the remote copy program 6010 and thereby transfers the command of the synchronous remote copy to the virtual storage apparatus (secondary virtual storage apparatus) 1000R having the copy destination volume.

(S32005) The AOU I/O processing program 31010 receives the write data (whole or a part) constituting the write request corresponding to S32001.

(S32006) The AOU I/O processing program 31010 confirms the attribute of the AOU volume 29010R, 29010L, and executes S32007 if the AOU volume 29010R, 29010L is a copy source volume, and otherwise executes S32008.

(S32007) The AOU I/O processing program 31010 calls the remote copy program 6010 and thereby transfers the write data to the virtual storage apparatus (secondary virtual storage apparatus) 1000R having the copy destination volume.

(S32008) The AOU I/O processing program 31010 seeks the area of the pool volume actually storing the write data from the address in the AOU volumes 29010R, 29010L based on the AOU address mapping information 31030, and stores and manages the write data related to the sought area in the cache memory.

(S32009) The AOU I/O processing program 31010 determines whether there is a continuation of the write data reception, and re-executes S32005 when there is a continuation.

(S32010) The AOU I/O processing program 31010 transfers the write completion reply to the primary virtual storage apparatus 1000L or the host 1100, and ends this write request processing.

Incidentally, the secondary virtual storage apparatus 1000R handles the reception of the command of the synchronous remote copy as with the reception of the write command from the host 1100. Similarly, the virtual storage apparatus 1000R handles the reception of data based on the data transfer of the synchronous remote copy as with the reception of write data from the host 1100. This concludes the explanation on the write request processing in the secondary virtual storage apparatus 1000R.

<4.1.1. Allocation Processing>

The allocation processing illustrated in FIG. 32 is now explained.

(S32101) The AOU I/O processing program 31010 divides the write range (in other words, write address and data length) designated in the write command into segments.

(S32102) The AOU I/O processing program 31010 assigns the first segment among the plurality of segments, created by the divisioning, to the variable i.

(S32103) The AOU I/O processing program 31010 determines the allocation status of the segment i and whether COW (Copy On Write) is necessary. Incidentally, the AOU address mapping information 31030 is used in this determination. As a result of the foregoing determination, the AOU I/O processing program 31010 executes S32105 if the allocation of the pool volume area is not required, and executes S32104 if the pool volume area is unallocated or, if the COW flag is ON even if it is allocated (for instance, when the segment and area of other AOU volumes 29010R, 29010L are being shared).

(S32104) The AOU I/O processing program 31010 searches for an unused area from the pool volume areas to allocate such unused area to the segment i, and then registers the searched area in the "pool volume area identifier" of the AOU address mapping information 31030. Incidentally, if an unused area cannot be found, the AOU I/O processing program 31010 transfers a reply indicating that the write command was unsuccessful, and thereby ends this allocation processing.

Incidentally, upon transferring the failure reply, some kind of error message can be returned together with the failure reply, and information indicating that the cause of the failure reply is the insufficient pool capacity. Further, if allocating the area in a case where the "COW flag" is ON, the AOU I/O processing program 31010 may copy data from the old area (shared area) to the allocated area upon allocating such area. Nevertheless, when the overall segment i is a write target, this data copy can be omitted. Further, pursuant to this area allocation, the AOU I/O processing program 31010 may edit the empty area list of the AOU pool management information, and delete the unused capacity.

Further, the AOU I/O processing program 31010 transfers the area in the allocated pool volume and information of the segment of the AOU volume 29010L allocated with the area to the secondary virtual storage apparatus 1000R. Incidentally, the allocated information can also be transferred together with the synchronous remote copy command.

(S32105) The AOU I/O processing program 31010 confirms the existence of a subsequent segment, executes S32106 if such subsequent segment exists, or ends this processing if it does not exist and then returns to the write request processing.

(S32106) The AOU I/O processing program 31010 assigns the subsequent segment to the variable i.

With the foregoing processing, the virtual storage apparatus 1000L confirms the allocation status for each segment, and allocates the pool volume area to the segment if necessary.

<4.1.2. Allocation Method of Secondary Pool Volume Area>

The pool volume area allocation step (S32104) of the secondary virtual storage apparatus 1000R allocates an area to the segment according to the following method based on the allocation information received from the primary virtual storage apparatus 1000L.

(A) If the primary virtual storage apparatus 1000L allocated an area from the pool volume of the shared storage apparatus (in other words, the storage apparatus 1500L), the secondary virtual storage apparatus 1000R sets "YES" in the "takeover area" of the corresponding segment in the AOU address mapping information 31030, and sets the "pool volume area identifier" in the received area identifier. Thereby, allocation of the pool volume area concerning the shared storage apparatus 1500L will be handled the same in both the primary and secondary systems.

(B) If the primary virtual storage apparatus 1000L allocated an area from the volume in the virtual storage apparatus 1000R, the secondary virtual storage apparatus 1000R searches for an empty area of the internal volume to be allocated to the corresponding segment. As a result, the secondary virtual storage apparatus 1000R sets "NO" in the "takeover area" of the segment in the AOU address mapping information 31030, and sets an area of the internal volume in the "pool volume area identifier." Thereby, the segment allocated with the area of the internal volume of the by the primary virtual storage apparatus 1000L can also be allocated with the internal volume in the secondary virtual storage apparatus 1000R.

<4.2. Read Request Processing>

Figure 33:
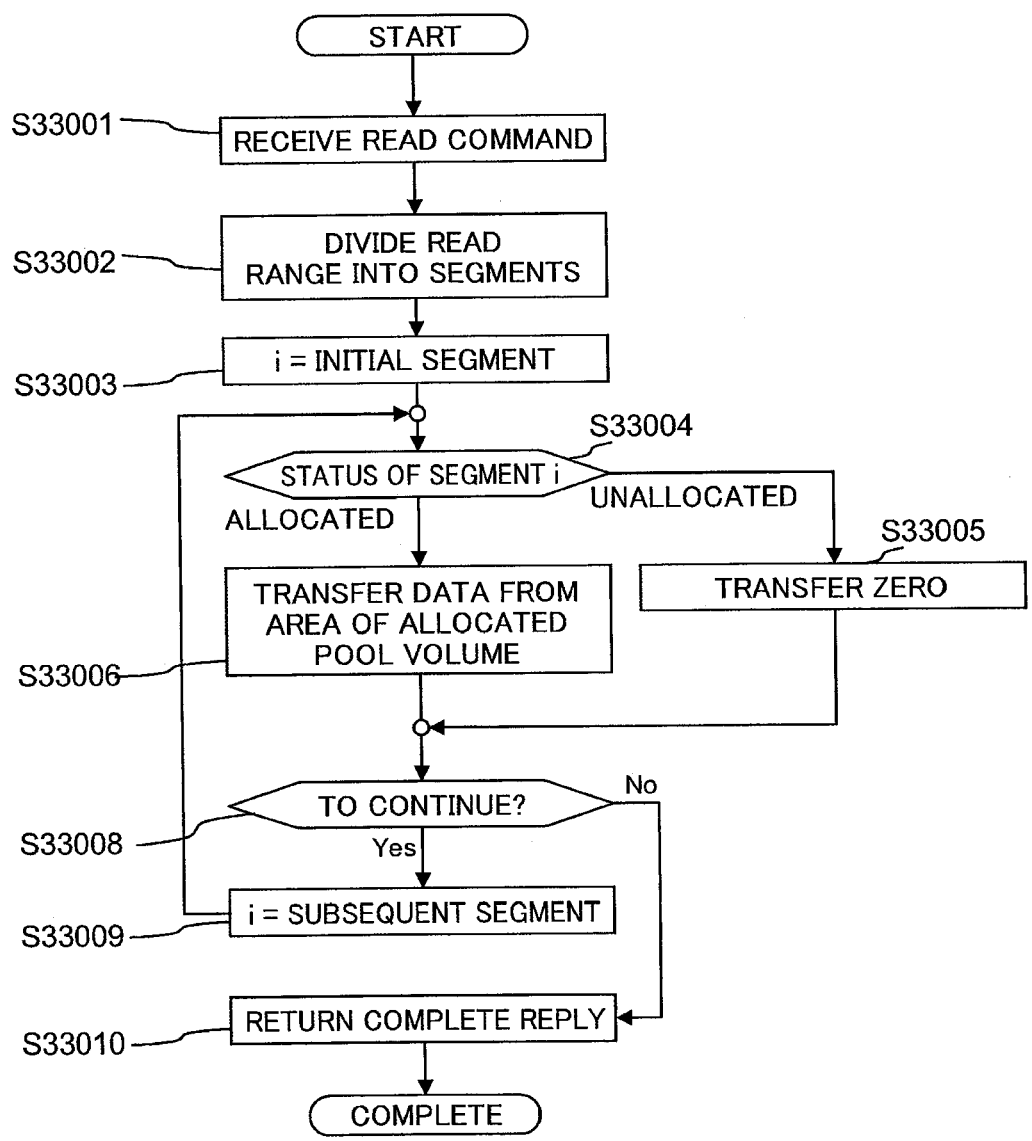
FIG. 33 is a flowchart showing a different flow when the virtual storage apparatus performs read processing.

FIG. 33 is a flowchart showing the processing contents to be executed by the AOU I/O processing program 31010 upon receiving a read request. The processing contents are now explained with reference to the flowchart.

(S33001) The AOU I/O processing program 31010 receives a read command constituting the read request. This received read command contains the address (location) and the data length.

(S33002) The AOU I/O processing program 31010 divides the read range (in other words, write address and data length) designated in the read command into segments.

(S33003) The AOU I/O processing program 31010 assigns the first segment among the plurality of segments, created by the divisioning, to the variable i.

(S33004) The AOU I/O processing program 31010 determines whether a pool volume area is allocated to the segment i. Incidentally, the AOU address mapping information 31030 is used in this determination. As a result of the foregoing determination, the AOU I/O processing program 31010 executes S33006 if the pool volume area is allocated, or executes S33005 if the pool volume area is unallocated.

(S33005) The AOU I/O processing program 31010 allocates a cache area for the segment in the cache memory of the virtual storage apparatus 1000L, 1000R, initializes the allocated cache area with zero, and transfers the zero data to the host 1100.

(S33006) The AOU I/O processing program 31010 transfers the data stored in the allocated pool volume area. Incidentally, if the pool volume area already exists in the cache area (staged), it transfers the data from the cache area, or performs staging and thereafter transfers such data if it does not exist in the cache area.

(S33008) The AOU I/O processing program 31010 determines whether there is a subsequent segment, executes S33009 if such a subsequent segment exists, or executes S33010 if it does not exist.

(S33009) The AOU I/O processing program 31010 sets the subsequent segment to the variable i, and executes S33004 once again.

(S33010) The AOU I/O processing program 31010 transfers the read completion reply to the host 1100, and thereby ends this processing.

Incidentally, in order to simplify the processing, the virtual storage apparatus 1000L may store a predetermined value (zero) in a certain area of the pool volume, and transfer the data stored in the area to the unallocated area of the AOU volumes 29010R, 29010L through reading.

<4.3. AOU Destaging Processing>

Figure 34:
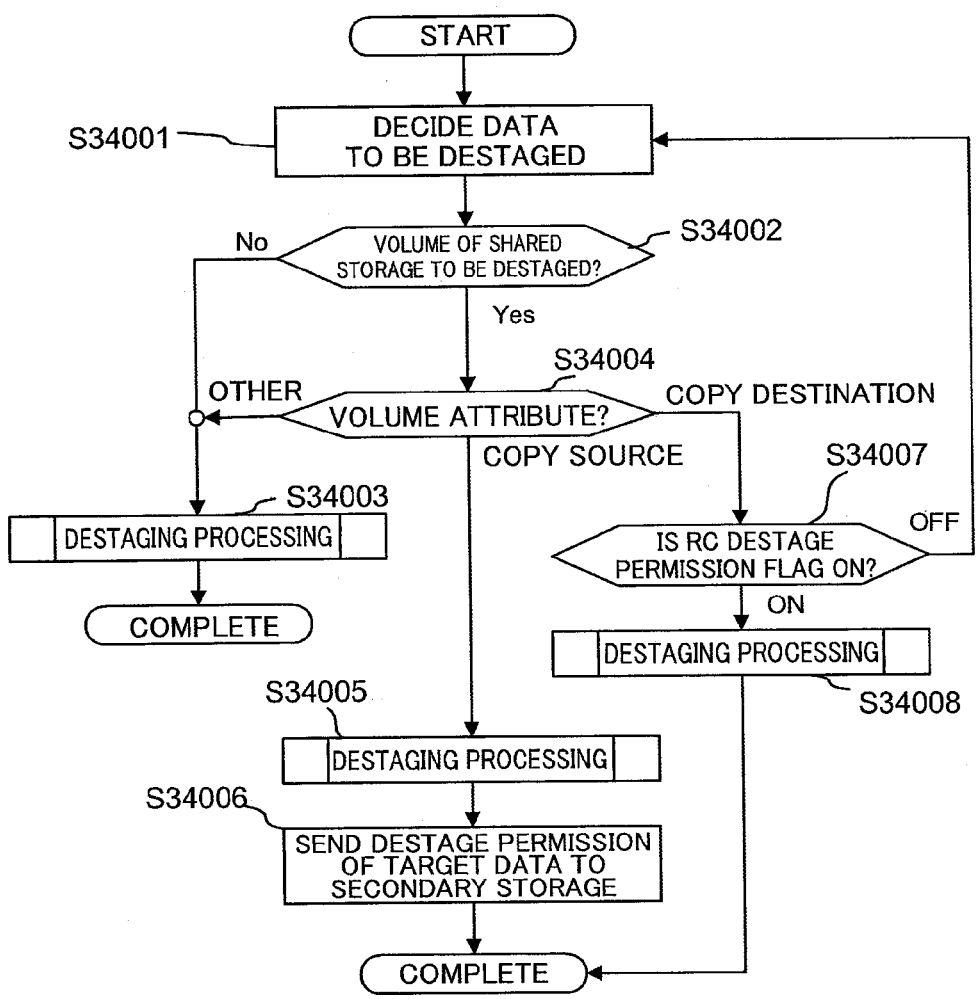
FIG. 34 is a flowchart showing the flow of staging processing for AOU.

FIG. 34 is a flowchart showing the processing contents of destaging processing to be executed by the AOU I/O processing program 31010. The destaging processing is now explained with reference to the flowchart.

(S34001) The AOU I/O processing program 31010 decides the data in the cache memory to be destaged based on the cache algorithm. Incidentally, the cache algorithm generally uses LRU (Less Recently Used) algorithm to decide the target dirty data, but other algorithms may also be used.

(S34002) The AOU I/O processing program 31010 determines whether the destaging target data corresponds to the volume of the shared storage apparatus (in other words, the storage apparatus 1500L), executes S34003 if they correspond, or executes S34004 if they do not correspond.

(S34003) The AOU I/O processing program 31010 executes destaging processing, and thereafter ends the sequential processing. Incidentally, destaging processing is performed as with the other embodiments.

(S34004) The AOU I/O processing program 31010 determines the volume attribute of the volume storing the destaging target data, executes S34005 if the volume is a copy source volume, executes S34007 if the volume is a copy destination volume, or otherwise executes S34003.

(S34005) The AOU I/O processing program 31010 executes destaging processing.

(S34006) The AOU I/O processing program 31010 transfers the RC destage permission command of the destaged data to the secondary virtual storage apparatus 1000R, and thereby ends this processing.

(S34007) The AOU I/O processing program 31010 confirms whether the RC destage permission flag is ON, re-executes S34001 to re-select separate destaging target data if it is OFF. Incidentally, the RC destage permission flag is set to OFF at the time the write data is stored or updated in the cache memory based on synchronous remote copy, and is set to ON upon receiving the command sent at S34006.

(S34008) The AOU I/O processing program 31010 executes destaging processing, and thereby ends this processing.

The following cache control is realized with this algorithm.

(A) Cache data that is not for the shared storage apparatus, i.e., in which destaging does not have to be coordinated in the primary and secondary virtual storage apparatuses 1000L, 1000R is destaged independently in both systems.

(B) Cache data of the secondary virtual storage apparatus 1000R is destaged based on a message sent after the destaging processing in the primary virtual storage apparatus 1000.

Incidentally, the staging processing is performed as in the first to fourteenth embodiments. Furthermore, Instead of the destaging at S34008, the AOU I/O processing program 31010 may discard the cache data without destaging.

<4.3.1. RC Destage Permission Command>

For the transfer of the RC destage permission command, the command may be sent asynchronously. Nevertheless, the primary and secondary virtual storage apparatuses 1000L, 1000R may invalidate the command unreflected in the RC destage flag by being triggered with remote copy.

<4.4. Monitoring of Empty Area of Pool>

The AOU management program 31020 periodically monitors the empty area of the respective pools, and sends a message to the management host 1200 if the value falls below the threshold value set by the user. Thereby, it is possible to avoid the failure of a write request from the host 1100 caused by insufficient capacity. Further, the AOU management program 31020 may manage the monitoring of the empty area of the shared storage apparatus 1500L and the unshared storage apparatus respectively, or change a the message to be transferred during such insufficient capacity respectively.

5. Switching when Failure in Primary Virtual Storage Apparatus

When the function of the primary virtual storage apparatus 1000L is stopped due to a failure or the like, the host 1100 is able to ongoingly operate the application by performing the processing as in the other embodiments.

Meanwhile, the host 1100 may also switch the I/O request destination to the secondary virtual storage apparatus 1000R if the write request to the copy source volume is unsuccessful due to insufficient capacity. This is because if the pool capacity of the secondary virtual storage apparatus 1000R is larger than the primary system, this switch will allow the ongoing processing of the application 2010 (FIG. 30) in which an I/O request is issued in the host 1100.

Incidentally, in the foregoing case, the direction of remote copy will be inverted as a result of switching the request destination, but the remote copy will be stopped. This is because, since the request was unsuccessful in the old primary virtual storage apparatus 1000L due to insufficient pool capacity during the write request, the attempt of writing write data into the new primary (old secondary) virtual storage apparatus 1000R based on synchronous remote copy will end in a failure.

Nevertheless, since a request (particularly read) to the old primary virtual storage apparatus 1000L can be continued, it is not possible to distinguish this failure from the communication path failure between the virtual storage apparatuses 1000L, 1000R, and the host 1100 may read old data of the old primary virtual storage 1000L.

In order to avoid this kind of situation, if the cause of the remote copy failure is insufficient pool capacity, the issuance of a read request from the host 1100 to the old primary virtual storage apparatus 1000L may be inhibited. Or, while it is not possible to limit the cause of the remote copy failure, it is also possible to inhibit the reading from the host 1100 to the secondary virtual storage apparatus 1000R or 1000L, and cancel such inhibition when it is discovered that the cause is a communication path failure.

Based on the foregoing processing, the storage system of this embodiment is able to provide a storage service having an AOU function with high service continuity. Further, the AOU function needs to refer to and change the AOU address mapping information 31030L, 31030R for each I/O request, and the controller load will be higher than a normal storage I/O. Therefore, regarding a part (or half) of the volumes required by the host 1100, one of the virtual storage apparatuses 1000L and 1000R may handle the reading and writing as a primary system, and, regarding the remaining volumes, the other virtual storage apparatus 1000R or 1000L may handle the reading and writing as a primary system. As a result of adopting this kind of constitution, the controller load of the AOU function can be equalized between the virtual storage apparatuses 1000L and 1000R while maintaining the availability of the storage system.

6. Allocation of Pool Volume Area and Data Migration

As described above, in this embodiment, the volume in the virtual storage apparatuses 1000L, 1000R and the volume of the storage apparatus 1500L can both be used as pool volumes. Thus, by allocating the volume in the virtual storage apparatuses 1000L, 1000R to the segment of high access frequency data that is already stored or will be stored, in addition to seeking improvement of the access performance, it is possible to avoid the bottleneck of the communication network between the virtual storage apparatuses 1000L, 1000R and the storage apparatus 1500L.

Nevertheless, since the pool volume area is allocated to the segment based on the first write request in AOU, it would be difficult to perform allocation with the virtual storage apparatuses 1000L, 1000R alone while giving consideration to the access frequency. The following methods can be considered to overcome the foregoing problem.

<6.1. Method of Adding Attribute to AOU Volume>

Consider to giving an attribute concerning the access frequency at the time of creating the AOU volumes 29010L and 29010R and then the AOU I/O processing program 31010 is to allocate a pool volume area to the segment. If the access frequency of such data to be written into the segment is known to a certain degree, the access frequency attribute is referred to, and the volume in the virtual storage apparatuses 1000L, 1000R is allocated to the segment of the high access frequency data, and an area of the volume in the storage apparatus 1500L is allocated to the segment of low access frequency data (backup data, for instance).

<6.2. Data Migration of Pool Volume Area>

The access frequency to the AOU volumes 29010L, 29010R is measured in segment units (or units of a plurality of segments), and data of a segment of high access frequency is migrated to the pool volume area in the virtual storage apparatuses 1000L, 1000R. Here, pursuant to the migration of data, it is necessary to change the correspondence of the AOU volume 29010L, 29010R's segment, that is the target of the migration, from a segment in the volume of the storage apparatus 1500L to a segment of the migration destination in the virtual storage apparatuses 1000L, 1000R. But in the AOU function, since address mapping has already been performed in the virtual storage apparatuses 1000L, 1000R, it is possible to migrate data transparently to the host 1100 by using it without additional mapping scheme.

Incidentally, if performing data migration as in this embodiment, it is desirable that the data of the target segment is in the pool volume of both the primary and secondary virtual storage apparatuses 1000L, 1000R. Nevertheless, if there are other effects (as listed below), data migration may also be performed into a state where only a segment of one side is allocated with the pool volume area in the virtual storage apparatuses 1000L, 1000R.

(Example 1) If one of the virtual storage apparatuses 1000L, 1000R first exhausted the internal pool volume, and only the shared storage apparatus 1500L remains.

(Example 2) If the load of the read request to the AOU volume 29010L of the copy source is large, and the network performance between the primary virtual storage apparatus 1000L and the storage apparatus 1500L is suppressed by it.

In the foregoing case, the primary virtual storage apparatus 1000L copies segment data from the pool volume area in the storage apparatus 1500L to the area of its own pool volume, and provides the AOU volume 29010L by using the area of the copy destination. The secondary virtual storage apparatuses 1000R may also provide the AOU volume 29010R using the pool volume area of the storage apparatus 1500L of the copy source. Here, the secondary virtual storage apparatus 1000R may reflect the write data to the pool volume area of the storage apparatus 1500L.

Further, as an intermediate status of segment data migration for improving the access performance including reading and writing, a configuration may also be adopted where only the primary virtual storage apparatus 1000L uses the internal pool volume area, and the secondary virtual storage apparatus 1000R uses the pool volume of the storage apparatus 1500L.

7. Variation of Present Embodiment

<7.1. Implementation of Address Mapping During Staging and Destaging Processing>

In this embodiment described above, address mapping is performed with the read request processing and the write request processing. While this method is able to return a failure reply triggered by the insufficient capacity of the pool volume at the time of receiving the write request, since address mapping is performed for each request, there is a problem from the perspective of performance. As a method of overcoming this problem, a method of performing address mapping with staging or destaging processing can be considered. However, in this method, since the pool volume area is allocated to the segment at the time of destaging, data loss similar to a case of the volume being blocked due to the double block of the HDD 1030 or the like will occur. Thus, in the latter method, processing of delaying or stopping the request processing may be performed from the time that the unused capacity starts falling low.

Incidentally, the specific processing can be realized by changing the processing contents explained in FIG. 32 and FIG. 33 as described below.

(Writing and Destaging) Allocation processing at S32100 of FIG. 32 is moved after the destaging processing at S34001.

(Reading and Staging) Determination of allocation and transfer of zero data in the case of unallocation pursuant to the address mapping performed at S33004 to S33006 of FIG. 33 are performed at staging.

Further, in order to combine both advantages, the AOU I/O processing program 31010 may perform mapping in the staging/destaging processing if the unused capacity of the pool volume is greater than the threshold value, or perform mapping in the I/O request processing if the unused capacity falls below the threshold value.

7.2. <De-Duplication>

The AOU management program 31010 may also perform the following processing referred to as De-duplication independent from the I/O request.

(Step 1) The AOU management program 31010 scans the data of the respective pool volume areas and searches for redundant segments.

(Step 2) When the AOU management program 31010 detects redundant data stored in the pool volume areas, it leaves one of the areas, and releases the other remaining areas as empty areas. Then, the "pool volume area identifier" of the segment corresponding to the area released in the AOU address mapping information 31030 is updated to the one remaining area, and the "COW flag" is set to "ON."

Here, as the method of detecting redundancy, a two-step method of calculating the hash value of each pool volume, thereafter sequentially comparing such hash value with the hash value of the other areas, and comparing the actual data if the hash values are the same may be adopted. Further, since the calculation of the hash value and the comparison of data are high-load processing, the load can be balanced by performing processing in the secondary virtual storage apparatus 1000R.

(17) Seventeenth Embodiment

1. Configuration of Information System

Figure 37:
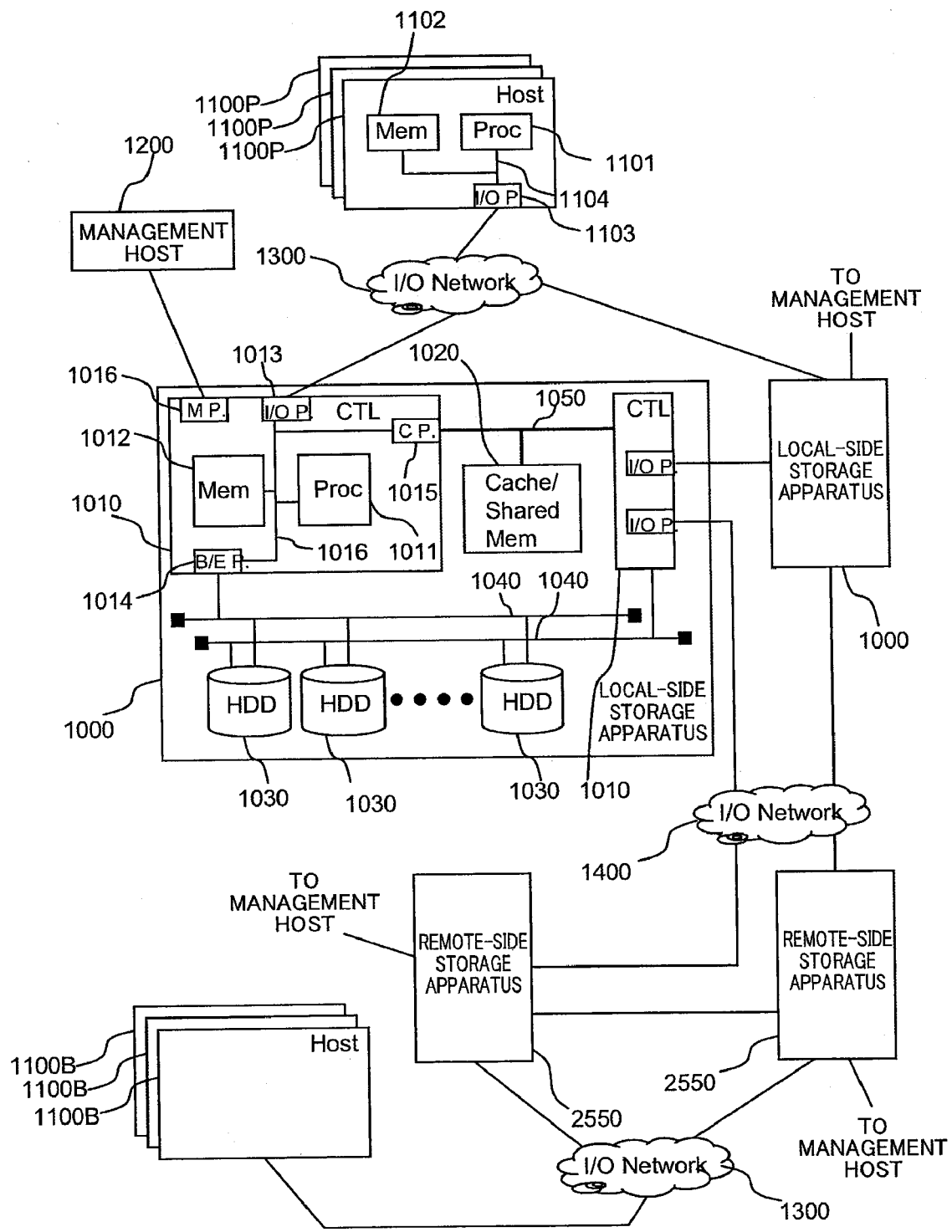
FIG. 37 is a block diagram showing an example of the hardware constitution of the information system according to a seventeenth embodiment.

FIG. 37, in which the same reference numeral is given to the components corresponding to those illustrated in FIG. 1, shows an example of the hardware constitution of the information system according to an embodiment of the present invention.

This embodiment differs from the first embodiment in that the remote-side storage apparatuses 2550 and the local-side storage apparatuses 1000 are connected via an I/O network 1400, and the two remote-side storage apparatuses 2550 are coupled together. Although the I/O network 1400 may be equivalent to the I/O network 1300, generally, a communications means that has a slower communication speed than the I/O network 1300 and is communicable even at a remote location is used. Further, this embodiment also differs from the first embodiment in that the host 1100B is also coupled to the side of the remote-side storage apparatus 2550. Generally, the host 1100B exists at a remote site, and is used upon recovering the system at the remote site 38000B (FIG. 38) when the overall host 1100P or local-side storage apparatus 1000 at the local site 38000P (FIG. 38) becomes unavailable.

2. Overview of Present Embodiment

Figure 38:
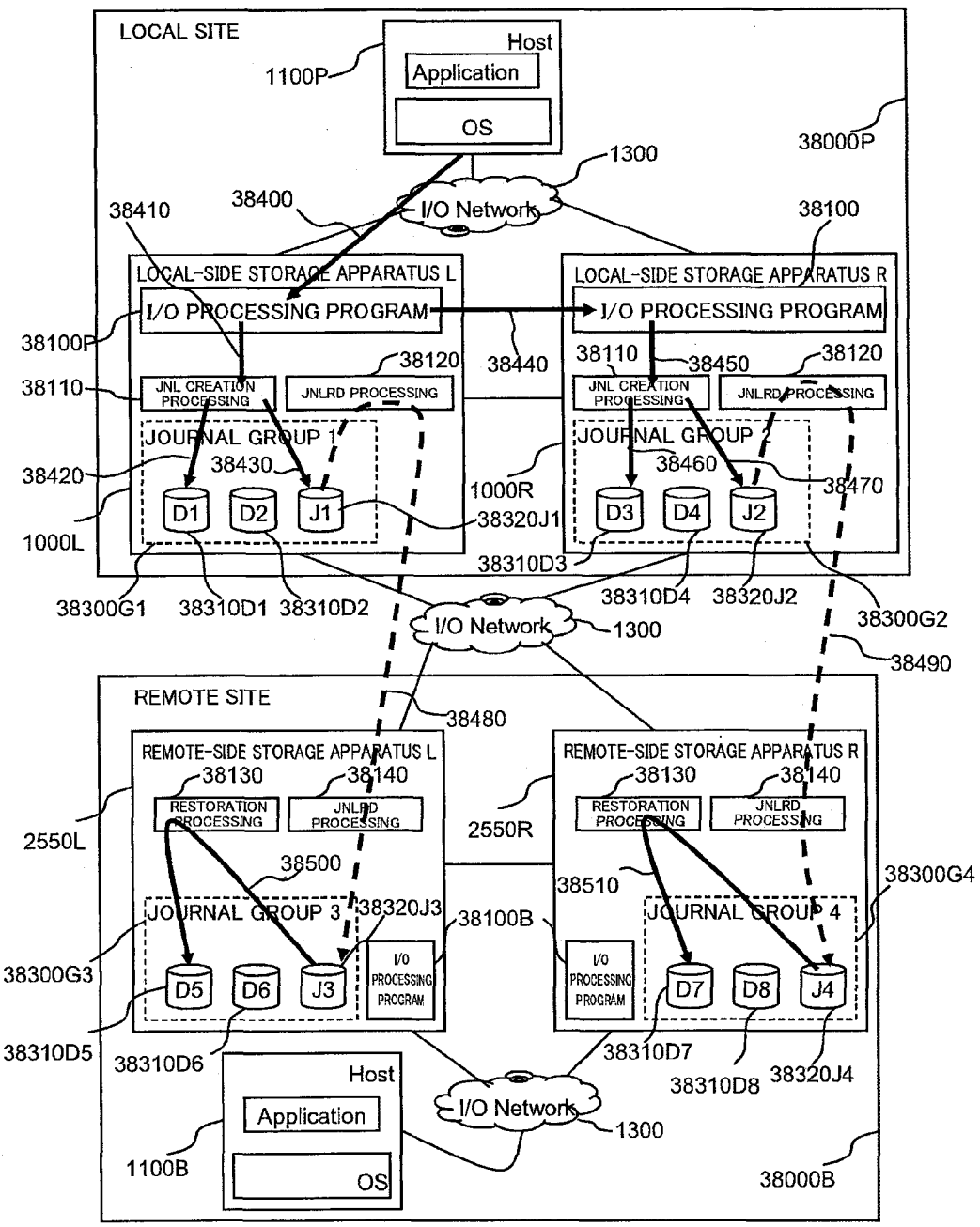
FIG. 38 is a first conceptual diagram showing an overview of the seventeenth embodiment.

In this embodiment, in order to further improve the availability of the storage system, two remote-side storage apparatuses 2550 are installed at the remote site 38000B located at a site that is remote from the local site 38000P constituted of two local-side storage apparatuses 1000. FIG. 38 shows an overview thereof. Incidentally, in the following explanation, the term "local" will be added as a prefix to the storage apparatus 1000 (or 2550) or the host 1100, or the programs or components included in the storage apparatus 1000 or the host 1100 to specify that they exist at the local site 38000P (FIG. 38), and the term "remote" will be added as a prefix to specify that they exist at the remote site (FIG. 38, 38000B).

In this overview, the storage system includes the local-side storage apparatus 1000L, the local-side storage apparatus 1000R, the remote-side storage apparatus 2550L, and the remote-side storage apparatus 2550R. The local-side storage apparatuses 1000L, 1000R and the remote-side storage apparatuses 2550L, 2550R include journal groups 38300G1 to 38300G4, and one or more data volumes 38310D1 to 38310D8 and one or more journal volumes 38320J1 to 38320J4 are defined in these journal groups 38300G1 to 38300G4. Incidentally, the journal volumes 38320J1 to 38320J4 are volumes for temporarily storing update data to be used in remote copy.

After the journal groups 38300G1 to 38300G4 of one of the storage apparatuses (local-side storage apparatus 1000L, local-side storage apparatus 1000R, remote-side storage apparatus 2550L, remote-side storage apparatus 2550R) are defined, when data is written into the data volumes 38310D1 to 38310D8 belonging to the journal groups 38300G1 to 38300G4, the journal data containing the write data is stored in the journal volumes 38320J1 to 38320J4 belonging to the journal groups 38300G1 to 38300G4. Further, the journal data is recorded in the journal volumes 38320J1 to 38320J4 in the order that writing processing is performed to the data volumes 38310D1 to 38310D8 in the journal groups 38300G1 to 38300G4. The structural of the journal data and the journal volumes 38320J1 to 38320J4 will be described later in detail.

The constitution of basic copy is now explained. The data volumes 38310D1, 38310D2 belonging to the journal group 38300G1 and the data volumes 38310D3, 38310D4 belonging to the journal group 38300G2 respectively configure a synchronous remote copy pair explained in the first to sixteenth embodiments.

Further, the data volumes 38310D1, 38310D2 belonging to the journal group 38300G1 and the data volumes 38310D5, 38310D6 belonging to the journal group 38300G3 respectively configure an asynchronous remote copy pair described later.

Further, the data volumes 38310D3, 38310D4 belonging to the journal group 38300G2 and the data volumes 38310D7, 38310D8 belonging to the journal group 38300G4 similarly configure an asynchronous remote copy pair.

Subsequently, outline of the processing in the two local-side storage apparatuses 1000L, 1000R is explained.

(A) The local-side storage apparatus 1000L receives a write I/O command (arrow 38400) for writing into the data volume 38310D1 sent from the host 1100P to the local-side storage apparatus 1000L via the I/O network 1300.

(B) When the I/O processing program 38100P receives the write I/O command, it executes a JNL creation processing program 38110, which is a part of the asynchronous remote copy program 41050P (FIG. 41), according to the write I/O command (arrow 38410). Thereby, write data is written into the data volume 38310D1 (arrow 38420), and journal data created with the JNL creation processing program 38110 is written into the journal volume 38320J1 (arrow 38430). The journal data is constituted of update information and write data. The update information contains an update number. The update number is a number added by the local-side storage apparatus 1000L to the I/O command, and a number is added in the order of receiving the I/O command. In addition to the update number, the update information also contains time information added by the host 1100P.

Figure 41:
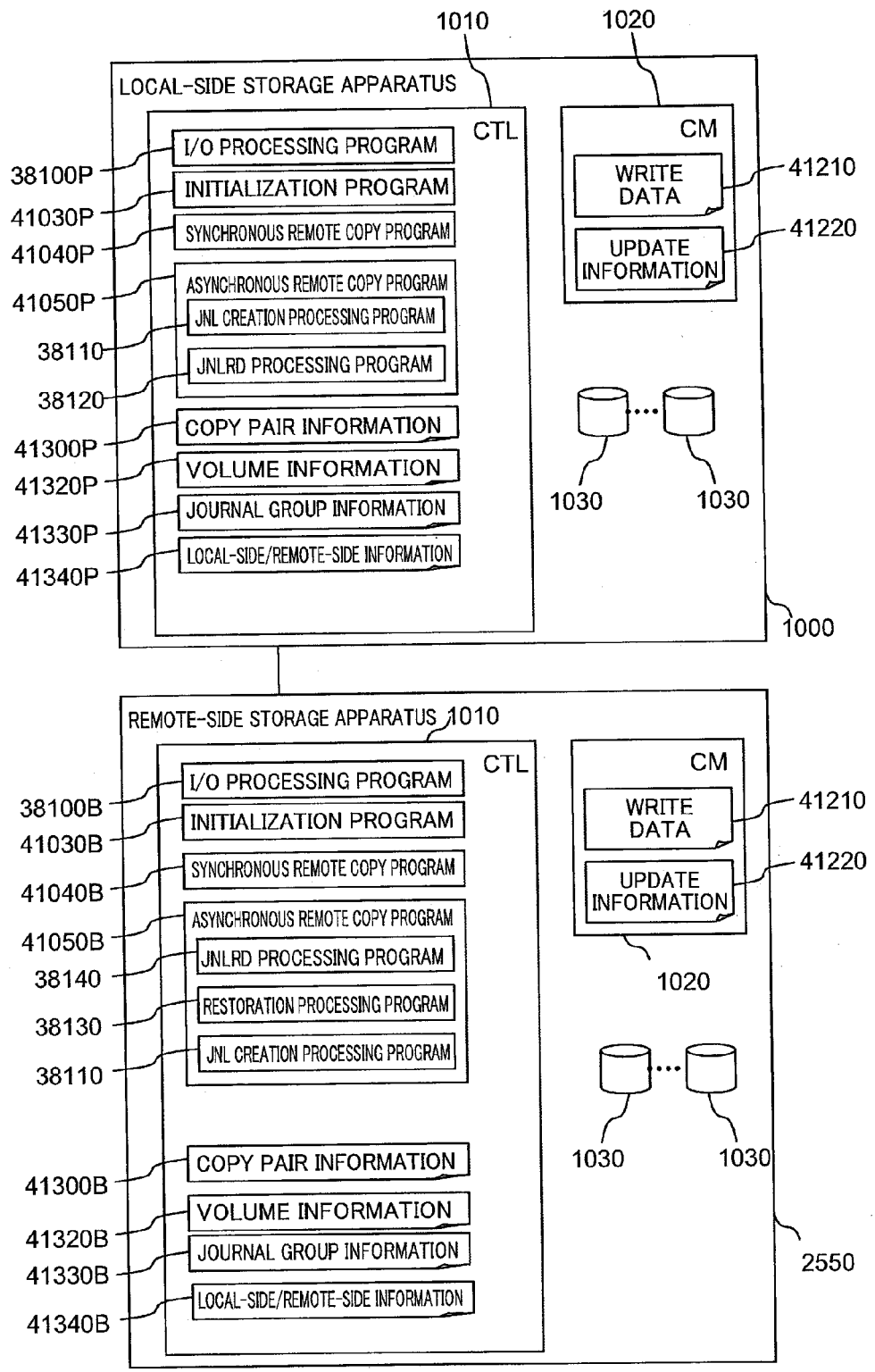
FIG. 41 is a block diagram representing the software constitution in a local-side storage apparatus and a remote-side storage apparatus.

(C) Further, the I/O processing program 38100P sends a remote write request to the local-side storage apparatus 1000R of the remote copy destination (arrow 38440). The remote write request contains a write command, a logical address, a volume number, a data volume, and the update number and time added to the corresponding journal data by the local-side storage apparatus 1000L at (B) above. In reality, the I/O processing program 38100P sends a remote write request by executing a synchronous remote copy program 41040P (FIG. 41). Other matters concerning synchronous remote copy have been explained in the first to sixteenth embodiments, and the detailed explanation thereof is omitted.

The local-side storage apparatus 1000R processes the write data to be transferred as with the write I/O command sent from the host 1100P to the local-side storage apparatus 1000L (arrow 38450, arrow 38460, arrow 38470). Nevertheless, the JNL creation processing program 38110 of the local-side storage apparatus 1000R creates journal data (journal data includes write data, and information such as the write location, write length, update number and the like required for reflecting the write data in the remote-side storage apparatus 2550, and the details will be described later) based on the information received at (C), so that the write data in the primary system (copy source of remote copy) and the secondary (copy source of remote copy) corresponds to the update number and time.

(D) In the sequential processing described above, at the point in time the writing of write data in all data volumes 38310D1 to 38310D4 and the writing of journal data in the journal volumes 38320J1, 38320J2 are complete, the local-side storage apparatus 1000L sends a write I/O command completion notice to the host 1100P.

Subsequently, outline of the processing in the two remote-side storage apparatuses 2550L, 2550R is explained.

(E) The JNLRD processing program 38140 of the remote-side storage apparatuses 2550L, 2550R sends a journal data acquisition request to the corresponding local-side storage apparatuses 1000L, 1000R via the I/O network 1300. The local-side storage apparatuses 1000L, 1000R that received the acquisition request send journal data to the remote-side storage apparatuses 2550L, 2550R. When the JNLRD processing program 38140 of the remote-side storage apparatuses 2550L, 2550R receives the journal data, it stores this in the journal volumes 38320J3, 38320J4 (arrow 38480, arrow 38490).

(F) The restoration processing program 38130 reads journal data from the journal volumes 38320J3, 38320J4 of the remote-side storage apparatuses 2550L, 2550R, and writes the write data containing such journal data into the corresponding data volumes 38310D5 to 38310D8 (arrow 26500, arrow 26510).

Subsequently, the JNLRD processing program 38140 and the restoration processing program 38100 of the remote-side storage apparatuses 2550L, 2550R, and the JNL creation processing program 38110 and the JNLRD processing program 38120 of the local-side storage apparatuses 1000L, 1000R execute asynchronous remote copy. Details concerning the processing of asynchronous remote copy and the pair status will be described later.

Outline of the processing when a failure occurs in the local-side storage apparatus 1000L communicating with the host 1100P under a normal status in the constitution of the storage system illustrated in FIG. 38 is now explained with reference to FIG. 39.

When a failure occurs in the local-side storage apparatus 1000L, the host 1100P switches the path to the other local-side storage apparatus 1000R with the I/O path manager 5000 (FIG. 5) explained in the previous embodiments. Details concerning the path switching and failure detection have been explained above, and will be omitted here. Further, when a failure occurs in the local-side storage apparatus 1000L, the restoration processing program 38130 of the corresponding remote-side storage apparatus 2550L may be stopped.

Like this, even when one local-side storage apparatus 1000L fails, the other local-side storage apparatus 1000R is able to continue the application in the host 1100P. Further, the remote-side storage apparatus 2550R is able to perform asynchronous remote copy continuously at the remote site.

Figure 40:
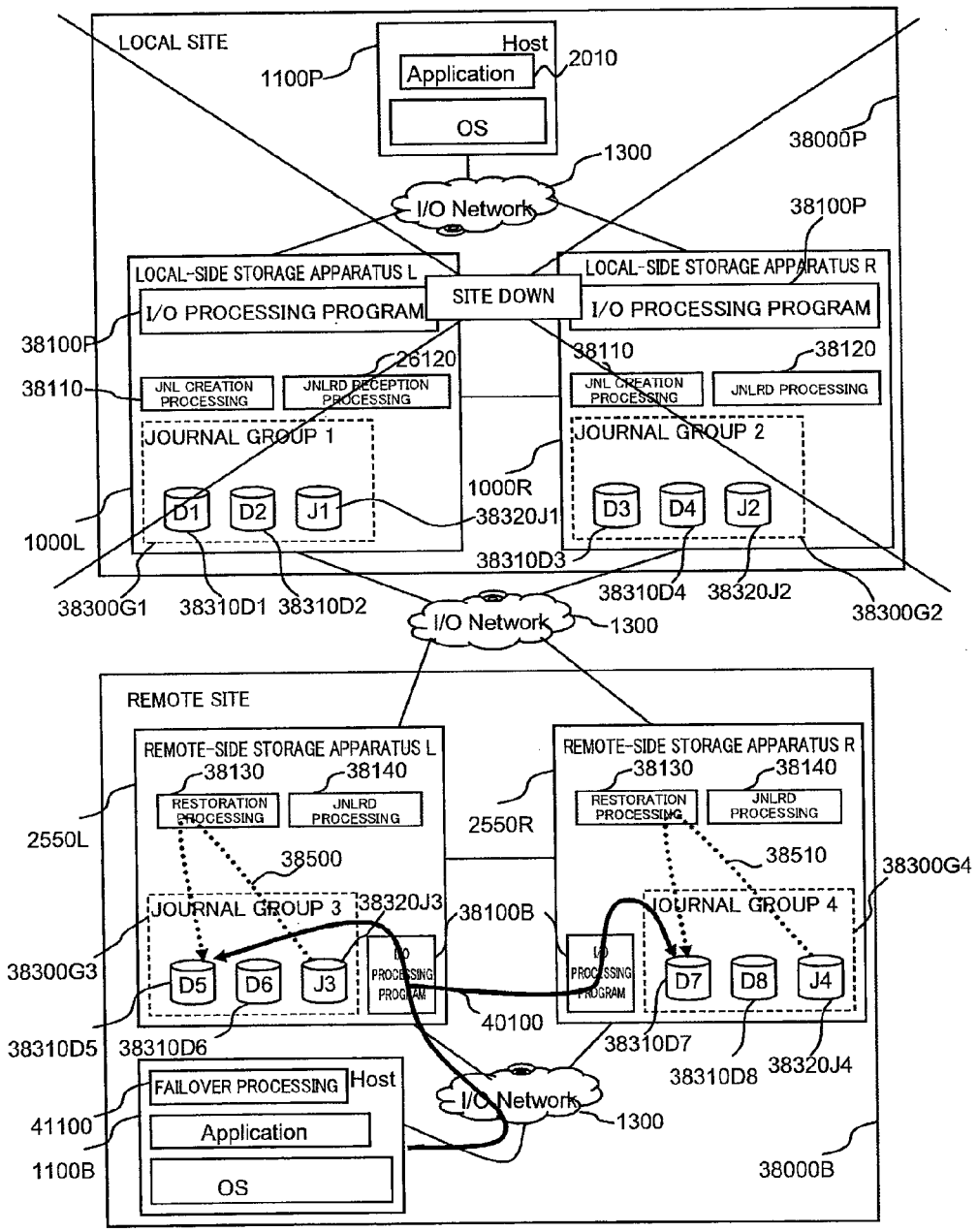
FIG. 40 is a third conceptual diagram showing an overview of the seventeenth embodiment.

Outline of the processing in the case of a failover (in particular, when the function of both primary local-side storage apparatuses 1000L, 1000R stops) for recovering the system using the remote-side host 1100B in the constitution of the storage system illustrated in FIG. 38 is now explained with reference to FIG. 40. The failover processing program 41100 of the remote-side host 1100B determines which one of the remote-side storage apparatuses 2550L, 2550R is retaining the latest data. As this example, for instance, a method of comparing the restored update number (or time) of the both storage apparatuses 2550L, 2550R may be adopted.

With the remote-side storage apparatus 2550L, 2550R retaining the latest data as the primary system, the data volumes 38310D5 to 38310D8 in the respective journal groups 38300G3, 38300G4 of the remote-side storage apparatus 2550L and the remote-side storage apparatus 2550R form a synchronous remote copy pair, and the synchronous remote copy (arrow 40100) is started and the pair status becomes a Duplex status. Subsequently, the I/O path manager 5000 or the like of the host 1100B switches the I/O request (indicating read and/or write) destination to the primary data volumes 38310D5 to 38310D8 of the pair. Details regarding the failover processing will be explained later with reference to a flowchart.

Like this, even when the overall local site 38000P malfunctions, it is possible to recover the processing of the host 1100P at the remote site 38000B with the same redundant constitution of two apparatuses as the local site 38000P. Incidentally, the I/O request start sequence and the synchronous remote copy start sequence may be reversed.

Incidentally, in order to simplify the foregoing explanation, although the operation of the cache (1020 of FIG. 37 in the case of the local-side storage apparatuses 1000L, 1000R) in the local-side storage apparatuses 1000L, 1000R and the remote-side storage apparatuses 2550L, 2550R is not explained, when storing write data in the data volumes 38310D1 to 38310D8 or storing journal data in the journal volumes 38320J1 to 38320J4, such write data and journal data may foremost be stored in the cache. This is because, although the installation will become complex, the performance will improve since the seek time of HDD and the like will not be included in the I/O performance. Nevertheless, as a variation of this embodiment, the constitution may exclude the cache when the local-side storage apparatuses 1000L, 1000R are virtual switches. Here, the seek time of HDD and the like will not be included in the I/O performance because the storage apparatuses (in this case, the remote-side storage apparatuses 2550L, 2550R) coupled to the local-side storage apparatuses 1000L, 1000R comprise the cache.

In this embodiment, the remote-side storage apparatuses 2550L, 2550R primarily issue the journal data acquisition request. This is to yield the advantage of performing efficient transfer of journal data in consideration of the status or the like of the remote-side storage apparatuses 2550L, 2550R, but other modes (a mode of the local-side storage apparatuses 1000L, 1000R primarily sending journal data) may also be adopted if the objective is simply to conduct a data transfer.

Further, in this embodiment, by temporarily storing update data in the journal volumes 38320J1 to 38320J4, it is possible to realize a system capable of continuing remote copy in response to the temporary failure or performance change of the I/O network 1400, or changes in the write frequency and write volume from the host 1100P.

Moreover, in this embodiment, on the local side, since the local-side storage apparatuses 1000L, 1000R and the remote-side storage apparatuses 2550L, 2550R coordinate to create journal data, and the secondary remote-side storage apparatuses 2550L, 2550R coordinate to restore the journal data on the remote side to the secondary volume, the processing will become complex in comparison to cases of using only one storage apparatus. Thus, there are times when the primary system and the secondary system are not able to perform remote copy with the same transfer performance due to the performance deterioration of one of the systems (for example, when a large-volume read request is issued to the primary local-side storage apparatus 1000L, the load will increase only in the primary system since the read request is not transferred to the secondary system). The journal volumes 38320J1 to 38320J4 have an advantage in that they are able to avoid the overflow of journal data by continuing to perform buffering even when there is a load bias between the primary system and the secondary system.

Incidentally, the journal volumes 38320J1 to 38320J4 are constituted of an area in one or more HDDs. As a more preferable embodiment, the journal volumes 38320J1 to 38320J4 are constituted of a partial or entire area of the RAID parity group as with the data volumes 38310D1 to 38310D8. Further, the journal volumes 38320J1 to 38320J4 in the local-side storage apparatuses 1000L, 1000R and the remote-side storage apparatuses 2550L, 2550R may retain internal information so that areas of the RAID parity group can be used as the journal volumes 38320J1 to 38320J4 based on a journal volume request specifying the data volumes 38310D1 to 38310D8.

3. Software and Data Creation in Present Embodiment

Programs operating in the local-side storage apparatuses 1000L, 1000R and the remote-side storage apparatuses 2550L, 2550R, and the data structure are now explained with reference to FIG. 41 concerning portions that are different from the first to sixteenth embodiments.

<3.1. Local-Side Storage Apparatus 1000>

As shown in FIG. 41, the local-side storage apparatuses 1000 (1000L, 1000R) retain, in the memory 1012 of the controller 1010, an I/O processing program 38100P, an initialization program 41030P, a synchronous remote copy program 41040P, an asynchronous remote copy program 41050P, copy pair information 41300P, volume information 41320P, journal group information 41330P and primary/secondary information 41340P.

Among the above, the I/O processing program 38100P is a program for receiving I/O commands and requests from the host 1100P, booting corresponding programs, and executing read/write processing or the like to the volumes, and the initialization program 41030P is a program for forming a synchronous remote copy pair and an asynchronous remote copy pair, and executing initialization copy.

Further, in this embodiment, the synchronous remote copy program 41040P is a program for performing transfer processing of transferring write data together with the update number and update time. Incidentally, the point of referring to the request used in this transfer as a remote write request is as explained in the foregoing overview.

Contents of the asynchronous remote copy processing based on the asynchronous remote copy program 41050P are as explained in the third embodiment. The asynchronous remote copy program 41050P differs on the local side and the remote side. The asynchronous remote copy program 41050P of the local-side storage apparatuses 1000L, 1000R is constituted of the JNL creation processing program 38110 and the JNLRD processing program 38120.

The JNL creation processing program 38110 is a program for deciding the corresponding journal groups 38300G1, 38300G2 and journal volumes 38320J1, 38320J2 upon receiving a write request for writing into the data volumes 38310D1 to 38310D4, and writes journal data into the journal volumes 38320J1, 38320J2. Incidentally, journal data contains the address, write data, write sequence number and the like of the data of the volume in the write command received by the local-side storage apparatus 1000L. Details concerning the journal data will be described later.

The JNLRD processing program 38120 is a program for sending journal data according to a request of the JNLRD processing program 38140 (described later) to be executed by the remote-side storage apparatuses 2550L, 2550R. Details concerning the JNLRD processing based on the JNLRD processing program 38120 will be described later with reference to a flowchart.

The copy pair information 41300P includes the following information in addition to the information of the previous embodiments:

(1) Identifier of the journal groups 38300G1, 38300G2 to which the data volumes 38310D1 to 38310D4 belong; and (2) Type of copy ("synchronous" or "asynchronous").

The volume information 41320P includes the type of volumes (journal volumes 38320J1, 38320J2 or data volumes 38310D1 to 38310D4) in addition to the information of the previous embodiments.

The journal group information 41330P is information for managing the journal groups 38300G1, 38300G2, and, as shown in FIG. 47, contains the following information for each of the journal groups 38300G1, 38300G2 identified by the journal group number.

(1) Pair identifier list: Information storing the identifier of the copy pairs belonging to the journal groups 38300G1, 38300G2.

(2) Journal volume number list: Information storing the identifier of the journal volumes 38320J1, 38320J2 belonging to the journal groups 38300G1, 38300G2.

(3) Update number: Recorded in the update information of journal data, and used for protecting the update sequence of data in the remote-side storage apparatuses 2550L, 2550R, and determining from the remote side the remote-side storage apparatuses 2550L, 2550R having the latest data volumes 38310D5 to 38310D8 at the time of recovery.

(4) Opponent storage apparatus number: Stores information for identifying the storage apparatuses (local-side storage apparatuses 1000L, 1000R or remote-side storage apparatuses 2550L, 2550R) of the remote copy destination.

(5) Opponent journal group number: Stores information for identifying the journal groups 38300G1 to 38300G4 of the remote copy destination.

(6) Oldest address of update information (7) Latest address of update information (8) Start address of update information transfer (9) Oldest address of write data

(10) Latest data of write data

(11) Restored latest update number

Incidentally, (6) to (11) will be described later.

The primary/secondary information 41340P is information for managing the role of storage apparatuses (for instance, when the local-side storage apparatus 1000L is a self-storage apparatus, the local-side storage apparatus 1000R and the remote-side storage apparatuses 2550L, 2550R corresponding thereto) other than the self-storage apparatus configuring the system, and contains the following information.

(1) System status ("primary" or "secondary") and journal group number of the self-storage apparatus. The self-storage apparatus having the primary/secondary information 41340P stores information showing whether the status is primary or secondary, and an identifier of the journal groups in the self-storage apparatus. Incidentally, primary and secondary represent the primary/secondary of the switch destination of the I/O path viewed from the hosts 1100P, 1100B. In this embodiment, the local-side storage apparatus 1000L and the remote-side storage apparatus 2550L are "primary," and the local-side storage apparatus 1000R and the remote-side storage apparatus 2550R are "secondary."

(2) Apparatus number and journal group number of the opponent storage apparatus in the self site. The identification number of the opponent storage apparatus constituted as high availability based on synchronous remote copy and the identifier of the corresponding journal groups in the opponent storage apparatus are stored.

(3) Apparatus number and journal group number of the storage apparatus recognized by the I/O path manager as a primary system/secondary system (hereinafter referred to as the "primary/secondary storage apparatus") in other sites. When the storage apparatus managing the foregoing information exists in the local site 38000P, the identifier of the journal group relating to the apparatus identifier of the primary storage apparatus in the remote site 38000B is stored, and, when the storage apparatus managing the foregoing information exists in the remote site 38000B, the identifier of the journal group relating to the apparatus identifier of the primary storage apparatus in the local site 38000P is stored.

Incidentally, the primary/secondary information 41340P is changed upon receiving a command issued pursuant to the switch of the write request or read request destination of the I/O path manager 5000 (FIG. 5) of the host 1100P. Incidentally, when the secondary storage apparatus 1000R is in a state of not being able to directly communicate with the hosts 1100P, 1100B, the local-side storage apparatus 1000L may relay the foregoing command.

Further, the cache memory 1020 stores the write data 41210 and the update information 41220, which are information configuring journal data. Details of the foregoing information will be described later.

<3.2. Remote-Side Storage Apparatus 2550>

The remote-side storage apparatuses 2500 (2550L, 2550R) retain, in the memory 1012 of the controller 1010, an I/O processing program 38100B, an initialization program 41030B, a synchronous remote copy program 41040B, an asynchronous remote copy program 41050B, copy pair information 41300B, volume information 41320B, journal group information 41330B, and primary/secondary information 41340B.

Among the above, the I/O processing program 38100B, the initialization program 41030B, the synchronous remote copy program 41040B, the asynchronous remote copy program 41050B, the copy pair information 41300B, the volume information 41320B, the journal group information 41330B, and the primary/secondary information 41340B are the same as the corresponding elements of the local-side storage apparatuses 1000L, 1000R, and the explanation thereof is omitted.

The asynchronous remote copy program 41050B is constituted of the JNLRD processing program 38140, the restoration processing program 38100 and the JNL creation processing program 38110.

The JNLRD processing program 38140 is a program for acquiring journal data from the local-side storage apparatuses 1000L, 1000R. Specifically, a JNLRD command designating a journal group number of the journal groups 38300G1, 38300G2 existing in the local-side storage apparatuses 1000L, 1000R is sent to the command-target local-side storage apparatuses 1000L, 1000R. Details of the processing based on the JNLRD processing program 38140 are now explained with reference to a flowchart.

The restoration processing program 38100 is a program for writing write data stored in the journal volumes 38320J3, 38320J4 belonging to the journal groups 38300G3, 38300G4 of the remote-side storage apparatuses 2550L, 2550R into the corresponding data volumes 38310D5 to 38310D8 belonging to the journal groups 38300G3, 38300G4. Details concerning the restoration processing based on the restoration processing program 38100 will be explained later with reference to a flowchart.

Incidentally, other processing and programs not illustrated in FIG. 41 and described in the other embodiments may also be included in the respective storage apparatuses.

4. Structure of Journal Volume and Relationship with Journal Group Information Structure of the journal volumes 38320J1 to 38320J4 respectively retained in the local-side storage apparatuses 1000L, 1000R and the remote-side storage apparatuses 2550L, 2550R is now explained with reference to FIG. 42.

The journal volumes 38320J1 to 38320J4 are used by being divided into the two areas of write data area and update information area.

<4.1. Update Information Area>

The update information area is an area for storing the update information of journal data, and the update information oldest address and the update information latest address of the journal group information 41330P, 41330B (FIG. 41) manage the update information 41220 (FIG. 41) to be retained by the local-side storage apparatuses 1000L, 1000R or the remote-side storage apparatuses 2550L, 2550R in a ring-buffer format. Further, the update information read start address of the journal group information 41330P, 41330B shows the update information of journal data to be transferred by the JNLRD processing program 38140 (FIG. 41). Thus, when the JNLRD processing program 38140 receives a journal acquisition request that does not designate the acquisition target, it transfers the update information shown in the read start address.

FIG. 46 is a chart (46001) showing the information retained in the update information. Each type of information is explained below.

(A) The update time is information showing the time that the local-side storage apparatuses 1000L, 1000R received a write request.

(B) The update number is information showing the sequence relation of the write data containing the update information.

Figure 42:
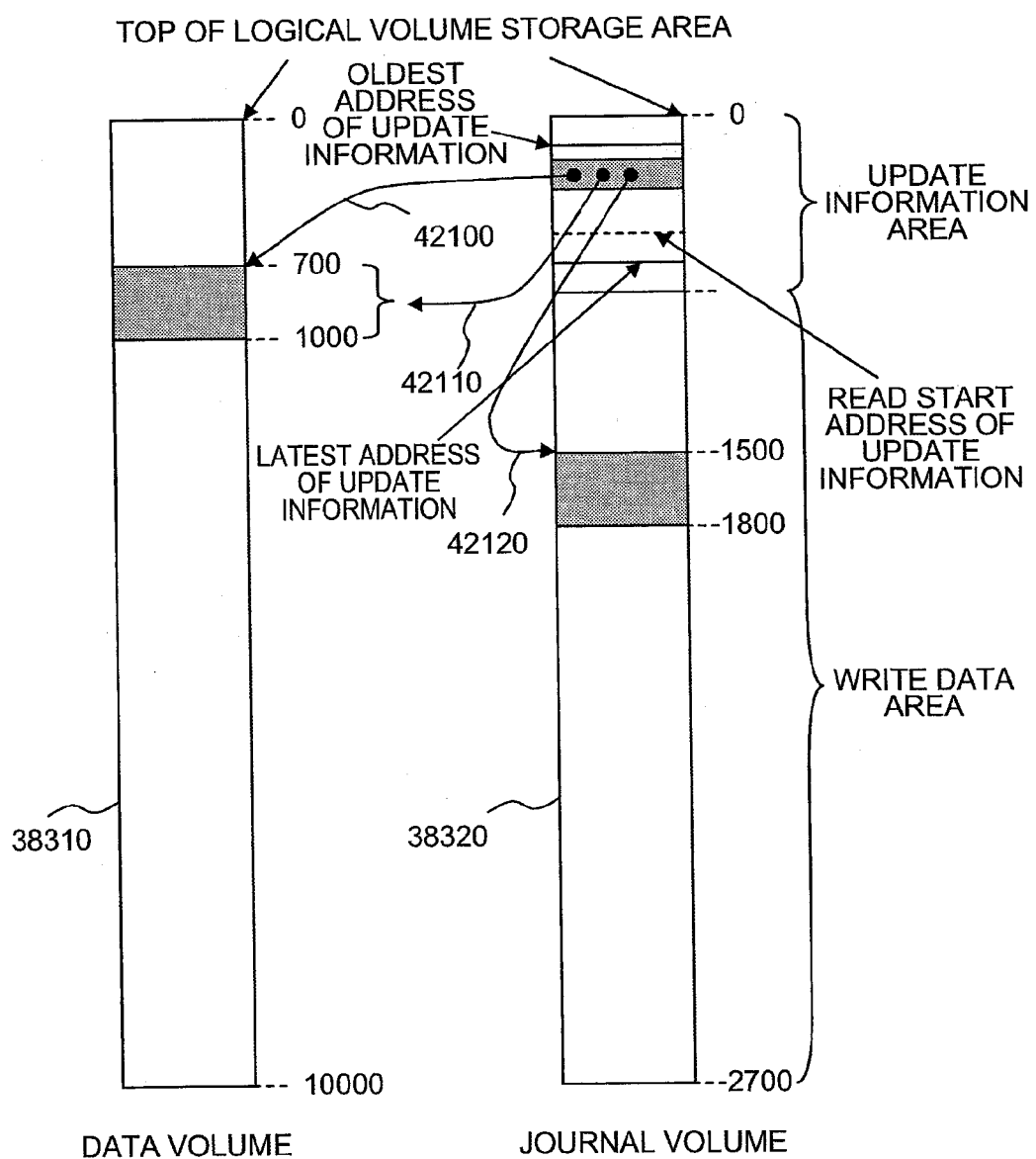
FIG. 42 is a conceptual diagram explaining the structure of a journal volume.

(C) The write address and write data length are information showing the volume designated in the write request, address in the volume, and length of write data (FIG. 42; 42100 and 42110).

(D) The journal volume address is information showing the journal volumes 38320J1 to 38320J4 storing the replication of write data, and the address in the journal volumes 38320J1 to 38320J4 (FIG. 42; 42120).

<4.2. Write Data Area>

The write data area is an area storing the write data contained in the journal data, and the write data oldest address and the write data latest address of the journal group information 41330P, 41330B manage the write data to be retained by the local-side storage apparatuses 1000L, 1000R or the remote-side storage apparatuses 2550L, 2550R in a ring-buffer format.

<4.3. When Using Plurality of Journal Volumes>

Due to the following reasons, there are cases where a plurality of journal volumes 38320J1 to 38320J4 belong to a certain journal group 38300G1 to 38300G4.

(Reason 1) Flexibility of capacity: There may be cases the amount of journal data to be retained by one journal volume 38320J1 to 38320J4 is too small.

(Reason 2) Problems in terms of performance: Since journal data equivalent to the write request of all data volumes 38310D1 to 38310D8 in the journal groups 38300G1 to 38300G4 is created in the journal volumes 38320J1 to 38320J4, this easily becomes a bottleneck.

Thus, when the local-side storage apparatuses 1000L, 1000R or the remote-side storage apparatuses 2550L, 2550R use a plurality of journal volumes 38320J1 to 38320J4, the following modes may be adopted in view of the foregoing problems.

(Mode 1) A mode known as concatenate of adding a new journal volume behind a certain journal volume 38320J1 to 38320J4. The various types of information managing the journal volumes 38320J1 to 38320J4 will conduct such management under the addressing rule allocated after being added.

(Mode 2) A striping mode of switching the journal volumes 38320J1 to 38320J4 of the storage destination via rotation for each data volume or creation count of predetermined journal data. As with mode 1, various types of information managing the journal volumes 38320J1 to 38320J4 will conduct such management under the addressing rule allocated after being added.

Further, although the update area of the journal volumes 38320J1 to 38320J4 will be used by being divided into an update information area and a write data area, a different mode may be adopted for each different area.

<4.4. Variation>

The journal volumes 38320J1 to 38320J4 may also collectively retain the update information and write data without retaining the update information and write data in separate areas.

5. Pair Status of Asynchronous Remote Copy

Figure 43:
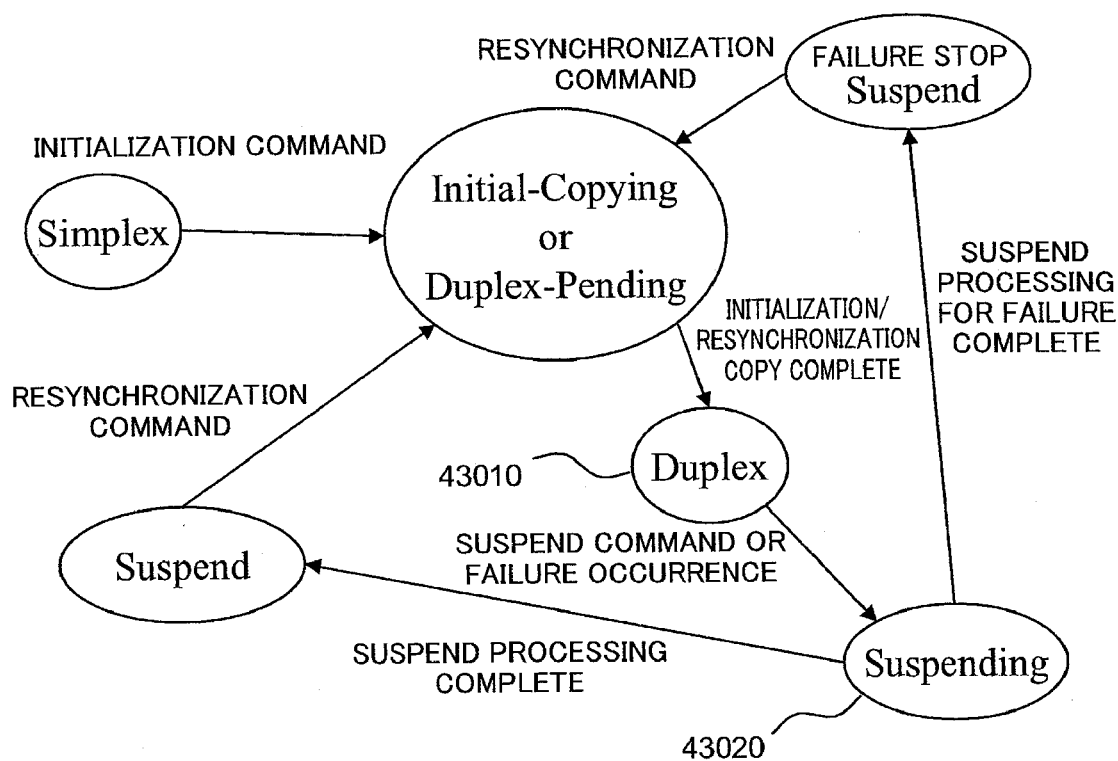
FIG. 43 is a conceptual diagram representing the pair status of remote copy and the transition of pair status according to the seventeenth embodiment.

The pair status of asynchronous remote copy is now explained with reference to FIG. 43. Explanation of the same status as synchronous remote copy explained in the previous embodiments is omitted, and only the different points will be explained.

(1) Duplex Status (43010)

In asynchronous remote copy, since the copy from the primary volume to the secondary volume is conducted asynchronously as a result of going through the journal data, even in a Duplex status, the secondary volume will follow slightly behind the primary volume.

(2) Suspending Status (43020)

The Suspending status is an intermediate status during the transition from the Duplex status to a Suspend status.

6. Initialization of System

Figure 44:
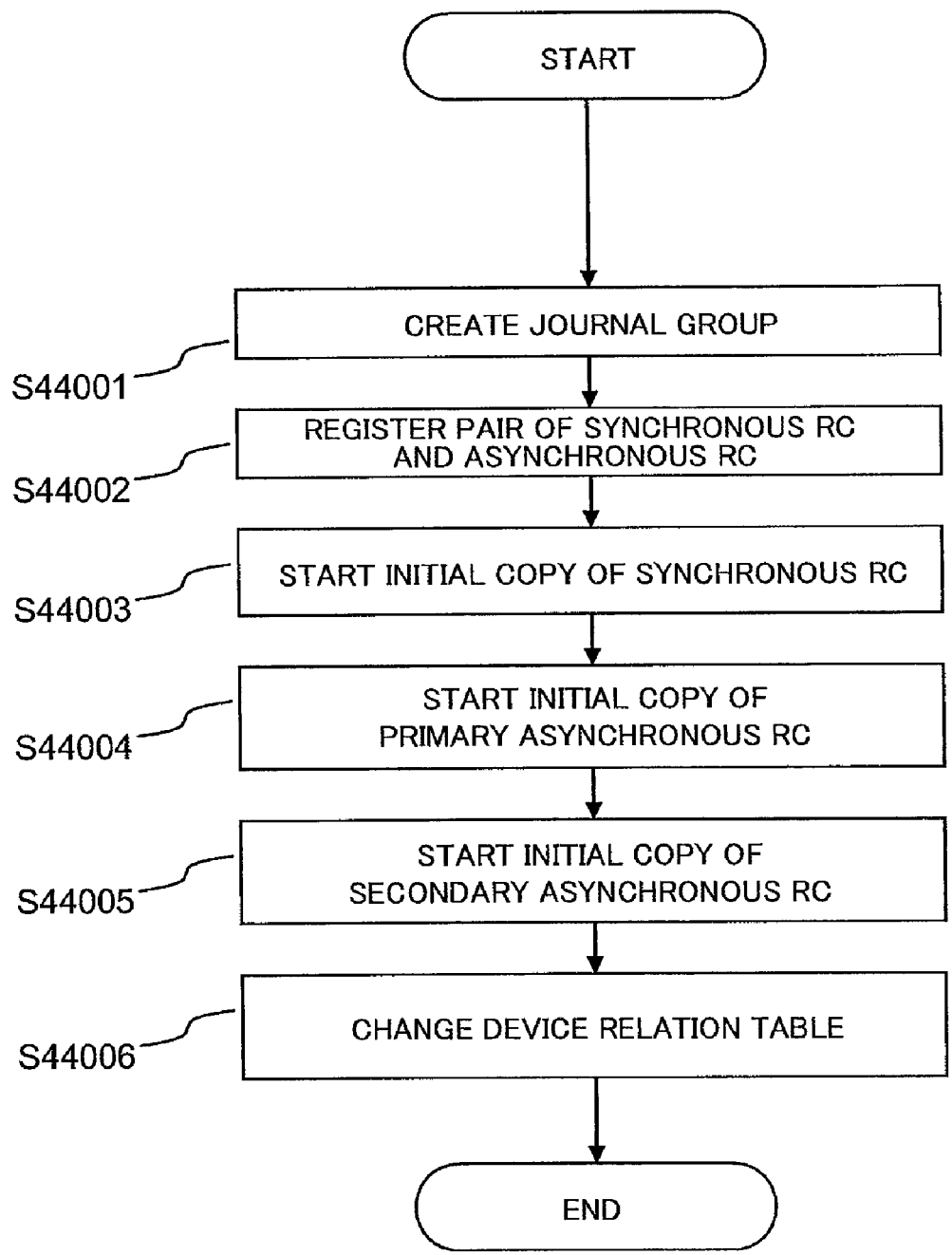
FIG. 44 is a flowchart showing the flow of initialization processing according to the seventeenth embodiment.

The initialization processing of this system using the initialization programs 41030P, 41030B for setting the journal group information 41330P, 41330B and setting the copy pair information 41300P, 41300B in order to start the operation of the system is now explained with reference to FIG. 44.

The initialization programs 41030P, 41030B are executed as a result of being triggered by the reception of an initialization command from the hosts 1100P, 1100B or the management host 1200 (FIG. 37). Further, the initialization command contains the following information.

(A) Apparatus number of the primary local-side storage apparatus 1000L and the secondary storage apparatus 1000R

(B) Apparatus number of the remote-side primary storage apparatus 2550L and the remote-side storage apparatus 2550R

(C) Identifier of the volume to be used as the journal volume 38320J1 among the volumes in the primary local-side storage apparatus 1000L

(D) Identifier of the volume to be used as the journal volume 38320J2 among the volumes in the local-side secondary storage apparatus 1000R

(E) Identifier of the volume to be used as the journal volume 38320J3 among the volumes in the remote-side primary storage apparatus 2550L

(F) Identifier of the volume to be used in the journal volume 38320J4 among the volumes in the secondary remote-side storage apparatus 2550R

(G) Identifier of the volume of the primary local-side storage apparatus 1000L and the volume of the secondary storage apparatus 1000R to be set as a synchronous remote copy pair (H) Identifier of the volume of the primary local-side storage apparatus 1000L and the volume of the remote-side local-side storage apparatus 1000R to be set as an asynchronous remote copy (I) Identifier of the volume of the primary local-side storage apparatus 1000L and the volume of the remote-side primary storage apparatus 2550L to be set as an asynchronous remote copy pair Incidentally, these commands may be issued in parts. The routine illustrated in FIG. 44 is now explained in detail.

(S44001) When the initialization programs 41030P, 41030B are started, creation processing of the journal groups 38320J1 to 38320J4 is performed. A more specific routine of the creation processing of the journal groups 38320J1 to 38320J4 is described below.

(A) The local-side storage apparatus 1000L of the local-side primary system uses the information contained in the initialization command to define the journal group 38300G1, and sets the volume designated by the journal group 38300G1 to be used as the journal volume 38320J1.

Incidentally, when this initialization command to the local-side storage apparatus 1000L is not directly given from the host 1100P to the local-side storage apparatus 1000L of the local-side primary system, it is relayed by storage apparatus (for instance, the local-side storage apparatus 1000R of the local-side secondary system) that received the initialization command, and, by way of compensation, a journal group identifier is returned from the ẽlocal-side storage apparatus 1000L to the local-side storage apparatus 1000R that conducted the relay. Further, pursuant to the setting of the journal volume 38300G1, the update number of the journal group information 41330P is set to 0, and the update information oldest address, update information latest address and update information transfer start address are also set to the top address of the update information area. Similarly, the write data oldest address and the write data latest address are set as the top address of the write data area.

(B) Similarly processing is performed to the remote-side primary storage apparatus 2550L.

(C) Similarly processing is performed to the local-side secondary storage apparatus 1000R and the secondary remote-side storage apparatus 2550B.

(D) The storage apparatus (local-side storage apparatus 1000L, 1000R or remote-side storage apparatus 2550L, 2550R) that relayed the initialization command communicates with each of the other storage apparatuses (local-side storage apparatuses 1000L, 1000R or remote-side storage apparatuses 2550L, 2550R) so as to issue a command for setting the necessary values as the opponent storage apparatus number and the opponent journal group number to be included in the journal group information 41330P, 41330B. Each of the other storage apparatuses (local-side storage apparatuses 1000L, 1000R or remote-side storage apparatuses 2550L, 2550R) that received this command sets the various values to realize the copy topology illustrated in FIG. 38.

(S44002) The initialization programs 41030P, 41030B register a pair. A more detailed operation of the pair creation processing is explained below.

(A: Pair setting of synchronous remote copy) The pair setting of synchronous remote copy of forming a pair with the data volumes 38310D1 and 38310D3, and a pair with the data volumes 38310D2 and 38310D4 is performed. Specifically, the storage apparatus number of the local-side storage apparatus 1000L and the volume number of the data volume 38310D1 are set as the storage apparatus number and the volume number of the storage apparatus having a copy source volume, and the storage apparatus number of the local-side storage apparatus 1000R of the volume number of the data volume 38310D3 are set as the storage apparatus number and the volume number of the storage apparatus having a copy destination volume of the copy pair information 41300P of the local-side storage apparatus 1000L. Further, "Simplex" is set as the pair status of the foregoing copy pair. Further, "synchronous" is set as the type of copy of the pair status.

(B: First pair setting of asynchronous remote copy) The storage apparatus number of the local-side storage apparatus 1000L and the volume number of the data volume D1 are set as the storage apparatus number and the volume number of the storage apparatus having a copy source volume, and the storage apparatus number of the local-side storage apparatus 1000R of the volume number of the data volume D5 are set as the storage apparatus number and the volume number of the storage apparatus having a copy destination volume of the copy pair information 41300P of the local-side storage apparatus 1000L. Further, "Simplex" is set as the pair status of the foregoing copy pair. Further, "asynchronous" is set as the type of copy of the pair status. Subsequently, the same contents as the copy pair information 41300P of the local-side storage apparatus 1000L are set as the copy pair information 41300B of the remote-side storage apparatus 2550.

Further, a pair number as a number for identifying the respective copy pair information 41300P, 41300B is added to the pair identifier list of the journal group information 41330P, 41330B of the local-side storage apparatus 1000L and the remote-side storage apparatus 2550L.

Moreover, when there are a plurality of data volumes to be added to the journal groups 38300G1, 38300G3, the copy pair information 41300P, 41300B and the journal group information 41330P, 41330B are similarly set as described above for each data volume.

(C: Second pair setting of asynchronous remote copy) The same pair creation processing as (B) above is performed to the local-side storage apparatus 1000R of the local-side secondary system and the remote-side storage apparatus 2550R of the remote-side secondary system.

(S44003) The initialization programs 41030P, 41030B start the initial copy based on the synchronous remote copy programs 41040P, 41040B. Incidentally, this initial copy is started by the relaying storage apparatus issuing a command to the storage apparatus involved in synchronous remote copy.

(S44004) The initialization programs 41030P, 41030B waits for the initial copy at S44003 to end, and then starts the initial copy of asynchronous remote copy from the primary local-side storage apparatus 1000L to the remote-side primary storage apparatus 2550L. Incidentally, this initial copy is started by the relaying storage apparatus issuing a command to the storage apparatus involved in asynchronous remote copy. Further, upon performing this initial copy, the remote-side primary storage apparatus 2550L starts the JNLRD processing based on the JNLRD processing program 38140 and the restoration processing based on the restoration processing program 38100.

(S44005) The initialization programs 41030P, 41030B start the initial copy of asynchronous remote copy from the local-side secondary storage apparatus 1000R to the secondary remote-side storage apparatus 2550R. Incidentally, this initial copy is started by the relaying storage apparatus issuing a command to the storage apparatus involved in asynchronous remote copy. Further, upon performing this initial copy, the secondary remote-side storage apparatus 2550R starts the JNLRD processing based on the JNLRD processing program 38140 and the restoration processing based on the restoration processing program 38100.

(S44006) The initialization programs 41030P, 41030B change the failure status corresponding to the foregoing pair of the device relation table in the host 1100P to "normal status" after both pair statuses of asynchronous remote copy are changed to Duplex status. Further, the local-side storage apparatus 1000L sets "primary" as the system status of the self-storage apparatus of the primary/secondary information 41340P, the local-side storage apparatus 1000R sets "secondary" as the system status of the self-storage apparatus of the primary/secondary information 41340B, the remote-side storage apparatus 2550L sets "primary" as the system status of the self-storage apparatus of the primary/secondary information 41340B, and the remote-side storage apparatus 2550R sets "secondary" as the system status of the self-storage apparatus of the primary/secondary information 41340B. Further, the journal group number of each storage apparatus (local-side storage apparatus 1000L, 1000R or remote-side storage apparatus 2550L, 2550R) is stored in the primary/secondary information 41340P, 41340B.

The routine is as described above. Incidentally, in the foregoing explanation, although the setting for the initialization of the local-side storage apparatuses 1000L, 1000R and the remote-side storage apparatuses 2550L, 2550R is configured at that same time, initialization of the local-side storage apparatuses 1000L, 1000R and the remote-side storage apparatuses 2550L, 2550R can also be performed by the hosts 1100P, 1100B making the respective settings separately through the function I/F or the like.

7. Failover Processing of System

The failover processing based on the failover processing program 41100 (FIG. 40) is now explained with reference to FIG. 45.

The failover processing is processing of recovering the system with the remote host 1100B when a failure occurs in the local-side storage apparatus (local-side storage apparatuses 1000L, 1000R). The failover processing is executed based on the failover processing program 41100 loaded in the remote-side host 1100B (secondary host).

(S45001) Foremost, the failover processing program 41100 issues a command of stopping the JNLRD processing to the JNLRD processing program 38140 of the remote-side storage apparatus 2550R via the function I/F. The remote-side storage apparatus 2550R that received this command stops the JNLRD processing. Incidentally, this step may be omitted when the JNLRD processing is automatically stopped based on the asynchronous remote copy function.

(S45002) Subsequently, the failover processing program 41100 confirms that the two remote-side storage apparatuses 2550L, 2550R have completed the restoration processing of the respective journal groups 38300G3, 38300G4. For example, the secondary host 1100B issues a command to the remote-side storage apparatuses 2550L, 2550R via the function I/F to return a completion notice at the time the restoration processing based on the restoration processing program 38100 is complete.

(S45003) Subsequently, the failover processing program 41100 selects the remote-side storage apparatus 2550L, 2550R having the latest journal group 38300G3, 38300G4. For example, by adding an update number of the journal group information 41330B to the completion notice, the secondary host 1100B is able to select the remote-side storage apparatus 2550L, 2550R having the newest update number as the remote-side storage apparatus 2550L, 2550R having the latest journal group 38300G3, 38300G4. The update number to be used in this determination be a time stamp or a marker.

(S45004) Subsequently, the failover processing program 41100 uses the function I/F and the like creates a synchronous remote copy pair with the data volumes 38310D5 to 38318D8 existing in the journal groups 38300G3, 38300G4 of the selected remote-side storage apparatuses 2550L, 2550R as the primary system.

(S45005) Subsequently, the secondary host 1100B starts the host access to the data volumes 38310D5 to 38318D8 existing in the selected journal groups 38300G3, 38300G4.

(S45006) Finally, the failover processing program 41100 changes the device relation table of the host 11006 when the pair status of the synchronous remote copy of the data volumes 38310D5 to 38318D8 is changed to a "Duplex" status.

Nevertheless, when recovering remote copy with one storage system, after step S45003 in the foregoing flowchart, step S45004 onward can be omitted by setting the I/O path manager 5000 so that the host 1100B will only recognize a storage apparatus having a new time stamp.

Incidentally, in order to simplify the explanation, although it was explained that the failover processing program 41100 is executed based on the failover processing program 41100 loaded in the remote-side host 1100B, this may also be loaded as a program that operates by the controller 1010 in the remote-side storage apparatuses 2550L, 2550R via the function I/F.

8. Details of Synchronous Remote Copy Program

Figure 48:
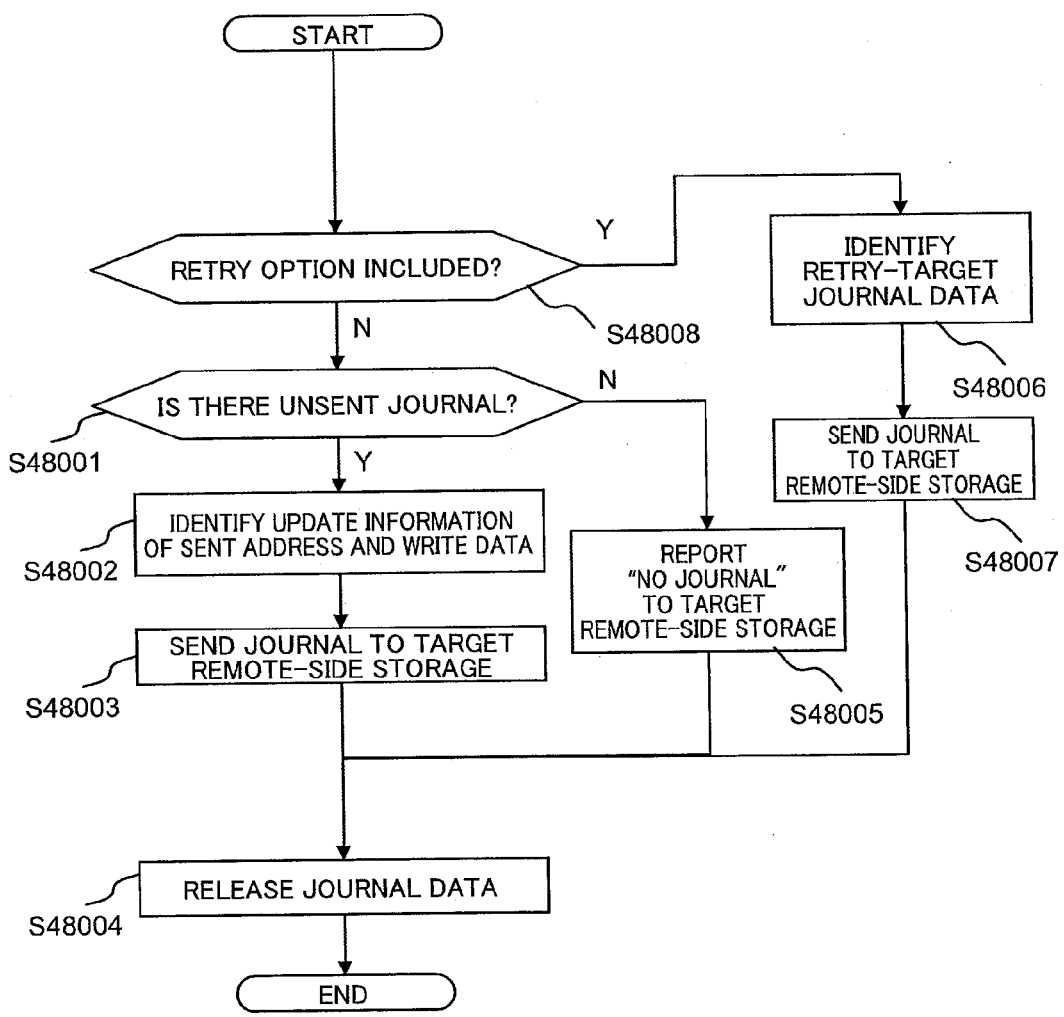
FIG. 48 is a flowchart showing the flow of JNLRD processing.

The JNLRD processing based on the JNLRD processing program 38120 is now explained according to FIG. 48.

The JNLRD processing is started when the local-side storage apparatuses 1000L, 1000R receive a journal read request from the remote-side storage apparatuses 2550L, 2550R. Incidentally, the received journal read request contains the latest update number of the journal data subject to restoration processing by the remote-side storage apparatuses 2550L, 2550R.

(S48008) The JNLRD processing program 38120 determines whether a retry option accompanying information (update number, etc.) showing the journal data to be retransferred is added to the journal read request, and proceeds to S48006 when such retry option is added (S48008; Y). When a retry command is not added (S48008; N), the JNLRD processing program 38120 proceeds to S48001.

(S48006) The JNLRD processing program 38120 seeks the update information from the update sequence or the like showing the journal data to be retransferred, and identifies the write data showed in the update information.

(S48007) The JNLRD processing program 38120 transfers the write data and update information identified at step S48006 as journal data.

(S48001) The JNLRD processing program 38120 confirms the existence of an unsent journal, and proceeds to S48005 when an unsent journal does not exist (S48001; N), and proceeds to S48002 when an unsent journal data exists (S48001; Y). This determination is made based on whether the update information transfer start address and the update information latest address of the journal group information 41330P are the same.

(S48005) The JNLRD processing program 38120 reports "no journal" to the target remote-side storage apparatuses 2550L, 2550R.

(S48002) The JNLRD processing program 38120 identifies the write data indicated in the update information shown in the update information transfer start address of the journal group information 41330P.

(S48003) The JNLRD processing program 38120 transfers the write data and the update information identified at step S48002 as journal data, and changes the update information transfer start address to the address of the subsequent update information.

(S48004) The JNLRD processing program 38120 waits for a reply concerning the journal transfer from the remote-side storage apparatuses 2550L, 2550R, releases the storage area of the journal volumes 38320J1, 38320J2 used for the journal data upon receiving the reply, and thereby ends this processing. Incidentally, release of the storage area of the journal volumes 38320J1, 38320J2 can be realized by performing the following update.

(A) Updating the value of the update information oldest address to a value obtained by adding the data size of update information and the value of the current update information oldest address so as to indicate the subsequent update information.

(B) Updating the value of the write data oldest address to a value obtained by adding the data size of write data and the value of the current write data oldest address so as to indicate the address of the subsequent write data.

(C) Updating the restored latest update number of the journal group information 41330P to the restored latest update number incidental to the journal read request.

Incidentally, as a variation of this embodiment, the release of the journal data in the local-side storage apparatuses 1000L, 1000R may also be performed by waiting for the transfer complete message from the remote-side storage apparatuses 2550L, 2550R, and at a timing that is immediately after the transfer at S48003 and before the restoration is complete. Further, as with the foregoing embodiments, the information can be read from the journal volumes 38320J1, 38320J2 for transferring the update information and write data and staged to the cache memory 1020 (FIG. 37), and, when such information already exists in the cache memory 1020, staging to the cache memory 1020 may be omitted.

Figure 49:
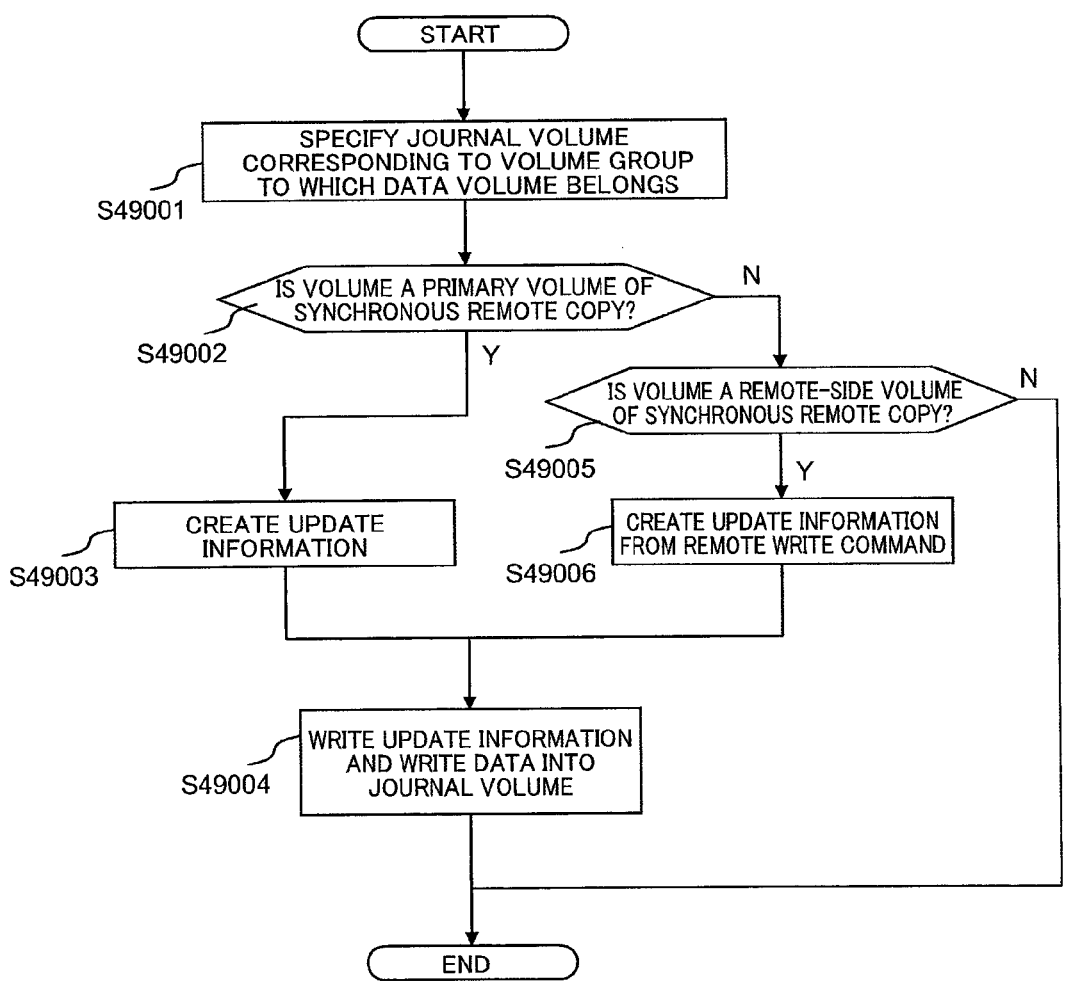
FIG. 49 is a flowchart showing the flow of journal creation processing.

The journal creation processing program 38110 is now explained with reference to FIG. 49. This processing is called by the I/O processing program 38100P when the local-side storage apparatuses 1000L, 1000R receive a write request or a remote write request from the host 1100P. This processing is explained with reference to the flowchart.

(S49001) The journal creation processing program 38110 specifies the journal groups 38300G1, 383001G2 belonging to the data volumes 38310D1 to 38310D4 designated in the write request or the remote write request, and specifies the corresponding the journal volumes 38320J1, 38320J2.

(S49002) The journal creation processing program 38110 determines whether the data volumes 38310D1 to 38310D4 designated in the write request or the remote write request are primary volumes of synchronous remote copy by referring to the copy pair information 41300P. When the data volumes 38310D1 to 38310D4 are primary volumes of synchronous remote copy (S49002; Y), the journal creation processing program 38110 proceeds to S49003. Further, when the data volumes 38310D1 to 38310D4 are not primary volumes of synchronous remote copy (S49002; N), the journal creation processing program 38110 proceeds to S49005.

(S49003) The journal creation processing program 38110 creates update information by performing the following routine.

(A) The current time in the local-side storage apparatuses 1000L, 1000R is set in the update time of update information. Incidentally, when the mainframe host sends a write request, since the time can be associated with the write request, the reception time can also be set upon receiving this kind of request.

(B) A value obtained by adding 1 to the update number of the corresponding journal group information 41330P is set as the update number of update information.

(C) The information (logical volume number, write start address, write data length) to be contained in the write request is set as the write address and write data length of update information. Incidentally, although information of the write request may be stored as is as the foregoing information, a value based on the addressing rule used in the local-side storage apparatuses 1000L, 1000R may also be set.

(D) A value obtained by adding 1 to the value of the foregoing information is set as the update number of the journal group information 41330P.

(S49004) The journal creation processing program 38110 allocates a storage area of update information and write data in the journal volumes 38320J1, 38320J2, and sets the top address of the write data storage area to the journal volume address of update information created at step S49003. Subsequently, the foregoing update information and write data are written into the storage area allocated in the journal volumes 38320J1, 38320J2. Incidentally, the following information of the journal group information 41330P is updated pursuant to the foregoing writing.

(A) The update information latest address is set to the storage area of the update information.

(B) The write data latest address is set to the storage area of the write data.

(S49005) The journal creation processing program 38110 proceeds to S49006 when the data volumes 38310D1 to 38310D4 are secondary volumes of synchronous remote copy (S49005; Y), and end the processing when the data volumes 38310D1 to 38310D4 are not secondary volumes of synchronous remote copy (S49005; N).

(S49006) The journal creation processing program 38110 creates update information from the remote write request. In creating the update information, the update number contained in the remote write request is set as the update number of update information. Further, in creating the update information, the update time is set as the time contained in the remote write request. Elements of other update information also perform the setting of corresponding information.

Incidentally, information (for instance, update number) received with the remote write request and used to create the update information may also be set in the journal group information 41330P. Incidentally, the update number transferred by the local-side storage apparatus 1000L of the primary system based on the remote write request is the same value as the update number contained in the update information created at S49003.

The JNLRD processing is now explained with reference to FIG. 50. The JNLRD processing is processing to be executed with the remote-side storage apparatuses 2550L, 2550R. The initialization program 41030B designates the start of execution, and the remote-side storage apparatuses 2550L, 2550R thereafter detect a failure concerning the remote copy failure, and the JNLRD processing is repeated until a command is received from another storage apparatus or the host 11006.

(S50001) The JNLRD processing program 38140 sends a journal read request to the local-side storage apparatuses 1000L, 1000R. Incidentally, when the JNLRD processing program 38140 is requested to resend the journal data from another processing or the host 1100B, it sends resends such journal upon adding information (update number, etc.) for identifying journal data to be subject to a retry option and retransfer to the foregoing request. Further, the JNLRD processing contains the value of the restored latest update number of the journal group information 41330B.

(S50002) The JNLRD processing program 38140 receives a reply from the local-side storage apparatuses 1000L, 1000R.

(S50003) The JNLRD processing program 38140 determines whether the content of the reply is "no journal," and proceeds to S50006 when the reply is "no journal" (S50003; Y), and proceeds to S50004 when the reply is not "no journal" (S50003; N).

(S50006) The JNLRD processing program 38140 waits for a given period of time.

(S50004) The JNLRD processing program 38140 determines whether there is shortage of an area for storing journal data in the journal volumes 38320J3, 38320J4 of the self-storage apparatus, and proceeds to S50005 when a journal data storage area cannot be allocated (S50004; Y), and proceeds to S50007 when a journal data storage area could be allocated (S50004; N). Incidentally, this determination can be made by referring to the following information of the journal group information 41330B.

(A) When the update information latest address is smaller than the address added with the update information of journal data that received the update information oldest address, the storage area of update information is insufficient.

(B) When the write data latest address is smaller than the address added with the write data of journal data that received the write data oldest address, the storage area of write data is insufficient.

(S50007) The JNLRD processing program 38140 discards the received journal data, and waits a given period of time.

(S50005) The JNLRD processing program 38140 allocates a storage area of update information and write data in the journal volumes 38320J3, 38320J4, and sets the top address of the write data storage area as the journal volume address of the update information of the received journal data. The foregoing update information and write data are written into the storage area allocated in the journal volumes 38320J3, 38320J4. Incidentally, the following information of the journal group information 41330B is updated pursuant to the foregoing writing.

(A) The update information latest address is set to the storage area of update information.

(B) The write data latest address is set to the storage area of write data.

Incidentally, the remote-side storage apparatuses 2550L, 2550R may simultaneously issue a plurality of journal read requests.

Figure 51:
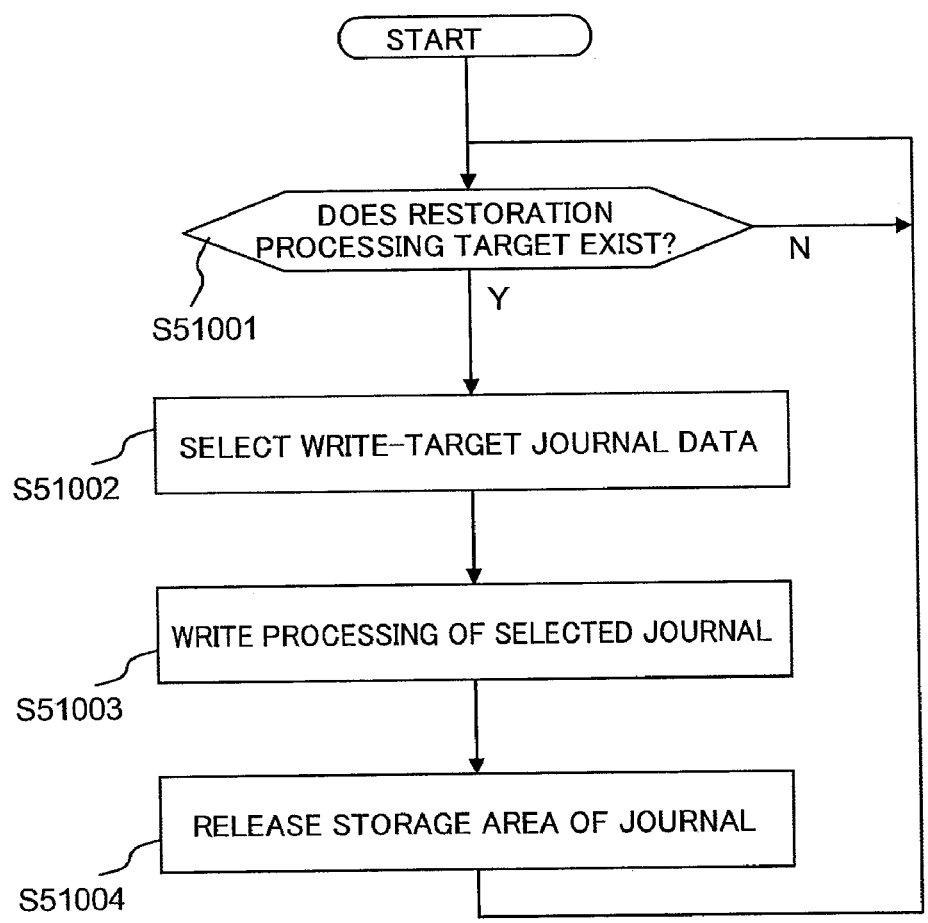
FIG. 51 is a flowchart showing the flow of restoration processing.

The restoration processing program 38100 is now explained with reference to FIG. 51. The restoration processing program 38100 is executed by the remote-side storage apparatuses 2550L, 2550R, and the initialization program 41030B starts the processing.

(S51001) The restoration processing program 38100 checks whether a restoration-target journal data exists. This checking is performed by referring to the journal group information 41330B, referring to the pointer information of the journal volumes 38320J3, 38320J4 correspondingly to the respective journal groups 38300G3, 38300G4, comparing the update information oldest address and the update information latest address, and determining whether the difference is 0. The restoration processing program 38100 proceeds to S51002 when a restoration-target journal data exists (S51001; Y), and waits for the arrival of a restoration-target journal data when a restoration-target journal data does not exist (S51001; N) since all journal data are in an applied status (this status is sometimes referred to as "restoration processing complete") (loop S51001).

(S51002) The restoration processing program 38100 reads all or a part of one or more pieces of update information stored in the update information area of the journal volumes 38320J3, 38320J4, and selects the write data to be reflected in the data volumes 38310D5 to 38310D8. Incidentally, this decision of write data is conducted by rearranging a plurality of pieces of update information according to the update number sequence, and the update information in which the update number is continuing from the number subsequent to the update information oldest address (showing the latest update number of the restored journal data) of the journal group information 41330B becomes the target of selection. Incidentally, the foregoing rearranging processing is necessary to transfer the journal read requests independently from the sequence when they are processed in parallel.

(S51003) The restoration processing program 38100 writes the write data having one or more journal data decided at S51002 into the data volumes 38310D5 to 38310D8. Incidentally, when there are a plurality of selection-target journal data, this processing may also write the update number sequence into the respective journal data. Further, the following processing may be performed in order to speed up the foregoing writing process.

(A) When it is discovered that a plurality of write data have been written into the same address, only the last write data is written, and the writing of the other write data is omitted.

(B) When there are a plurality of write data in which another address is the writing destination, the writing of such write data is performed in parallel or randomly.

Incidentally, since the data volumes 38310D5 to 38310D8 will be of an inconsistent state (write I/O sequence is not retained) in all processing of this step, when ending this restoration processing, it is necessary to end all writing processing in this step to realize a status where consistency is secured. Further, the restored latest update number of the journal group information 41330B is set as the latest value among the update information corresponding to the plurality of write data written in this step.

(S51004) The restoration processing program 38100 releases the journal data written at S51003. The method of release is the same as in the JNLRD processing, and the explanation thereof is omitted.

In this section, an asynchronous remote copy mode was explained where the journal data is transferred by the remote-side storage apparatuses 2550L, 2550R taking lead in sending to the journal acquisition request to the local-side storage apparatuses 1000L, 1000R. Incidentally, a mode where the local-side storage apparatuses 1000L, 1000R take the lead as the journal data transfer mode may also be considered. More specifically, the following changes or additions are made to the previous explanation.

(A) The local-side storage apparatuses 1000L, 1000R periodically monitor the journal volumes 38320J1, 38320J2 and transfer journal data upon discovering such journal data.

(B) The remote-side storage apparatuses 2550L, 2550R receive the sent journal data and thereafter store the journal data in the journal volumes 38320J3, 38320J4, and return the latest update number of the restored journal data together with the reply of transfer complete. Further, the update number of the journal data determined by the remote-side storage apparatuses 2550L, 2550R as requiring retransfer may by returned to the local-side storage apparatuses 1000L, 1000R together with the reply.

Further, as the timing of the local-side storage apparatuses 1000L, 1000R releasing the journal data, in addition to determining the timing based on the latest update number of the restored journal data, a method of releasing the journal data when the local-side storage apparatuses 1000L, 1000R complete transferring the journal data may also be considered.

9. Network Failure Between Local-Side Storage Apparatus and Remote-Side Storage Apparatus When the asynchronous remote copy cannot be continued due to a network failure between the local-side storage apparatuses 1000L, 1000R and the remote-side storage apparatuses 2550L, 2550R, the following processing may be performed.

(Processing of local-side storage apparatus) When the local-side storage apparatuses 1000L, 1000R detect a status where remote copy cannot be continued, they record the write location recorded in the update information of the journal data stored in the journal volumes 38320J1, 38320J2 of the local-side storage apparatuses 1000L, 1000R in the differential bitmap (primary) of the local-side storage apparatuses 1000L, 1000R. Further, when the local-side storage apparatuses 1000L, 1000R receive a write request, they record the write location in the differential bitmap together with normal write processing.

(Processing of remote-side storage apparatus) When the remote-side storage apparatuses 2550L, 2550R detects a status where remote copy cannot be continued, they release the journal data stored in the journal volumes 38320J3, 38320J4 of the remote-side storage apparatuses 2550L, 2550R (step 1). When the remote-side storage apparatuses 2550L, 2550R receive a write request, they record the write location in the differential bitmap (secondary) of the remote-side storage apparatuses 2550L, 2550R together with normal write processing (step 2). Incidentally, foregoing step 1 and step 2 may be executed in independent timings.

(Processing of local-side/remote-side storage apparatus upon receiving a resynchronization command) The remote-side storage apparatuses 2550L, 2550R send data of the differential bitmap (secondary) to the local-side storage apparatuses 1000L, 1000R. The local-side storage apparatuses 1000L, 1000R that received the differential bitmap confirm the contents of the differential bitmap (primary) and the received differential bitmap (secondary) so as to specify whether writing was made into the local-side storage apparatuses 1000L, 1000R or the remote-side storage apparatuses 2550L, 2550R after entering the Suspend status, and specifies the write location when there is write data that has not yet been transferred to the remote-side storage apparatuses 2550L, 2550R. Subsequently, the local-side storage apparatuses 1000L, 1000R execute differential copy regarding a specified location during the Duplex-Pending status.

Incidentally, the foregoing processing may also be executed based on split commands issued from the host 1100P. Incidentally, in the foregoing case, although there are cases of accessing the volumes of the remote-side storage apparatuses 2550L, 2550R after entering the Suspend status, the method of identifying the volumes to be used is the same as in the failover processing. However, in the failover processing, data of an old volume is overwritten with data of a new volume, and all replications will be lost in the remote copy of the remote-side storage apparatuses 2550L, 2550R in the subsequent differential copy. In order to avoid this kind of situation, synchronous remote copy of the remote-side storage apparatuses 2550L, 2550R accompanying the failover processing may be omitted.

10. Variation of Asynchronous Remote Copy

Other modes for realizing asynchronous remote copy in addition to the modes explained above may be considered.

<10.1. Grouping Mode of Write Data>

The local-side storage apparatuses 1000L, 1000R group and transfer one or more write data. As the trigger for starting the collection of write data into a new group, the lapse of a certain period of time from the start of collection of the current group, and the local-side storage apparatuses 1000L, 1000R detecting that writing of a given volume has been performed may be considered, but other triggers (for instance, upon receiving a command from the host 1100P). Incidentally, unlike journal data, the write data in the group do not have sequence information, but the groups have sequence information. Further, when a plurality of writings update the same address, only the latest write data in the same group needs to be transferred.

By restoring only the write data in the group that satisfies both of the following conditions, the remote-side storage apparatuses 2550L, 2550R are able to protect the write sequence of data of the remote-side storage apparatus 2550 even without the sequence relationship in the group.

(A) All write data in the group are received by the remote-side storage apparatuses 2550L, 2550R.

(B) Further, write data of groups having an update number before the group of (A) are restored.

Incidentally, in order to perform the failover processing described later, the remote-side storage apparatuses 2550L, 2550R retain the update number of the restored groups according to a method, for instance, described in the specification of US Patent Publication No. 2005/0213389.

<10.2. Mode of Using Logical Snapshot>

The local-side storage apparatuses 1000L, 1000R repeatedly create a logical snapshot, and remotely write the data of such snapshot into the volume of the remote-side storage apparatuses 2550L, 2550R. As explained in the first to sixteenth embodiments, since the logical snapshot records the writing location pursuant to the Copy-On-Write processing, it is possible to identify the data to be remotely written.

Incidentally, in this remote writing, since the sequence relationship is not retained in write request units as with Section 9.1, a logical snapshot (save snapshot) is also created for the volume of the remote-side storage apparatuses 2550L, 2550R, and remote writing is received thereafter. Further, the local-side storage apparatuses 1000L, 1000R allocate an update number to the created logical snapshot to associate with remote writing, and the remote-side storage apparatuses 2550L, 2550R have information for determining for which generation (update number) the logical snapshot (save snapshot) was created. This technology is explained in detail in the specification of US Patent Publication No. 2005/0210210.

<10.3. Failover Processing>

In both modes explained in Section 10.1 and Section 10.2, the sequence relationship of the write data is unclear at the time the write data is transferred to the remote-side storage apparatuses 2550L, 2550R, and the identification of the latest data accompanying the failover cannot be performed. The following methods can be considered as countermeasures.

(A) The local-side both storage apparatuses 1000L, 1000R switch (create a snapshot) the groups of both storage apparatuses 1000L, 1000R atomically through mutual coordination. Incidentally, atomic means that the write request is not processed during the switching (or creation) of both local-side storage apparatuses 1000L, 1000R, and this can be realized by the host 1100P or the local-side storage apparatus 1000L of the primary system reserving the write request. Further, the local-side both local-side storage apparatuses 1000L, 1000R allocate the same update number to the switched group (or created snapshot). Incidentally, coordination of both local-side storage apparatuses 1000L, 1000R can be realized by the local-side storage apparatus 1000L of the local-side primary system issuing a command to the local-side storage apparatus 1000R of the secondary system, but this coordination can also be realized by the resident software in the host 1100P periodically issuing a command to both local-side storage apparatuses 1000L, 1000R.

(B) In the failover processing, which remote-side storage apparatus 2550L, 2550R has the latest data is determined by comparing the update numbers of groups (or logical snapshot (save snapshot)) in substitute for the restored journal data update number.

11. Variation of Failover Processing

<11.1. When Clock is Assigned to Write Request from Host>

When the host 1100P is a mainframe, the time allocated by the host can be associated with the write request as a rule of the I/O protocol, and the sequence relationship of the write requests can be determined by using this time. Therefore, by making the following changes or additions, failover processing can be realized based on the write associated time.

(A) In the JNL creation processing, the write associated time is included in the update information at the time of creating journal data, and transferred to the remote-side storage apparatuses 2550L, 2550R.

(B) In the restoration processing, the latest write associated time of the restored journal data is stored.

(C) In the failover processing, the latest data is specified using the write associated time in substitute for the update number of journal data.

<11.2. Comparison with Written Data of Application>

In normal synchronous remote copy, since it is not necessary to associate the update time with the remote write request, this portion must be expanded in the modes described above. In this Section, a mode that does not require such expansion is explained.

When the application 2010 (FIG. 38) operating in the host 1100P is a database, a log created by the database to be written into the volume is allocated with a transaction sequence number allocated by the database. Further, when re-booting the database, the database reads the log in order to secure the atomicity of the transaction, and user of the database will be able to know the latest transaction sequence number that has been committed up to that point in time.

Needless to say, since the transaction sequence number and log are written into the volume with a normal write request, they will become a target of asynchronous remote copy. Therefore, if the failover processing program 41100 (or administrator) performs the following routine, it will be possible to know which remote-side storage apparatus 2550L, 2550R has the latest data.

(Step 1) The failover processing program 41100 issues a command to the database of the host 1100B to re-boot using the volume of one of the remote-side storage apparatuses 2550L, 2550R. The database that received the command performs the re-boot, and returns the latest transaction sequence number to the administrator or the failover processing program 41100. Incidentally, the database may thereafter be ended once.

(Step 2) The failover processing program 41100 issues a command to the database of the host 11006 to re-boot using the volume of the other remote-side storage apparatus 2550L, 2550R. The database that received the command performs the re-boot as with Step 1, and returns the latest transaction sequence number to the administrator or the failover processing program 41100.

(Step 3) The failover processing program 41100 compares the latest transaction sequence numbers obtained at Step 1 and Step 2, and determines that the remote-side storage apparatus 2550L, 2550R used by the database is the latest data when it is possible to return a new value.

Incidentally, this method is not limited to a database, if the I/O path manager 5000 (FIG. 5) or the file system 5020 (FIG. 5) is to create a log with an update sequence to a specific area of the volume, such log may be used for the comparison. Incidentally, although the mode explained in this Section does not require the expansion of the synchronous remote copy, since it will depend on the type of application, this mode does not deny the best modes explained above, nor is this mode denied by the foregoing best modes.

12. Case of Intersite Synchronous Remote Copy

Incidentally, although data copy between the local-side storage apparatuses 1000L, 1000R and the remote-side storage apparatuses 2550L, 2550R was performed with asynchronous remote copy in the foregoing explanation, this may be substituted with synchronous remote copy. Incidentally, in the case of intersite synchronous remote copy, write completion is returned to the host 1100P at the time data copy or writing to all four storage apparatuses (local-side storage apparatuses 1000L, 1000R and remote-side storage apparatuses 2550L, 2550R) is complete. Nevertheless, since there are cases where one side of the intersite synchronous remote copy will become a Failure Suspend status depending on the pattern of network failure, similar failover processing (when required, allocation of update information with the primary local-side storage apparatus 1000L) will be required.

(18) Eighteenth Embodiment

In the seventeenth embodiment, the intersite network use efficiency was inferior because data written by the host 1100P of the local site 38000P was transferred to the secondary site 38000B from both the local-side storage apparatus 1000L of the primary system and the local-side storage apparatus 1000R of the secondary system since processing of existing asynchronous remote copy is diverted considerably. In this embodiment, the method of improving the use efficiency by expanding asynchronous remote copy is described below.

1. Overview of Present Embodiment

Figure 52:
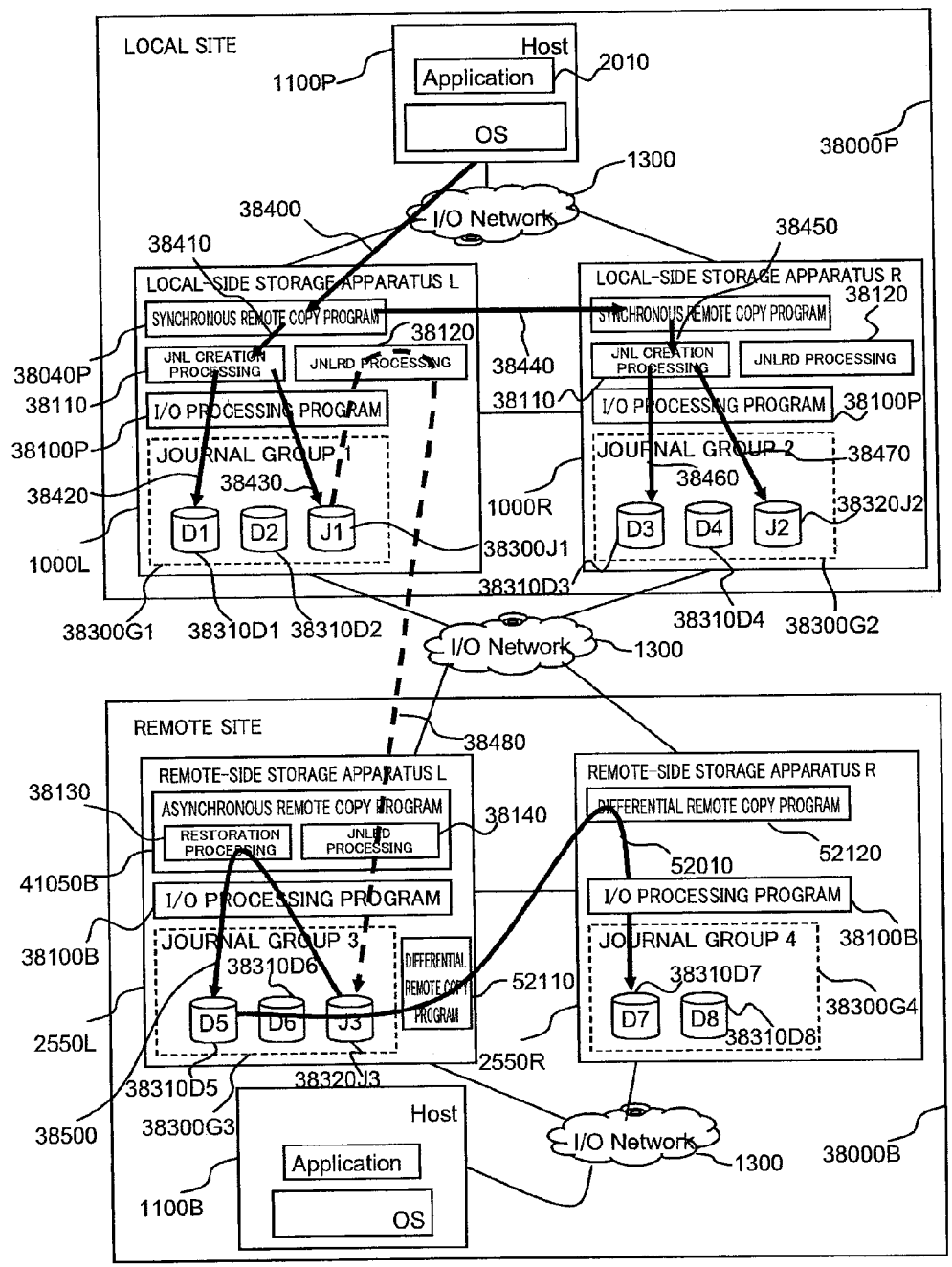
FIG. 52 is a first conceptual diagram showing an overview of an eighteenth embodiment.
Figure 53:
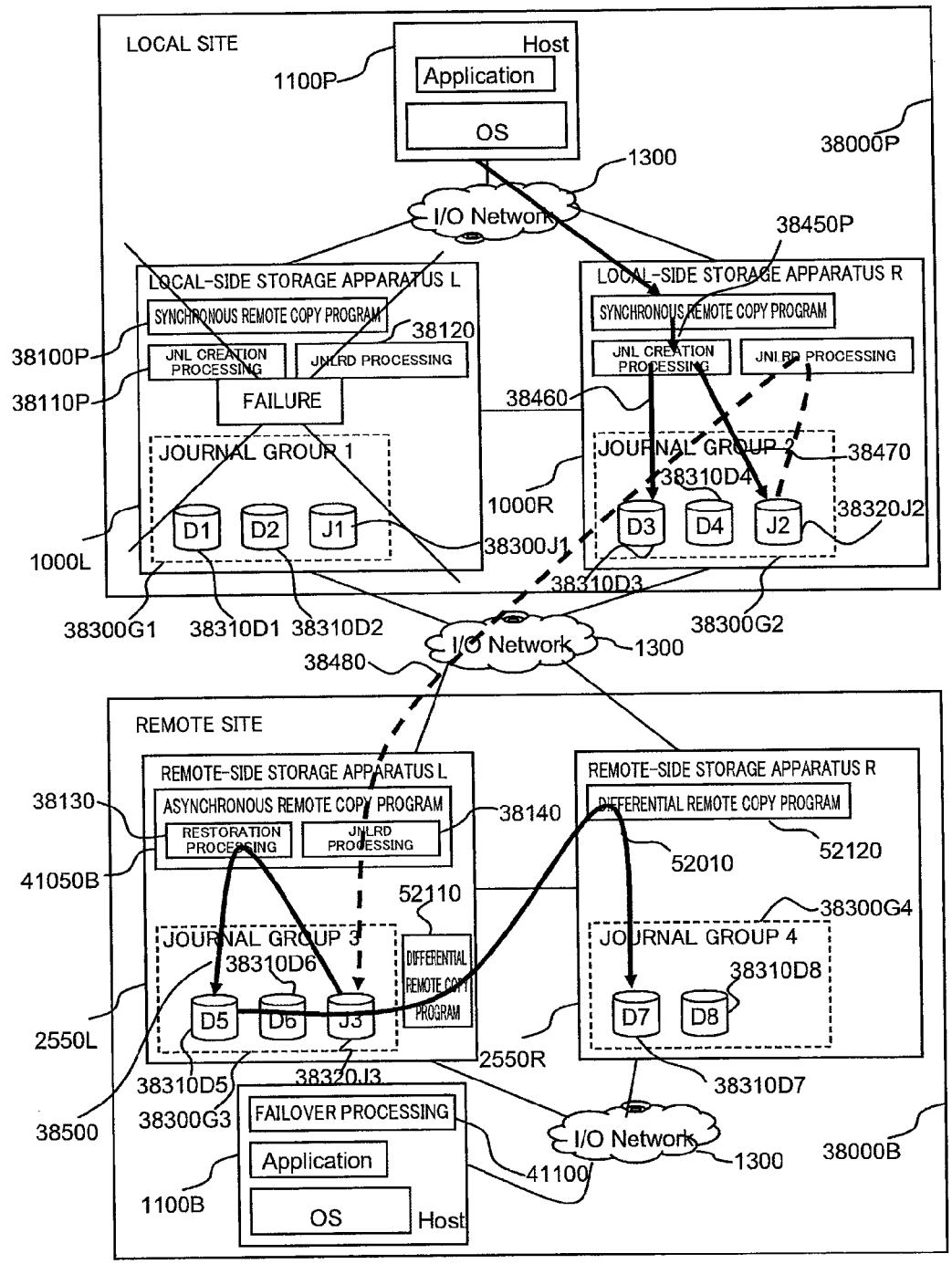
FIG. 53 is a second conceptual diagram showing an overview of the eighteenth embodiment.
Figure 54:
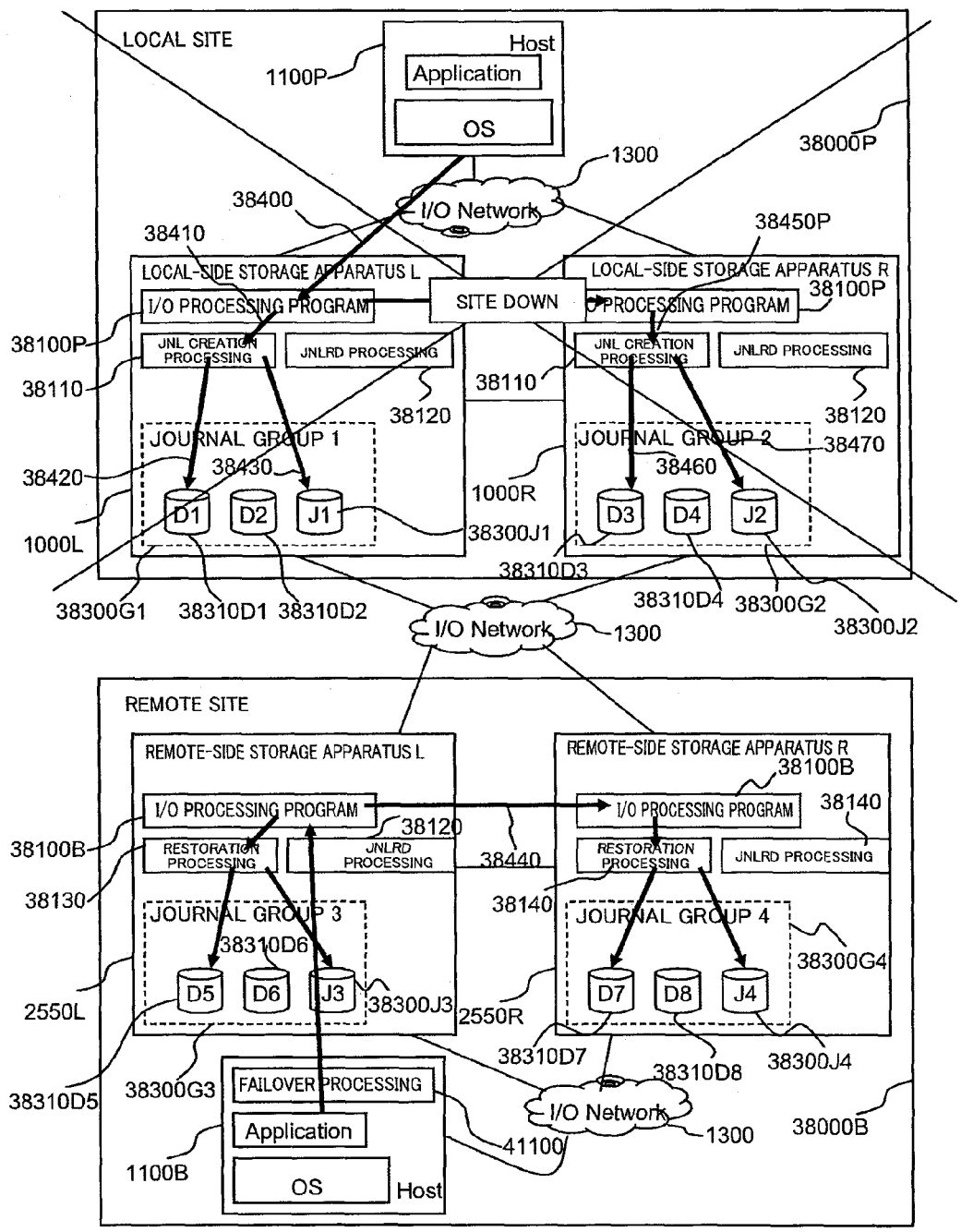
FIG. 54 is a third conceptual diagram showing an overview of the eighteenth embodiment.

FIG. 52 to FIG. 54 are schematic diagrams showing the invention of this embodiment. Incidentally, the hardware constitution used in this embodiment is similar to the seventeenth embodiment. Further, the programs running in the hosts 1100P, 1100B and the respective storage apparatuses (local-side storage apparatuses 1000L, 1000R and remote-side storage apparatuses 2550L, 2550R) have the same constitution as the seventeenth embodiment. Nevertheless, since certain processing contents of individual programs differ, the corresponding programs will be described later.

<1.1. Normal Status>

FIG. 52 shows the normal status of the information system of this embodiment. In this embodiment, as in the seventeenth embodiment, the write data sent from the I/O path manager 5000 (FIG. 5) in the host 1100P to the primary local-side storage apparatus 1000L is changed into journal data by the local-side and remote-side storage apparatuses 1000L, 1000R. Nevertheless, although the primary local-side storage apparatus 1000L transfers the journal data to the remote-side primary storage apparatus 2550L, journal is not normally transferred between the local-side secondary storage apparatus 1000R and the secondary remote-side storage apparatus 2550R. Such being the case, data written into the remote-side primary storage apparatus 2550L is copied to the secondary remote-side storage apparatus 2550R based on remote copy.

Incidentally, for the intersite transfer of journal data, the mode based on a journal read request is considered first as in the seventeenth embodiment, but an asynchronous RC mode may also be adopted. In order to decide the transfer destination of journal data and to avoid unauthorized access and malfunctions, the respective local-side storage apparatuses 1000L, 1000R and the respective remote-side storage apparatuses 2550L, 2550R use information of the storage apparatuses registered in the primary/secondary information 41340P, 41340B. Release of the journal data of the primary local-side storage apparatus 1000L is conducted based on the update number of the restored journal data associated with the journal read request. Further, release of the journal data of the local-side secondary storage apparatus 1000R is conducted with the secondary journal release processing (not shown) as a part of the asynchronous remote copy program 41050P booted in the secondary storage apparatus 1000R.

Further, remote copy (arrow 52010) of the data volumes 38310D5 to 38310D8 between the secondary remote-side storage apparatuses 2550L, 2550R may be synchronous remote copy or asynchronous remote copy (same number as the update number used in the intersite asynchronous remote copy may be allocated to journal data of asynchronous remote copy of the remote-side storage apparatuses 2550L, 2550R). Further, a mode of asynchronous remote copy known as differential remote copy may also be adopted.

Differential remote copy is a mode of recording the location of the write request to the copy source volume in the differential bitmap, and copying the data of the location in the copy source volume to the copy destination volume upon finding the update the data transfer processing program (not shown), which is periodically operated, finding the update location. Unlike other asynchronous remote copy, since this is similar to the format of synchronous remote copy where initialization copy and resynchronization copy are constantly operating, the processing is simple and the necessary amount of control information is small, but the write sequence of the copy destination volume cannot be protected when the storage apparatus having the copy source volume fails and stops.

<1.2. Status after Failure of Primary Site>

FIG. 54 is a schematic diagram showing the state after a failure occurs at the local site in a normal status illustrated in FIG. 52. The remote-side primary storage apparatus 2550L stops the restoration processing triggered by the processing request from the failover processing program 41100 of the host 1100B, copies all data of the update location to be copied based on differential remote copy, ensures that the contents of the data volumes 38310D5 to 38310D8 of both secondary remote-side storage apparatuses 2550L, 2550R are uniform, and thereafter switches the copy mode to synchronous remote copy. Subsequently, the application processing is resumed while maintaining the high availability constitution as in the other embodiments. Incidentally, write data from the host 1100B may be recorded with the update location based on a differential bitmap of intersite asynchronous remote copy. Further, when the local-side storage apparatuses 1000L, 1000R of the local site 38000P become available (or the reason of failover is a plan failover and the local-side storage apparatuses 1000L, 1000R enter their original operable state), journal data may be created to operate the JNL creation processing in order to perform asynchronous remote copy from the remote site 38000B to the local site 38000P in the future.

<1.3. Status after Failure of Local-Side Primary Storage Apparatus>

FIG. 53 is a schematic diagram showing a state after the primary local-side storage apparatus 1000L fails and stops. The I/O path manager 5000 (FIG. 5) of the host 1100P detects the failure and switches the I/O request destination to the secondary storage apparatus 1000R. Then, pursuant to this switch, the local-side secondary storage apparatus 1000R becomes a new primary storage apparatus, and the primary/secondary information 41340P (FIG. 41) is thereby updated.

Further, the storage apparatus 1000R that became the new local-side primary notifies the remote-side primary storage apparatus 2550L, which is the transfer destination of journal data, that the primary system and the secondary system has been changed, and further acquires the update number of journal data in which the transfer is requested by the remote-side primary storage apparatus 2550L. Since the storage apparatus 1000R that became a new local-side primary at the time of a normal status has created journal data, asynchronous remote copy can be continued by transferring the journal data from the acquired update number. Thus, even when the primary system and the secondary system are switched pursuant to the failure of the primary local-side storage apparatus L, it is possible to preserve the write sequence of the data volumes 38310D5, 38310D6 of the remote-side storage apparatus 2550L.

2. Initialization of Information System

Initialization of remote copy of the information system according to this embodiment is performed in the following sequence. Incidentally, the argument of command and the path provided to the respective local-side storage apparatuses 1000L, 1000R and the respective remote-side storage apparatuses 2550L, 2550R are the same as in the seventeenth embodiment.

(Step 1) Synchronous remote copy is performed from the data volumes 38310D1, 38310D2 of the primary local-side storage apparatus 1000L to the data volumes 38310D3, 38310D4 of the secondary storage apparatus 1000R, and the routine waits until the initialization copy is complete. Setting of the synchronous remote copy is the same as in the seventeenth embodiment.

(Step 2) Asynchronous remote copy is performed from the data volumes 38310D1, 38310D2 of the primary local-side storage apparatus 1000L to the data volumes 38310D5, 38310D6 of the remote-side primary storage apparatus 2550L, and the routine waits until the initialization copy is complete. Incidentally, the local-side secondary storage apparatus 1000R creates journal data when the primary local-side storage apparatus 1000L starts creating journal data.

(Step 3) Remote copy is performed from the remote-side primary storage apparatus 2550L to the remote-side storage apparatus 2550R, and the routine waits until the initialization copy is complete.

(Step 4) The apparatus number and journal group number of the primary/secondary information 41340P, 41340B in the respective local-side storage apparatuses 1000L, 1000R and the respective remote-side storage apparatuses 2550L, 2550R are updated.

The initialization routine is as described above. Incidentally, as in the first to seventeenth embodiments, the setting of remote copy may be designated by the host 1100P, and the transition between steps and the setting of remote copy may be performed with a program in the host 1100P.

3. Processing of I/O Path Manager

In this embodiment, a trigger for switching the intersite asynchronous remote copy is necessary. This Section explains the required expansion in the foregoing case.

Figure 55:
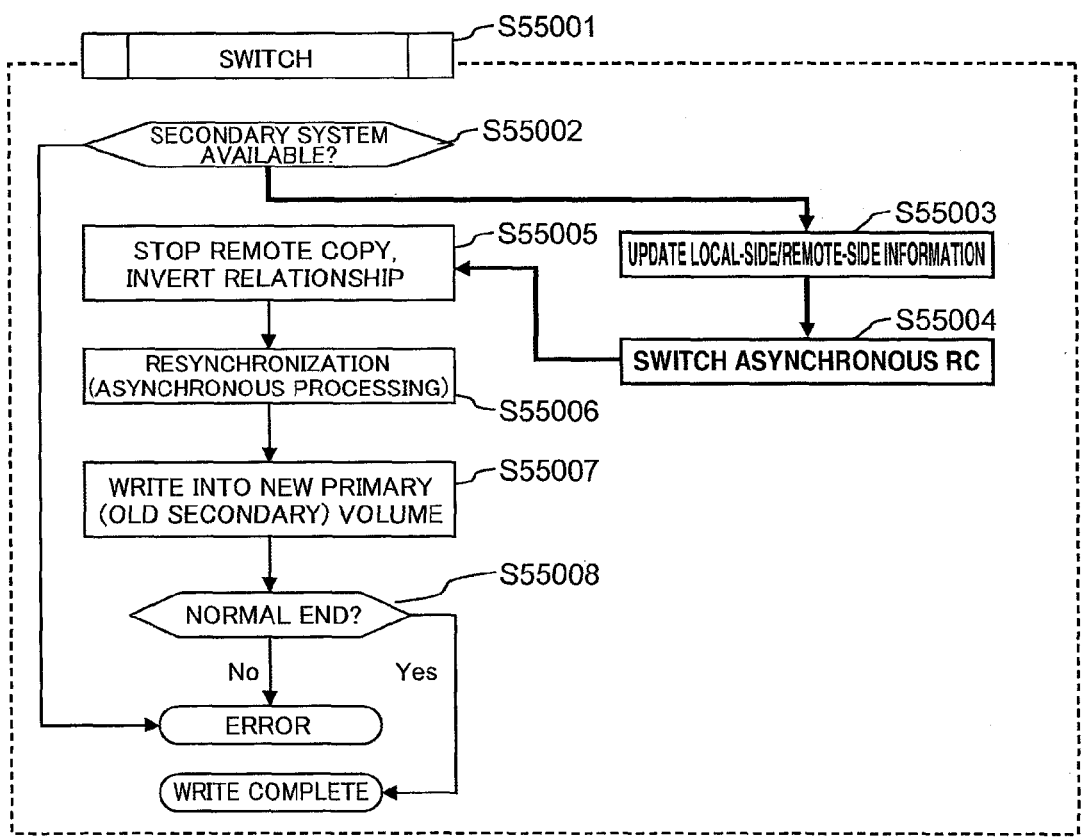
FIG. 55 is a flowchart showing the flow of switch processing in remote copy write processing.
Figure 56:
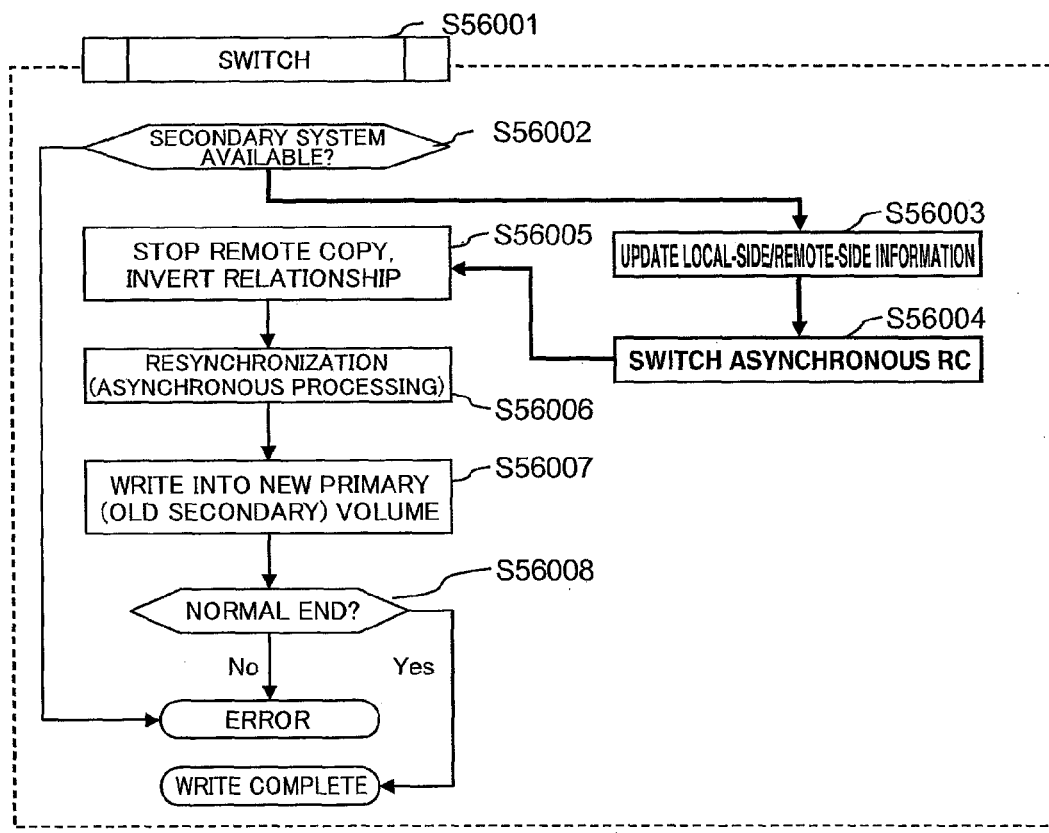
FIG. 56 is a flowchart showing the flow of switch processing in remote copy read processing.

FIG. 55 and FIG. 56 are flowcharts explaining the expansion required in the switch processing of the read request processing and the write request processing explained with reference to FIG. 10 and FIG. 11 of the first embodiment. Expansion is realized by inserting the following processing between the determination of secondary system availability and inversion of remote copy. Incidentally, the processing at S55002, S55005 to S55008 of FIG. 55 is the same as the processing at S10011, S10012 to S10015 of FIG. 10, and the processing at S56002, S56005 to S56008 of FIG. 56 is the same as the processing at S11011, S11012 to S11015 of FIG. 11, and the explanation thereof is omitted.

(Update of primary/secondary information: Corresponds to S55003 of FIG. 55 and S56003 of FIG. 56) The I/O path manager 5000 (FIG. 5) issues a command to the local-side secondary storage apparatus 1000R to update the primary/secondary information 41340P (FIG. 41). The local-side secondary storage apparatus 1000R that received the command switches the relationship of the primary system and secondary system of both primary local-side storage apparatuses 1000L, 1000R shown with the primary/secondary information 41340P, and updates information showing that it is the primary storage apparatus.

Incidentally, it is also necessary to notify the local-side old local-side storage apparatus 1000L and both secondary remote-side storage apparatuses 2550L, 2550R that the relationship of the primary system and secondary system of both primary local-side storage apparatuses 1000L, 1000R has been switched. As this method, the host 1100P may directly communicate with the respective local-side storage apparatuses 1000L, 1000R and the respective remote-side storage apparatuses 2550L, 2550R, or the local-side secondary storage apparatus 1000R may represent the other apparatuses and receive commands from the host 1100P, and the secondary storage apparatus 1000R may distribute the commands to the remaining storage apparatuses (local-side storage apparatus 1000R and the respective remote-side storage apparatuses 2550L, 2550R). With this method, the local-side secondary storage apparatus 1000R that received the command from the host 1100P may further distribute the command to the remote-side primary storage apparatus 2550L, and the remote-side primary storage apparatus 2550L may additionally distribute the command to the secondary remote-side storage apparatus 2550R. Further, as a method of issuing a command to the local-side old local-side storage apparatus 1000L, such command may be sent together with the inversion command of synchronous remote copy.

(Switch of asynchronous remote copy: Corresponds to S55003 of FIG. 55 and S56003 of FIG. 56) The I/O path manager 5000 (FIG. 5) issues a switch command (this is hereinafter referred to as an "asynchronous remote copy switch command") of the copy source of asynchronous remote copy to the local-side secondary storage apparatus 1000R. When the local-side secondary storage apparatus 1000R receives the asynchronous remote copy switch command, it calls the switch processing program (not shown) of the asynchronous remote copy program 41050P, and it thereby personally becomes the copy source of asynchronous remote copy. Incidentally, the identification number and journal group number of the remote-side primary storage apparatus 2550L and the journal group number of the local-side secondary storage apparatus 1000R may be associated with the asynchronous remote copy switch command. In addition, the identifying information of the data volumes 38310D1 to 38310D4 belonging to the local-side journal groups 38300G1, 38300G2 and the identifying information of the data volumes 38310D5 to 38310D8 belonging to the remote-side journal groups 38300G3, 38300G4 configuring a pair may be associated.

Figure 39:
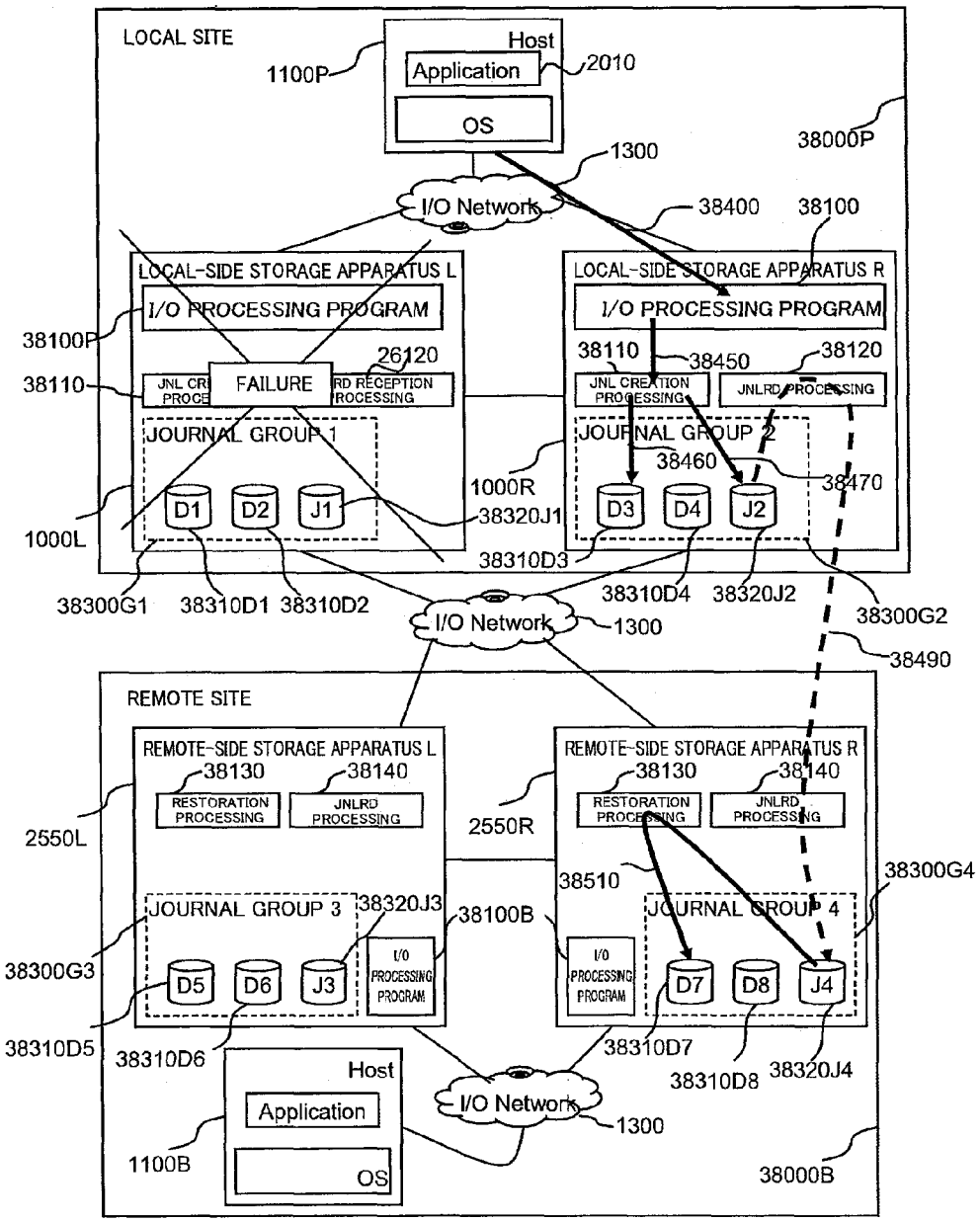
FIG. 39 is a second conceptual diagram showing an overview of the seventeenth embodiment.

Incidentally, update of the primary/secondary information 41340P, 41340B (FIG. 41) and the asynchronous remote copy switch command may also be inserted before the synchronous remote copy inversion processing of FIG. 39 (switch processing triggered by the local-side secondary storage apparatus 1000R receiving the write request).

4. Asynchronous Remote Copy

<4.1. Switch Processing>

The switch processing of the asynchronous remote copy programs 41050P, 41050B is processing of switching the storage apparatuses 1000L, 1000R to become the copy source triggered by a command from the host 1100P. Processing of the respective local-side storage apparatuses 1000L, 1000R and remote-side storage apparatuses 2550L, 2550R involved in this switch processing is now explained. Incidentally, The adjectives of primary and secondary used in the local-side storage apparatuses 1000L, 1000R and the remote-side storage apparatuses 2550L, 2550R to execute this processing may change due to the update of the primary/secondary information 41340P, 41340B to be executed together with this processing. Therefore, the storage apparatuses (local-side storage apparatuses 1000L, 1000R and remote-side storage apparatuses 2550L, 2550R) referred to as primary and secondary together with the term "old" in this Section shall be of a relationship before the update of the primary/secondary information 41340P, 41340B based on the switch processing of the host 1100P and before the execution of this processing.

<4.1.1. Processing of Local-Side Old Secondary Storage Apparatus>

Figure 57:
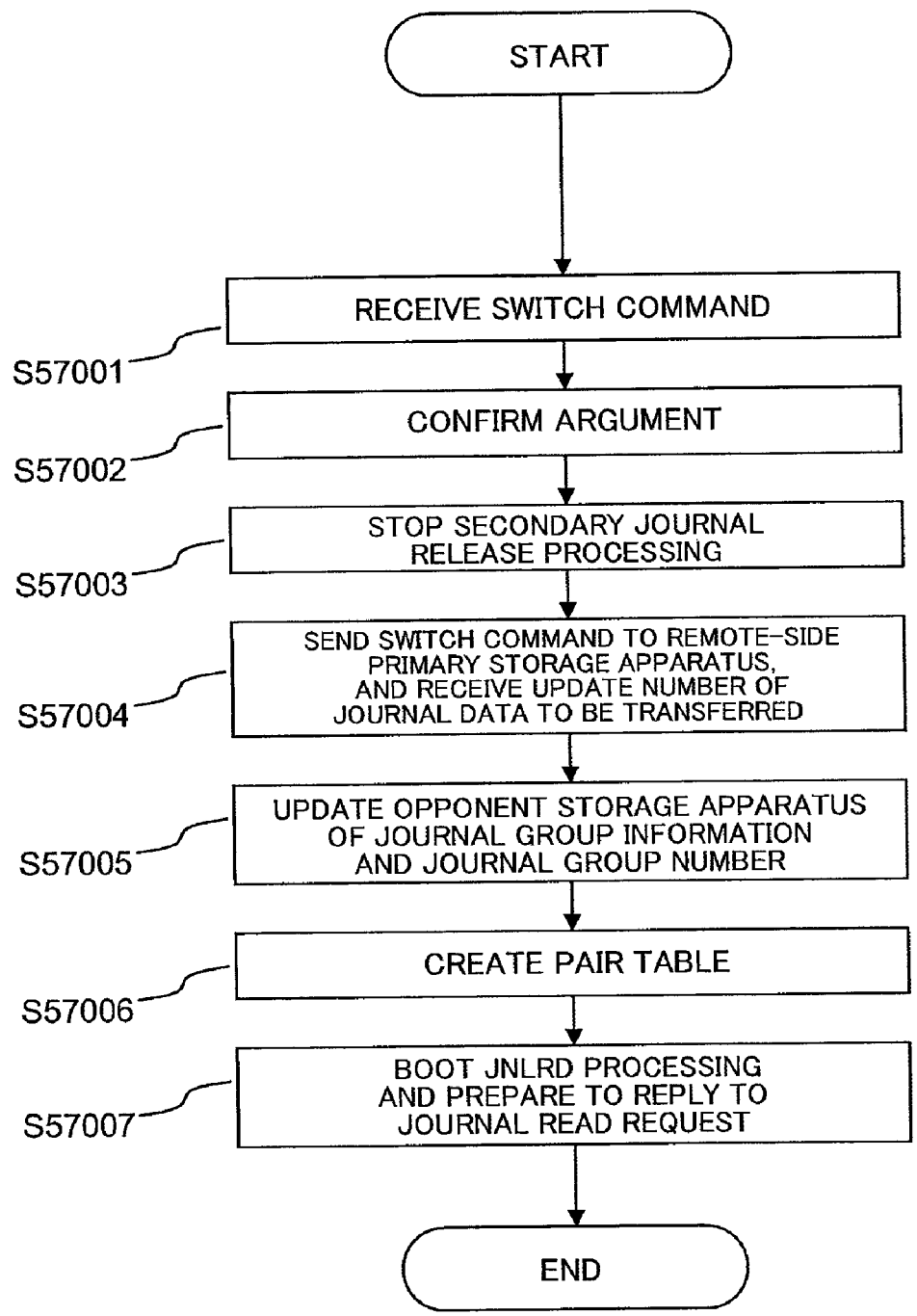
FIG. 57 is a flowchart showing the flow of switch processing to be performed in a local-side old secondary storage apparatus.

FIG. 57 is a flowchart representing the processing contents of switch processing to be performed in the local-side old secondary storage apparatus 1000R that received a switch command from the host 1100P. The processing contents are explained below with reference to the flowchart.

(S57001) The local-side old secondary storage apparatus 1000R receives an asynchronous remote copy switch command sent from the host 1100P.

(S57002) The local-side old secondary storage apparatus 1000R confirms the argument of the received command.

(S57003) The local-side old secondary storage apparatus 1000R stops the secondary journal release processing.

(S57004) The local-side old secondary storage apparatus 1000R sends the command received at S57001 to the remote-side primary storage apparatus 2550L, and waits for the return of the update number of journal data that needs to be transferred to the journal group 38300G3 of the opponent storage apparatus (in other words, the remote-side primary storage apparatus 2550L) as the return value. Incidentally, when the requested journal group 38300G3 does not exist or the copy destination data volumes 38310D5, 38310D6 belonging to the journal volume 38300J3 are of a Duplex-Pending status, since an error value will be obtained instead of the update number, an abnormal end is return to the host 1100P in this processing, and this processing is thereby ended.

(S57005) The local-side old secondary storage apparatus 1000R updates the opponent storage apparatus number and the journal group number in the journal group information 41330P to the apparatus number of the remote-side primary storage apparatus 2550L and journal group number of the journal group 38300G3 of the primary storage apparatus 2550L. As a result of this update, it is possible to deny unauthorized journal read request from a storage apparatus other than the copy destination.

(S57006) The local-side old secondary storage apparatus 1000R registers and updates the asynchronous remote copy pair to be created in the copy pair information 41300P.

(S45007) The local-side old secondary storage apparatus 1000R boots the JNLRD processing program 38120 and prepares to return a normal reply to the journal read request.

<4.1.2. Remote-Side Primary Storage Apparatus>

Figure 58:
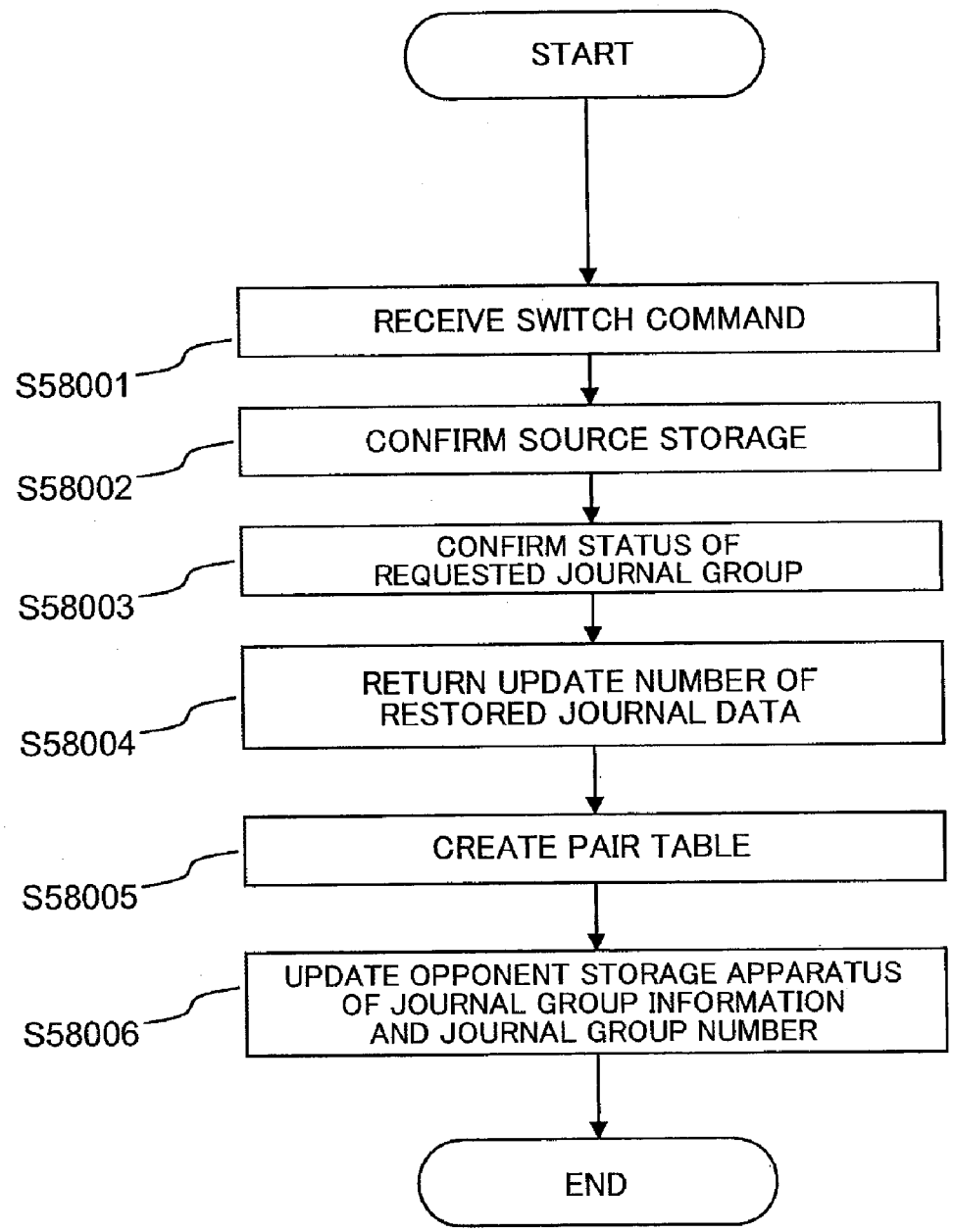
FIG. 58 is a flowchart showing the flow of switch processing to be performed in a remote-side primary storage apparatus.

FIG. 58 is a flowchart representing the processing contents of switch processing to be performed in the remote-side primary storage apparatus 2550L. The processing contents are explained below with reference to the flowchart.

(S58001) The remote-side primary storage apparatus 2550L receives an asynchronous remote copy switch command sent by the local-side old secondary storage apparatus 1000R at S57004.

(S58002) The remote-side primary storage apparatus 2550L confirms whether the switch command is from the local-side old secondary storage apparatus 1000R. Incidentally, when the source is other than the local-side old secondary storage apparatus R, this processing is ended.

(S58003) The remote-side primary storage apparatus 2550L confirms the existence of the requested journal group 38300G3 and the data volumes 38310D5, 38310D6. Incidentally, if the existence cannot be confirmed, an error value is returned, and this processing is ended.

(S58004) The remote-side primary storage apparatus 2550L returns the update number of the restored journal data to the local-side old secondary storage apparatus 1000R.

(S58005) The remote-side primary storage apparatus 2550L registers and updates the asynchronous remote copy pair to be created in the copy pair information 41300.

(S58006) The remote-side primary storage apparatus 2550L updates the opponent storage apparatus number and the journal group number in the journal group information 41330P to the apparatus number of the local-side old secondary storage apparatus 1000R and the group number of the journal group 38300G3 of the old secondary storage apparatus 1000R. Thereby, the JNLRD processing program 38140 is able to switch the destination of the journal read request to the local-side old secondary storage apparatus 1000R.

<4.1.3. Local-Side Old Primary Storage Apparatus>

Figure 59:
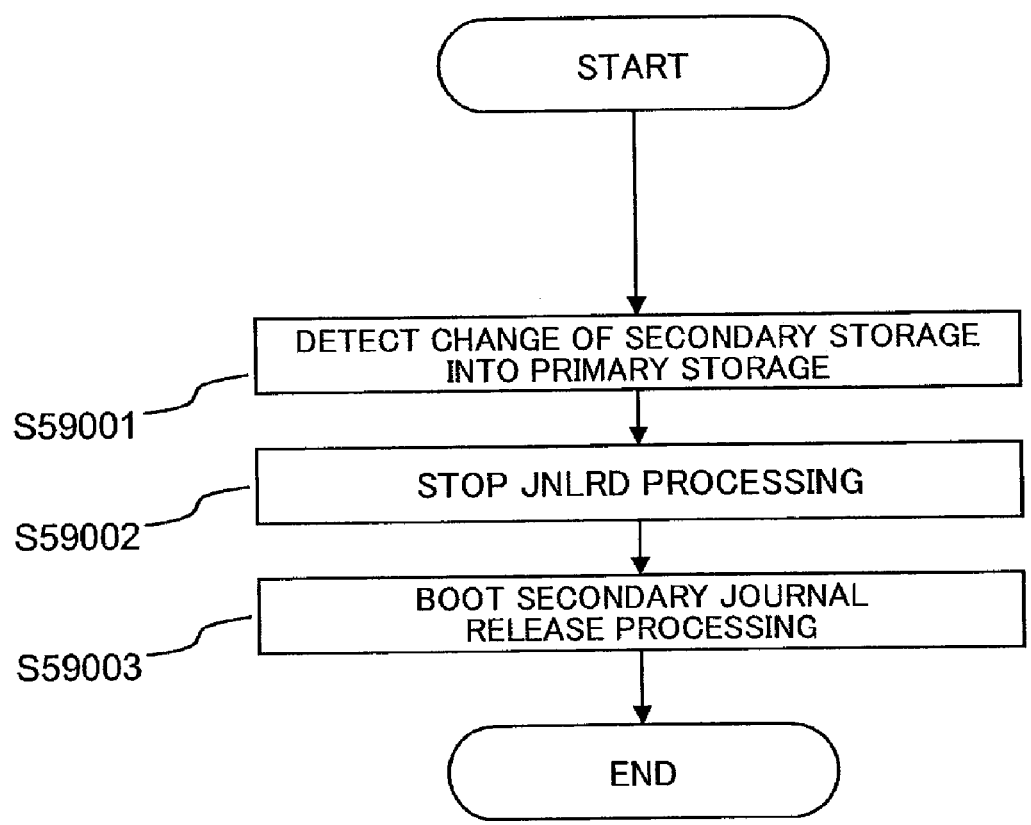
FIG. 59 is a flowchart showing the flow of switch processing to be performed in a local-side old primary storage apparatus.

FIG. 59 is a flowchart representing the processing contents of switch processing to be performed in the local-side old local-side storage apparatus 1000L. The processing contents are explained below with reference to the flowchart.

(S59001) The local-side old local-side storage apparatus 1000L detects that the local-side old secondary storage apparatus 1000R became a primary system. Incidentally, the following methods may be considered as the detection method, but the method is not limited thereto.

(Method 1) An update command of the primary/secondary information 41340P is received from the local-side old secondary storage apparatus 1000R.

(Method 2) A return value of the remote writing sent to the local-side old secondary storage apparatus 1000R is detected.

(S59002) The local-side old local-side storage apparatus 1000L stops the JNLRD processing program 38120.

(S59003) The local-side old local-side storage apparatus 1000L boots the secondary journal release processing.

<4.2. Journal Creation Processing>

In this embodiment also, as with the first to seventeenth embodiments, the primary local-side storage apparatus 1000L creates journal data including the update number that it personally created, and the secondary storage apparatus 1000R creates journal data based on the update information and update time contained in the remote writing.

<4.3. JNLRD Processing>

Figure 50:
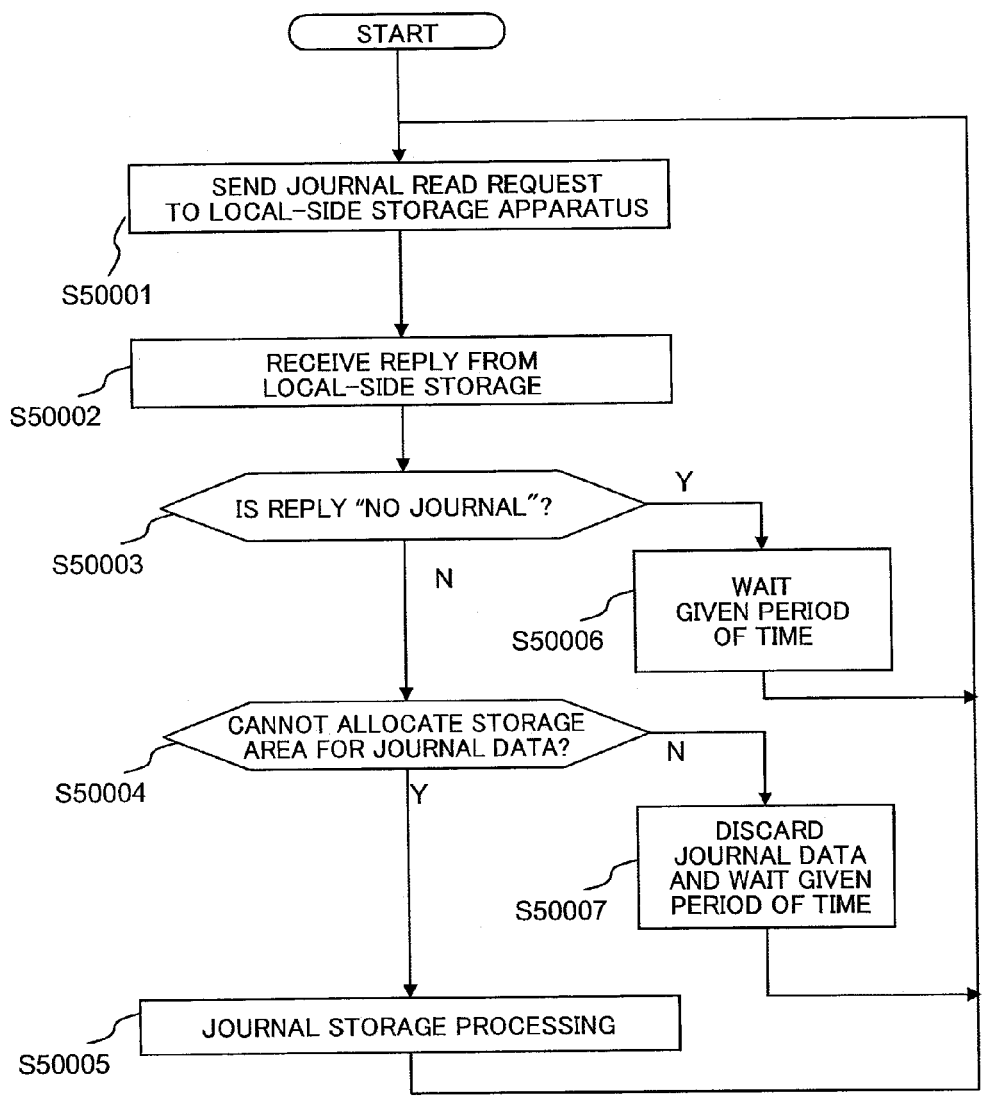
FIG. 50 is a flowchart showing the flow of JNLRD processing.

The processing explained with reference to FIG. 50 is also used in this embodiment.

<4.4. JNLRD Processing>

In this embodiment, immediately after the start of processing according to the flowchart shown in FIG. 48, expansion is implemented so as to foremost confirm that the source of the journal read request is the remote-side primary storage apparatus 2550L registered in the primary/secondary information 41340P or the journal group information 41330P. There are the following reasons for adding this kind of confirmation processing.

(Reason 1) In order to prevent the leakage of data due to unauthorized access; and (Reason 2) If the journal read request is processed even when it is an unauthorized access, the update information transfer start address of the journal group information 41330P indicating the journal to be subsequently transferred will advance, and the journal data transfer will become inconsistent.

<4.5. Secondary Journal Release Processing>

Figure 60:
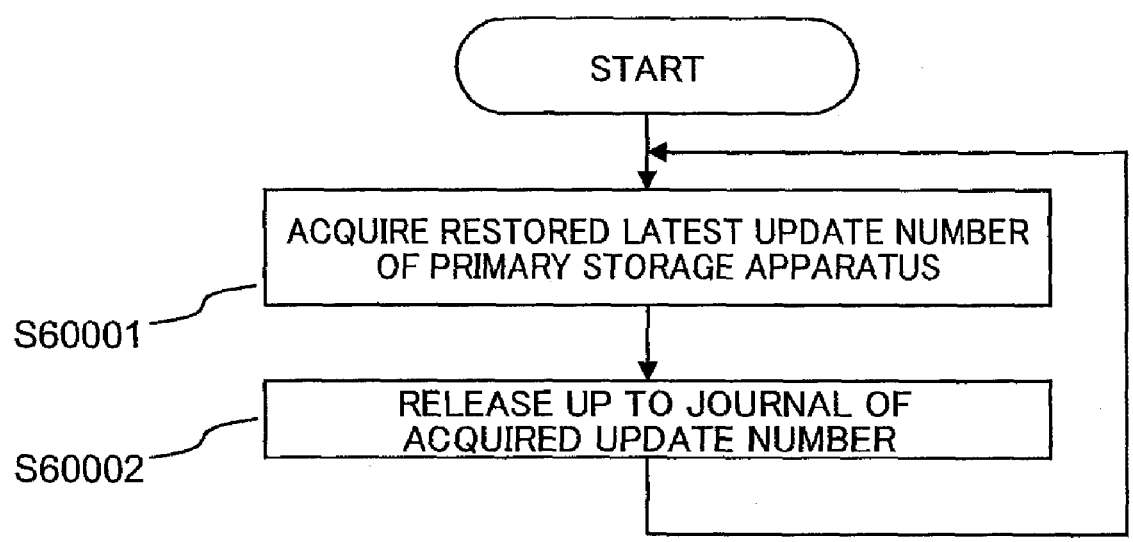
FIG. 60 is a flowchart showing the flow of secondary journal release processing.

FIG. 60 shows a flowchart representing the processing contents of secondary journal release processing. The processing contents are explained below with reference to the flowchart.

(S60001) The secondary journal release processing acquires the restored latest update number of the journal group information 41330P related to the primary local-side storage apparatus 1000L.

(S60002) The secondary journal release processing releases the journal data up to the received update number. The specific method of release is the same as the method explained in the JNLRD processing.

5. Failover Processing

Figure 45:
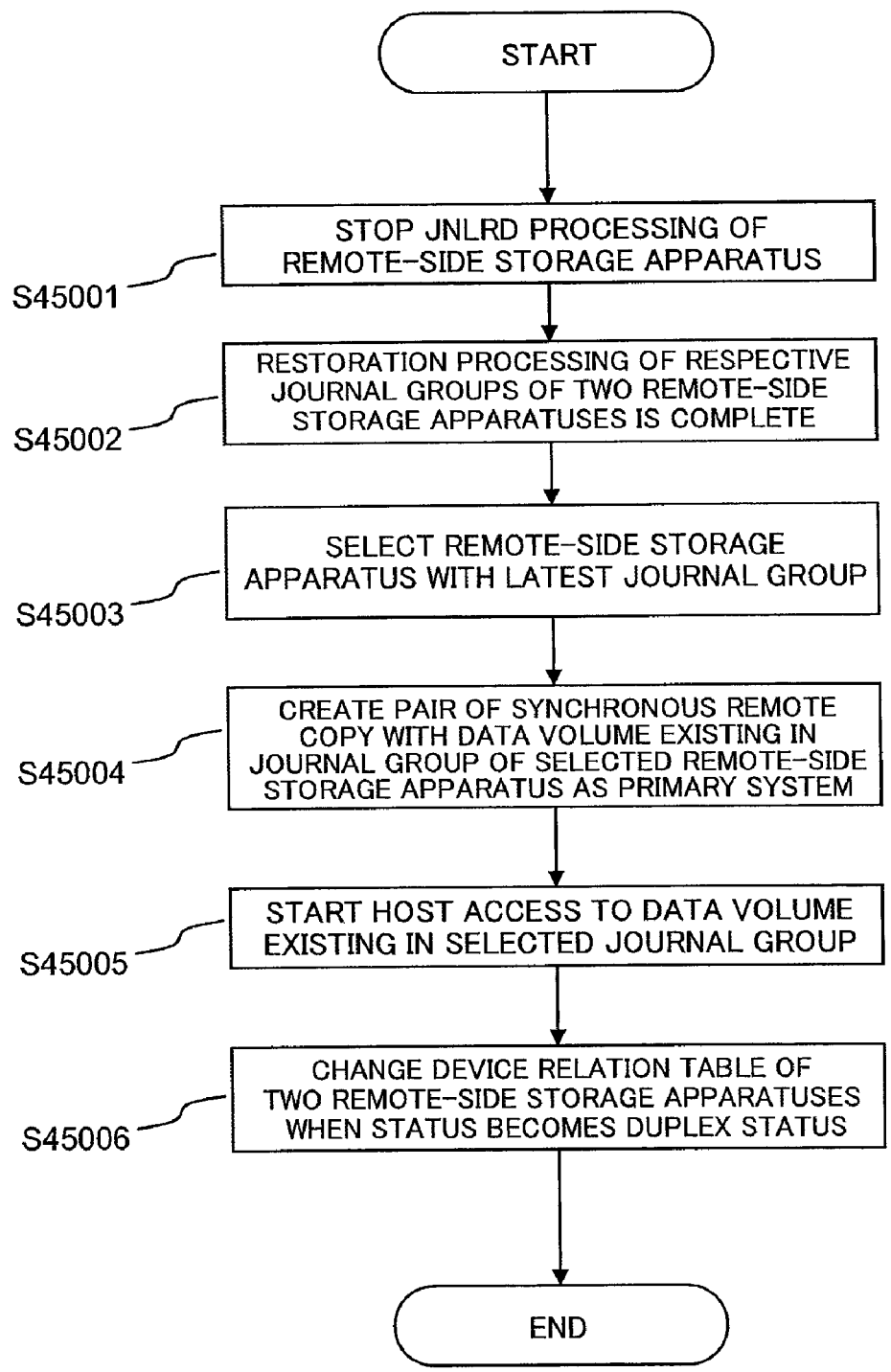
FIG. 45 is a flowchart showing the flow of failover processing according to the seventeenth embodiment.

Since the copy path to the secondary remote-side storage apparatus 2550R is different in the seventeenth embodiment and this embodiment, failover is conducted with processing that is different from FIG. 45. FIG. 61 shows a flowchart representing the processing contents of failover processing based on the failover processing program 41100 in this embodiment.

(S61001) Foremost, the failover processing program 41100 (FIG. 53) of the secondary host 1100B issues a command to stop the JNLRD processing program 38140 of the remote-side storage apparatuses 2550L, 2550R via the function I/F or the like. The remote-side storage apparatuses 2550L, 2550R that received the command stop the JNLRD processing. Incidentally, his step may be omitted when the JNLRD processing program 38140 is automatically stopped based on the asynchronous remote copy function.

(S61002) Subsequently, the failover processing program 41100 confirms that the remote-side primary storage apparatus 2550L completed the restoration processing based on the restoration processing program 38130. For example, the secondary host 11006 issues a command to the remote-side storage apparatus 2550L via the function I/F to return a completion notice at the time the restoration processing is complete.

(S61003) Subsequently, the failover processing program 41100 unifies the data of the data volumes 38310D7, 38310D8 of the secondary remote-side storage apparatus 2550R with the data of the primary storage apparatus 2550L. The unification method will differ as follows depending on the remote copy mode set between the remote-side storage apparatuses 2550L, 2550R.

(Case of synchronous remote copy) Special processing is not required since write data contained in the restored journal data is copied to the remote-side storage apparatus 2550R in the normal status.

(Case of asynchronous remote copy) The method waits for journal data that has not been released to the journal volume 38320J3 of the primary storage apparatus 2550L to exist.

(Case of differential remote copy) All differential bitmaps of the primary storage apparatus 2550L are cleared.

(S61004) Subsequently, the failover processing program 41100 uses the function I/F or the like to form a synchronous remote copy pair with the data volumes 38310D5, 38310D6 existing in the journal group 38300G3 of the selected remote-side storage apparatus 2550L as the primary system. Incidentally, this step can be omitted if synchronous remote copy has already been set from the normal status. Further, since the data contents of the primary and remote-side storage apparatuses 2550L, 2550R are the same even in the other remote copy modes, the initialization copy and resynchronization copy for synchronous remote copy can be omitted.

(S61005) Subsequently, the failover processing program 41100 issues a command to the application operating in the secondary host 1100B to start access to the data volumes 38310D5, 38310D6 of the remote-side primary storage apparatus 2550L. Incidentally, the subsequent processing is the same as the other embodiments, including the first embodiment (first to seventeenth embodiments).

6. Variation of Asynchronous Remote Copy

As explained in the seventeenth embodiment, the asynchronous remote copy modes respectively have variations.

<6.1. Journal Data Transfer Mode LED by Local-Side Storage>

Although the secondary remote-side storage apparatuses 2550L, 2550R led the journal data transfer in the journal read request mode, in this mode, the primary local-side storage apparatuses 1000L, 1000R lead the journal transfer. Here, if the following situations occur simultaneously, both local-side storage apparatuses 1000L, 1000R of the local-side primary system and secondary system will send journal data to the remote-side primary storage apparatus 2550L, and inconsistency may arise.

(Situation 1) The network between the primary local-side storage apparatus 1000L and the host 1100P and the secondary storage apparatus 1000R is interrupted, but the network from the primary local-side storage apparatus 1000L to the remote-side primary storage apparatus 2550L is communicable.

(Situation 2) The host 1100P sends a write request to the primary local-side storage apparatus 1000L in the state of Situation 1 and the request destination is switched to the local-side secondary storage apparatus 1000R (in other words, the secondary system became the primary system).

(Situation 3) Although in Situation 2 a command should be issued to the local-side storage apparatus 1000L of the primary system to change to a secondary system, since the communication is interrupted, the local-side storage apparatus 1000L of the primary system is not changed to a secondary system, and consequently two apparatuses will become a primary system.

Thus, the remote-side primary storage apparatus 2550L confirms the source upon receiving the journal data, and only receives journal data from the local-side storage apparatus 1000R designated as being a local-side primary system with the asynchronous remote copy switch command or the like.

<6.2. Grouping Mode of Write Data>

As explained in the seventeenth embodiment, the grouped write data is treated as one journal data, and the processing disclosed in this embodiment is performed.

<6.3. Snapshot Mode>

As explained in the seventeenth embodiment, the same generation number is given to the snapshots created at the same timing in both primary local-side storage apparatuses 1000L, 1000R. Incidentally, in this mode, it is necessary to create a save snapshot in the secondary remote-side storage apparatuses 2550L, 2550R, and a snapshot may be created in the primary storage apparatus 2550L as the creation destination. In the case of this method, save snapshot data is written back (only differential) to the data volume of the copy destination based on the failover processing program 41100 of the secondary host 1100B, and the data contents of the primary storage apparatus 2550L and the remote-side storage apparatus 2550R are subsequently unified.

Incidentally, in addition to the above, a save snapshot may also be created in the remote-side storage apparatus 2550R.

7. Measures Against Failure in Primary Storage Apparatus of Secondary Site

With the modes explained in various parts of this embodiment, there are cases when the secondary remote-side storage apparatus 2550R is not able to take over asynchronous remote copy when the remote-side primary storage apparatus 2550L fails and stops. This is because only the remote-side primary storage apparatus 2550L knows the data differential location between the remote-side primary and remote-side storage apparatuses 2550L, 2550R. Therefore, in order for the secondary remote-side storage apparatus 2550R to take over asynchronous remote copy, the primary local-side storage apparatus 1000L needs to know up to which journal data of the update number has reached the secondary remote-side storage apparatus 2550R, and release journal data that are earlier than the arrived journal data. Two realization methods to match the remote copy mode between both secondary remote-side storage apparatuses 2550L, 2550R are explained below.

<7.1. Differential Remote Copy Mode>
<7.1.1. During Normal Operation>

The following processing is periodically repeated.

(Step 1) The remote-side primary storage apparatus 2550L stops the restoration processing.

(Step 2) The remote-side primary storage apparatus 2550L waits under the data of the remote-side storage apparatus 2550R becomes uniform.

(Step 3) The remote-side primary storage apparatus 2550L stores the update number of journal data that was lastly restored during the stoppage at Step 1 as the value of the restored update number to be returned to the primary local-side storage apparatus 1000L.

(Step 4) The remote-side primary storage apparatus 2550L resumes the restoration processing and waits for a given period of time.

Incidentally, the update number stored at Step 3 is conveyed to the primary local-side storage apparatus 1000L based on the journal read request, and earlier journal data is released.

<7.1.2. During Failure in Remote Primary Storage Apparatus>

Upon detecting a failure in the remote-side primary storage apparatus 2550L, the primary local-side storage apparatus 1000L records the journal data into the write location by changing it into a differential bitmap. Then, the primary local-side storage apparatus 1000L and the old remote-side storage apparatus 2550R that newly became a primary system on the remote side perform resynchronization processing of asynchronous remote copy with such differential bitmap.

<7.2. Asynchronous Remote Copy Mode>
<7.2.1. During Normal Operation>

The following processing is periodically repeated.

(Step 1) The remote-side primary storage apparatus 2550L restores journal data to the data volume 38300G3 of the copy destination.

(Step 2) The remote-side primary storage apparatus 2550L transfers the journal data to the secondary remote-side storage apparatus 2550R based on asynchronous remote copy.

(Step 3) The secondary remote-side storage apparatus 2550R restores journal data to the data volumes 38310D7, 38310D8 and sends the update number of the restored journal data to the remote-side primary storage apparatus 2550L.

(Step 4) The remote-side primary storage apparatus 2550L releases the journal data based on the update number received at Step 3, and further sends the update number to the primary local-side storage apparatus 1000L.

(Step 5) The primary local-side storage apparatus 1000L receives the update number of Step 4 and uses it to release the journal data.

7.2.2. During Failure in Remote Primary Storage Apparatus>

After a failure occurs in the remote-side primary storage apparatus 2550R, the primary local-side storage apparatus 1000L inquires the secondary remote-side storage apparatus 2550R on the update number of the restored journal data to prepare for transferring from such journal. One secondary remote-side storage apparatus 2550R switches the source of journal data from the remote-side primary storage apparatus 2550L to the primary local-side storage apparatus 1000L, and receives journal data.

8. Variation

In the modes explained above, the source of journal data was always the local-side storage apparatus 1000L, but the secondary storage apparatus 1000R may also be used as the source.

What is claimed is:

1. An information system comprising:
a first computer;
a first storage apparatus coupled to the first computer and including a first volume;
a second storage apparatus coupled to the first computer and the first storage apparatus, and including a second volume; and
a third storage apparatus coupled to the first storage apparatus and including a third volume,
wherein the first storage apparatus and the second storage apparatus execute remote copy of copying data stored in the first volume to the second volume,
wherein the first storage apparatus and the third storage apparatus execute remote copy of copying data stored in the first volume to the third volume, and
wherein upon receiving a remote copy switch command from the first computer, the second storage apparatus and the third storage apparatus start remote copy of copying data stored in the second volume to the third volume.

2. The information system according to claim 1, wherein the remote copy switch command is issued from the first computer when a failure occurs in the first storage apparatus.

3. The information system according to claim 1, wherein the first storage apparatus assigns a unique update number to the data written by the first computer into the first volume, and notifies the update number to the second or third storage apparatus upon copying the data to the second or third volume.

4. The information system according to claim 1, wherein the first computer switches a path to the second storage apparatus when a failure occurs in the first storage apparatus.

5. The information system according to claim 1, wherein the first and second storage apparatuses perform remote copy of copying data stored in the first volume to the second volume synchronously with the writing of the data into the first volume, and
wherein the first and third storage apparatuses perform remote copy of copying data stored in the first volume to the third volume asynchronously with the writing of the data into the first volume.

6. The information system according to claim 1, wherein the first storage apparatus sends data to the third storage apparatus according to a request from the third storage apparatus.

7. The information system according to claim 1, wherein upon receiving data to be written into the first volume from the first computer, the first storage apparatus creates journal data containing the data and update information of the data including the update number, stores the created journal data in a first journal volume provided in the first storage apparatus, and sends the data to the second storage apparatus together with the update number,
wherein, upon receiving the data from the first storage apparatus, the second storage apparatus stores the data in the second volume, creates journal data containing the data and update information of the data including the update number notified by the first storage apparatus, and stores the created journal data in a second journal volume provided in the second storage apparatus, and wherein the third storage apparatus stores journal data sent from the first storage apparatus in a third journal volume provided in the third storage apparatus, and stores data contained in the journal data in the third volume.

8. The information system according to claim 1, further comprising:
a second computer coupled to the third storage apparatus, wherein the second computer takes over the processing of the first computer and writes data into the third volume when a failure occurs in the first and second storage apparatuses.

9. A method for performing remote copy in an information system which includes a first computer, a first storage apparatus coupled to the first computer and including a first volume, a second storage apparatus coupled to the first computer and the first storage apparatus, and including a second volume, and a third storage apparatus coupled to the first storage apparatus and including a third volume, said method comprising the steps of:
executing, by the first storage apparatus and the second storage apparatus, remote copy of copying data stored in the first volume to the second volume;
executing, by the first storage apparatus and the third storage apparatus, remote copy of copying data stored in the first volume to the third volume; and
upon receiving a remote copy switch command from the first computer, starting, by the second storage apparatus and the third storage apparatus, remote copy of copying data stored in the second volume to the third volume.

10. The method according to claim 9, further comprising the step of:
issuing the remote copy switch command from the first computer when a failure occurs in the first storage apparatus.

11. The method according to claim 9, further comprising the steps of:
assigning, by the first storage apparatus, a unique update number to the data written by the first computer into the first volume; and
notifying the update number to the second or third storage apparatus upon copying the data to the second or third volume.

12. The method according to claim 9, further comprising the step of:
switching, by the first computer, a path to the second storage apparatus when a failure occurs in the first storage apparatus.

13. The method according to claim 9, further comprising the steps of:
performing, by the first and second storage apparatuses, remote copy of copying data stored in the first volume to the second volume synchronously with the writing of the data into the first volume; and
performing, by the first and third storage apparatuses, remote copy of copying data stored in the first volume to the third volume asynchronously with the writing of the data into the first volume.

14. The method according to claim 9, further comprising the step of:
sending, by the first storage apparatus, data to the third storage apparatus according to a request from the third storage apparatus.

15. The method according to claim 9, further comprising the steps of:
upon receiving data to be written into the first volume from the first computer, creating, by the first storage apparatus, journal data containing the data and update information of the data including the update number, storing the created journal data in a first journal volume provided in the first storage apparatus, and sending the data to the second storage apparatus together with the update number;
upon receiving the data from the first storage apparatus, storing, by the second storage apparatus, the data in the second volume, creating journal data containing the data and update information of the data including the update number notified by the first storage apparatus, and storing the created journal data in a second journal volume provided in the second storage apparatus; and
storing, by the third storage apparatus, journal data sent from the first storage apparatus in a third journal volume provided in the third storage apparatus, and storing data contained in the journal data in the third volume.

16. The method according to claim 9, wherein the information system further includes a second computer coupled to the third storage apparatus, and
said method further comprising the step of:
taking over, by the second computer, the processing of the first computer and writing data into the third volume when a failure occurs in the first and second storage apparatuses.

* * * * *